(12) United States Patent
Mochinaga et al.

(10) Patent No.: US 9,300,903 B2
(45) Date of Patent: Mar. 29, 2016

(54) RECORDING MEDIUM, REPRODUCTION DEVICE, AND RECORDING DEVICE

(75) Inventors: Kazuhiro Mochinaga, Hyogo (JP); Taiji Sasaki, Osaka (JP); Hiroshi Yahata, Osaka (JP); Tomoki Ogawa, Osaka (JP); Tomohiro Matsumoto, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 222 days.

(21) Appl. No.: 14/113,473

(22) PCT Filed: Apr. 27, 2012

(86) PCT No.: PCT/JP2012/002911
§ 371 (c)(1),
(2), (4) Date: Oct. 23, 2013

(87) PCT Pub. No.: WO2012/147365
PCT Pub. Date: Nov. 1, 2012

(65) Prior Publication Data
US 2014/0050458 A1 Feb. 20, 2014

Related U.S. Application Data

(60) Provisional application No. 61/479,960, filed on Apr. 28, 2011, provisional application No. 61/576,022, filed on Dec. 15, 2011, provisional application No. 61/579,341, filed on Dec. 22, 2011.

(51) Int. Cl.
*H04N 5/76* (2006.01)
*H04N 5/85* (2006.01)
(Continued)

(52) U.S. Cl.
CPC ............... *H04N 5/85* (2013.01); *G11B 27/105* (2013.01); *G11B 27/329* (2013.01); *H04N 5/76* (2013.01);
(Continued)

(58) Field of Classification Search
None
See application file for complete search history.

(56) References Cited

U.S. PATENT DOCUMENTS 5,923,869 A 7/1999 Kashiwagi et al.
6,393,574 B1 5/2002 Kashiwagi et al.
(Continued)

FOREIGN PATENT DOCUMENTS

JP 3935507 6/2007
JP 2010-244630 10/2010
(Continued)

OTHER PUBLICATIONS

International Search Report issued Aug. 7, 2012 in corresponding International Application No. PCT/JP2012/002911.

*Primary Examiner* — Eileen Adams
(74) *Attorney, Agent, or Firm* — Wenderoth, Lind & Ponack, L.L.P.

(57) ABSTRACT

A recording medium has a main-view stream, a sub-view stream, and an extended stream recorded thereon. The main-view stream contains a main-view video stream constituting main views of stereoscopic video images, and is divided into a plurality of main-view extents arranged on the recording medium. The sub-view stream contains a sub-view video stream constituting sub-views of the stereoscopic video images, and is divided into a plurality of sub-view extents arranged on the recording medium. The extended stream contains extended data to be used in combination with the main-view stream, and is divided into a plurality of extended extents arranged on the recording medium. Between an adjacent pair of the plurality of extended extents, at least two each of the plurality of the main-view extents and the plurality of the sub-view extents are placed in a continuous, interleaved arrangement.

14 Claims, 57 Drawing Sheets

(51) Int. Cl.
  *H04N 9/82* (2006.01)
  *H04N 13/00* (2006.01)
  *H04N 13/02* (2006.01)
  *G11B 27/10* (2006.01)
  *G11B 27/32* (2006.01)
  *H04N 13/04* (2006.01)
  *H04N 19/597* (2014.01)
  *H04N 19/46* (2014.01)
  *H04N 19/59* (2014.01)
  *G11B 20/10* (2006.01)

(52) U.S. Cl.
  CPC ......... *H04N 9/8205* (2013.01); *H04N 13/0048* (2013.01); *H04N 13/0055* (2013.01); *H04N 13/0062* (2013.01); *H04N 13/0207* (2013.01); *H04N 13/0434* (2013.01); *H04N 13/0438* (2013.01); *H04N 19/46* (2014.11); *H04N 19/59* (2014.11); *H04N 19/597* (2014.11); *G11B 2020/1062* (2013.01); *G11B 2020/10805* (2013.01); *G11B 2020/10814* (2013.01); *G11B 2020/10916* (2013.01); *G11B 2220/2541* (2013.01)

(56) References Cited

U.S. PATENT DOCUMENTS

| | | | |
|---|---|---|---|
| 6,470,460 | B1 | 10/2002 | Kashiwagi et al. |
| 8,989,556 | B2 * | 3/2015 | Ogawa et al. ................ 386/241 |
| 2001/0053281 | A1 | 12/2001 | Kashiwagi et al. |
| 2002/0025143 | A1 | 2/2002 | Kashiwagi et al. |
| 2010/0067873 | A1 * | 3/2010 | Sasaki et al. .................... 386/95 |
| 2010/0253765 | A1 | 10/2010 | Kato et al. |
| 2011/0008024 | A1 | 1/2011 | Sasaki et al. |
| 2011/0013884 | A1 | 1/2011 | Sasaki et al. |
| 2011/0158604 | A1 | 6/2011 | Sasaki et al. |
| 2011/0283077 | A1 * | 11/2011 | Cammarata et al. ......... 711/170 |

FOREIGN PATENT DOCUMENTS

| | | |
|---|---|---|
| JP | 2011-004411 | 1/2011 |
| WO | 2010/073499 | 7/2010 |
| WO | 2010/116659 | 10/2010 |

* cited by examiner

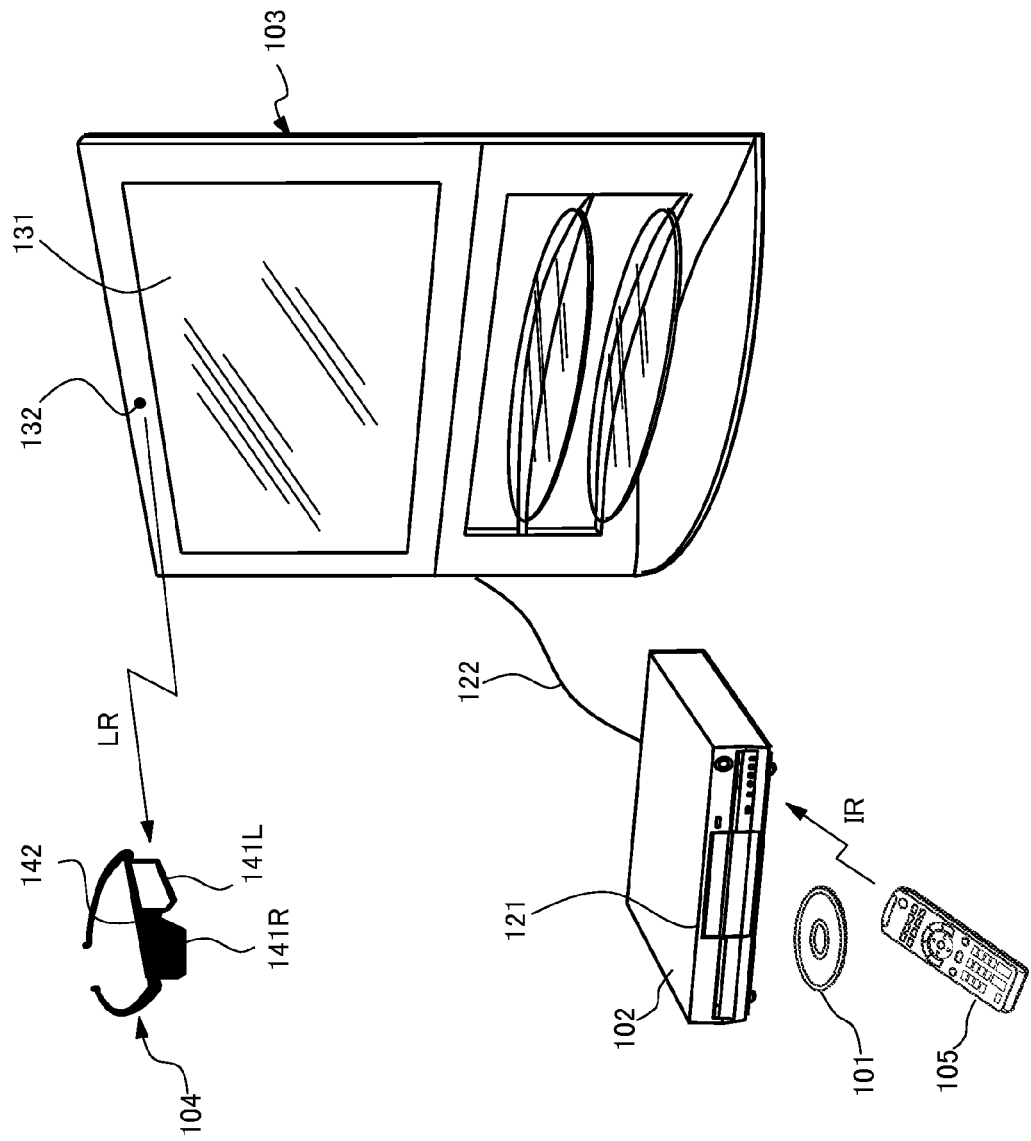

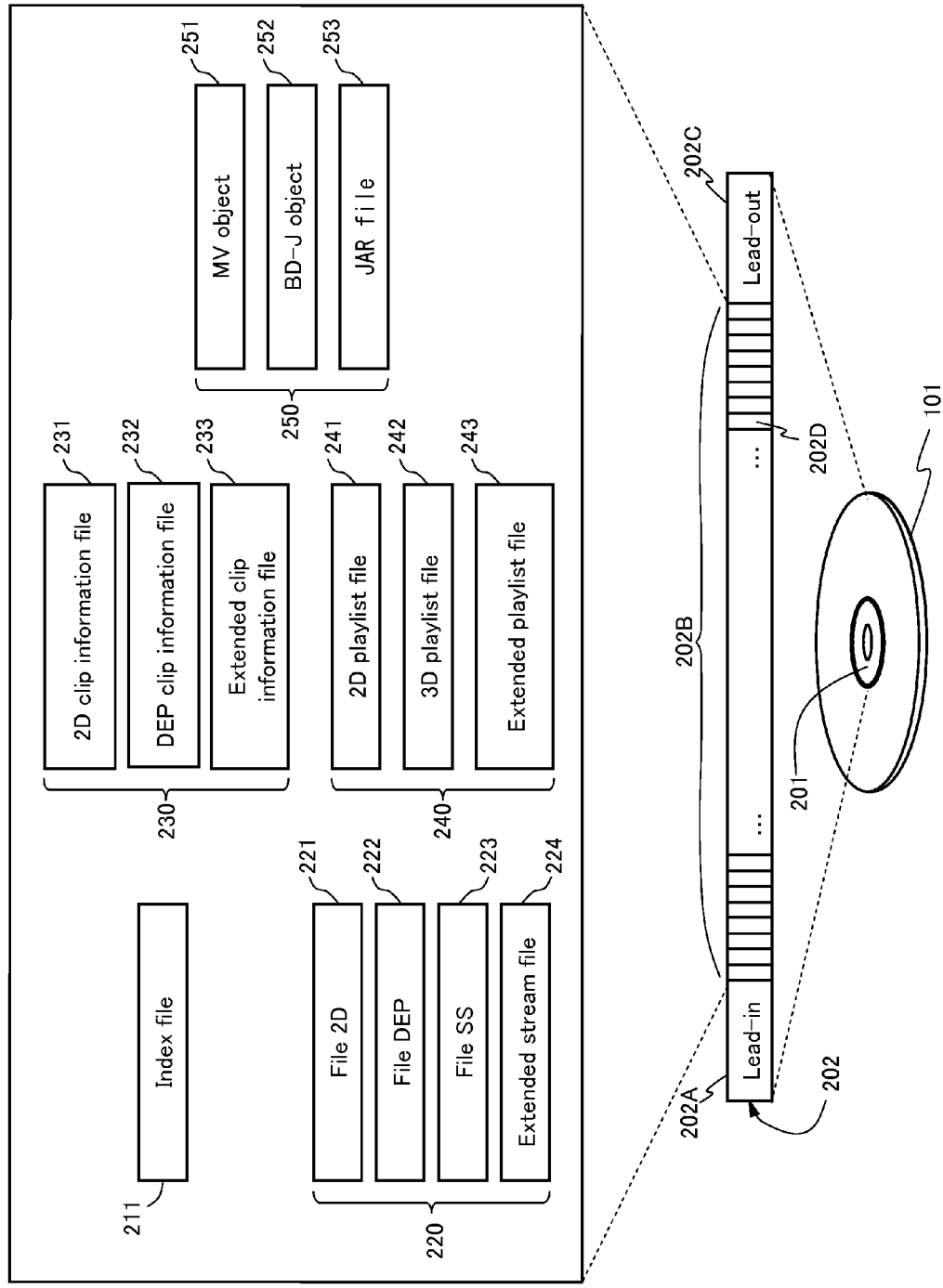

FIG.3A

| PID = 0x1011 | Primary video stream |
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

FIG.3B

| PID = 0x1012 | Primary video stream |
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

FIG.3C

| PID = 0x1013 | Primary video stream |
| 0x1260 | Depth map PG stream |
| 0x1261 | Depth map IG stream |
| 0x1460 | Depth map IG stream |
| 0x1B40 | Secondary video stream |

FIG.3D

| PID = 0x1014 | Resolution extension information |

FIG.17

| $S_{JUMP}$ (sectors) | 0 | 1 – 10000 | 10001 – 20000 | 20001 – 40000 | 40000 – 1/10 stroke | 1/10 stroke or greater |
|---|---|---|---|---|---|---|
| $T_{JUMP-MAX}$ (ms) | $50 = T_{JUMP0}$ | 200 | 300 | 350 | 700 | 1400 |

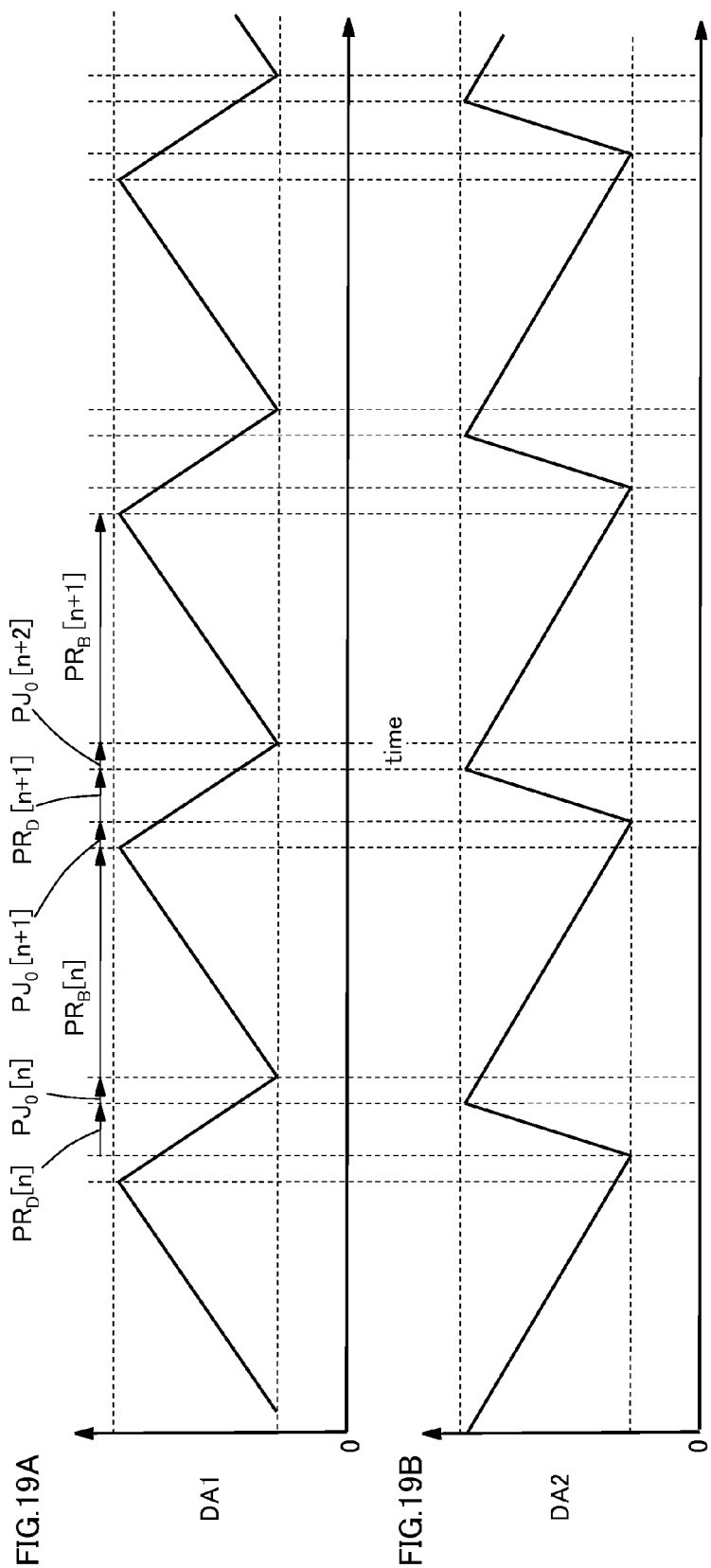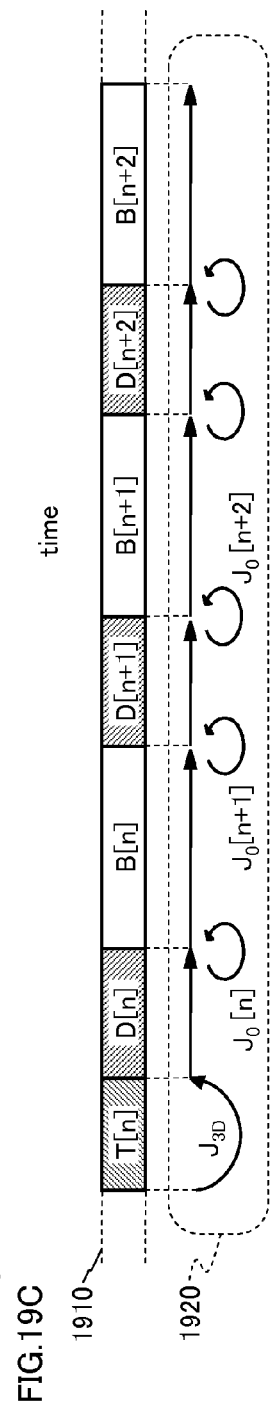

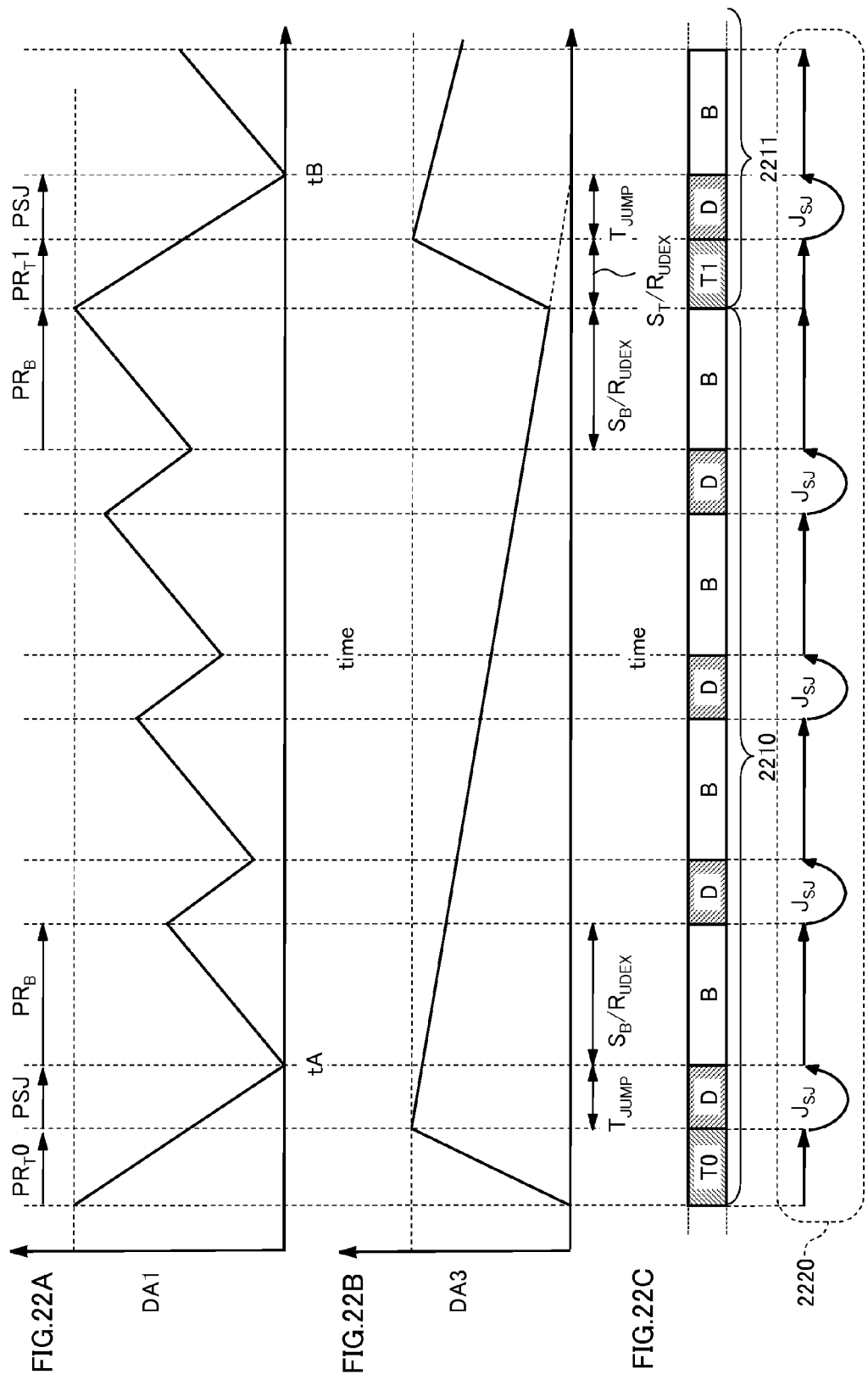

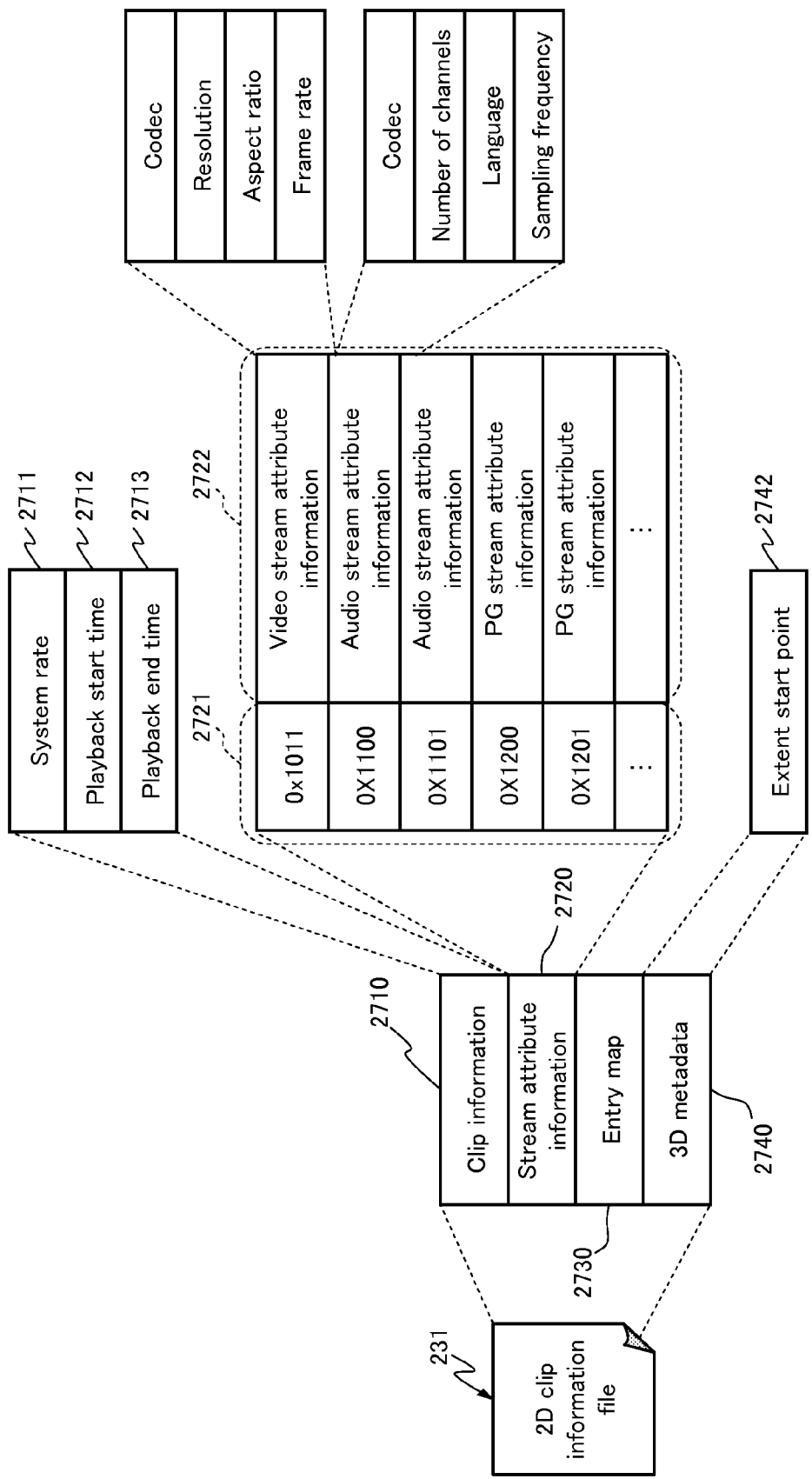

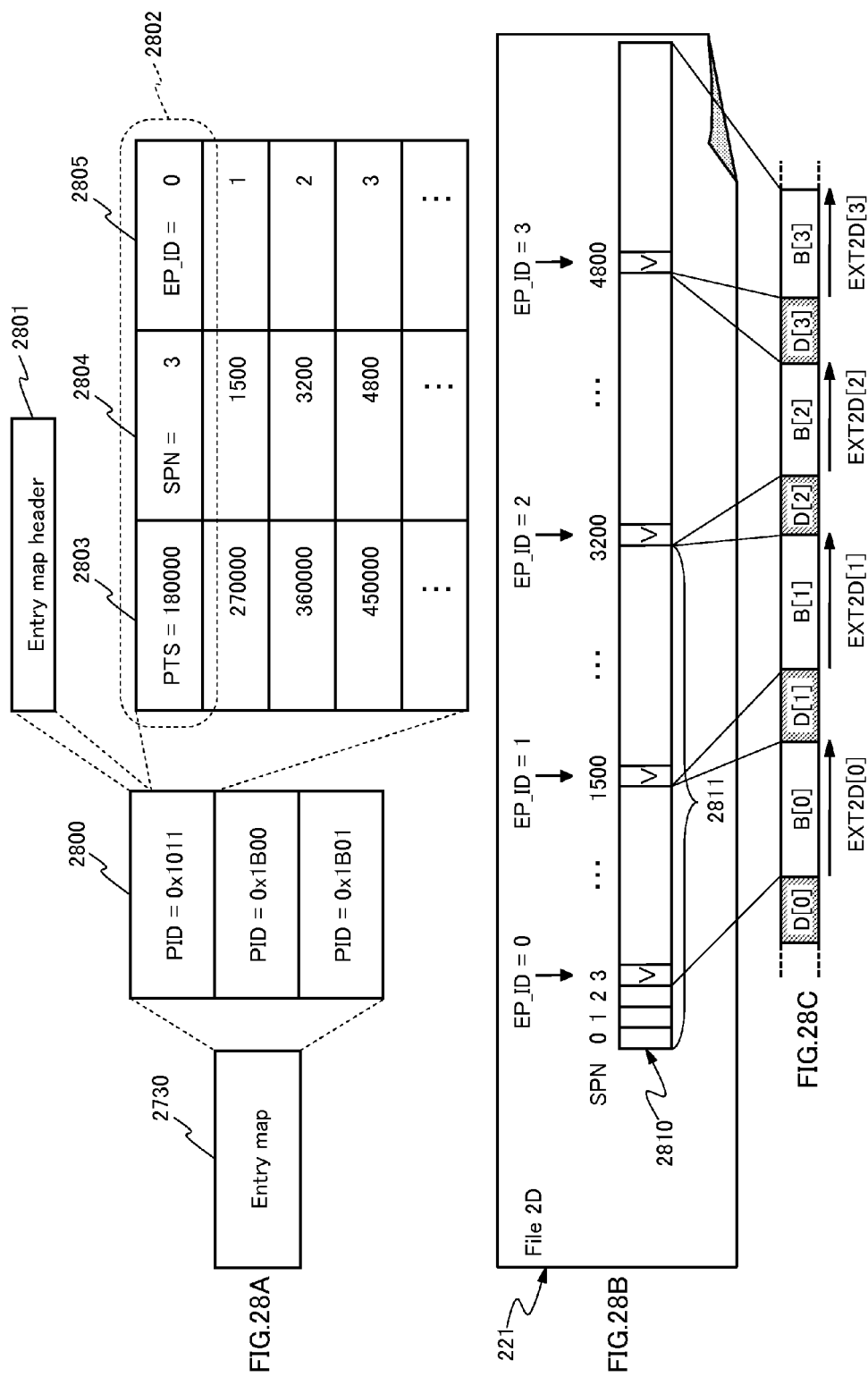

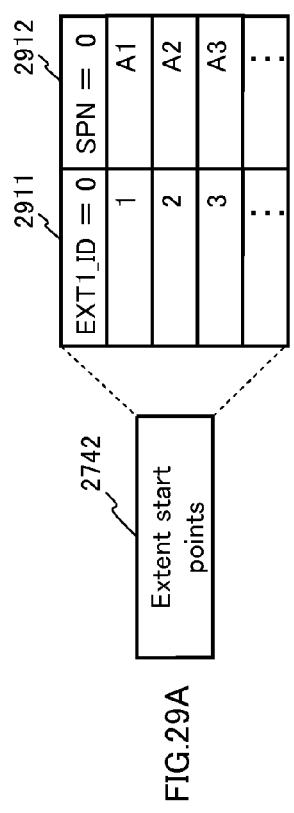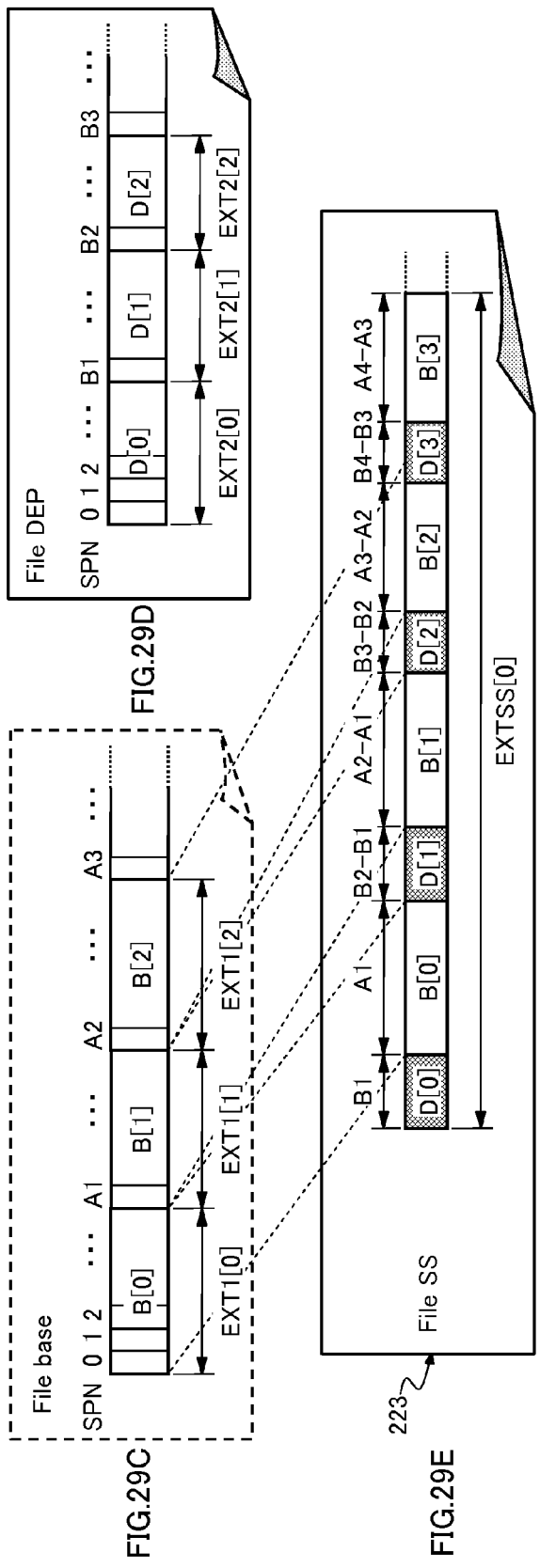
FIG.29A
FIG.29B
FIG.29C
FIG.29D
FIG.29E

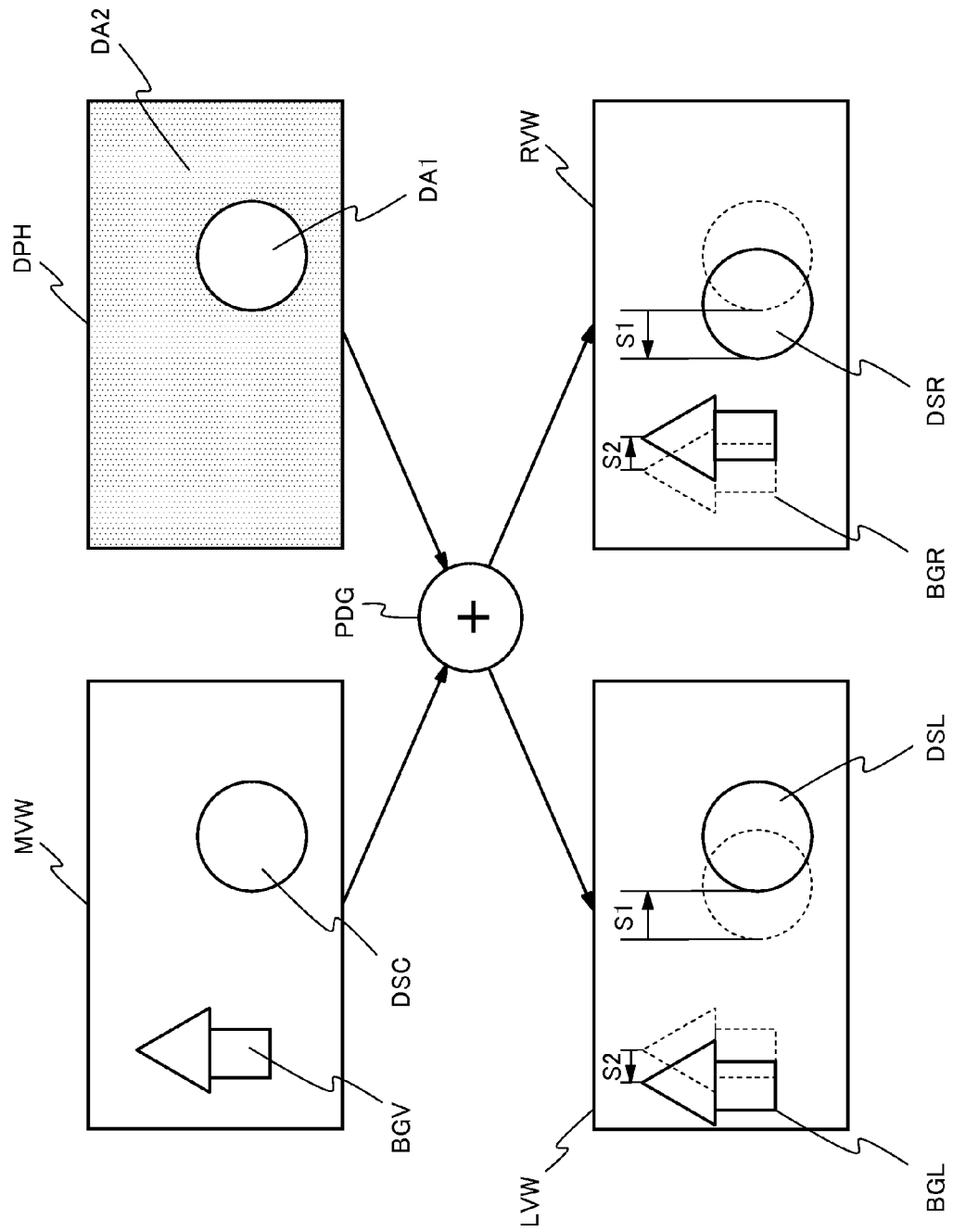

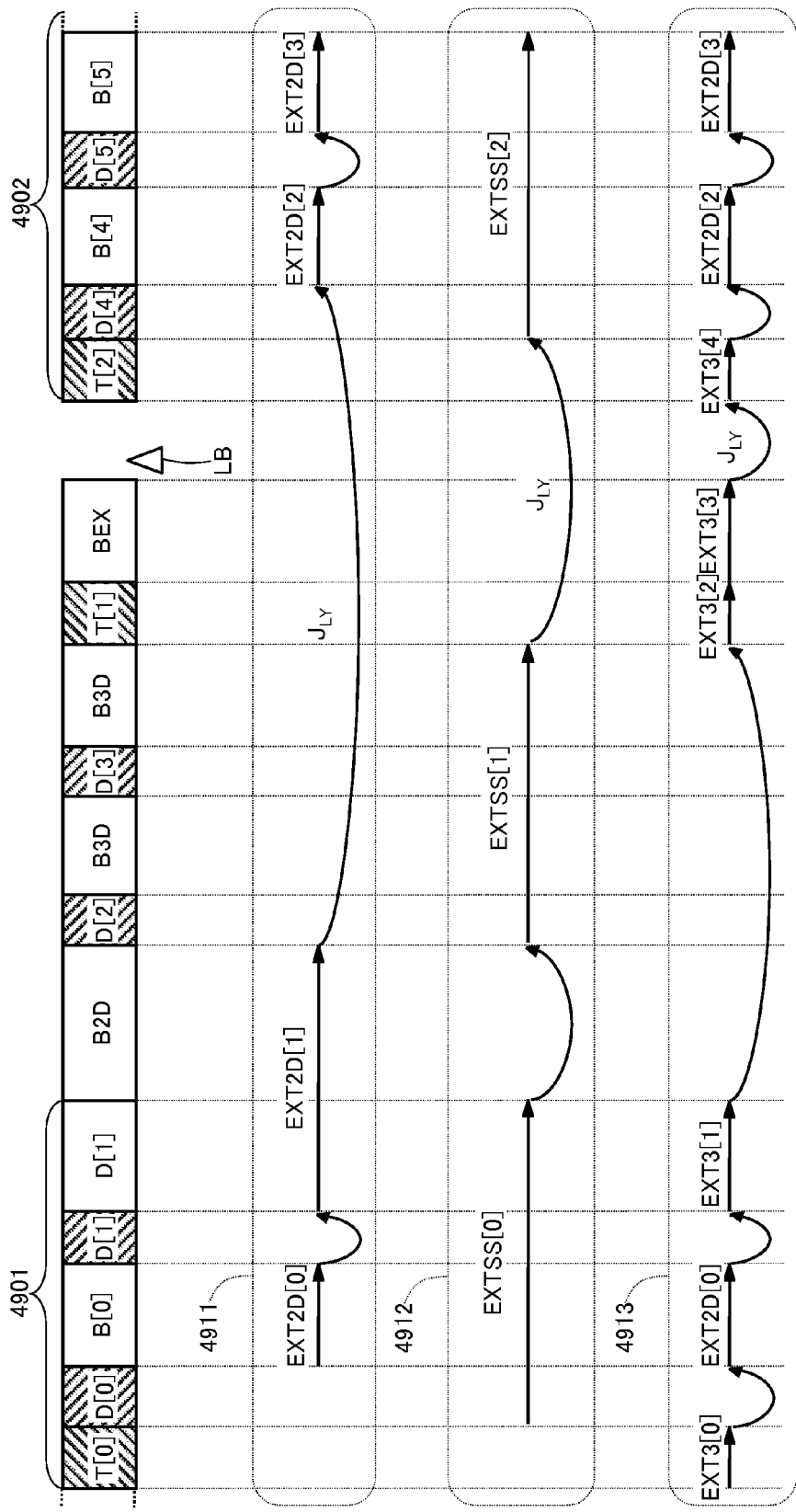

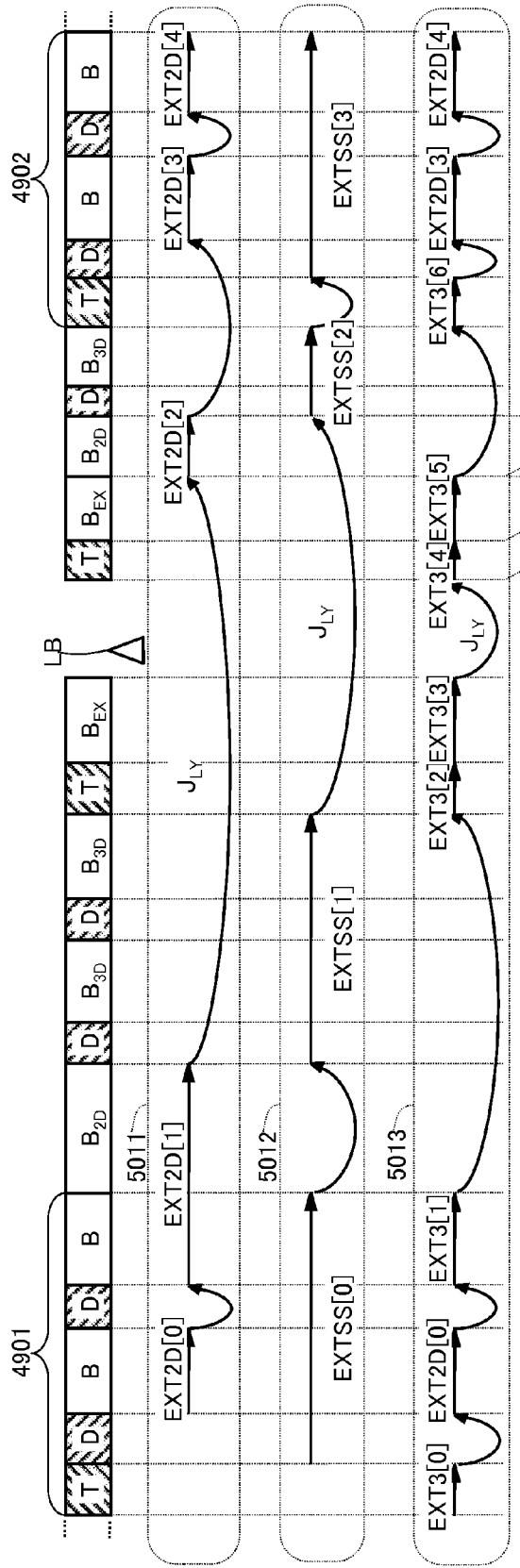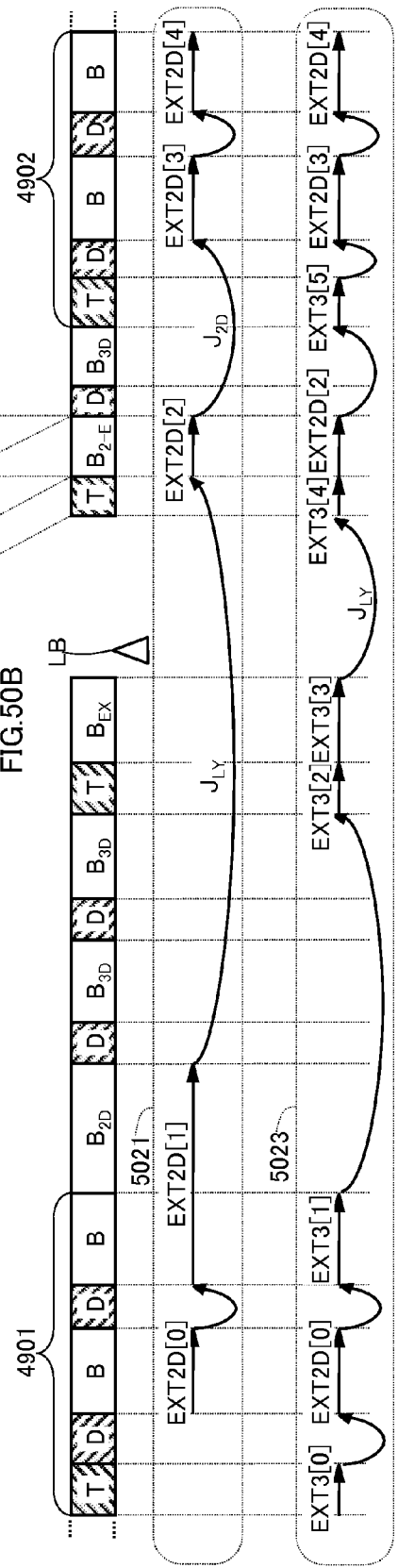

RECORDING MEDIUM, REPRODUCTION DEVICE, AND RECORDING DEVICE

This application is the National Stage of International Application No. PCT/JP2012/002911, filed Apr. 27, 2012, which claims the benefit of U.S. Provisional Application No. 61/479,960, filed Apr. 28, 2011, U.S. Provisional Application No. 61/576,022, filed Dec. 15, 2011, and U.S. Provisional Application No. 61/579,341, filed Dec. 22, 2011.

TECHNICAL FIELD

The present invention relates to a technology for recording and playing back stereoscopic video images, i.e., 3D video images, and especially to the structure of stream data on a recording medium.

BACKGROUND ART

In recent years, movies featuring 3D video images have gained popularity. This causes people to become familiar with household playback devices that can play back 3D video content from recording media such as optical discs. Household recording devices that can record 3D television programs on recording media and household video cameras that can record 3D video images have also been developed. It is preferable that, on recording media handled by such devices, 3D video content can be recorded in such a way to be also played back as 2D video content. More specifically, it is preferable that the 3D video content recorded on the recording media allows 2D playback devices to play back 2D video images and 3D playback devices to play back 3D video images. Here, "2D playback devices" refer to conventional playback devices that can only play back monoscopic video images, i.e., 2D video images, whereas "3D playback devices" refer to playback devices that can play back 3D video images. It is assumed in this description that a 3D playback device can also play back conventional 2D video images.

FIG. 57 is a schematic diagram illustrating the technology for ensuring the compatibility of an optical disc storing 3D video content with 2D playback devices (see, for example, Patent Document 1). Two types of video streams are stored in an optical disc PDS: One is a 2D/left-view video stream, and the other is a right-view video stream. The "2D/left-view video stream" is used for 3D video playback to represent 2D video images to be shown to the left eye of a viewer, i.e., "left views," and is used for 2D video playback to constitute 2D video images themselves. The "right-view video stream" is used for 3D video playback to represent 2D video images to be shown to the right eye of the viewer, i.e., "right views." The left- and right-view video streams have the same frame rate but different presentation times shifted from each other by half a frame period. For example, when the frame rate of the 2D/left- and right-view video streams is 24 frames per second, the frames of the video streams are alternately displayed every 1/48 seconds.

As shown in FIG. 57, the left- and right-view video streams are divided into a plurality of extents EX1A-C and EX2A-C, respectively, on the optical disc PDS. An "extent" is the smallest unit of data that can be read from the optical disc drive (see "Supplement" for details). Each extent contains at least one group of pictures (GOP). Hereinafter, the extents belonging to the 2D/left-view video stream are referred to as "2D/left-view extents," and the extents belonging to the right-view video stream are referred to as "right-view extents." The 2D/left-view extents EX1A-C and the right-view extents EX2A-C are alternately arranged on a track TRC of the optical disc PDS. Such an arrangement of extents is referred to as an "interleaved arrangement." A group of extents recorded in an interleaved arrangement on a recording medium is used both in 3D video playback and 2D video image playback, as described below.

From the optical disc PDS, a 2D playback device PL2 causes an optical disc drive DD2 to read only the 2D/left-view extents EX1A-C in order, skipping right-view extents EX2A-C. Furthermore, an image decoder VDC sequentially decodes the extents read by the optical disc drive DD2 into video frames VFL. In this way, a display device DS2 only displays left views, and viewers can watch normal 2D video images.

A 3D playback device PL3 causes an optical disc drive DD3 to alternately read 2D/left- and right-view extents from the optical disc PDS. When expressed as codes, the extents are read in the order of EX1A, EX2A, EX1B, EX2B, EX1C, and EX2C. Furthermore, from among the read extents, those belonging to the 2D/left- and right-view video streams are supplied to a left-video decoder VDL and a right-video decoder VDR, respectively. The video decoders VDL and VDR alternately decode the video streams into video frames VFL and VFR. As a result, left and right views are alternately displayed on a display device DS3. In synchronization with the switching of the views by the display device DS3, shutter glasses SHG cause its left and right lenses to become opaque alternately. Therefore, the left views are shown only to the viewer's left eye, and the right views are only to the viewer's right eye. At this point, the viewer perceives differences in shape between the left and right views as binocular parallax, and thus sees the pair of 2D video images displayed by the display device DS3 as one 3D video image.

The above-described interleaved arrangement of extents is used when 3D video content is stored on any recording medium, not only on an optical disc. This allows the recording medium to be used both for 2D and 3D video playbacks.

CITATION LIST

Patent Literature

[Patent Literature 1]
Japanese Patent No. 3935507

SUMMARY OF INVENTION

Technical Problem

In recent years, the development of 4K2K, one of the next-generation display technologies, has been advanced. "4K2K" is the technology for displaying video images at a high resolution of 4000×2000 pixels, which is approximately four times the conventional resolution of 1920×1080 pixels. If the screen size is fixed, the representation of video images becomes finer as the resolution increases. Therefore, 4K2K is a promising technology for achieving a further increase in image quality. At the same time, during the development of 4K2K, importance is being placed on ensuring compatibility with schemes of displaying video images at conventional resolutions. In particular, when 4K2K video content is recorded on a recording medium, it is preferable that a conventional 2D playback device be able to play back the video content at a conventional resolution. Accordingly, one current suggestion is to divide 4K2K video content into first and second portions, and then record both the portions on a recording medium: the first portion represents the video content at a conventional resolution, and the second portion includes extended data necessary for converting the resolution of the first portion into the 4K2K resolution. A conventional playback device is allowed to read only the first portion from the recording medium, and then play back video images at a conventional resolution from the first portion. On the other hand, a 4K2K-compatible playback device is allowed to read both the first and second portions from the recording medium, and then play back video images at the 4K2K resolution from these portions. This approach enables the 4K2K video content to be used to play back video images both at the conventional resolution and at the 4K2K resolution.

As another technology striving for a further increase in image quality, increasing the number of bits in the color information of each pixel from the current value "8" to "12," for example, has also been developed. This technology is referred to as "n-bit extension." Since increase in the number of bits in the color information enables each pixel to express a richer variety of colors, the n-bit extension holds the promise of a further increase in image quality. In order to preserve compatibility with conventional technologies, the n-bit extension also adopts a suggestion to separate bit-extended content into a portion representing 8-bit color information and another portion of extended data necessary for converting the 8-bit color information into 12-bit one or the like, and then to record both the portions on a recording medium.

In addition to 4K2K and n-bit extension, various technologies for further improvement in the quality of video content or the diversity of its attributes represent video content as a combination of conventional video content and extended data in order to preserve compatibility with conventional technologies. On the other hand, the above-described technology for recording and playback of 3D video images allows 3D video content to be compatible with 2D playback devices by adding extended data, i.e., the right-view video stream, to 2D video content, i.e., the 2D/left-view video stream. Accordingly, it is expected that incorporating extended data for 4K2K, n-bit extension, or the like, into 3D video content enables recording of the 3D video content on recording media in a structure to be usable for all of these technologies. Such recording of the 3D video content, however, is not easy in practice for the following reasons.

As shown in FIG. 57, when 2D video images are played back from extents placed in an interleaved arrangement, the optical disc drive DD2 skips the right-view extents EX2A-C. This operation is referred to as a "jump." During a jump period, data is not provided from the optical disc drive DD2 to a buffer built in the image decoder VDC, and therefore the data stored in the buffer decreases because of being processed by the image decoder VDC. Accordingly, in order to allow the 2D playback device PL2 to seamlessly play back 2D video images, each of the 2D/left-view extents EX1A-C has to be designed to have a lower limit of its data amount, i.e., a minimum extent size, so that buffer underflow does not occur during the jump period.

When 3D video images are played back from the same extents, the optical disc drive DD2 does not read the right-view extents EX2A-C while being read the 2D/left-view extents EX1A-C. Therefore, during this period, the data of the right-view extents EX2A-C stored in a buffer built in the right-video decoder VDR decreases because of being processed by the right-video decoder VDR. Conversely, the optical disc drive DD2 does not read the 2D/left-view extents EX1A-C while being read the right-view extents EX2A-C. Therefore, during this period, the data of the 2D/left-view extents EX1A-C stored in another buffer built in the left-video decoder VDL decreases because of being processed by the left-video decoder VDL. As a result, in order to allow the 3D playback device PL3 to seamlessly play back 3D video images, each of the extents EX1A-C and EX2A-C has to be designed to have a minimum extent size so that buffer underflow does not occur during the period when the next extent is read.

Furthermore, since the read rate of an optical disc drive is higher than the processing rate of a video decoder, a buffer that stores the data of an extent has an increasing data amount while the optical disc drive is reading the extent. In order to prevent the buffer from overflow without providing an excessive capacity, each extent is required to have an upper limit of its data amount, i.e., a maximum extent size.

As described above, recording of 3D video content on a recording medium requires that the size of each extent satisfy a plurality of conditions. Accordingly, addition of extended data to the 3D video content further requires that an arrangement of the extended data do not violate any of these conditions. Such an arrangement is never obvious even to a person of ordinary skill in the art.

An object of the present invention is to solve the above-discussed problems, i.e., to provide a recording medium including a combination of 3D video content and extended data recorded thereon so as to enable a playback device to maintain good playback performance.

Solution to Problem

A recording medium according to an aspect of the invention comprises a main-view stream, a sub-view stream, and an extended stream recorded thereon. The main-view stream contains a main-view video stream constituting main views of stereoscopic video images, and is divided into a plurality of main-view extents arranged on the recording medium. The sub-view stream contains a sub-view video stream constituting sub-views of the stereoscopic video images, and is divided into a plurality of sub-view extents arranged on the recording medium. The extended stream contains extended data to be used in combination with the main-view stream, and is divided into a plurality of extended extents arranged on the recording medium. At least two each of the plurality of main-view extents and the plurality of sub-view extents are placed in a continuous, interleaved arrangement between an adjacent pair of the plurality of extended extents.

Advantageous Effects of Invention

The recording medium according to the aspect of the invention has at least two each of the main-view and sub-view extents between an adjacent pair of the extended extents. Accordingly, the entirety of the extents arranged between the pair of extended extents has a sufficiently large size, even when each of the extents has a size limited to a maximum extent size or less. This allows a playback device to avoid buffer underflow during jumps over the recording areas of the extended extents. The recording medium thus includes the combination of 3D video content and extended data recorded thereon so as to enable the playback device to maintain good playback performance.

BRIEF DESCRIPTION OF DRAWINGS

FIG. 1 is a schematic diagram showing a home theater system that uses a recording medium according to Embodiment 1 of the present invention.

FIG. 2 is a schematic diagram showing the data structure of a BD-ROM disc 101 shown in FIG. 1.

FIG. 3A is a list of elementary streams multiplexed in a main TS on the BD-ROM disc 101 shown in FIG. 1, FIG. 3B is an example of a list of elementary streams multiplexed in a sub-TS on the BD-ROM disc 101, FIG. 3C is another example of a list of elementary streams multiplexed in the sub-TS on the BD-ROM disc 101, and FIG. 3D is a list of elementary streams multiplexed in an extended stream on the BD-ROM disc 101.

FIG. 17 is an example of a correspondence table between jump distances $S_{JUMP}$ and maximum jump times $T_{JUMP\_MAX}$ for a BD-ROM disc.

FIGS. 19A and 19B are graphs showing changes in data amounts DA1 and DA2 stored in an RB1 1811 and RB2 1812, respectively, when 3D video images are played back seamlessly from a single extent block.

FIG. 19C is a schematic diagram showing a correspondence between an extent block 1910 and a playback path 1920 in 3D playback mode.

FIGS. 22A and 22B are graphs showing changes in data amounts DA1 and DA3 stored in an RB1 2111 and RB3 2112, respectively, when 4K2K 2D video images are played back seamlessly from two extent groups 2210 and 2211, and FIG. 22C is a schematic diagram showing a correspondence between the two extent groups 2210 and 2211 and a playback path 2220 in extended playback mode.

FIG. 27 is a schematic diagram showing the data structure of a 2D clip information file 231.

FIG. 28A is a schematic diagram showing the data structure of an entry map 2730, FIG. 28B is a schematic diagram showing source packets that are included in a source packet group 2810 belonging to a file 2D 221, and are associated with EP_IDs 2805 by the entry map 2730, and FIG. 28C is a schematic diagram showing extents D[n], B[n] (n=0, 1, 2, 3, ...) on the BD-ROM disc 101 corresponding to the source packet group 2810.

FIG. 29A is a schematic diagram showing the data structure of extent start points 2742, FIG. 29B is a schematic diagram showing the data structure of extent start points 2920 included in a DEP clip information file 232, FIG. 29C is a schematic diagram representing base-view extents B[0], B[1], B[2], ... extracted from a file SS 223 by the playback device 102 in 3D playback mode, FIG. 29D is a schematic diagram showing a correspondence between dependent-view extents EXT2[0], EXT2[1], ... belonging to a file DEP 222 and SPNs 2922 shown by the extent start points 2920, and FIG. 29E is a schematic diagram showing a correspondence between an extent EXTSS[0] belonging to the file SS 223 and an extent block on the BD-ROM disc 101.

FIG. 48 is a schematic diagram showing an example of constructing a left view LVW and a right view RVW from the combination of a 2D video image MVW and a depth map DPH.

FIG. 49 is a schematic diagram showing arrangement 1 of extents recorded before and after the layer boundary LB on the BD-ROM disc 101, and playback paths for the extents in the three playback modes.

FIG. 50A is a schematic diagram showing arrangement 2 of extents recorded before and after the layer boundary LB on the BD-ROM disc 101, and playback paths for the extents in the three playback modes, and FIG. 50B is a schematic diagram showing arrangement 3 of extents recorded before and after the layer boundary LB on the BD-ROM disc 101, and playback paths for the extents in 2D playback mode and extended playback mode.

DESCRIPTION OF EMBODIMENTS

Figure 4A:
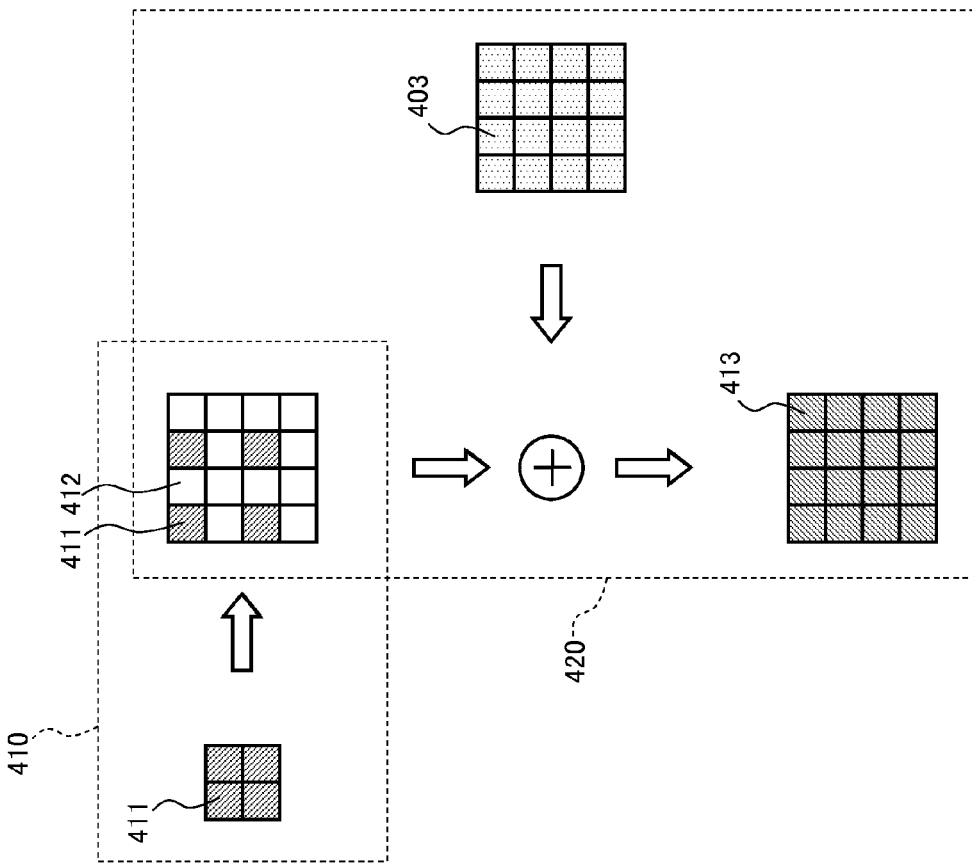
FIG. 4A is a table showing the data structure of resolution extension information.

The following describes embodiments of the present invention with reference to the drawings.

Embodiment 1

FIG. 1 is a schematic diagram showing a home theater system that uses a recording medium according to Embodiment 1 of the present invention. In addition to 2D video images and 3D video images at 1920×1080 pixels (hereinafter referred to as full HD (full High Definition)), this home theater system can display 2D video images in 4K2K. As shown in FIG. 1, this home theater system plays back a recording medium 101 and includes a playback device 102, a display device 103, shutter glasses 104, and a remote control 105.

The recording medium 101 is a read-only Blu-ray disc (BD, registered trademark), i.e. a BD-ROM disc. The BD-ROM disc 101 stores movie content. This content includes a video stream representing 2D video images in full HD, a video stream representing 3D video images, and a video stream representing 2D video images in 4K2K. These video streams are arranged on the BD-ROM disc 101 in units of extents and are accessed using a file structure described below.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 can play back the content as 2D video images, as 3D video images, or as 2D video images in 4K2K. Hereinafter, the operational mode of the playback device 102 is referred to as "2D playback mode" when playing back full HD 2D video images, as "3D playback mode" when playing back 3D video images, and as "extended playback mode" when playing back 2D video images in 4K2K.

The playback device 102 is connected to the display device 103 via a High-Definition Multimedia Interface (HDMI) cable 122. The playback device 102 converts the video and audio data into video and audio signals in the HDMI format, respectively, and transmits the signals to the display device 103 via the HDMI cable 122. Additionally, the playback device 102 exchanges CEC messages with the display device 103 via the HDMI cable 122. The playback device 102 can thus ask the display device 103 whether it supports playback of 3D video images and of video images at 4K2K.

The display device 103 is a liquid crystal display. The display device 103 displays video on the screen 131 in response to a video signal, and causes the speakers to produce audio in response to an audio signal. The display device 103 supports playback of 3D video images. During playback of 2D video images, either the left view or the right view is displayed on the screen 131. During playback of 3D video images, the left view and right view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame based on a control signal that accompanies a video signal. Furthermore, the display device 103 causes the left/right signal transmitting unit 132 to switch the left/right signal LR synchronously with the detected switching of frames.

The shutter glasses 104 include two liquid crystal display panels 141L and 141R and a left/right signal receiving unit 142. The liquid crystal display panels 141L and 141R respectively constitute the left and right lens parts. The left/right signal receiving unit 142 receives the left/right signal LR, and in accordance with changes therein, transmits a signal to the left and right liquid crystal display panels 141L and 141R. In response to the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. The two liquid crystal display panels 141L and 141R thus alternately let light pass through in sync with the switching of frames. As a result, when the viewer looks at the screen 131 while wearing the shutter glasses 104, the left view is shown only to the viewer's left eye, and the right view is shown only to the right eye. The viewer is made to perceive the difference between the images seen by each eye as the binocular parallax for the same stereoscopic object, and thus the video image appears to be stereoscopic.

The remote control 105 includes an operation unit and a transmitting unit. The operation unit includes a plurality of buttons. The buttons correspond to the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

FIG. 2 is a schematic diagram showing the data structure of a BD-ROM disc 101. As shown in FIG. 2, a Burst Cutting Area (BCA) 201 is provided at the innermost part of the data recording area on the BD-ROM disc 101. Only the BD-ROM drive 121 is permitted to access the BCA, and access by application programs is prohibited. The BCA 201 can thus be used as technology for copyright protection. In the data recording area outside of the BCA 201, tracks spiral from the inner to the outer circumference. In FIG. 2, a track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc.

The volume area 202B is divided into small areas 202D called "sectors." The sectors have a common size, for example 2048 bytes. Each sector 202D is consecutively assigned a serial number in order from the top of the volume area 202B. These serial numbers are called logical block numbers (LBN) and are used in logical addresses on the BD-ROM disc 101. During reading of data from the BD-ROM disc 101, data to be read is specified through designation of the LBN for the destination sector. The volume area 202B can thus be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data from sectors having consecutive LBNs without making the optical pickup perform a seek.

The data recorded in the volume area 202B is managed under a predetermined file system. Universal Disc Format (UDF) is adopted as this file system. Alternatively, the file system may be ISO 9660. The data recorded on the volume area 202B is represented in a directory-file format in accordance with the file system (see "Supplement" for details). In other words, the data is accessible in units of directories or files.

As further shown in FIG. 2, an index file 211, an AV (audio-visual) stream file 220, a clip information file 230, a playlist file 240, and a BD program file 250 are recorded in the volume area 202B. The AV stream file 220 includes a file 2D 221, a file dependent (file DEP) 222, a stereoscopic interleaved file (SSIF; hereinafter referred to as a file SS) 223, and an extended stream file 224. The clip information file 230 includes a 2D clip information file 231, a dependent-view (DEP) clip information file 232, and an extended clip information file 233. The playlist file 240 includes a 2D playlist file 241, a 3D playlist file 242, and an extended playlist file 243. The BD program file 250 includes a movie (MV) object file 251, a BD-J (BD Java™) object file 252, and a Java archive (JAR) file 253.

The "index file" 211 contains information for managing as a whole the content recorded on the BD-ROM disc 101. In particular, this information includes both information to make the playback device 102 recognize the content, as well as an index table. The index table is a correspondence table between titles and BD program files constituting the content. The "BD program files" are files storing "objects," which are programs for controlling operations of the playback device 102. There are two types of objects: MV and BD-J ones.

The AV stream file 220 is the body of video content recorded on the BD-ROM disc 101 and complies with the file format determined by the file system. Such video content generally refers to stream data in which different types of stream data representing video, audio, subtitles, etc., i.e. elementary streams, have been multiplexed. There are three types of multiplexed stream data: a main transport stream (TS), a sub-TS, and an extended stream.

A "main TS" is multiplexed stream data that includes a base-view video stream as a primary video stream. A "base-view video stream" is a video stream that can be played back independently and that represents full HD 2D video images. Note that a base-view is also called a "main-view."

A "sub-TS" is multiplexed stream data that includes a dependent-view video stream as a primary video stream. A "dependent-view video stream" is a video stream that requires a base-view video stream for playback and represents 3D video images by being combined with the base-view video stream. Note that a dependent-view is also called a "sub-view." Types of dependent-view video streams include a right-view video stream, left-view video stream, and depth map stream. When 2D video images represented by a base-view video stream are used by a playback device as the left view of 3D video images, the "right-view video stream" is used as the video stream representing the right view of the 3D video images. When 2D video images represented by a base-view video stream are used by a playback device as the right view of 3D video images, the "left-view video stream" is used as the video stream representing the left view of the 3D video images. When 2D video images represented by a base-view video stream are used by a playback device as a projection of 3D video images on a virtual 2D screen, the "depth map stream" is used as stream data representing the depth map of the 3D video images (for details, see <Modifications>). When the playback device 102 is in 3D playback mode and uses the right-view video stream (or the left-view video stream) as the dependent-view video stream, the operation mode is referred to as "left/right (L/R) mode." On the other hand, when the playback device 102 is in 3D playback mode and uses the depth map stream as the dependent-view video stream, the operation mode is referred to as "depth mode".

The "extended stream" is multiplexed stream data storing information necessary for extending full HD 2D video images representing the base-view video stream to 2D video images at 4K2K.

The "file 2D" 221 is an AV stream file used by the playback device 102 in 2D playback mode, and includes a main TS. The "file DEP" is an AV stream file that includes a sub-TS. The "file SS" 223 is an AV stream file used by the playback device 102 in 3D playback mode, and includes both a main TS and a sub-TS. The "extended stream file 224" is an AV stream file used by the playback device 102 in extended playback mode, and includes an extended stream.

The file SS 223 shares its main TS with a file 2D 221 and shares its sub-TS with a file DEP 222. In other words, in the file system on the BD-ROM disc 101, the main TS can be accessed as either the file SS 223 or the file 2D 221, and the sub-TS can be accessed as either the file SS 223 or the file DEP 222.

The clip information file 230 is a file associated on a one-to-one basis with the file 2D 221, the file DEP 222, and the extended stream file 224 and in particular, refers to a file including an entry map for each of the files 221, 222, and 224. The "entry map" is a correspondence table between the presentation time for each scene represented by the file 2D 221, the file DEP 222, and the extended stream file 224 and the address within the respective one of the files 221, 222, and 224 at which the scene is recorded. The "2D clip information file" 231 is associated with the file 2D 221, the "DEP clip information file" 232 is associated with the file DEP 222, and the "extension clip information file" 233 is associated with the extended stream file 224.

The "playlist file" 240 is a file that specifies the playback path of the AV stream file 220. The "playback path" refers to a correspondence between parts of the AV stream file 220 to be played back and their order of playback. The "2D playlist file" 241 specifies the playback path of the file 2D 221. The "3D playlist file" 242 specifies the playback path of the file 2D 221 for the playback device 102 in 2D playback mode, and the playback path of the file SS 223 for the playback device 102 in 3D playback mode. The "extended playlist file" 243 specifies the playback path of the file 2D 221 for the playback device 102 in 2D playback mode, and the playback path of the file 2D 221 and of the extended stream file 224 for the playback device 102 in extended playback mode.

The MV object file 251 generally stores a plurality of MV objects. Each MV object includes a sequence of navigation commands. A navigation command is a control command causing the playback device 102 to execute a playback process similar to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device 102, thus making the control unit execute the desired job. A navigation command is composed of an opcode and an operand. The opcode describes the type of operation that the playback device 102 is to execute, such as dividing, playing back, or calculating a title, etc. The operand indicates identification information targeted by the operation such as the title's number, etc. The control unit of the playback device 102 calls a MV object in response, for example, to a user operation and executes navigation commands included in the called MV object in the order of the sequence. In a manner similar to general DVD players, the playback device 102 first displays a menu on the display device 103 to allow the user to select a command. The playback device 102 then executes playback start/stop of a title, switches to another title, etc. in response to the selected command, thereby dynamically changing the progress of video playback.

The BD-J object file 252 includes a single BD-J object. The BD-J object is a bytecode program to cause a Java virtual machine mounted on the playback device 102 to play back a title and render graphics images. The BD-J object is written in a compiler language such as Java or the like. The BD-J object includes an application management table and identification information for the playlist file to which is referred. The "application management table" is a list of the Java application programs to be executed by the Java virtual machine and their period of execution, i.e. lifecycle. The "identification information of the playlist file to which is referred" identifies a playlist file that corresponds to a title to be played back. The Java virtual machine calls a BD-J object in response to a user operation or an application program and executes the Java application program according to the application management table included in the BD-J object. Consequently, the playback device 102 dynamically changes the progress of the video for each title played back, or causes the display device 103 to display graphics images independently of the title video.

The JAR directory 253 generally includes a plurality of actual Java application programs to be executed in accordance with the application management table shown in the BD-J object. A "Java application program" is a bytecode program written in a compiler language such as Java or the like, as is the BD-J object. Types of Java application programs include programs causing the Java virtual machine to perform playback of a title and programs causing the Java virtual machine to render graphics images. The JAR file 261 is a Java archive file, and when it is read by the playback device 102, it is loaded in internal memory. In this way, a Java application program is stored in memory.

<<Structure of Multiplexed Stream Data>>

FIG. 3A is a list of elementary streams multiplexed in a main TS on the BD-ROM disc 101. The main TS is a digital stream in MPEG-2 Transport Stream (TS) format and includes the file 2D 221 shown in FIG. 2. As shown in FIG. 3A, the main TS includes a primary video stream 301 and primary audio streams 302A and 302B. The main TS may additionally include presentation graphics (PG) streams 303A and 303B, an interactive graphics (IG) stream 304, a secondary audio stream 305, and a secondary video stream 306.

The primary video stream 301 represents the primary video images of a movie, and the secondary video stream 306 represents the secondary video images of the movie. The primary video images mean video images essential for content, such as those representing the main story of the movie; the primary video images will be displayed on the entirety of a screen, for example. The secondary video images mean video images to be displayed picture-in-picture on a screen simultaneously with the display of the primary ones on the screen; the secondary video images will be displayed within a small window included in the primary video images, for example. The primary video stream 301 and the secondary video stream 306 are both a base-view video stream. Each of the video streams 301 and 306 is encoded by a video compression encoding method, such as MPEG-2, MPEG-4 AVC, or SMPTE VC-1. Each of the video frames included in the video streams 301 and 306 is thus compressed into one picture. Here, a "video frame" is a 2D array of pixel data, the size of the array being equal to the resolution of the frame. For example, a full HD video frame is a 1920×1080 2D array. A set of pixel data is formed by a combination of chromatic coordinate values and an α value (opacity). The chromatic coordinate value is expressed as 8-bit RGB values or YCrCb values. The α value is also an 8-bit value.

The primary audio streams 302A and 302B represent the primary sounds of the movie. In this case, the two primary audio streams 302A and 302B are in different languages. The secondary audio stream 305 represents the secondary sounds to be mixed with the primary ones, such as sound effects accompanying operation of an interactive screen. Each of the audio streams 302A, 302B, and 305 is encoded by a method such as AC-3, Dolby Digital Plus ("Dolby Digital" is a registered trademark), Meridian Lossless Packing™ (MLP), Digital Theater System™ (DTS), DTS-HD, or linear Pulse Code Modulation (PCM). The audio frames included in the audio streams 302A, 302B, and 305 are thus individually compressed.

Each of the PG streams 303A and 303B represents graphics images, such as subtitles formed by graphics, to be displayed superimposed on the video images represented by the primary video stream 301. The two PG streams 303A and 303B represent, for example, subtitles in a different language. The IG stream 304 represents Graphical User Interface (GUI) graphics elements, and the arrangement thereof, for constructing an interactive screen on the screen 131 in the display device 103.

The elementary streams 301-306 are identified by packet identifiers (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is an example of a list of elementary streams multiplexed in a sub-TS on the BD-ROM disc 101. The sub-TS is multiplexed stream data in MPEG-2 TS format and is included in the file DEP 222 shown in FIG. 2. As shown in FIG. 3B, the sub-TS includes a primary video stream 311. The sub-TS may additionally include left-view PG streams 312A and 312B, right-view PG streams 313A and 313B, a left-view IG stream 314, a right-view IG stream 315, and a secondary video stream 316. When the primary video stream 301 in the main TS represents the left view of 3D video images, the primary video stream 311, which is a right-view video stream, represents the right view of the 3D video images. The pairs of left-view and right-view PG streams 312A+313A and 312B+313B represent the left view and right view of graphics images, such as subtitles, when these graphics images are displayed as 3D video images. The pair of left-view and right-view IG streams 314 and 315 represent the left view and right view of graphics images for an interactive screen when these graphics images are displayed as 3D video images. When the secondary video stream 306 in the main TS represents the left view of 3D video images, the secondary video stream 316, which is a right-view video stream, represents the right view of the 3D video images.

PIDs are assigned to the elementary streams 311-316 as follows, for example. A PID of 0x1012 is assigned to the primary video stream 311. When up to 32 other elementary streams can be multiplexed by type in one sub-TS, the left-view PG streams 312A and 312B are assigned any value from 0x1220 to 0x123F, and the right-view PG streams 313A and 313B are assigned any value from 0x1240 to 0x125F. The left-view IG stream 314 is assigned any value from 0x1420 to 0x143F, and the right-view IG stream 315 is assigned any value from 0x1440 to 0x145F. The secondary video stream 316 is assigned any value from 0x1B20 to 0x1B3F.

FIG. 3C is another example of a list of elementary streams multiplexed in the sub-TS on the BD-ROM disc 101. As shown in FIG. 3C, the sub-TS includes a primary video stream 321. The sub-TS may additionally include depth map PG streams 323A and 323B, a depth map IG stream 324, and a secondary video stream 326. The primary video stream 321 is a depth map stream and represents 3D video images in combination with the primary video stream 301 in the main TS. When the 2D video images represented by the PG streams 303A and 303B in the main TS are used to project 3D video images on a virtual 2D screen, the depth map PG streams 323A and 323B are used as the PG streams representing a depth map for the 3D video images. When the 2D video images represented by the IG stream 304 in the main TS are used to project 3D video images on a virtual 2D screen, the depth map IG stream 324 is used as the IG stream representing a depth map for the 3D video images. The secondary video stream 326 is a depth map stream and represents 3D video images in combination with the secondary video stream 306 in the main TS.

PIDs are assigned to the elementary streams 321-326 as follows, for example. A PID of 0x1013 is assigned to the primary video stream 321. When up to 32 other elementary streams can be multiplexed by type in one sub-TS, the depth map PG streams 323A and 323B are assigned any value from 0x1260 to 0x127F. The depth map IG stream 324 is assigned any value from 0x1460 to 0x147F. The secondary video stream 326 is assigned any value from 0x1B40 to 0x1B5F.

FIG. 3D is a list of elementary streams multiplexed in an extended stream on the BD-ROM disc 101. As shown in FIG.

3D, the extended stream includes resolution extension information 331. The resolution extension information 331 is information necessary for extending each full HD video frame included in the primary video stream 301 of the main TS to a 4K2K video frame. A value of 0x1014 is allocated as the PID to the resolution extension information 331.

FIG. 4A shows the data structure of resolution extension information. As illustrated in FIG. 4A, the resolution extension information includes an extended resolution 401, interpolation method 402, and pixel difference information 403 for each video frame. The extended resolution 401 indicates a 4K2K resolution. The interpolation method 402 indicates a type of interpolation to be used to increase the number of pixels per full HD video frame to the number of pixels per 4K2K video frame. The types of interpolation include bicubic and bilinear ones. The pixel difference information 403 represents the difference between the pixel data obtained from a full HD video frame by the interpolation method and the pixel data included in an original 4K2K video frame. When the pixel data is represented as YCrCb values, the pixel difference information 403 includes a difference Y_d in the luminance component Y, a difference Cr_d in the red-difference component Cr, a difference Cb_d in the blue-difference component Cb, and a difference α_d in the opacity α.

Figure 4B:
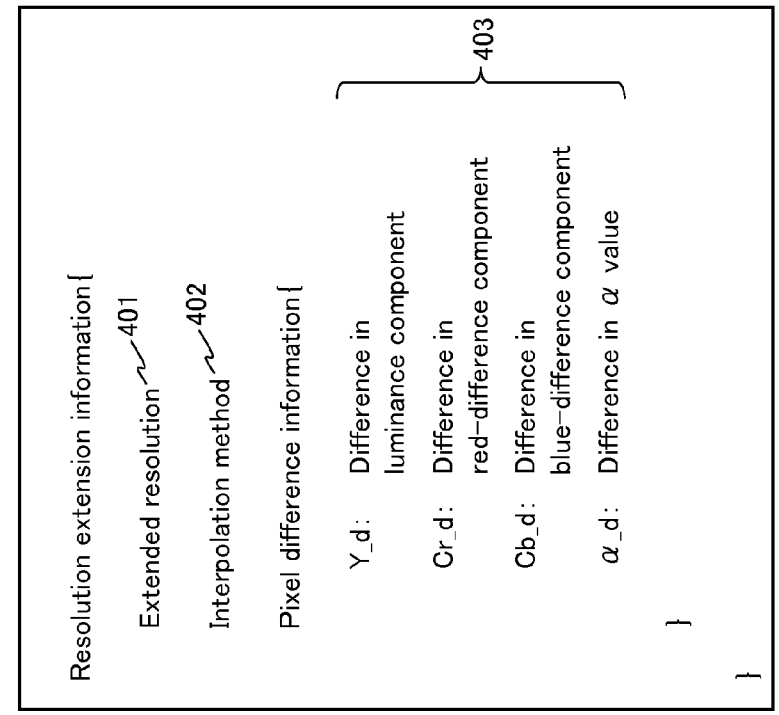
FIG. 4B is a schematic diagram showing the role of resolution extension information in the process to extend a full HD video frame to a 4K2K video frame.

FIG. 4B is a schematic diagram showing the role of the resolution extension information in a process to extend a full HD video frame to a 4K2K video frame. This process requires the following two steps. The first step 410 is to perform an interpolation to add new pixel data to original pixel data contained in the full HD video frame such that new pixels 412 are inserted between original pixels 411 within the frame. This increases the total size of pixel data to that included in a 4K2K video frame. The extended resolution 401 specifies the increased size of pixel data as the resolution. The interpolation method 402 specifies the type of the interpolation to be used in the first step. The second step is to calculate the sum of the pixel difference information 403 and the data of each pixel 411, 412 contained in the video frame obtained by the interpolation. This reconstructs data of pixels 413 constituting an original 4K2K video frame.

Figure 5:
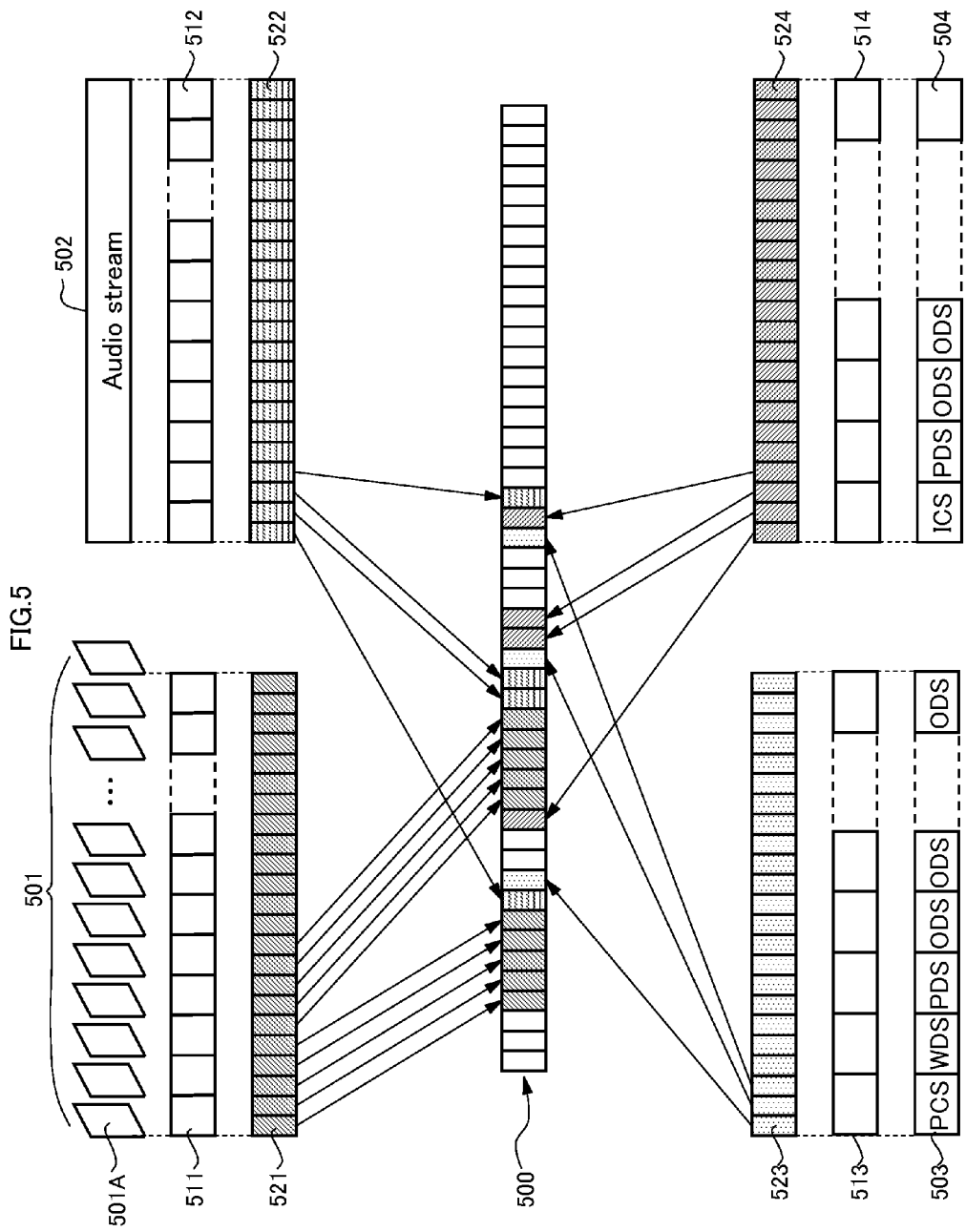
FIG. 5 is a schematic diagram showing an arrangement of TS packets in multiplexed stream data 500.

FIG. 5 is a schematic diagram showing the arrangement of TS packets in the multiplexed stream data 500. The same packet structure is shared by the main TS, sub-TS, and the extended stream. In the multiplexed stream data 500, the elementary streams 501, 502, 503, and 504 are respectively converted into sequences of TS packets 521, 522, 523, and 524. For example, in the video stream 501, each video frame 501A is first converted into one Packetized Elementary Stream (PES) packet 511. Next, each PES packet 511 is generally converted into a plurality of TS packets 521. Similarly, the audio stream 502, PG stream 503, and IG stream 504 are respectively first converted into a sequence of PES packets 512, 513, and 514, after which they are converted into a sequence of TS packets 522, 523, and 524. Finally, the TS packets 521, 522, 523, and 524 obtained from the elementary streams 501, 502, 503, and 504 are time-multiplexed into one piece of stream data 500.

Figure 6:
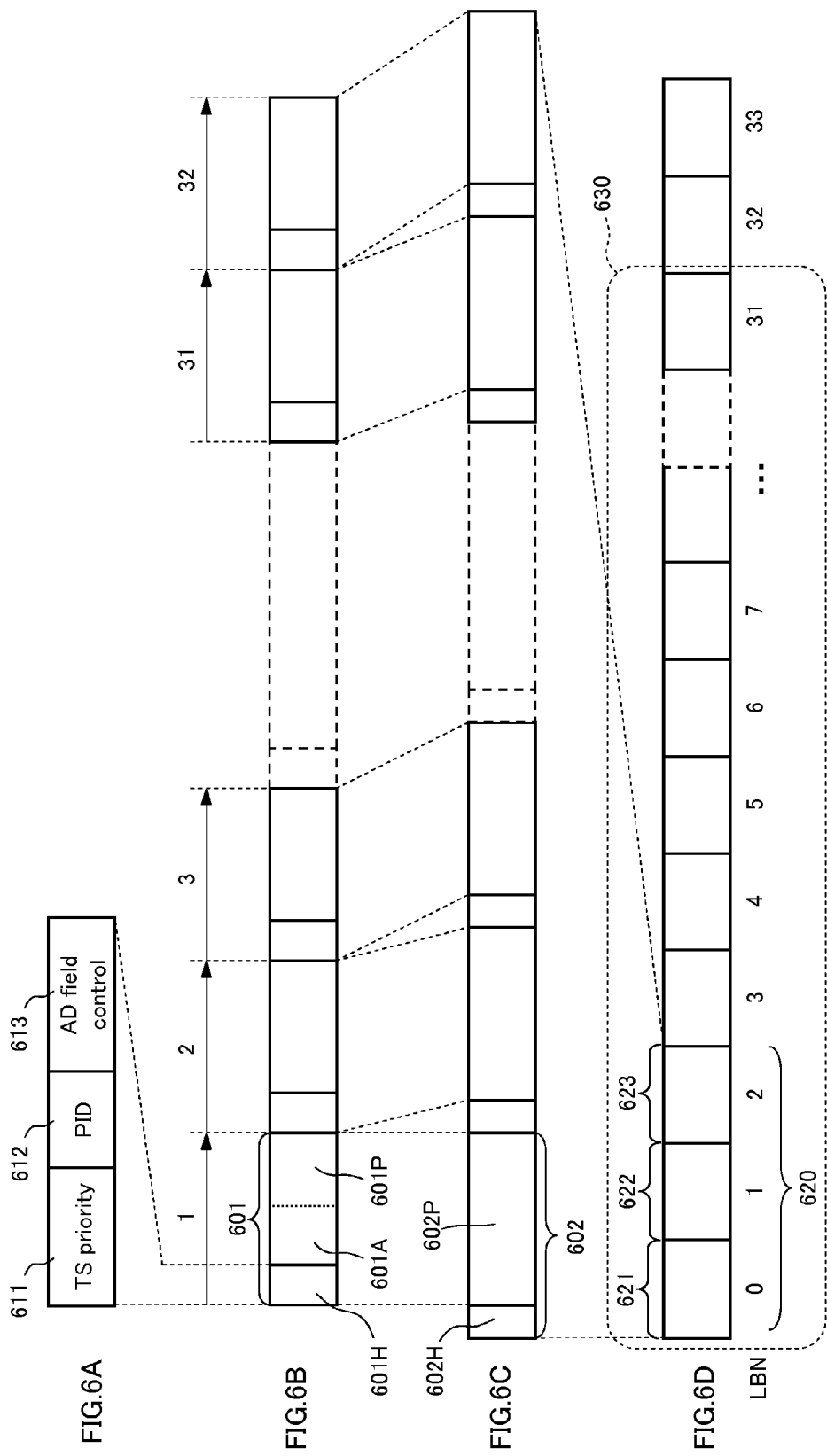
FIG. 6A is a schematic diagram showing a data structure of a TS header 601H.
FIG. 6B is a schematic diagram showing a format of a TS packet sequence constituting multiplexed stream data.
FIG. 6C is a schematic diagram of a format of a source packet sequence composed of a TS packet sequence in multiplexed stream data.
FIG. 6D is a schematic diagram showing sectors located in a volume area 202B of the BD-ROM disc 101, in which a sequence of source packets 602 are continuously recorded.

FIG. 6B is a schematic diagram showing a TS packet sequence constituting multiplexed stream data. Each TS packet 601 is 188 bytes long. As shown in FIG. 6B, each TS packet 601 includes a TS header 601H and either, or both, a TS payload 601P and an adaptation field (hereinafter abbreviated as "AD field") 601A. The TS payload 601P and AD field 601A together constitute a 184 byte-long data area. The TS payload 601P is used as a storage area for a PES packet. The PES packets 511-414 shown in FIG. 5 are typically divided into a plurality of parts, and each part is stored in a different TS payload 601P. The AD field 601A is an area for storing stuffing bytes (i.e. dummy data) when the amount of data in the TS payload 601P does not reach 184 bytes. Additionally, when the TS packet 601 is, for example, a PCR as described below, the AD field 601A is used as a region for storing such information. The TS header 601H is a four-byte long data area.

FIG. 6A is a schematic diagram showing the data structure of a TS header 601H. As shown in FIG. 6A, the TS header 601H includes a TS priority 611, a PID 612, and an AD field control 613. The PID 612 indicates the PID for the elementary stream whose data is stored in the TS payload 601P of the TS packet 601 containing the PID 512. The TS priority 611 indicates the degree of priority of the TS packet 601 among the TS packets that share the value indicated by the PID 612. The AD field control 613 indicates whether the TS packet 601 contains an AD field 601A and/or a TS payload 601P.

FIG. 6C is a schematic diagram showing the formation of a source packet sequence composed of the TS packet sequence for multiplexed stream data. As shown in FIG. 6C, each source packet 602 is 192 bytes long and includes one TS packet 601, shown in FIG. 6B, and a four-byte long header 602H. When the TS packet 601 is recorded on the BD-ROM disc 101, a source packet 602 is constituted by attaching a header 602H to the TS packet 601. The header 602H includes an ATS (Arrival_Time_Stamp). The "ATS" is time information used by a system target decoder in the playback device 102 as follows. The "system target decoder" is a device that decodes multiplexed stream data one elementary stream at a time. When a source packet 602 is sent from the BD-ROM disc 101 to the system target decoder, the system target decoder extracts the TS packet 602P from the source packet 602 and transfers the TS packet 602P to a PID filter. The system target decoder transfers the TS packet 602P at a point in time when the value of an internal clock, referred to as an arrival time clock (ATC), matches with the ATS in the header 602H of the source packet 602. Details regarding the system target decoder and its use of the ATS are provided below.

FIG. 6D is a schematic diagram of sectors located in the volume area 202B of the BD-ROM disc 101, in which a sequence of source packets 602 are consecutively recorded. As shown in FIG. 6D, each sequence of 32 source packets 602 is recorded on three consecutive sectors 621, 622, and 623. This is because the data amount for 32 source packets, i.e. 192 bytes×32=6144 bytes, is the same as the total size of three sectors, i.e. 2048 bytes×3=6144 bytes. 32 source packets 602 that are recorded in this way in three consecutive sectors 621, 622, and 623 are referred to as an "aligned unit" 620. The BD-ROM drive 121 in the playback device 102 reads source packets 602 from the BD-ROM disc 101 by each aligned unit 620, i.e. 32 source packets at a time. The sectors 621, 622, 623, . . . are divided into sections of 32 sectors in order from the top, each section forming one error correcting code (ECC) block 630. The BD-ROM drive 121 performs error correction process for each ECC block 630.

<<Data Structure of PG Stream>>

The PG stream includes a plurality of data entries. The data entries represent the PG stream in display sets and are composed of data necessary for the playback device 102 to form one graphics plane. A "graphics plane" refers to plane data generated from graphics data representing a 2D graphics image. "Plane data" is a two-dimensional array of pixel data. The size of the array is the same as the resolution of the video frame. Types of graphics planes include a PG plane, IG plane, image plane, and On-Screen Display (OSD) plane. A PG plane is generated from a PG stream in the main TS. An IG plane is generated from an IG stream in the main TS. An image plane is generated in accordance with a BD-J object. An OSD plane is generated in accordance with firmware in the playback device 102.

Each data entry includes a plurality of functional segments. In order from the top, these functional segments include a Presentation Control Segment (PCS), Window Define Segment (WDS), Palette Define Segment (PDS), and Object Define Segment (ODS). WDS defines a rectangular region inside the graphics plane, i.e. a window. PDS defines a correspondence between a predetermined type of color ID and a chromatic coordinate value (for example, luminance Y, red-difference Cr, blue-difference Cb, and opacity α). There are usually a plurality of ODSs, which represent one graphics object. A "graphics object" is data that expresses graphics rendering via a correspondence between pixel codes and color IDs. After being compressed via run-length encoding, a graphics object is divided up and distributed among ODSs. A PCS indicates details on display sets belonging to the same data entry and in particular defines a screen layout that uses graphics objects. Types of screen layout include Cut-In/Out, Fade-In/Out, Color Change, Scroll, and Wipe-In/Out. A content provider refers to the parameters of the PCS to indicate the screen layout to the playback device 102. Accordingly, it is possible to cause the playback device 102 to implement a visual effect whereby, for example, "a certain subtitle gradually disappears, and the next subtitle is displayed."

<<Data Structure of IG Stream>>

The IG stream includes an Interactive Composition Segment (ICS), PDS, and ODS. PDS and ODS are the same functional segments as included in the PG stream. In particular, a graphics object that includes an ODS represents a GUI graphics element, such as a button, pop-up menu, etc., that forms an interactive screen. An ICS defines interactive operations that use these graphics objects. Specifically, an ICS defines the states that each graphics object, such as a button, pop-up menu, etc. can take when changed in response to user operation, states such as normal, selected, and active. An ICS also includes button information. Button information includes a command that the playback device 102 is to perform when the user performs a certain operation on the button or the like.

<<Data Structure of Video Stream>>

Figure 7:
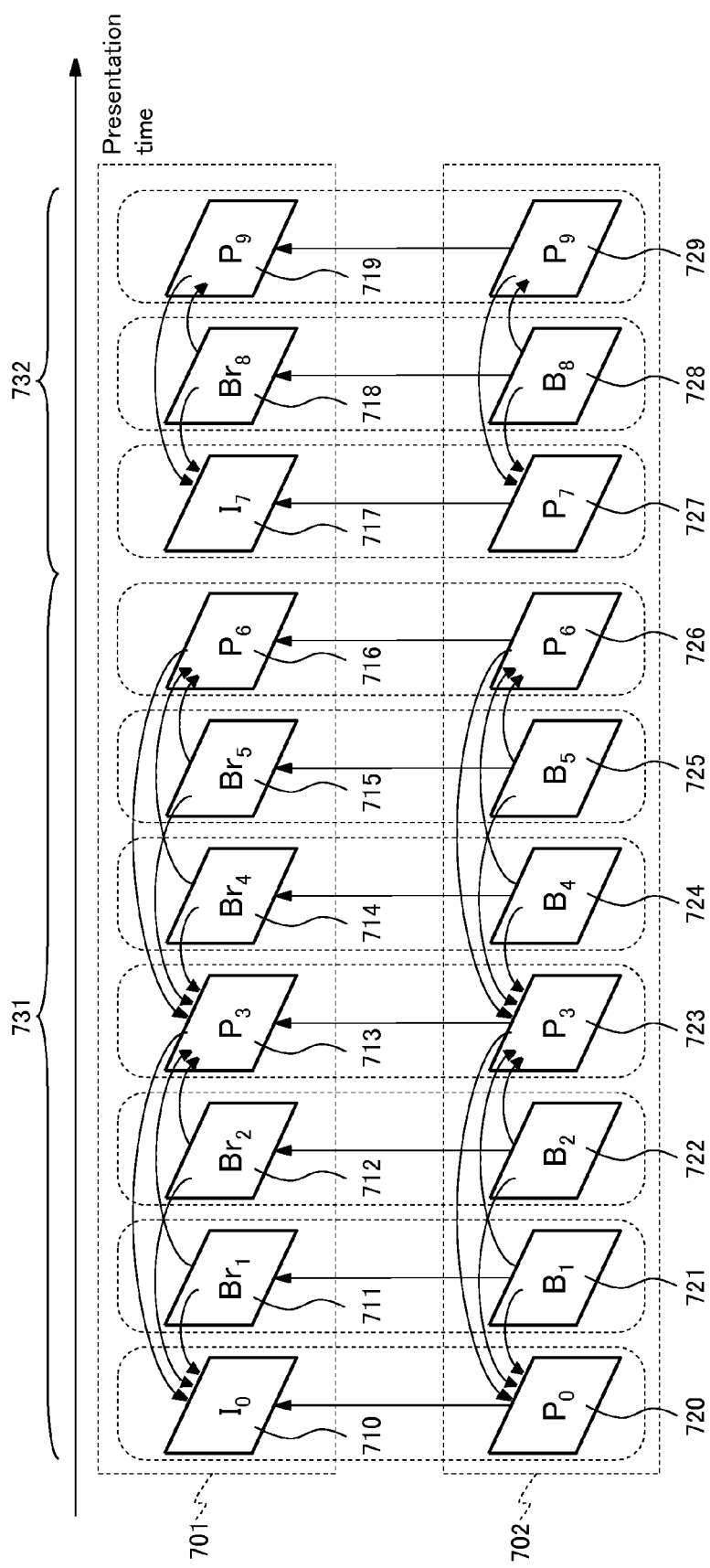
FIG. 7 is a schematic diagram showing the pictures for a base-view video stream 701 and a right-view video stream 702 in order of presentation time.

FIG. 7 is a schematic diagram showing the pictures for a base-view video stream 701 and a right-view video stream 702 in order of presentation time. As shown in FIG. 7, the base-view video stream 701 includes pictures 710, 711, 712, . . . , 719 (hereinafter "base-view pictures"), and the right-view video stream 702 includes pictures 720, 721, 722, . . . , 729 (hereinafter "right-view pictures"). Each of the pictures 710-719 and 720-729 represents one frame and is compressed by a video compression encoding method, such as MPEG-2, MPEG-4 AVC, etc.

This compression of each picture via the above encoding uses the picture's spatial or temporal redundancy. Here, picture encoding that only uses the picture's spatial redundancy is referred to as "intra-picture encoding." On the other hand, picture encoding that uses temporal redundancy, i.e. the similarity between data for a plurality of pictures displayed sequentially, is referred to as "inter-picture predictive encoding." In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after motion compensation and the picture to be encoded is sought, and spatial redundancy is removed using the difference value. In this way, the amount of data for each picture is compressed.

As shown in FIG. 7, the base-view pictures 710-719 are typically divided into a plurality of GOPs 731 and 732. A "GOP" refers to a sequence of pictures having an I (Intra) picture as their top. An "I picture" refers to a picture compressed by intra-picture encoding. In addition to the I picture, a GOP typically includes P (Predictive) and B (Bidirectionally Predictive) pictures. A "P picture" refers to a picture compressed by inter-picture predictive encoding with a reference picture, either an I picture or another P picture, that has an earlier presentation time than the picture compressed. A "B picture" refers to a picture compressed by inter-picture predictive encoding with two reference pictures, either I or P pictures, that each have an earlier or later presentation time than the picture compressed. A B picture that is used as a reference picture for another picture by inter-picture predictive encoding are particularly referred to as a "Br (reference B) picture."

In the example shown in FIG. 7, the base-view pictures in the GOPs 731 and 732 are compressed in the following order. In the first GOP 731, the top base-view picture is compressed as $I_0$ picture 710. The subscripted number indicates the serial number allotted to each picture in order of presentation time. Next, the fourth base-view picture is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third base-view pictures are respectively compressed as $Br_1$ picture 711 and $Br_2$ picture 712, using both $I_0$ picture 710 and $P_3$ picture 713 as reference pictures. Furthermore, the seventh base-view picture is compressed as $P_6$ picture 716 using $P_3$ picture 713 as a reference picture. Next, the fourth and fifth base-view pictures are respectively compressed as $Br_4$ picture 714 and $Br_5$ picture 715, using both $P_3$ picture 713 and $P_6$ picture 716 as reference pictures. Similarly, in the second GOP 732, the top base-view picture is first compressed as $I_7$ picture 717. Next, the third base-view picture is compressed as $P_9$ picture 719 using $I_7$ picture 717 as a reference picture. Subsequently, the second base-view picture is compressed as $Br_8$ picture 718 using both $I_7$ picture 717 and $P_9$ picture 719 as reference pictures.

In the base-view video stream 701, each GOP 731 and 732 always contains an I picture at the top, and thus base-view pictures can be decoded GOP by GOP. For example, in the first GOP 731, the $I_0$ picture 710 is first decoded independently. Next, the $P_3$ picture 713 is decoded using the decoded $I_0$ picture 710. Then the $Br_1$ picture 711 and $Br_2$ picture 712 are decoded using both the decoded L picture 710 and $P_3$ picture 713. The subsequent pictures 714, 715, . . . are similarly decoded. In this way, the base-view video stream 701 can be decoded independently and furthermore can be randomly accessed in units of GOPs.

As further shown in FIG. 7, the right-view pictures 720-729 are compressed by inter-picture predictive encoding. However, the encoding method differs from the encoding method for the base-view pictures 710-719, since in addition to redundancy in the temporal redundancy of video images, redundancy between the left and right-video images is also used. Specifically, as shown by the arrows in FIG. 7, the reference picture for each of the right-view pictures 720-729 is not selected from the right-view video stream 702, but rather from the base-view video stream 701. In particular, the presentation time is substantially the same for each of the right-view pictures 720-729 and the corresponding base-view picture selected as a reference picture. These pictures represent a right view and a left view for the same scene of a 3D video image, i.e. a parallax video image. The right-view pictures 720-729 and the base-view pictures 710-719 are thus in one-to-one correspondence. In particular, the GOP structure is the same between these pictures.

In the example shown in FIG. 7, the top right-view picture in the first GOP 731 is compressed as $P_0$ picture 720 using $I_0$ picture 710 in the base-view video stream 701 as a reference picture. These pictures 710 and 720 represent the left view and right view of the top frame in the 3D video images. Next, the fourth right-view picture is compressed as $P_3$ picture 723 using $P_3$ picture 713 in the base-view video stream 701 and $P_0$ picture 720 as reference pictures. Next, the second right-view picture is compressed as $B_1$ picture 721, using $Br_1$ picture 711 in the base-view video stream 701 in addition to $P_0$ picture 720 and $P_3$ picture 723 as reference pictures. Similarly, the third right-view picture is compressed as $B_2$ picture 722, using $Br_2$ picture 712 in the base-view video stream 701 in addition to $P_0$ picture 720 and $P_3$ picture 730 as reference pictures. For each of the remaining right-view pictures 724-729, a base-view picture having substantially the same presentation time as the right-view picture has is similarly used as a reference picture.

The revised standards for MPEG-4 AVC/H.264, called Multiview Video Coding (MVC), are known as a video compression encoding method that makes use of correlation between left and right-video images as described above. MVC was created in July of 2008 by the Joint Video Team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described above, a base-view picture is used as a reference picture for compression of each of the right-view pictures 720-729. Therefore, unlike the base-view video stream 701, the right-view video stream 702 cannot be decoded independently. On the other hand, however, the difference between parallax video images is generally very small; that is, the correlation between the left view and the right view is high. Accordingly, the right-view pictures generally have a significantly higher compression rate than the base-view pictures, meaning that the amount of data is significantly smaller.

While not shown in FIG. 7, a depth map stream includes a plurality of depth maps. The depth maps are in one-to-one correspondence with base-view pictures and each represent the depth map corresponding to a 2D video image in one field as indicated by a base-view picture. The depth maps are compressed by a video compression encoding method, such as MPEG-2, MPEG-4 AVC, etc., in the same way as the base-view pictures. In particular, inter-picture predictive encoding is used in this encoding method. In other words, each depth map is compressed using another depth map as a reference picture. Furthermore, the depth map stream is divided into units of GOPs in the same way as the base-view video stream, and each GOP always contains an I picture at the top. Accordingly, depth maps can be decoded GOP by GOP. However, since a depth map itself is only information representing the depth of each part of a 2D video image pixel by pixel, the depth map stream cannot be used independently for playback of video images. The encoding method used in compression of the depth map stream is the same as that used in compression of the right-view video stream. For example, if the right-view video stream is encoded in MVC format, the depth map stream is also encoded in MVC format. In this case, during playback of 3D video images, the playback device 102 can smoothly switch between L/R mode and depth mode, while maintaining a constant encoding method.

Figure 8:
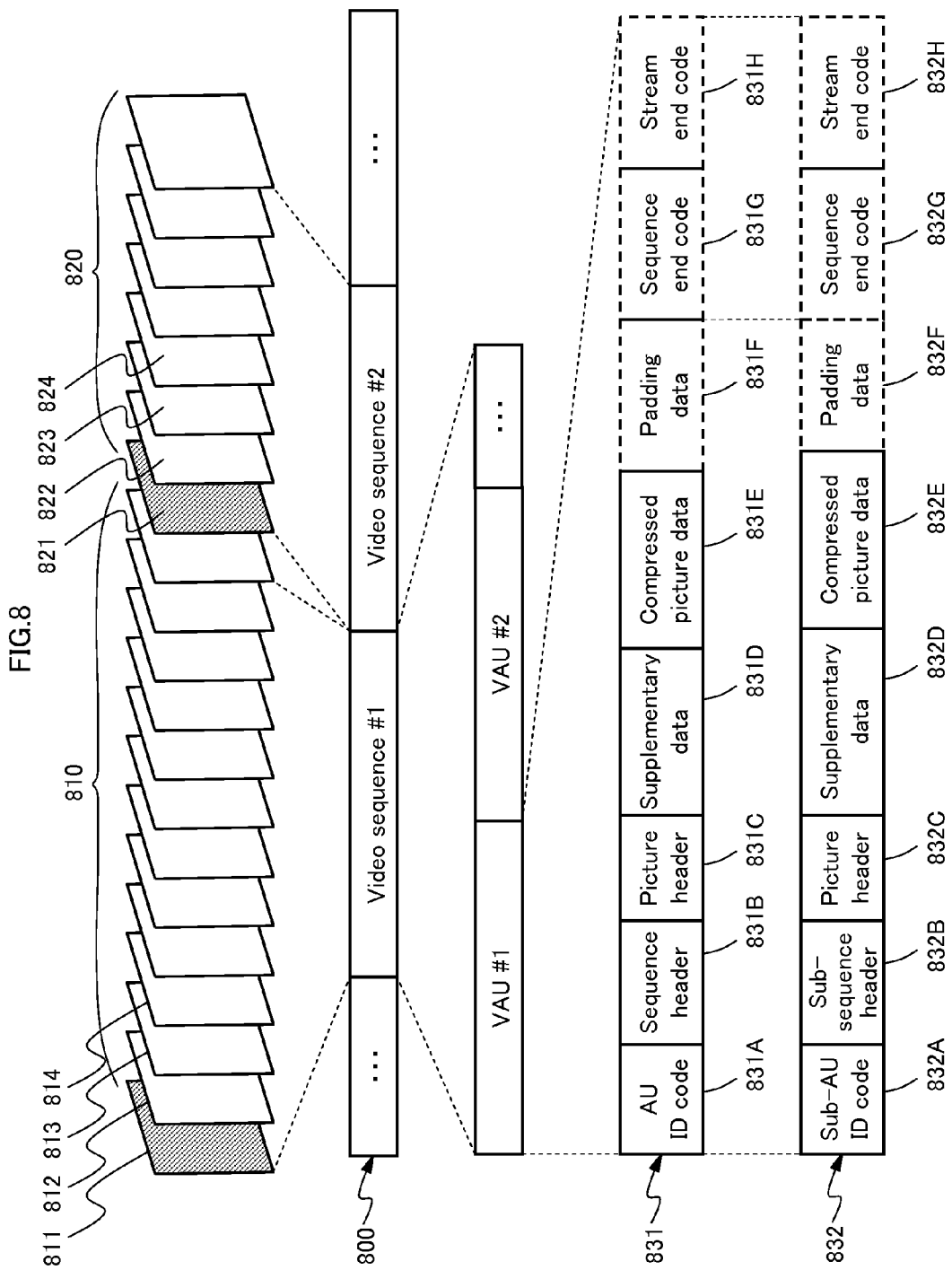
FIG. 8 is a schematic diagram showing details of the data structure of a video stream 800.

FIG. 8 is a schematic diagram showing details on the data structure of a video stream 800. This data structure is substantially the same for the base-view video stream and the dependent-view video stream. As shown in FIG. 8, the video stream 800 is generally composed of a plurality of video sequences #1, #2, . . . . A "video sequence" is a combination of pictures 811, 812, 813, 814, . . . that constitute a single GOP 810 and to which additional information, such as a header, has been individually attached. The combination of this additional information and a picture is referred to as a "video access unit (VAU)." That is, in the GOPs 810 and 820, a single VAU #1, #2, . . . is formed for each picture. Each picture can be read from the video stream 800 in units of VAUs.

FIG. 8 further shows the structure of VAU #1 831 located at the top of each video sequence in the base-view video stream. The VAU #1 831 includes an access unit (AU) identification code 831A, sequence header 831B, picture header 831C, supplementary data 831D, and compressed picture data 831E. Except for not including a sequence header 831B, VAUs from the second VAU #2 on have the same structure as VAU #1 831. The AU identification code 831A is a predetermined code indicating the top of the VAU #1 831. The sequence header 831B, also called a GOP header, includes an identification number for the video sequence #1 which includes the VAU #1 831. The sequence header 831B further includes information shared by the whole GOP 810, e.g. resolution, frame rate, aspect ratio, and bitrate. The picture header 831C indicates a unique identification number, the identification number for the video sequence #1, and information necessary for decoding the picture, such as the type of encoding method. The supplementary data 831D includes additional information regarding matters other than the decoding of the picture, for example closed caption text information, information on the GOP structure, and time code information. The compressed picture data 831E includes a base-view picture.

Additionally, the VAU #1 831 may include any or all of padding data 831F, a sequence end code 831G, and a stream end code 831H as necessary. The padding data 831F is dummy data. By adjusting the size of the padding data 831F to match with the size of the compressed picture data 831E, the bitrate of the VAU #1 831 can be maintained at a predetermined value. The sequence end code 831G indicates that the VAU #1 831 is located at the end of the video sequence #1. The stream end code 831H indicates the end of the base-view video stream 800.

FIG. 8 also shows the structure of a VAU #1 832 located at the top of each video sequence in the dependent-view video stream. The VAU #1 832 includes a sub-sequence header 832B, picture header 832C, supplementary data 832D, and compressed picture data 832E. Except for not including a sub-sequence header 832B, VAUs from the second VAU #2 on have the same structure as VAU #1 832. The sub-sequence header 832B includes an identification number for the video sequence #1 which includes the VAU #1 832. The sub-sequence header 832B further includes information shared by the whole GOP 810, e.g. resolution, frame rate, aspect ratio, and bitrate. These values are the same as the values set for the corresponding GOP in the base-view video stream, i.e. the values shown by the sequence header 831B in the VAU #1 831. The picture header 832C indicates a unique identification number, the identification number for the video sequence

1, and information necessary for decoding the picture, such as the type of encoding method. The supplementary data 832D includes additional information regarding matters other than the decoding of the picture, for example closed caption text information, information on the GOP structure, and time code information. The compressed picture data 832E includes a dependent-view picture.

Additionally, the VAU #1 831 may include any or all of padding data 832F, a sequence end code 832G, and a stream end code 832H as necessary. The padding data 832F is dummy data. By adjusting the size of the padding data 832F in conjunction with the size of the compressed picture data 831E, the bitrate of the VAU #1 832 can be maintained at a predetermined value. The sequence end code 832G indicates that the VAU #1 832 is located at the end of the video sequence #1. The stream end code 832H indicates the end of the dependent-view video stream 800.

The specific content of each component in a VAU differs according to the encoding method of the video stream 800. For example, when the encoding method is MPEG-4 AVC, the components in the VAUs shown in FIG. 8 are composed of a single Network Abstraction Layer (NAL) unit. Specifically, the AU identification code 831A, sequence header 831B, picture header 831C, supplementary data 831D, compressed picture data 831E, padding data 831F, sequence end code 831G, and stream end code 831H respectively correspond to an Access Unit (AU) delimiter, Sequence Parameter Set (SPS), Picture Parameter Set (PPS), Supplemental Enhancement Information (SEI), View Component, Filler Data, End of Sequence, and End of Stream.

Figure 9:
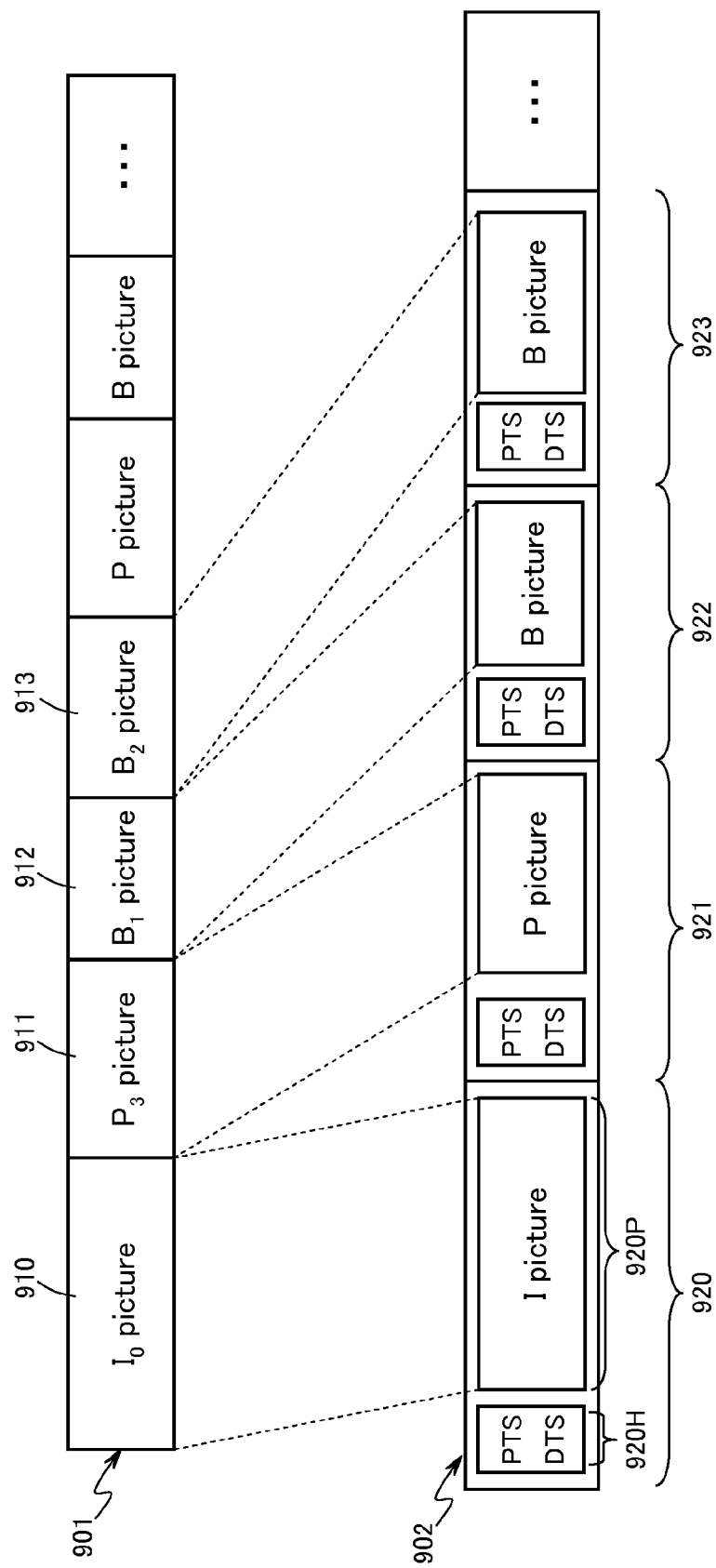
FIG. 9 is a schematic diagram showing details of a method for storing a video stream 901 into a PES packet sequence 902.

FIG. 9 is a schematic diagram showing details on a method for storing a video stream 901 into a PES packet sequence 902. This storage method is the same for the base-view video stream and the dependent-view video stream. As shown in FIG. 9, in the actual video stream 901, pictures are multiplexed in the order of encoding, not in the order of presentation time. For example, in the VAUs in the base-view video stream, as shown in FIG. 9, $I_0$ picture 910, $P_3$ picture 911, $B_1$ picture 912, $B_2$ picture 913, . . . are stored in order from the top. The subscripted number indicates the serial number allotted to each picture in order of presentation time. $I_0$ picture 910 is used as a reference picture for encoding $P_3$ picture 911, and both $I_0$ picture 910 and $P_3$ picture 911 are used as reference pictures for encoding $B_1$ picture 912 and $B_2$ picture 913. Each of these VAUs is stored as a different PES packet 920, 921, 922, 923, . . . . Each PES packet 920, . . . includes a PES payload 920P and a PES header 920H. Each VAU is stored in a PES payload 920P. Each PES header 920H includes a presentation time, (Presentation Time-Stamp, or PTS), and a decoding time (Decoding Time-Stamp, or DTS), for the picture stored in the PES payload 920P in the same PES packet 920. The "PTS" indicates the timing at which data, such as a picture, decoded by a decoder in the playback device 102 is output by the decoder. The "DTS" indicates the timing at which to cause the decoder to begin decoding the data, such as a picture.

As with the video stream 901 shown in FIG. 9, the other elementary streams shown in FIG. 3 are stored in PES payloads in a sequence of PES packets. Furthermore, the PES header in each PES packet includes the PTS for the data stored in the PES payload for the PES packet.

Figure 10:
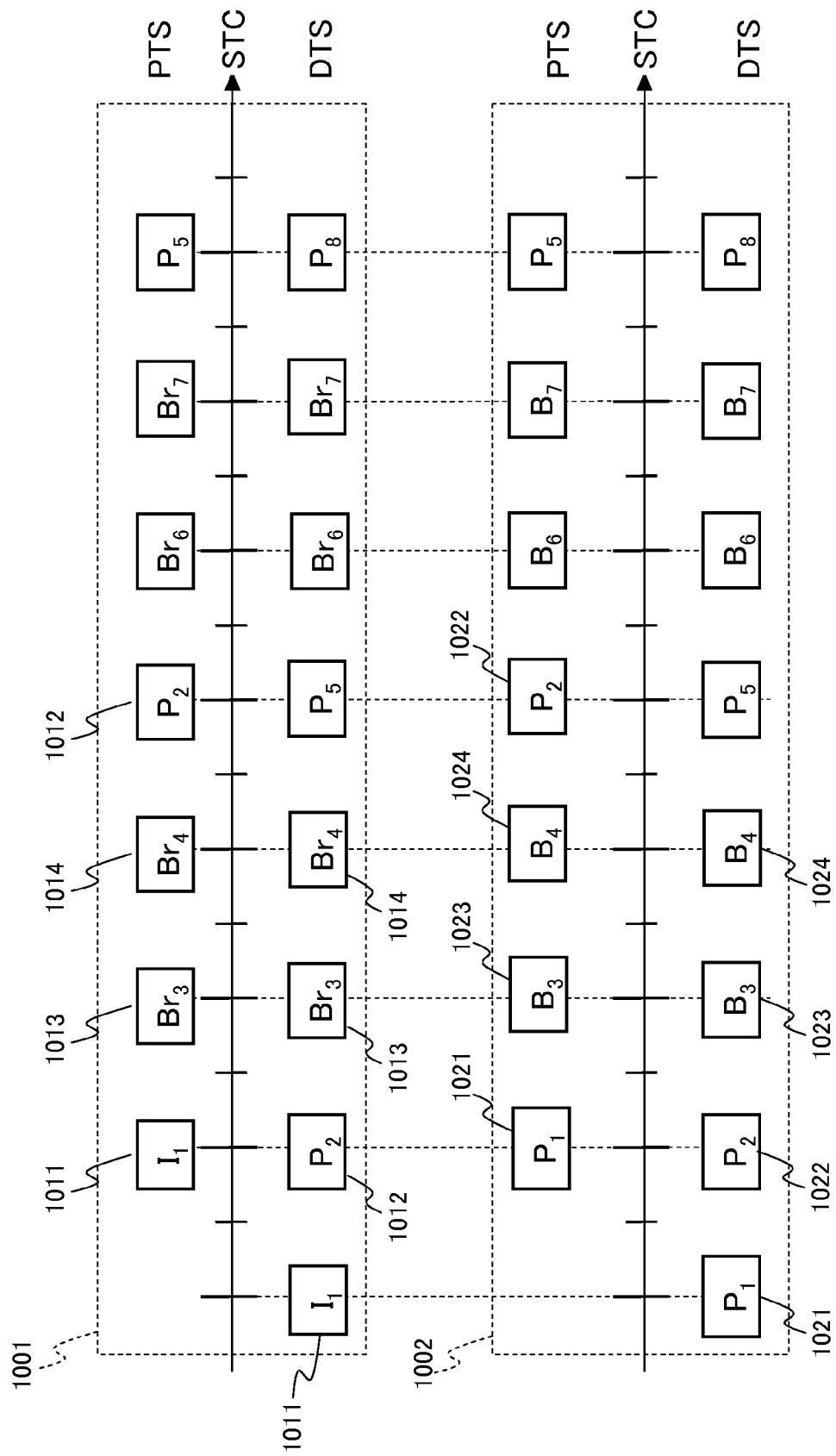
FIG. 10 is a schematic diagram showing a correspondence between PTSs and DTSs assigned to pictures in a base-view video stream 1001 and a dependent-view video stream 1002.

FIG. 10 is a schematic diagram showing a correspondence between PTSs and DTSs assigned to pictures in a base-view video stream 1001 and a dependent-view video stream 1002. As shown in FIG. 10, between the video streams 1001 and 1002, the same PTSs and DTSs are assigned to a pair of pictures representing the same frame in a 3D video image. For example, the top frame in the 3D video image is rendered from a combination of $I_1$ picture 1011 in the base-view video stream 1001 and $P_1$ picture 1021 in the dependent-view video stream 1002. Accordingly, the PTS and DTS for these two pictures 1011 and 1021 are the same. The subscripted numbers indicate the serial number allotted to each picture in the order of DTSs. Also, when the dependent-view video stream 1002 is a depth map stream, $P_1$ picture 1021 is replaced by an I picture representing a depth map for the $I_1$ picture 1011. Similarly, the PTS and DTS for the pair of second pictures in the video streams 1001 and 1002, i.e. $P_2$ pictures 1012 and 1022, are the same. The PTS and DTS are both the same for the pair of third pictures in the video streams 1001 and 1002, i.e. $Br_3$ picture 1013 and $B_3$ picture 1023. The same is also true for the pair $Br_4$ picture 1014 and $B_4$ picture 1024.

A pair of VAUs that include pictures for which the PTS and DTS are the same between the base-view video stream 1001 and the dependent-view video stream 1002 is called a "3D VAU." Using the allocation of PTSs and DTSs shown in FIG. 10, it is easy to cause the decoder in the playback device 102 in 3D playback mode to process the base-view video stream 1001 and the dependent-view video stream 1002 in parallel in units of 3D VAUs. In this way, the decoder definitely processes a pair of pictures representing the same frame in a 3D video image in parallel. Furthermore, the sequence header in the 3D VAU at the top of each GOP includes the same resolution, the same frame rate, and the same aspect ratio. In particular, this frame rate is equal to the value when the base-view video stream 1001 is decoded independently in 2D playback mode.

<<Other TS Packets Included in AV Stream File>>

In addition to the TS packets converted from the elementary stream as shown in FIG. 3, the types of TS packets included in an AV stream file include a Program Association Table (PAT), Program Map Table (PMT), and Program Clock Reference (PCR). The PCR, PMT, and PAT are specified by the European Digital Broadcasting Standard and regulate the AV stream in the same way as the partial transport stream constituting a single program. Specifically, the PAT shows the PID of a PMT included in the same AV stream file. The PID of the PAT itself is 0. The PMT includes the PID of each elementary stream included in the AV stream file and the corresponding attribute information. The attribute information includes identification information for the codec used for compressing the elementary stream as well as a frame rate and an aspect ratio of the elementary stream. The PMT also includes various descriptors relating to the AV stream file. The descriptors indicate attributes shared throughout the AV stream file and particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC. By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Interleaved Arrangement of Multiplexed Stream Data>>

In order to seamlessly play back any of full HD 2D video images, 3D video images, and 4K2K 2D video images from the BD-ROM disc 101, it is important how to physically arrange the base-view video stream, the dependent-view video stream, and the extended stream on the BD-ROM disc 101. "Seamless playback" refers to playing back images and sounds from multiplexed stream data without interruption.

Figure 11:
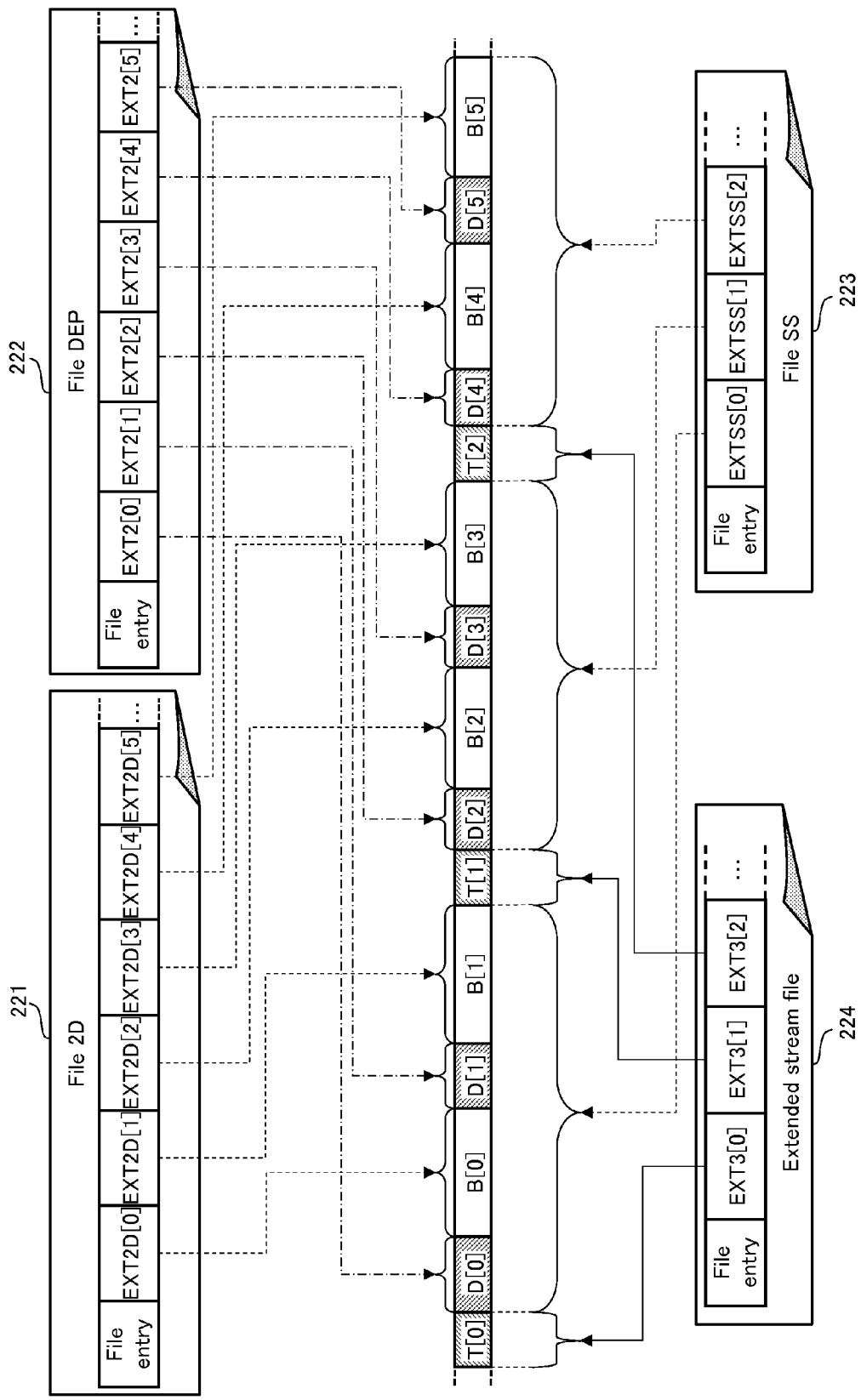
FIG. 11 is a schematic diagram showing a physical arrangement of a main TS, a sub-TS, and an extended stream on the BD-ROM disc 101.

FIG. 11 is a schematic diagram showing a physical arrangement of a main TS, a sub-TS, and an extended stream on the BD-ROM disc 101. As shown in FIG. 11, the main TS, the sub-TS, and the extended stream are divided into a plurality of data blocks B[n], D[n], and T[n], respectively (n=0, 1, 2, 3, ... ). The data blocks B[n], D[n], and T[n] are each recorded in a plurality of sectors physically contiguous on the BD-ROM disc 101. The data blocks B[n] of the main TS can be each accessed as one extent EXT2D[n] of the file 2D 221. The data blocks D[n] of the sub-TS can be each accessed as one extent EXT2[n] of the file DEP 222. The data blocks T[n] of the extended stream can be each accessed as one extent EXT3[n] of the extended stream file 224. In other words, the sizes and the first LBNs of the data blocks B[n], D[n], and T[n] can be known from the file entries of the file 2D 221, the file DEP 222, and the extended stream file 224, respectively (see <<Supplement>> for details). Since physical addresses on the BD-ROM disc 101 are substantially the same as logical addresses thereon, LBNs are also continuous within each of the data blocks B[n], D[n], and T[n]. Accordingly, the BD-ROM drive 121 can continuously read each of the data blocks B[n], D[n], and T[n] without causing the optical pickup to seek. Hereinafter, the data blocks B[n] belonging to the main TS are referred to as "base-view extents," the data blocks D[n] belonging to the sub-TS are referred to as "dependent-view extents," and the data blocks T[n] belonging to the extended stream are referred to as "extended extents."

As shown in FIG. 11, each group of the extents B[n], D[n], T[n] is recorded continuously along a track on the BD-ROM disc 101. In particular, two each of the base-view extents B[n+i] and dependent-view extents D[n+i] are alternately arranged (i=0, 1) right behind one of the extended extents T[n]. This arrangement of the extents B[n+i], D[n+i] is referred to as an "interleaved arrangement," and each sequence of the extents B[n+i], D[n+i] recorded in the interleaved arrangement is referred to as an "extent block." Each extent block can be accessed as one extent EXTSS[n] of the file SS 223. In other words, the sizes and the first LBNs of the extent blocks B[n+i], D[n+i] can be found from the file entry of the file SS 223. The extents EXTSS[0], EXTSS[1], and EXTSS[2] of the file SS share the base-view extents B[n] with the file 2D 221 and share the dependent-view extents D[n] with the file DEP 222.

[Playback Path for Extents in an Interleaved Arrangement]

Figure 12:
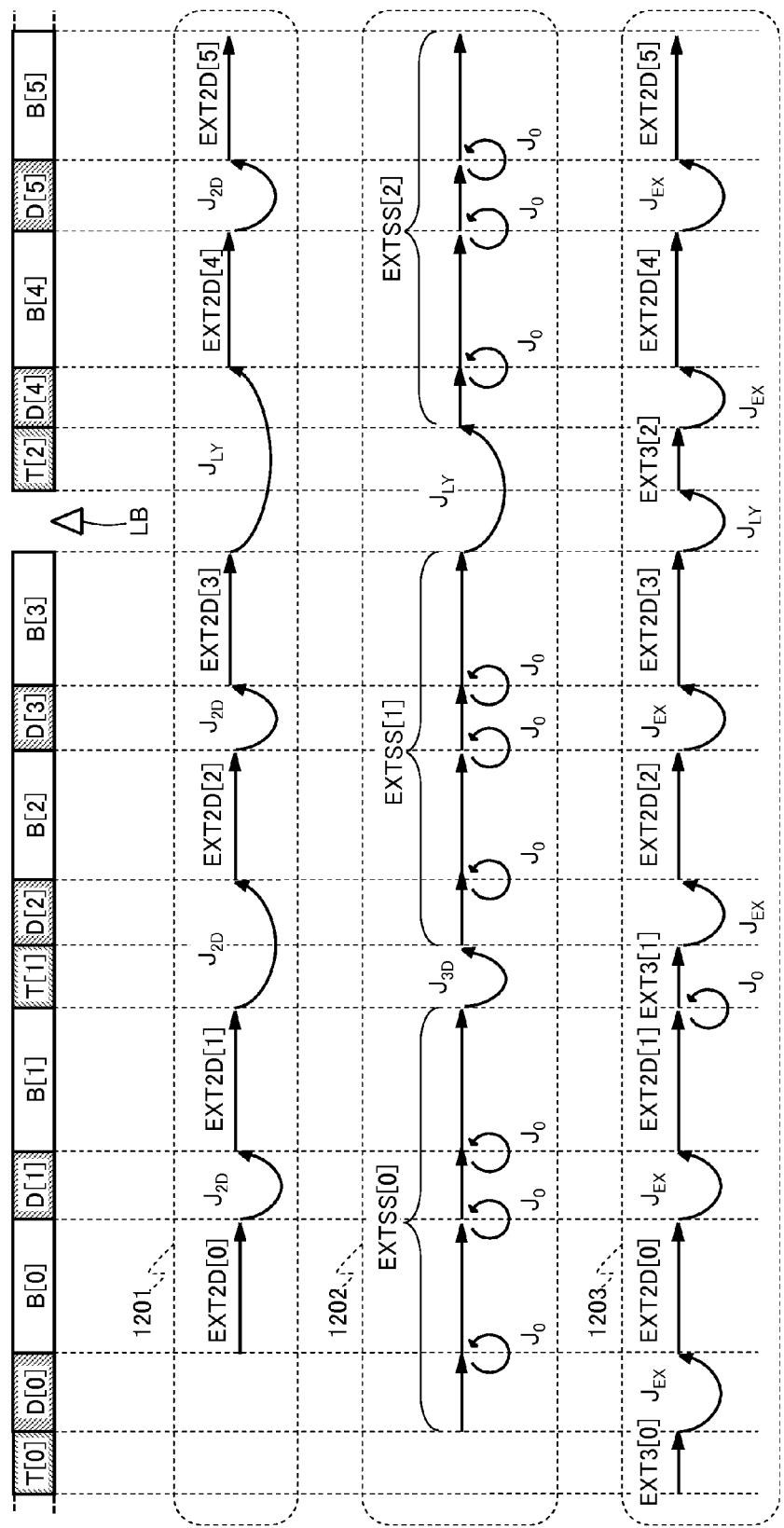
FIG. 12 is a schematic diagram showing three types of playback paths, 1201, 1202, and 1203, for extents T[m], D[m+i], B[m+i] (m=0, 1, 2, i=0, 1).

FIG. 12 is a schematic diagram showing three types of playback paths, 1201, 1202, and 1203, for extents T[m], D[m+i], B[m+i] (m=0, 1, 2, i=0, 1). The first playback path 1201 is a playback path for the file 2D 221. The second playback path 1202 is a playback path for the file SS 223. The third playback path 1203 is a playback path for the extended stream file 224.

The playback device 102 in 2D playback mode plays back the file 2D 221. Accordingly, as shown by the first playback path 1201, only the base-view extents B[m+1] are read in order from the extents shown in FIG. 12 as extents EXT2D [m+i] of the file 2D 221. Specifically, the top base-view extent B[0] is first read, and then the immediately subsequent dependent-view extent D[1] is skipped by a jump $J_{2D}$. Next, the second base-view extent B[1] is read, and then the immediately subsequent extended extent T[1] and dependent-view extent D[2] are skipped by a jump $J_{2D}$. Reading of base-view extents and jumps are similarly repeated thereafter.

A jump $J_{LY}$ occurring between the fourth base-view extent B[3] and the third extended extent T[2] is a long jump over a layer boundary LB. The "layer boundary" refers to a boundary between two recording layers of the BD-ROM disc 101 that is a multi-layer disc, i.e., includes two or more recording layers. The term "long jump" collectively means jumps with long lengths of seek time and specifically refers to (i) a jump caused by switching recording layers and (ii) a jump whose distance exceeds a predetermined threshold value. A "jump distance" refers to the length of an area on the BD-ROM disc 101 where reading is skipped during a jump period. The jump distance is usually expressed as the number of sectors included in the area. The threshold value in type (ii) is specified as 40,000 sectors, for example, in the BD-ROM standards. This threshold value, however, depends on the type of BD-ROM disc and on the reading performance of BD-ROM drive. Long jumps particularly include focus jumps and track jumps. A "focus jump" is a jump caused by switching recording layers, and includes the process of changing the focus distance of the optical pickup. A "track jump" includes the process of moving the optical pickup in a radial direction along the BD-ROM disc 101.

The playback device 102 in 3D playback mode plays back the file SS 223. Accordingly, as shown by the second playback path 1202, the extent blocks D[m+i], B[m+i] are read in order from the extents shown in FIG. 12 as extents EXTSS[0], EXTSS[1], EXTSS[2] of the file SS 223. Specifically, first, the top extent block D[0], B[0], D[1], B[1] is read continuously and then the next extended extent T[1] is skipped by a jump $J_{3D}$. Next, the second extent block D[2], ..., B[3] is read continuously. Immediately after that, a long jump $J_{LY}$ occurs for switching recording layers, and then the third extended extent T[2] is skipped. Subsequently, the third extent block D[4], B[4], ... is read continuously. After reading each of the extents EXTSS[0], EXTSS[1], ... of the file SS 223, the playback device 102 uses the clip information file to separate the extent into dependent-view extents and base-view extents to transfer them to its decoders.

The playback device 102 in extended playback mode plays back the extended stream file 224. Accordingly, as shown by the third playback path 1203, the extended extents T[m] are read from the extents shown in FIG. 12 as extents EXT3[0], EXT3[1], and EXT3[2] of the extended stream file 224, and the base-view extents B[m+i] are as extents EXT2D[0], EXT2D[1], and EXT2D[2] of the file 2D 221. Specifically, first, the top extended extent T[0] is read and the next dependent-view extent D[0] is skipped by a jump $J_{EX}$. Next, the top base-view extent B[0] is read and the next dependent-view extent D[1] is skipped by a jump $J_{EX}$. Thereafter, reading of the extended extents T[m] and base-view extents B[m+i] and jumps are similarly repeated.

As shown in FIG. 12, the BD-ROM drive 121, even when continuously reading two adjacent extents, actually performs a zero sector transition $J_0$ from the end of the previous extent to the top of the next one. A "zero sector transition" refers to a movement of the optical pickup between two consecutive extents. During a period in which a zero sector transition is performed (hereinafter referred to as a "zero sector transition period"), the optical pickup temporarily suspends its read operation and waits. For this reason, a zero sector transition is considered "a jump whose jump distance equals zero sectors." The length of the zero sector transition period, that is, the zero sector transition time period, may include, in addition to the time for shifting the position of the optical pickup via revolution of the BD-ROM disc 101, overhead caused by error correction process. "Overhead caused by error correction process" refers to excess time caused by performing error correction process twice using an ECC block when the boundary between ECC blocks does not match with the boundary between two extents. A whole ECC block is necessary for error correction process. Accordingly, when two consecutive extents share a single ECC block, the whole ECC block is read and used for error correction process during reading of either extent. As a result, each time one of these extents is read, a maximum of 32 sectors of excess data is additionally read. The overhead caused by error correction process is estimated at the total time for reading the excess data, i.e. 32 sectors×2048 bytes×8 bits/byte×2 times/read rate. Note that extents may be structured in units of ECC blocks. In this case, the size of each extent equals an integer multiple of the size of an ECC block. The overhead caused by error correction process can thus be removed from the zero sector transition period.

[Structure of Extent Blocks]

Within one extent block, the $(i+1)^{th}$ base-view extent B[m+i] and the $(i+1)^{th}$ dependent-view extent D[m+i] have the same extent ATC time. Hereinafter, such a pair of extents B[m+i], D[m+i] is referred to as an "extent pair." The "extent ATC time" indicates the range of ATSs assigned to source packets in one extent, i.e. the difference from the ATS of the top source packet in an extent to the ATS of the top source packet in the next extent. This difference equals the time, expressed as an ATC value, required for the playback device 102 to transfer all of the source packets in the extent from the read buffer to the system target decoder. The method of aligning the extent ATC times is described below. The "read buffer" is a buffer memory in the playback device 102 where extents read from the BD-ROM disc 101 are temporarily stored before being transmitted to the system target decoder. Details on the read buffer are provided later.

The VAUs located at the top of each extent pair D[m+i], B[m+i] belong to the same 3D VAU, and in particular include the top picture of the GOP representing the same 3D video image. For example, the top of each dependent-view extent D[m+i] includes a P picture in the right-view video stream, and the top of each base-view extent B[m+i] includes an I picture in the base-view video stream. A 2D video image represented by the P picture of the right-view video stream, together with a 2D video image represented by the I picture of the base-view video stream, represents one 3D video image. In particular, the P picture is compressed by using the I picture as a reference picture, as shown in FIG. 7. Accordingly, the playback device 102 in 3D playback mode can start playback of 3D video images from any extent pair D[m+1], B[m+1]. That is to say, the device can perform the process that requires random access to video streams, such as interrupt playback.

[Relationship Between Extended Extents and Extent Blocks]

Figure 13:
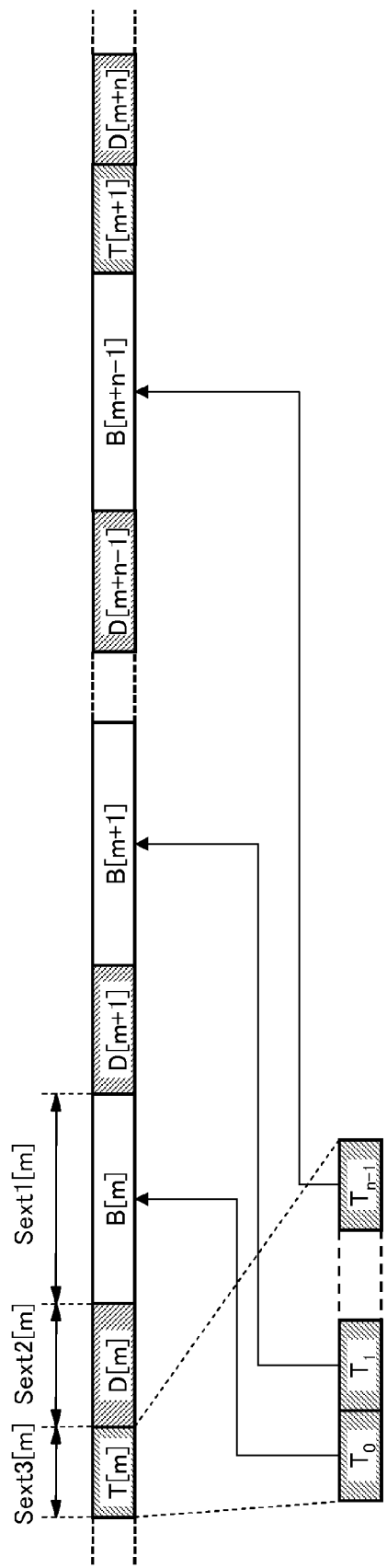
FIG. 13 is a schematic diagram showing the relationship between one extended extent T[m] (m=0, 1, 2, ...) and extent blocks B[k], D[k] (k=m, m+1, ..., m+n−1) arranged immediately thereafter.

FIG. 13 is a schematic diagram showing the relationship between one extended extent T[m] (m=0, 1, 2, . . . ) and the extent blocks B[k], D[k] (k=m, m+1, . . . m+n−1) arranged immediately after the extended extent. As illustrated in FIG. 13, one extent block includes "n" base-view extents B[k] and "n" dependent-view extents D[k]. As long as the number "n" is two or more, it may vary with extent blocks. The conditions for determining the number "n" will be described below. The extended extent T[m] includes pieces T, of resolution extension information for the subsequent "n" base-view extents B[m+i] (i=0, 1, . . . , n−1). The $(i+1)^{th}$ piece $T_i$ of resolution extension information is used to extend full HD pictures included in the $(m+i+1)^{th}$ base-view extent B[m+1] to 4K2K pictures. During random access such as interrupt playback, the extent to be first read is the extended extent including resolution extension information for the base-view picture located at the playback start position. Furthermore, the extended extent T[m] has the same extent ATC time as the entirety of the "n" base-view extents B[m+i].

As shown in FIG. 13, the interleaved arrangement includes the extended extent T[m], one of the dependent-view extents D[k], and one of the base-view extents B[k] in this order since the order generally shows that of increasing bitrate.

When the dependent-view extents D[k] include a right-view video stream, a picture included in the $(k+1)^{th}$ dependent-view extent D[k] is compressed by using a picture included in the $(k+1)^{th}$ base-view extent B[k] as a reference picture. When the dependent-view extents D[k] include a depth map stream, the data amount per pixel of a depth map, i.e., the number of bits of a depth value, is generally smaller than that of a base-view picture, i.e., the total number of bits of chromatic coordinates and an α value. As further shown in FIGS. 3A through 3D, the main TS, in contrast to the sub-TS, includes elementary streams other than its primary video stream such as a primary audio stream. Accordingly, the bitrate of the dependent-view extent D[k] is generally equal to or less than that of the base-view extent B[k]. Since the extents D[k] and B[k] have the same extent ATC time, the size $S_{EXT2}[k]$ of the dependent-view extent D[k] is generally equal to or less than the size $S_{EXT1}[k]$ of the base-view extent B[k]: $S_{EXT2}[k] \leq S_{EXT1}[k]$.

The bitrate of the extended extent T[m] is determined from the amount per frame of the pixel difference information 403 shown in FIG. 4. The pixel difference information 403 simply shows the difference between the pixel data obtained by interpolation from a full HD video frame and the pixel data included in an original 4K2K video frame. Accordingly, the amount of the pixel difference information 403 is, even for the entirety of the "n" frames, sufficiently smaller than the data amount of a full HD frame. Therefore, the size $S_{EXT3}[k]$ of the extended extent T[m] is generally no larger than the size $S_{EXT2}[k]$ of each of the dependent-view extents D[k]: $S_{EXT3}[k] \leq S_{EXT2}[k]$.

The interleaved arrangement including the extents T[m], D[k], and B[k] in order of increasing bitrate has the following advantage. The playback device 102 in 3D playback mode, when reading an extent from the top of each extent block or when reading an extent from the playback start position, does not transfer the read extent to the system target decoder until finishing the reading of the entirety of the extent into the read buffer. After finishing the reading, the playback device 102 transfers the extent to the system target decoder in parallel with the next extent. This process is called "preloading." The playback device 102 in extended playback mode similarly performs preloading when reading the first extent.

The technical significance of preloading is as follows. L/R mode needs decoded base-view pictures to decode dependent-view pictures. Therefore, simultaneously providing one extent pair to the system target decoder to allow it to simultaneously decode the extent pair is desirable for enabling a buffer to maintain its capacity at a minimum; the buffer holds decoded pictures until they undergo output processing. Depth mode needs a pair of video frames representing parallax images and being generated from a decoded pair of a base-view picture and depth map. Therefore, simultaneously providing one extent pair to the system target decoder to allow it to simultaneously decode the extent pair is desirable for enabling a buffer to maintain its capacity at a minimum; the buffer holds decoded data until it is used to generate the pair of video frames. Extended playback mode needs resolution extension information to extend a decoded base-view picture to a 4K2K video frame. Therefore, simultaneously providing an extended extent and a base-view extent to the system target decoder to allow it to simultaneously decode these extents is desirable for enabling a buffer to maintain its capacity at a minimum; the buffer holds decoded data until it is used to extend the decoded base-view picture. Therefore, preloading is performed in both 3D playback mode and extended playback mode. The playback device 102 can simultaneously send two extents that are first read from the read buffer to the system target decoder.

At preloading, the entirety of the extent that is read first is stored into the read buffer. Accordingly, the read buffer requires at least a capacity equal to the size of the extent. In order to maintain the capacity of the read buffer at a minimum, the size of the extent to be preloaded should be as small as possible. Therefore, as shown in FIG. 13, an extent with a smaller data amount is placed before other extents. This enables the capacity of the read buffer to be maintained at the minimum.

[Method to Align Extent ATC Times]

Figure 14:
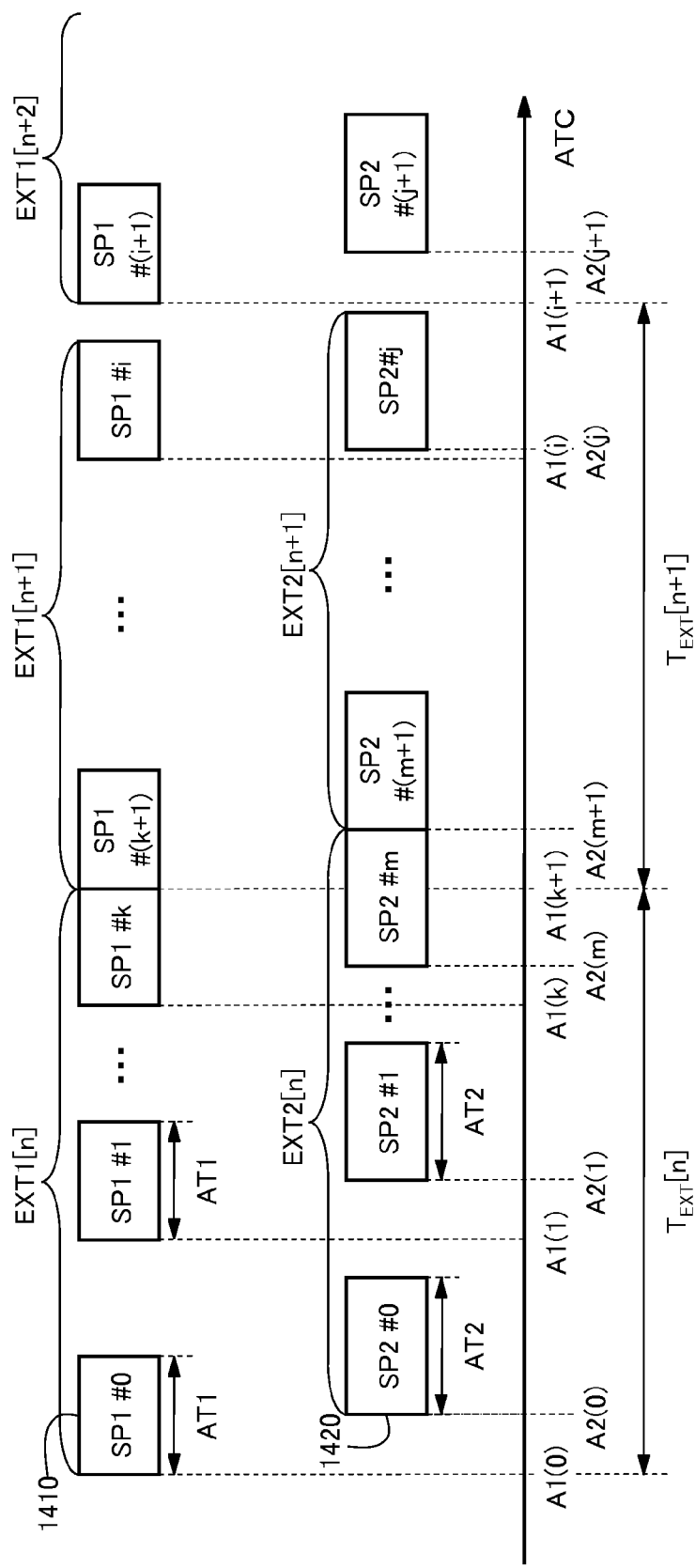
FIG. 14 is a schematic diagram showing a method to align extent ATC times between extent pairs.

FIG. 14 is a schematic diagram showing a method to align extent ATC times between consecutive extents. For the sake of convenience, the following description applies to 3D playback mode. A similar description can apply to extended playback mode. First, ATSs along the same ATC time axis are assigned to source packets stored in a base-view extent (hereinafter, SP1) and source packets stored in a dependent-view extent (hereinafter, SP2). Referring to FIG. 14, rectangles 1410 and 1420 respectively represent SP1 #p (p=0, 1, ..., k, k+1, ..., i, i+1) and SP2 #q (q=0, 1, ..., m, m+1, ..., j, j+1). These rectangles 1410 and 1420 are arranged in order along the time axis by the ATS of each source packet. The positions A1(p) and A2(q) of the tops of the rectangles 1410 and 1420, respectively, represent the value of the ATS of the source packet. The lengths AT1 and AT2 of the rectangles 1410 and 1420, respectively, represent the amount of time needed for the playback device 102 in 3D playback mode to transfer one source packet from the read buffer to the system target decoder.

SP1 #0, 1, 2, ..., k, are stored in the $(n+1)^{th}$ base-view extent EXT1[n]; these SP1 are transferred from the read buffer to the system target decoder within a period from the ATS A1(0) of SP1 #0 until elapse of an extent ATC time $T_{EXT1}$[n]. Similarly, SP1 #(k+1), ..., i, are stored in the $(n+2)^{th}$ base-view extent EXT1[n+1]; these SP1 are transferred from the read buffer to the system target decoder within a period from the ATS A1(k+1) of SP1 #(k+1) until elapse of an extent ATC time $T_{EXT1}$[n+1].

On the other hand, SP2, which is to be stored in the $(n+1)^{th}$ dependent-view extent EXT2[n], is selected as follows. First, the ATS A1(k+1) of SP1 #(k+1) is sought, which is the sum of the ATS A1(0) of SP1 #0 and the extent ATC time $T_{EXT1}$[n]: ATS A1(k+1)=A1(0)+$T_{EXT1}$[n]. Next, SP2 #0, 1, m, are selected; these SP2 each start being transferred from the read buffer to the system target decoder within a period from the ATS A1(0) of SP1 #0 until the ATS A1(k+1) of SP1 #(k+1). Accordingly, the ATS of the top SP2, i.e., the ATS A2(0) of SP2 #0, is always equal to or greater than that of the top SP1, i.e., the ATS A1(0) of SP1 #0: A2(0)≥A1(0). Furthermore, the ATS of the last SP2, i.e., the ATS A2(m) of SP2 #m, is equal to or less than the ATS A1(k+1) of SP1 #(k+1): A2(m)≤A1(k+1). In this context, transfer of SP2 #m may be completed at or after the ATS A1(k+1) of SP1 #(k+1).

Similarly, SP2, which is to be stored in the $(n+2)^{th}$ dependent-view extent EXT2[n+1], is selected as follows. First, the ATS A1(i+1) of SP1 #(i+1) is sought; the SP1 is located at the top of the $(n+3)^{th}$ base-view extent EXT1[n+2]: ATS A1(i+1)=A1(k+1)+$T_{EXT1}$[n+1]. Next, SP2 #(m+1), j, are selected; these SP2 each start being transferred from the read buffer to the system target decoder within a period from the ATS A1(k+1) of SP1 #(k+1) until the ATS A1(i+1) of SP1 #(i+1). Accordingly, the ATS of the top SP2, i.e., the ATS A2(m+1) of SP2 #(m+1), is equal to or greater than that of the top SP1, i.e., the ATS A1 (k+1) of SP1 #(k+1): A2(m+1)≥A1(k+1). Furthermore, the ATS A2(j) of the last SP2 #j is equal to or less than the ATS A1(i+1) of the SP1 #(i+1) located at the top of the next base-view extent EXT1[n+2]: A2(j)≤A1(i+1).

<<Conditions on Extent Size>>

Each extent is structured in aligned units. In particular, the size of each extent equals a multiple of the size of an aligned unit (=6,144 bytes, or approximately 6 KB). Accordingly, the BD-ROM drive can reliably read any extent continuously in its entirety, since the boundary between extents coincides with the boundary between sectors.

As illustrated in FIG. 12, the playback device 102 in any of 2D playback mode, 3D playback mode, and extended playback mode performs a jump. Allowing the playback device in any playback mode to play back video images seamlessly needs designing the lower limits for the sizes of the extents, i.e., the minimum extent sizes, to prevent underflow in any read buffer during the jump.

1: Conditions In 2D Playback Mode

Figure 15:
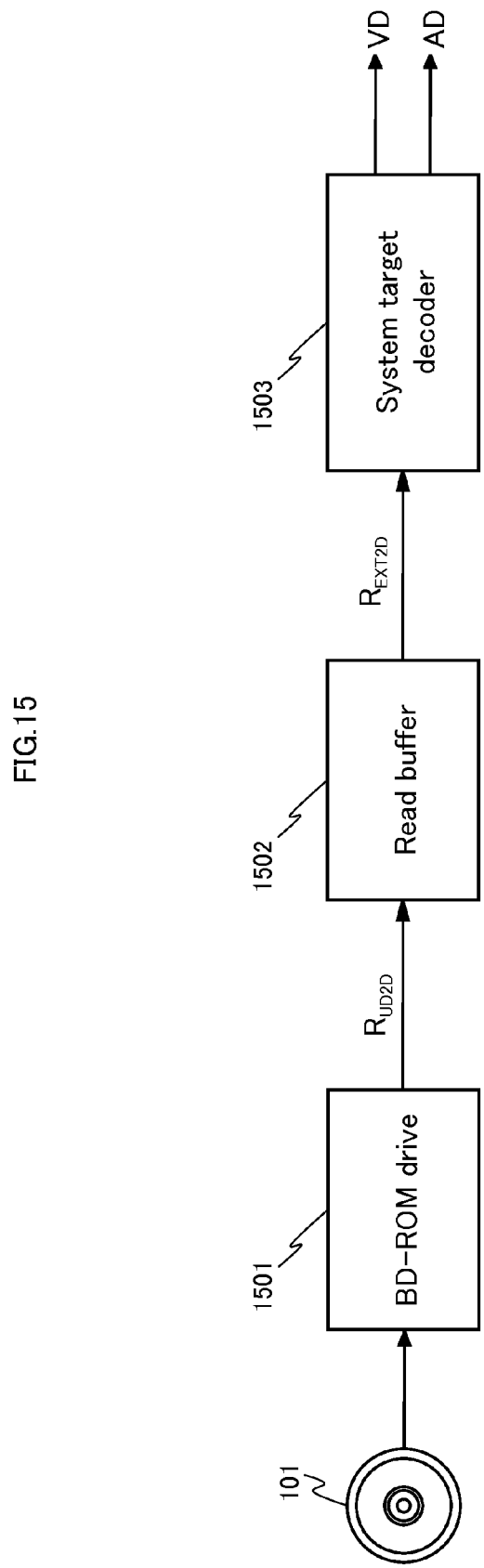
FIG. 15 is a block diagram showing a playback processing system built in a playback device 102 in 2D playback mode.

FIG. 15 is a block diagram showing a playback processing system in the playback device 102 in 2D playback mode. As shown in FIG. 15, this playback processing system includes a BD-ROM drive 1501, read buffer 1502, and a system target decoder 1503. The BD-ROM drive 1501 reads extents in the file 2D from the BD-ROM disc 101 and transfers the extents to the read buffer 1502 at a read rate $R_{UD2D}$. The read buffer 1502 is a buffer memory that is built in the playback device 102 and receives and stores extents from the BD-ROM drive 1501. The system target decoder 1503 reads source packets from each extent stored in the read buffer 1502 at a mean transfer rate $R_{EXT2D}$ and decodes the source packets into video data VD and audio data AD.

The mean transfer rate $R_{EXT2D}$ equals 192/188 times as high as the mean processing rate at which the system target decoder 1503 extracts TS packets from source packets stored in the read buffer 1502. In this case, the coefficient 192/188 is the ratio of the byte numbers between a source packet and a TS packet. The mean transfer rate $R_{EXT2D}$ is conventionally represented in bits/second and specifically equals the size of an extent, which is expressed in bits, divided by the extent ATC time. The "size of an extent expressed in bits" equals the number of source packets in the extent times the bit number per source packet (=192 bytes×8 bits/byte). The mean transfer rate $R_{EXT2D}$ typically varies with extents. The maximum value $R_{MAX2D}$ of the mean transfer rate $R_{EXT2D}$ equals 192/188 times the bitrate $R_{TS}$ of the file 2D. The maximum value of the speed at which the system target decoder 1503 processes TS packets, i.e., the "system rate," equals the bitrate $R_{TS}$ of the file 2D. The system rate $R_{TS}$ is normally expressed in bits per second (bps) and equals eight times the main TS recording rate expressed in bytes per second (Bps).

The read rate $R_{UD2D}$ is normally expressed in bits/second and is set at a higher value, e.g., 54 Mbps, than the maximum value $R_{MAX2D}$ of the mean transfer rate $R_{EXT2D}$: $R_{UD2D} > R_{MAX2D}$. This prevents decoding operation of the system target decoder 1503 from causing underflow of the read buffer 1502 while the BD-ROM drive 1501 is reading an extent from the BD-ROM disc 101.

Figure 16:
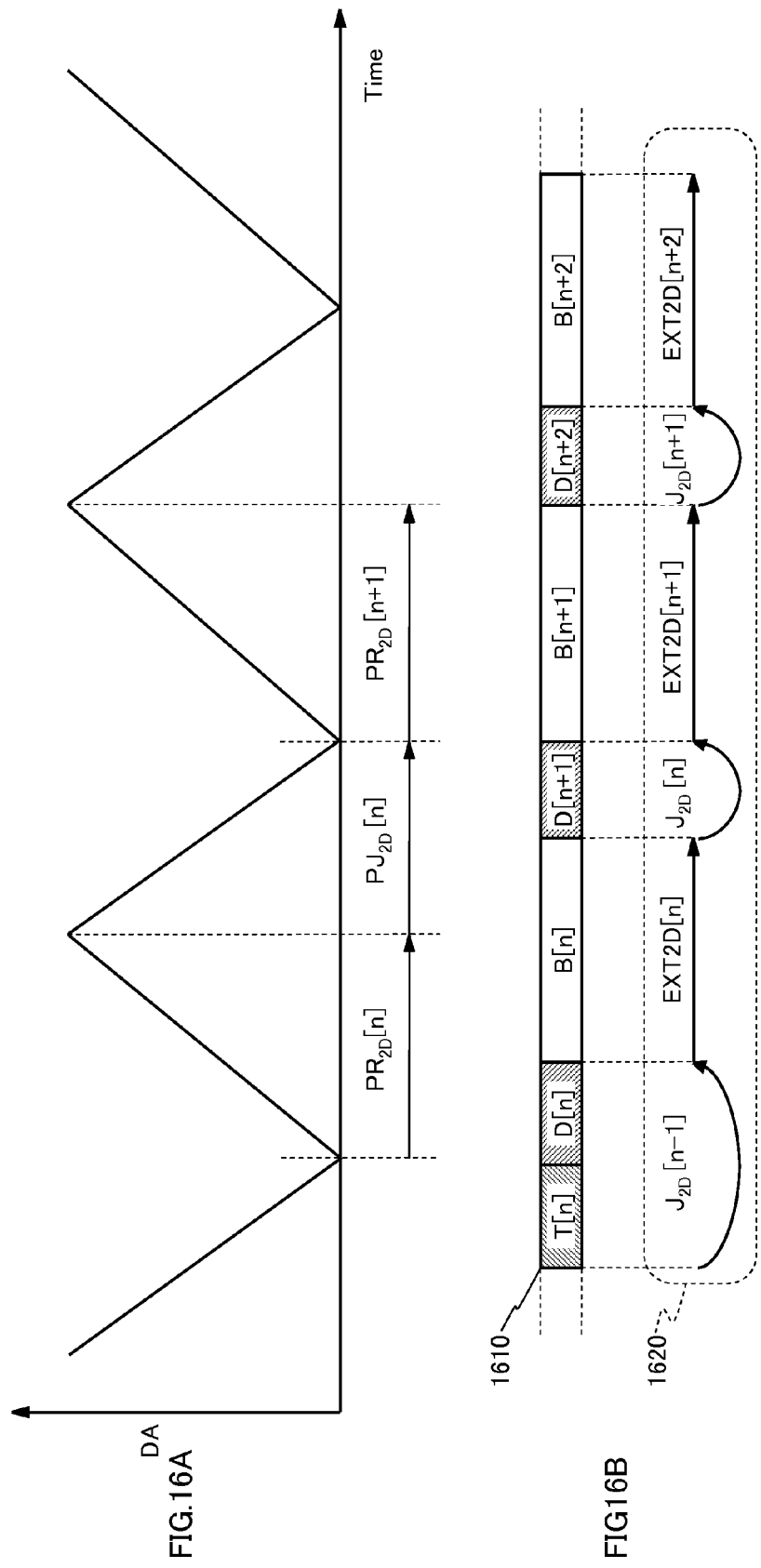
FIG. 16A is a graph showing the change in data amount DA stored in a read buffer 1502 during operation in 2D playback mode.
FIG. 16B is a schematic diagram showing a correspondence between an extended extent block 1610 to be played back and a playback path 1620 in 2D playback mode.

FIG. 16A is a graph showing the change in data amount DA stored in the read buffer 1502 during operation in 2D playback mode. FIG. 16B is a schematic diagram showing a correspondence between an extent block 1610 to be played back and a playback path 1620 in 2D playback mode. As shown in FIG. 16B, the playback path 1620 specifies that the base-view extents B[m] (m=n, n+1, n+2) included in the extent block 1610 are each read from the BD-ROM disc 101 into the read buffer 1502 as one extent EXT2D[m] of the file 2D. As shown in FIG. 16A, during the read period $PR_{2D}[n]$ for each extent EXT2D[n], the stored data amount DA increases at a rate equal to $R_{UD2D}-R_{EXT2D}[n]$, the difference between the read rate $R_{UD2D}$ and the mean transfer rate $R_{EXT2D}[n]$. A jump $J_{2D}[n]$ occurs between two contiguous 2D extents EXT2D[n] and EXT2D[n+1]. Reading of data from the BD-ROM disc 101 is interrupted during this jump period $PJ_{2D}[n]$, since the reading of the dependent-view extent D[n+1] is skipped. Accordingly, the stored data amount DA decreases at a mean transfer rate $R_{EXT2D}[n]$ during each jump period $PJ_{2D}[n]$.

Reading and transfer operations by the BD-ROM drive 1501 are not actually performed in a continuous manner, as suggested by the graph in FIG. 16A, but rather in an intermittent manner. This prevents the stored data amount DA from exceeding the capacity of the read buffer 1502, i.e., overflow in the read buffer 1502 during the read period $PR_{2D}[n]$ for each extent. Accordingly, the graph in FIG. 16A represents actual step-wise changes as approximated linear changes.

For seamless playback of full HD 2D video images from the extent block 1610 shown in FIG. 16B, the following two conditions are satisfied: first, the size $S_{EXT2D}[n]$ of each extent EXT2D[n] satisfies expression (1) described below. Second, the distance between extents of the file 2D does not exceed a predetermined upper limit.

[Minimum Extent Size of Extents of File 2D]

During each jump period $PJ_{2D}[n]$, data needs to be so continuously provided from the read buffer 1502 to the system target decoder 1503 that the system target decoder 1503 can ensure its own continuous output. To do so, the size of each extent in the file 2D satisfies the following condition 1.

The size $S_{EXT2D}[n]$ of each extent EXT2D[n] is the same as the data amount transferred from the read buffer 1502 to the system target decoder 1503 from the read period $PR_{2D}[n]$ through the next jump period $PJ_{2D}[n]$. In this case, as shown in FIG. 16A, the stored data amount DA at the end of the jump period $PJ_{2D}[n]$ does not fall below the value at the start of the read period $PR_{2D}[n]$. In other words, during each jump period $PJ_{2D}[n]$, data is continuously provided from the read buffer 1502 to the system target decoder 1503. In particular, underflow does not occur in the read buffer 1502. Note that the length of the read period $PR_{2D}[n]$ equals a value $S_{EXT2D}[n]/R_{UD2D}$, the size $S_{EXT2D}[n]$ of an extent EXT2D[n] divided by the read rate $R_{UD2D}$. Accordingly, condition 1 indicates as follows. The minimum extent size of each extent EXT2D[n] is expressed in the right-hand side of expression (1):

$$S_{EXT2D}[n] \geq \left(\frac{S_{EXT2D}[n]}{R_{UD2D}} + T_{JUMP-2D}[n]\right) \times R_{EXT2D}[n] \therefore \quad (1)$$

$$S_{EXT2D}[n] \geq \text{CEIL}\left\{\frac{R_{EXT2D}[n]}{8} \times \frac{R_{UD2D}}{R_{UD2D} - R_{EXT2D}[n]} \times T_{JUMP-2D}[n]\right\}.$$

In expression (1), the jump time $T_{JUMP-2D}[n]$ represents the length of the jump period $PJ_{2D}[n]$ in seconds. The read rate $R_{UD2D}$ and the mean transfer rate $R_{EXT2D}$ are both expressed in bits per second. Accordingly, in expression (1), the mean transfer rate $R_{EXT2D}$ is divided by 8 to convert the size $S_{EXT2D}[n]$ of the extent from bits to bytes. That is, the size $S_{EXT2D}[n]$ of the extent is expressed in bytes. The function CEIL( ) is an operation to round up fractional numbers after the decimal point of the value in parentheses.

To further ensure seamless playback during the jumps, it is preferable to add a margin to the minimum extent size expressed in the right-hand side of expression (1). Specifically, the extent ATC time of an extent of the file 2D is extended by $\Delta T$ seconds. In other words, the size $S_{EXT2D}$ of the extent satisfies expression (1A) instead of expression (1):

$$S_{EXT2D}[n] \geq \quad (1A)$$

$$\text{CEIL}\left\{\frac{R_{EXT2D}[n]}{8} \times \left(\frac{R_{UD54}}{R_{UD54} - R_{EXT2D}[n]} \times T_{JUMP-2D}[n] + \Delta T\right)\right\}.$$

The extension time $\Delta T$ may be determined by the length of a GOP, or by the upper limit of the number of extents that can be played back during a predetermined time. For example, if the length of a GOP is one second, the extension time $\Delta T$ is set to one second. On the other hand, if the number of extents that can be played back during a predetermined time [sec] has the upper limit of k, then the extension time $\Delta T$ is set to the predetermined time/k [sec].

[Interval Between Extents of File 2D]

Since the capacity of the read buffer 1502 is limited, the maximum value of the jump time $T_{JUMP-2D}[n]$ is restricted. In other words, even if the read buffer 1502 is filled to capacity with the stored data amount DA immediately before a jump period $PJ_{2D}[n]$, the jump time $T_{JUMP-2D}[n]$ being too long would cause the stored data amount DA to reach zero during the jump period $PJ_{2D}[n]$, and thus there would be a risk of underflow occurring in the read buffer 1502. Hereinafter, the time for the stored data amount DA to decrease from the capacity of the read buffer 1502 to zero while data supply from the BD-ROM disc 101 to the read buffer 1502 has stopped, that is, the maximum value of the jump time $T_{JUMP-2D}[n]$ that guarantees seamless playback, is referred to as the "maximum jump time $T_{JUMP\_MAX}$."

Standards of optical discs determine a correspondence between jump distances and maximum jump times from the access speed of an optical disc drive and other factors. FIG. 17 is an example of a correspondence table between jump distances $S_{JUMP}$ and maximum jump times $T_{JUMP\_MAX}$ for a BD-ROM disc. As shown in FIG. 17, jump distances $S_{JUMP}$ are represented in units of sectors, and maximum jump times $T_{JUMP\_MAX}$ are represented in milliseconds. One sector equals 2048 bytes. When a jump distance $S_{JUMP}$ is within a range of 0 sectors, 1-10000 sectors, 10001-20000 sectors, 20001-40000 sectors, 40001 sectors-1/10 of a stroke (=640000 sectors), and 1/10 of a stroke or greater, the corresponding maximum jump time $T_{JUMP\_MAX}$ is 50 ms, 200 ms, 300 ms, 350 ms, 700 ms, and 1400 ms, respectively. When the jump distance $S_{JUMP}$ is zero sectors, the maximum jump time $T_{JUMP\_MAX}$ is equal to the zero sector transition time $T_{JUMP0}$=50 ms.

Based on the above considerations, the jump time $T_{JUMP-2D}$ to be substituted into expression (1) is the maximum jump time $T_{JUMP\_MAX}$ specified for each jump distance by BD-ROM disc standards. Specifically, in the table in FIG. 17, the maximum jump time $T_{JUMP\_MAX}$ corresponding to the jump distance $S_{JUMP}$ between two contiguous extents EXT2D[n] and EXT2D[n+1] of the file 2D is substituted into expression (1) as the jump time $T_{JUMP-2D}$. The jump distance $S_{JUMP}$ equals the number of sectors within the range from the end of the $(n+1)^{th}$ extent EXT2D[n] to the top of the $(n+2)^{th}$ extent EXT2D[n+1].

Since the jump time $T_{JUMP-2D}[n]$ of a jump $J_{2D}[n]$ between the two extents EXT2D[n] and EXT2D[n+1] is restricted to the maximum jump time $T_{JUMP\_MAX}$, the jump distance $S_{JUMP}$ thereof, or the interval between the two extents EXT2D[n] and EXT2D[n+1], is also restricted. For example, when the jump time $T_{JUMP\_2D}[n]$ is restricted to the maximum jump time $T_{JUMP\_MAX}=700$ ms or shorter, the jump distance $S_{JUMP}$ between the two extents EXT2D[n] and EXT2D[n+1] is allowed to be up to 1/10 of a stroke (=approximately 1.2 GB). Like this maximum for the jump distance $S_{JUMP}$, a jump distance $S_{JUMP}$ corresponding to a jump time $T_{JUMP}$ equal to the maximum jump time $T_{JUMP\_MAX}$ is referred to as a "maximum jump distance $S_{JUMP\_MAX}$." Seamless playback of full HD 2D video images needs extents of the file 2D placed at intervals equal to or smaller than the maximum jump distance $S_{JUMP\_MAX}$.

In each extent block, an interval between two extents of the file 2D equals the size of a dependent-view extent. Accordingly, the size of a dependent-view extent is restricted to the maximum jump distance $S_{JUMP\_MAX}$ or smaller. More concretely, when the maximum jump time $T_{JUMP\_MAX}$ between two extents of the file 2D is restricted to 200 ms as specified in FIG. 17, the size of the dependent-view extent is restricted to a corresponding maximum jump distance $S_{JUMP\_MAX}=10000$ sectors (approximately 19.5 MB) or smaller.

An extended extent is arranged between two adjacent extent blocks. Accordingly, during the jump from the base-view extent located at the end of the first extent block to the base-view extent located at the top of the second extent block, not only the dependent-view extent but also the extended extent needs to be skipped. A margin is therefore added to the extents in the file 2D to allow them to satisfy expression (1A) instead of expression (1). In this case, the maximum jump distance $S_{JUMP\_MAX}$ is expanded to 20000 sectors. In other words, the extended extent and the dependent-view extent just needs to have a total size of up to 20000 sectors.

When seamlessly connecting two groups of extents arranged on different recording layers, the playback device 102 performs a long jump. This long jump involves switching between the recording layers such as a focus jump. Accordingly, the time required for the long jump includes, in addition to the maximum jump time $T_{JUMP\_MAX}$ as specified in FIG. 17, the time required for switching between the recording layers, which is hereinafter referred to as a "layer switching time." For example, the layer switching time is 350 ms. In the example shown in FIG. 12, a long jump $J_{LY}$ is performed from the fourth extent EXT2D[3] to the fifth extent EXT2D[4] of the file 2D. In this case, expression (1) that the size of the fourth extent EXT2D[3] should satisfy includes the jump time $T_{JUMP\_2D}[3]$ determined by a sum of two parameters TJ and TL: $T_{JUMP\_2D}[3]=TJ+TL$. The first parameter TJ indicates the maximum jump time $T_{JUMP\_MAX}$ that the standards for BD-ROM discs specify with respect to the jump distance $S_{JUMP}$ of the long jump. The maximum jump time $T_{JUMP\_MAX}$ corresponds to a value that the table shown in FIG. 17 associates with the number of sectors included in the range from the end of the fourth extent EXT2D[3] to the top of the fifth extent EXT2D[4]. The second parameter TL indicates the layer switching time, for example, 350 ms. Accordingly, the interval between the two extents EXT2D[3] and EXT2D[4] is restricted up to a maximum jump distance $S_{JUMP\_MAX}$ that the table shown in FIG. 17 associates with the maximum jump time $T_{JUMP\_MAX}$ of the long jump with the layer switching time removed. For example, when the jump time $T_{JUMP\_2D}[n]$ is restricted up to the maximum jump time $T_{JUMP\_MAX}=700$ ms, the maximum jump distance $S_{JUMP\_MAX}$ between the two extents EXT2D[3] and EXT2D [4] corresponds to 40000 sectors (approximately 78.1 MB).

2: Conditions in 3D Playback Mode

Figure 18:
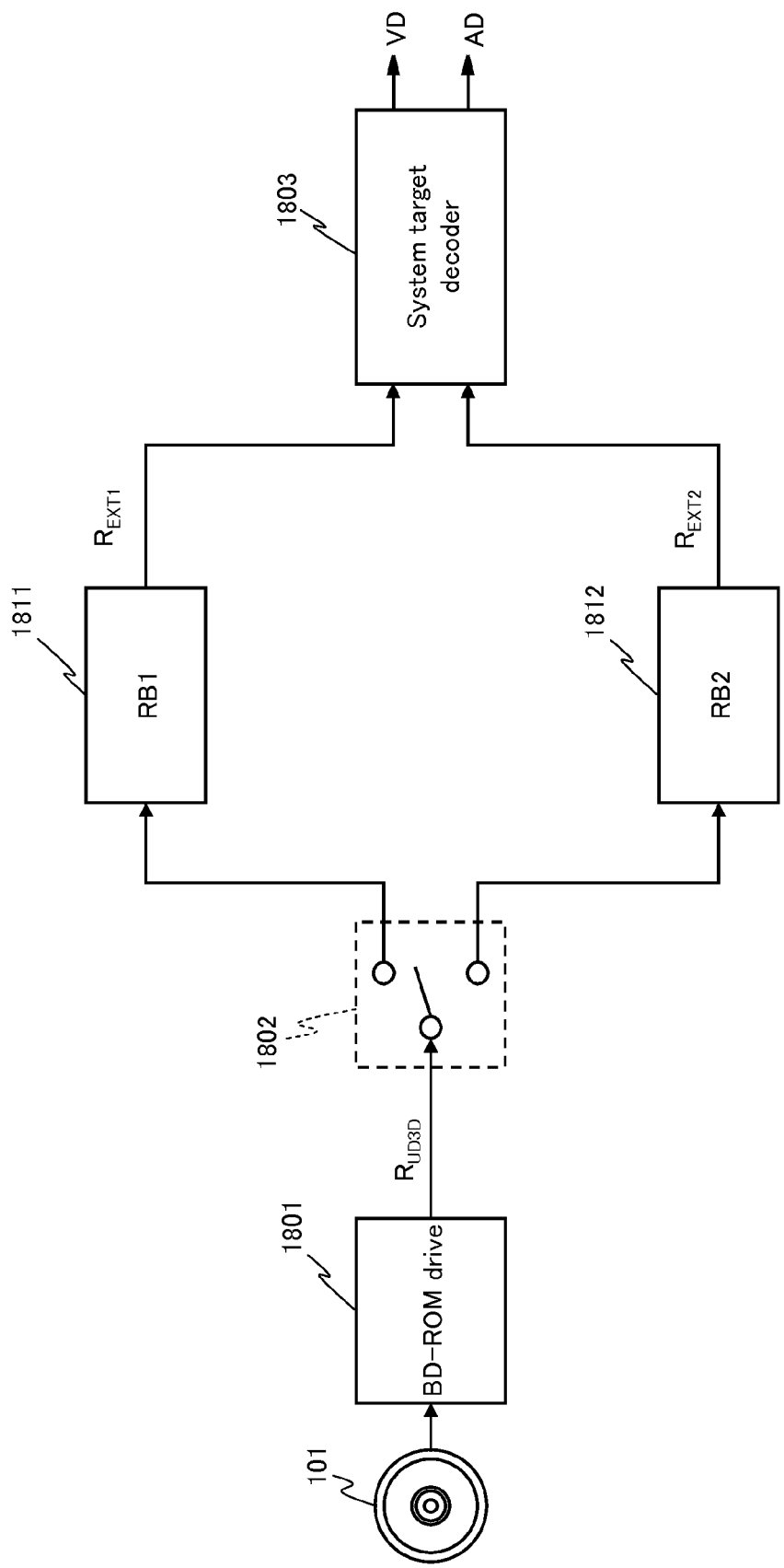
FIG. 18 is a block diagram showing a playback processing system built in the playback device 102 in 3D playback mode.

FIG. 18 is a block diagram showing a playback processing system in the playback device 102 in 3D playback mode. As shown in FIG. 18, this playback processing system includes a BD-ROM drive 1801, a switch 1802, a pair of read buffers 1811 and 1812, and a system target decoder 1803. The BD-ROM drive 1801 reads extents in the file 3D from the BD-ROM disc 101 and transfers the extents to the switch 1802 at a read rate $R_{UD3D}$. The switch 1802 separates the extents in the file SS into base-view extents and dependent-view extents. Details on the separation are provided below. The first read buffer 1811 and the second read buffer 1812 (hereinafter abbreviated as RB1 and RB2, respectively) are buffer memories internal to the playback device 102 and store extents separated by the switch 1802. The RB1 1811 stores base-view extents, and the RB2 1812 stores dependent-view extents. The system target decoder 1803 reads source packets from the base-view extents in the RB1 1811 at a first transfer rate $R_{EXT1}$ and reads source packets from the dependent-view extents in the RB2 1812 at a second transfer rate $R_{EXT2}$. The system target decoder 1803 also decodes pairs of read base-view extents and dependent-view extents into video data VD and audio data AD.

The first transfer rate $R_{EXT1}$ equals 192/188 times as high as the mean processing rate at which the system target decoder 1803 extracts TS packets from source packets stored in the RB 1 1811. The maximum value $R_{MAX1}$ of the first transfer rate $R_{EXT1}$ equals 192/188 times the system rate $R_{TS1}$ of the file 2D: $R_{MAX1}=R_{TS1}\times192/188$. This system rate $R_{TS1}$ is normally expressed in bits per second (bps) and equals eight times the main TS recording rate expressed in bytes per second (Bps). The second transfer rate $R_{EXT2}$ equals 192/188 times as high as the mean processing rate at which the system target decoder 1803 extracts TS packets from source packets stored in the RB2 1812. The maximum value $R_{MAX2}$ of the second transfer rate $R_{EXT2}$ equals 192/188 times the system rate $R_{TS2}$ of the file DEP: $R_{MAX2}=R_{TS2}\times192/188$. This system rate $R_{TS2}$ is normally expressed in bits per second (bps) and equals eight times the sub-TS recording rate expressed in bytes per second (Bps). Each of the transfer rates $R_{EXT1}$ and $R_{EXT2}$ is typically represented in bits/second and specifically equals the size of each extent, which is expressed in bits, divided by an extent ATC time. An extent ATC time equals the time required to transfer all source packets included in an extent from the RB1 1811 and RB2 1812 to the system target decoder 1803.

The read rate $R_{UD3D}$ is typically expressed in bits/second and is set at a higher value, e.g. 72 Mbps, than either of the maximum values $R_{MAX1}$, $R_{MAX2}$ of the transfer rates $R_{EXT1}$, $R_{EXT2}$: $R_{UD3D}>R_{MAX1}$, $R_{UD3D}>R_{MAX2}$. This prevents decoding operation of the system target decoder 1803 from causing underflow of the RB1 1811 and RB2 1812 while the BD-ROM drive 1801 is reading an extent of the file SS from the BD-ROM disc 101.

[Seamless Connection within Extent Block]

FIGS. 19A and 19B are graphs showing changes in data amounts DA1 and DA2, respectively stored in the RB1 1811 and RB2 1812, when 3D video images are played back seamlessly from a single extent block. FIG. 19C is a schematic diagram showing a correspondence between an extent block 1910 and a playback path 1920 in 3D playback mode. As shown in FIG. 19C, the playback path 1920 specifies that the entirety of the extent block 1910 is read continuously as one extent of the file SS. Subsequently, the switch 1802 separates the extent block into dependent-view extents D[k] and base-view extents B[k] (k= . . . n, n+1, n+2, . . . ).

Reading and transfer operations by the BD-ROM drive 1801 are not actually performed in a continuous manner, as suggested by the graphs in FIGS. 19A and 19B, but rather in an intermittent manner. This prevents overflow in the RB1 1811 and RB2 1812 during the read periods $PR_D[k]$ and $PR_B[k]$ of the extents D[k] and B[k]. Accordingly, the graphs in FIGS. 19A and 19B represent actual step-wise changes as approximated linear changes.

As shown in FIGS. 19A and 19B, during the read period $PR_D[n]$ for the $(n+1)^{th}$ dependent-view extent D[n], the data amount DA2 stored in the RB2 1812 increases at a rate equal to $R_{UD3D}-R_{EXT2}[n]$ the difference between the read rate $R_{UD3D}$ and the second transfer rate $R_{EXT2}[n]$, whereas the data amount DA1 stored in the RB1 1811 decreases at the first transfer rate $R_{EXT1}[n-1]$. As shown in FIG. 19C, a zero sector transition $J_0[n]$ occurs from the $(n+1)^{th}$ dependent-view extent D[n] to the $(n+1)^{th}$ base-view extent B[n]. As shown in FIGS. 19A and 19B, during the zero sector transition period $PJ_0[n]$, the data amount DA1 stored in the RB1 1811 continues to decrease at the first transfer rate $R_{EXT}[n-1]$, whereas the data amount DA2 stored in the RB2 1812 decreases at the second transfer rate $R_{EXT2}[n]$.

As further shown in FIGS. 19A and 19B, during the read period $PR_B[n]$ for the $(n+1)^{th}$ base-view extent B[n], the data amount DA1 stored in the RB1 1811 increases at a rate equal to $R_{UD3D}-R_{EXT1}[n]$ the difference between the read rate $R_{UD3D}$ and the first transfer rate $R_{EXT1}[n]$. On the other hand, the data amount DA2 stored in the RB2 1812 continues to decrease at the second transfer rate $R_{EXT2}[n]$. As further shown in FIG. 19C, a zero sector transition $J_0[n+1]$ occurs from the base-view extent B[n] to the subsequent dependent-view extent D[n+1]. As shown in FIGS. 19A and 19B, during the zero sector transition period $PJ_0[n+1]$, the data amount DA1 stored in the RB 1 1811 decreases at the first transfer rate $R_{EXT1}[n]$, whereas the data amount DA2 stored in the RB2 1812 continues to decrease at the second transfer rate $R_{EXT2}[n]$.

For seamless playback of 3D video images from the extent block 1910, the sizes of the extents B[n] and D[n] belonging to the extent block 1910 satisfy conditions 2 and 3 described below.

The size $S_{EXT1}[n]$ of the $(n+1)^{th}$ base-view extent B[n] is at least equal to the data amount transferred from the RB1 1811 to the system target decoder 1803 during the period from the start of the corresponding read period $PR_B[n]$ until immediately before the read period $PR_B[n+1]$ of the next base-view extent B[n+1]. In this case, as shown in FIG. 19A, immediately before the read period $PR_B[n+1]$ of the next base-view extent B[n+1], the data amount DA1 stored in the RB1 1811 does not fall below the amount immediately before the read period $PR_B[n]$ of the $(n+1)^{th}$ base-view extent B[n]. Here, the length of the read period $PR_B[n]$ of the $(n+1)^{th}$ base-view extent B[n] equals a value $S_{EXT1}[n]/R_{UD3D}$, the size $S_{EXT1}[n]$ of this base-view extent B[n] divided by the read rate $R_{UD3D}$. On the other hand, the length of the read period $PR_D[n+1]$ of the $(n+2)^{th}$ dependent-view extent D[n+1] equals a value $S_{EXT2}[n+1]/R_{UD3D}$, the size $S_{EXT2}[n+1]$ of this dependent-view extent D[n+1] divided by the read rate $R_{UD3D}$. Accordingly, condition 2 indicates as follows. The minimum extent size of the base-view extent B[n] is expressed in the right-hand side of expression (2):

$$S_{EXT1}[n] \geq \qquad (2)$$

$$\left(\frac{S_{EXT1}[n]}{R_{UD3D}} + T_{JUMP0}[n+1] + \frac{S_{EXT2}[n+1]}{R_{UD3D}} + T_{JUMP0}[n+2]\right) \times$$

-continued $$R_{EXT1}[n] \therefore$$

$$S_{EXT1}[n] \geq \text{CEIL}\left\{\frac{R_{EXT1}[n]}{8} \times \frac{R_{UD3D}}{R_{UD3D} - R_{EXT1}[n]} \times \left(T_{JUMP0}[n+1] + 8 \times \frac{S_{EXT2}[n+1]}{R_{UD3D}} + T_{JUMP0}[n+2]\right)\right\}$$

$$S_{EXT1}[n] \geq \text{CEIL}\left(R_{EXT1}[n] \times \frac{S_{EXT2}[n+1]}{R_{UD3D} - R_{EXT1}[n]}\right)$$

(when $T_{JUMP0}[k] = 0$).

The size $S_{EXT2}[n]$ of the $(n+1)^{th}$ dependent-view extent D[n] is at least equal to the data amount transferred from the RB2 1812 to the system target decoder 1803 during the period from the start of the corresponding read period $PR_D[n]$ until immediately before the read period $PR_D[n+1]$ of the next dependent-view extent D[n+1]. In this case, as shown in FIG. 19B, the data amount DA2 stored in the RB2 1812 immediately before the read period $PR_D[n+1]$ of the next dependent-view extent D[n+1] does not fall below the amount immediately before the read period $PR_D[n]$ of the $(n+1)^{th}$ dependent-view extent D[n]. Here, the length of the read period $PR_D[n]$ of the $(n+1)^{th}$ dependent-view extent D[n] equals a value $S_{EXT2}[n]/R_{UD3D}$, the size $S_{EXT2}[n]$ of this dependent-view extent D[n] divided by the read rate $R_{UD3D}$. Accordingly, condition 3 indicates the following. The minimum extent size of the dependent-view extent D[n] is expressed in the right-hand side of expression (3):

$$S_{EXT2}[n] \geq \qquad (3)$$

$$\left(\frac{S_{EXT2}[n]}{R_{UD3D}} + T_{JUMP0}[n] + \frac{S_{EXT1}[n]}{R_{UD3D}} + T_{JUMP0}[n+1]\right) \times R_{EXT2}[n] \therefore$$

$$S_{EXT2}[n] \geq \text{CEIL}\left\{\frac{R_{EXT2}[n]}{8} \times \frac{R_{UD3D}}{R_{UD3D} - R_{EXT2}[n]} \times \left(T_{JUMP0}[n] + 8 \times \frac{S_{EXT1}[n]}{R_{UD3D}} + T_{JUMP0}[n+1]\right)\right\}$$

$$S_{EXT2}[n] \geq \text{CEIL}\left(R_{EXT2}[n] \times \frac{S_{EXT1}[n]}{R_{UD3D} - R_{EXT2}[n]}\right)$$

(when $T_{JUMP0}[k] = 0$).

[Seamless Connection Between Extent Blocks]

Figures 20A, 20B:
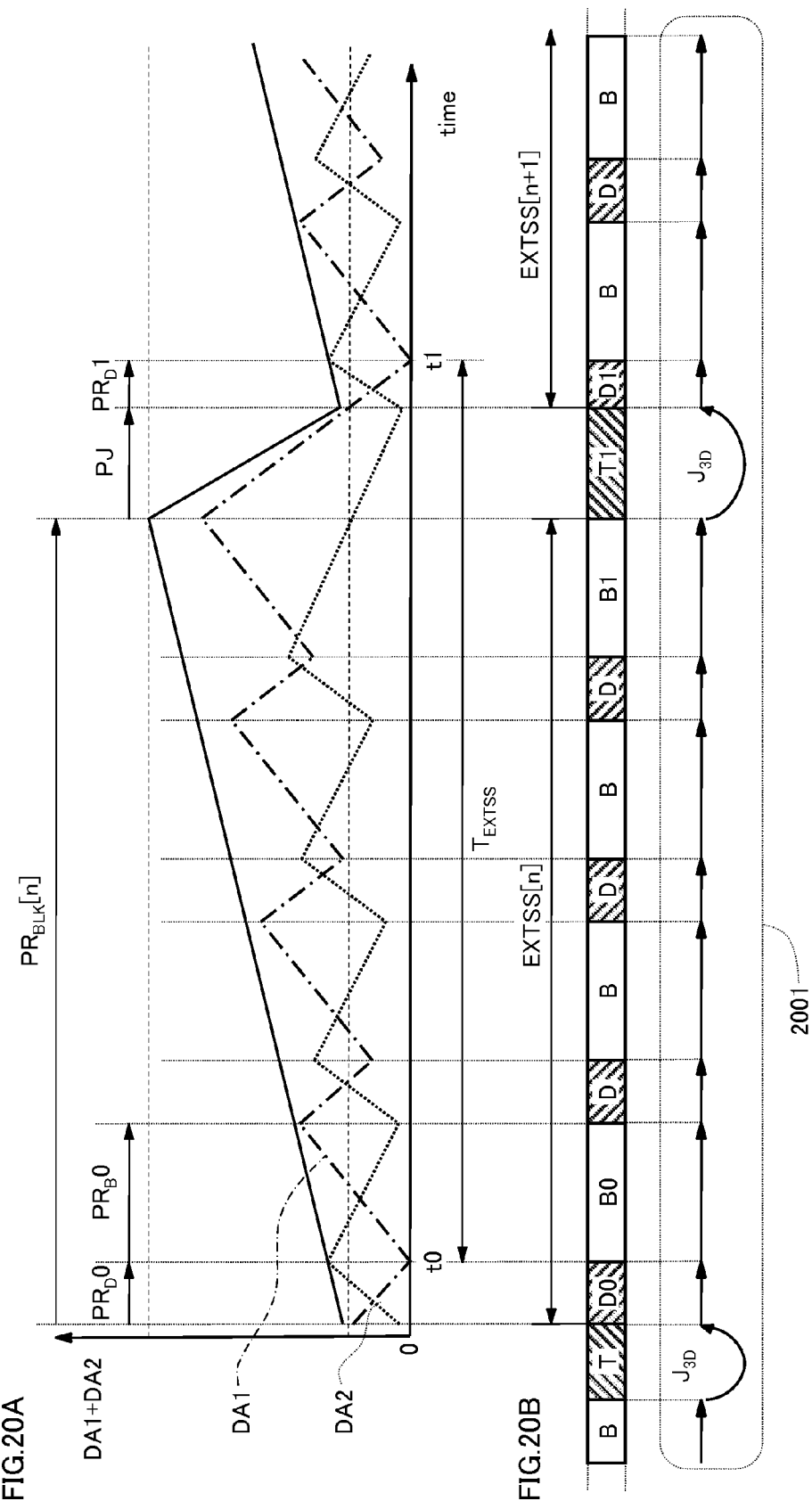
FIG. 20A is a graph showing changes in the data amounts DA1 and DA2 respectively stored in the RB1 1811 and RB2 1812 and changes in their sum DA1+DA2 when 3D video images are played back seamlessly and continuously from the $(n+1)^{th}$ extent block EXTSS[n] and the $(n+2)^{th}$ extent block EXTSS[n+1], where the letter n indicates an integer equal to or greater than one.
FIG. 20B is a schematic diagram showing the two extent blocks EXTSS[n] and EXTSS[n+1] and a correspondence between the extent blocks and a playback path 2001 in 3D playback mode.

FIG. 20B is a schematic diagram showing the $(n+1)^{th}$ extent block EXTSS[n] and the $(n+2)^{th}$ extent block EXTSS[n+1], where the letter n indicates an integer equal to or greater than one, and a correspondence between the extent blocks EXTSS[n], EXTSS[n+1] and a playback path 2001 in 3D playback mode. As shown in FIG. 20B, the two extent blocks EXTSS[n] and EXTSS[n+1] are separated by an extended extent T1. In accordance with the playback path 2001, first, the entirety of the $(n+1)^{th}$ extent block EXTSS[n] is read continuously as the $(n+1)^{th}$ extent of the file SS. Immediately following this, a jump $J_{3D}$ occurs. Subsequently, the entirety of the $(n+2)^{th}$ extent block EXTSS[n+1] is read continuously as the $(n+2)^{th}$ extent of the file SS.

FIG. 20A is a graph showing changes in data amounts DA1 and DA2, stored in the RB1 1811 and RB2 1812, respectively, and changes in their sum DA1+DA2, when 3D video images are played back seamlessly and continuously from the two extent blocks EXTSS[n] and EXTSS[n+1]. In FIG. 20A, the alternating long and short dashed line indicates changes in the data amount DA1 stored in the RB1 1811, the dashed line indicates changes in the data amount DA2 stored in the RB2 1812, and the solid line indicates changes in the sum DA1+

DA2 of the two data amounts. In this graph, the solid line is an approximation that averages small changes each occurring when an extent is read. Furthermore, the zero sector transition time $T_{JUMP0}$ is assumed to be zero milliseconds.

As shown in FIG. 20A, during the period $PR_{BLK}[n]$ while the entirety of the extent block EXTSS[n] is being continuously read from the BD-ROM disc 101 to the RB1 1811 and the RB2 1812, the data amounts DA1 and DA2 stored therein increase. Specifically, during the read period $PR_{BLK}[n]$ for the extent block EXTSS[n], the sum of the stored data amounts DA1+DA2 increases at a rate equal to $R_{UD3D}-R_{EXTSS}[n]$, the difference between the read rate $R_{UD3D}$ and the mean transfer rate $R_{EXTSS}[n]$. The mean transfer rate $R_{EXTSS}[n]$ is estimated at the size $S_{EXTSS}[n]$ of the entirety of the extent block EXTSS[n] divided by the extent ATC time $T_{EXTSS}$.

When the base-view extent B1 at the end of the $(n+1)^{th}$ extent block EXTSS[n] is read into the RB1 1811, the sum DA1+DA2 of the stored data amount reaches the maximum value. During the immediately subsequent jump period PJ, the sum DA1+DA2 of the stored data amount decreases at the mean transfer rate $R_{EXTSS}[n]$. Accordingly, by adjusting the maximum value of sum DA1+DA2 of the stored data amount to be sufficiently large, underflow of both the RB 1 1811 and the RB2 1812 can be prevented from occurring during the jump $J_{3D}$ over the recording area of the extended extent T1. As a result, the two extent blocks EXTSS[n] and EXTSS[n+1] can be seamlessly connected.

The maximum value of the sum DA1+DA2 of the stored data amount depends on the size of the $(n+1)^{th}$ extent block EXTSS[n]. Accordingly, the size of the $(n+1)^{th}$ extent block EXTSS[n] satisfies condition 4 described below for seamless connection between the two extent blocks EXTSS[n] and EXTSS[n+1].

Preloading is performed during the read period $PR_D0$ of the dependent-view extent D0 located at the top of the $(n+1)^{th}$ extent block EXTSS[n]. During the preload period $PR_D0$, data in the $n^{th}$ extent block continues to be transferred from the RB2 1812 to the system target decoder 1803 as during the immediately prior jump period. Data supply to the system target decoder 1803 is thus maintained. Similarly, preloading is performed during the read period $PR_D1$ of the dependent-view extent D2 located at the top of the $(n+2)^{th}$ extent block EXTSS[n+1]. Accordingly, during the preload period $PR_D1$, data in the $(n+1)^{th}$ extent block EXTSS[n] continues to be transferred from the RB2 1812 to the system target decoder 1803 as during the immediately prior jump period PJ. Data supply to the system target decoder 1803 is thus maintained. Therefore, in order to prevent underflow in the RB1 1811 and the RB2 1812 during the jump $J_{3D}$, the extent ATC time $T_{EXTSS}$ of the $(n+1)^{th}$ extent block EXTSS[n] needs to be at least equal to the length of the period from the end point t0 of the first preload period $PR_D0$ until the end point t1 of the next preload period $PR_D1$. In other words, the size $S_{EXTSS}[n]$ of the $(n+1)^{th}$ extent block EXTSS[n] needs to be at least equal to the sum of the amount of data transferred from the RB1 1811 and the RB2 1812 to the system target decoder 1803 during the period t0-t1.

As is clear from FIG. 20A, the length of the period t0-t1 is equal to the sum of the length of the read period $PR_{BLK}[n]$ of the $(n+1)^{th}$ extent block EXTSS[n], the length $T_{JUMP}[n]$ of the jump period PJ, and the difference $T_{DIFF}[n]$ between the lengths of the preload periods $PR_D0$ and $PR_D1$ between the two extent blocks EXTSS[n] and EXTSS[n+1]. Furthermore, the length of the read period $PR_{BLK}[n]$ of the $(n+1)^{th}$ extent block EXTSS[n] is equal to $S_{EXTSS}[n]/R_{UD3D}$, i.e. the size $S_{EXTSS}[n]$ of the extent block EXTSS[n] divided by the corresponding read rate $R_{UD3D}$. Accordingly, condition 4 indicates the following. The minimum extent size of the $(n+1)^{th}$ extent EXTSS[n] in the file SS is expressed in the right-hand side of expression (4):

$$S_{EXTSS}[n] \geq \left(\frac{S_{EXTSS}[n]}{R_{UD3D}} + T_{JUMP}[n] + T_{DIFF}[n]\right) \times R_{EXTSS}[n] \therefore \quad (4)$$

$$S_{EXTSS}[n] \geq \frac{R_{UD3D} \times R_{EXTSS}[n]}{R_{UD3D} - R_{EXTSS}[n]} \times (T_{JUMP}[n] + T_{DIFF}[n]).$$

The lengths of the preload periods $PR_D0$ and $PR_D1$ are respectively equal to $S_{EXT2}0/R_{UD3D}$ and $S_{EXT2}1/R_{UD3D}$, the sizes $S_{EXT2}0$ and $S_{EXT2}1$ of the dependent-view extents D0 and D1 divided by the read rate $R_{UD3D}$; the dependent-view extents D0 and D1 are located at the tops of the extent blocks EXTSS[n] and EXTSS[n+1], respectively. Accordingly, the difference $T_{DIFF}$ between the lengths of the preload periods $PR_D0$ and $PR_D1$ equals the difference between these values: $T_{DIFF}=S_{EXT2}1/R_{UD3D}-S_{EXT2}0/R_{UD3D}$. Like the right-hand sides of expressions (1)-(3), the right-hand side of expression (4) may be expressed as an integer value in units of bytes.

The difference $T_{DIFF}$ in expression (4) may be considered to be zero when decoding of multiplexed stream data is modified to include the following steps. The first step is seeking the maximum value of the difference $T_{DIFF}$ throughout the multiplexed stream data, i.e. the worst value of the difference $T_{DIFF}$. The second step is, when the multiplexed stream data is played back, delaying the start of decoding after the start of reading by a time equal to the worst value of the difference $T_{DIFF}$.

Let us suppose that, for instance, the mean transfer rate $R_{EXTSS}[n]$ is 192/188 times as high as 64 Mbps that is the upper limit of the bitrate of the extent block EXTSS[n]; the read rate $R_{UD3D}$ is 72 Mbps; the jump over the recording area of an extended extent has a maximum jump time of 200 ms; and the lengths of the preload periods has an ignorable difference $T_{DIFF}$. Then, the extent block EXTSS[n] has the minimum extent size of 16.9 MB according to expression (4). This size can be converted into an extent ATC time of approximately 2.17 seconds when the bitrate of the extent block EXTSS[n] is equal to its upper limit, 64 Mbps. As such, both the base-view and dependent-view extents included in the extent block EXTSS[n] only need to have a total of extent ATC times of 2.17 seconds or greater.

3: Maximum Extent Size

Above-described conditions 1-4 for seamless playback limit the minimum extent size of each extent of the file 2D, the file DEP, and the file SS. On the other hand, extents with larger sizes require the read buffers with larger capacities, as described below. Accordingly, possible reduction in capacity of the read buffers desires possible restriction on the upper limits of the sizes of extents. The upper limits are referred to as "maximum extent sizes."

The $(k+1)^{th}$ base-view extent EXT1[k] and the $(k+1)^{th}$ dependent-view extent EXT2[k] have a common extent ATC time (where the letter k represents an integer equal to or greater than zero). Accordingly, if the extent ATC time of the $(k+1)^{th}$ base-view extent EXT1 [k] is shortened by a restriction on the maximum extent size of the $(k+1)^{th}$ base-view extent EXT1[k], the maximum extent size of the $(k+1)^{th}$ dependent-view extent EXT2[k] is also restricted. Therefore, in order to maintain the lower limits of the capacities of RB1 1811 and RB2 1812 within acceptable ranges, the size of each base-view extent EXT1 [k] satisfies condition 5 described below.

The base-view extent B[k] is shared between the file 2D and the file SS. Accordingly, the size $S_{EXT1}$ [k] of the base-view extent B[k] should satisfy expression (1). Furthermore, reducing the size $S_{EXT1}$ [k] of the base-view extent B[k] as much as possible within the range that it satisfies expression (1) will be achieved as follows: the maximum extent size of the base-view extent B[k] is set as close as possible to the upper limit of the right-hand side of expression (1), i.e. the upper limit of the minimum extent size of the base-view extent B[k]. Accordingly, condition 5 indicates the following. The maximum extent size of the base-view extent B[k] is expressed in the right-hand side of expression (5):

$$S_{EXT1}[k] \le \text{CEIL}\left(\frac{R_{EXT1}[k]}{8} \times \frac{R_{UD2D}}{R_{UD2D} - R_{MAX2D}} \times T_{JUMP-2D\_MIN}\right). \quad (5)$$

The right-hand side of expression (5) differs from the right-hand side of expression (1) in the following ways. First, the mean transfer rate $R_{EXT2D}$ included in the denominator is replaced by the maximum value thereof, $R_{MAX2D}$. Accordingly, the second fraction in the right-hand side of expression (5) equals the maximum value of the same fraction in expression (1). Next, the jump time $T_{JUMP-2D\_MIN}$ in expression (5) is equal to the minimum value among the maximum jump times defined by the standards. For example, among the maximum jump times $T_{JUMP\_MAX}$ specified in the table in FIG. 17, the next largest value after the minimum value 50 ms, namely 200 ms, is adopted as the jump time $T_{JUMP-2D\_MIN}$ in expression (5). In this case, within each extent block, the interval between the extents EXT2D[k] and EXT2D[k+1] of the file 2D is restricted to being at most the corresponding maximum jump distance $S_{JUMP\_MAX}$=10000 sectors.

When adoption of expression (1A) instead of expression (1) adds the margin to a base-view extent, the size of the base-view extent satisfies the following expression (5A) instead of expression (5):

$$S_{EXT1}[n] \le \quad (5A)$$

$$\text{CEIL}\left\{\frac{R_{EXT2D}[n]}{8} \times \left(\frac{R_{UD2D}}{R_{UD2D} - R_{MAX2D}} \times T_{JUMP-2D\_MIN} + \Delta T\right)\right\}.$$

The maximum extent size expressed in the right-hand side of expression (5A) is larger than the minimum extent size expressed in the right-hand side of expression (5) by a data amount that is read from the read buffer to the system target decoder during an extension time $\Delta T$. This data amount is guaranteed as the margin.

For example, the BD-ROM standards specify that, when the bitrate of the extent block EXTSS[n] is its upper limit of 64 Mbps, the maximum extent size of each base-view extent is 3168 aligned units=3168×6144 bytes=approximately 18.6 MB (1 MB=1024×1024 bytes); on the other hand, the maximum extent size of each dependent-view extent is 7.7 MB.

4: Conditions in Extended Playback Mode

Figure 21:
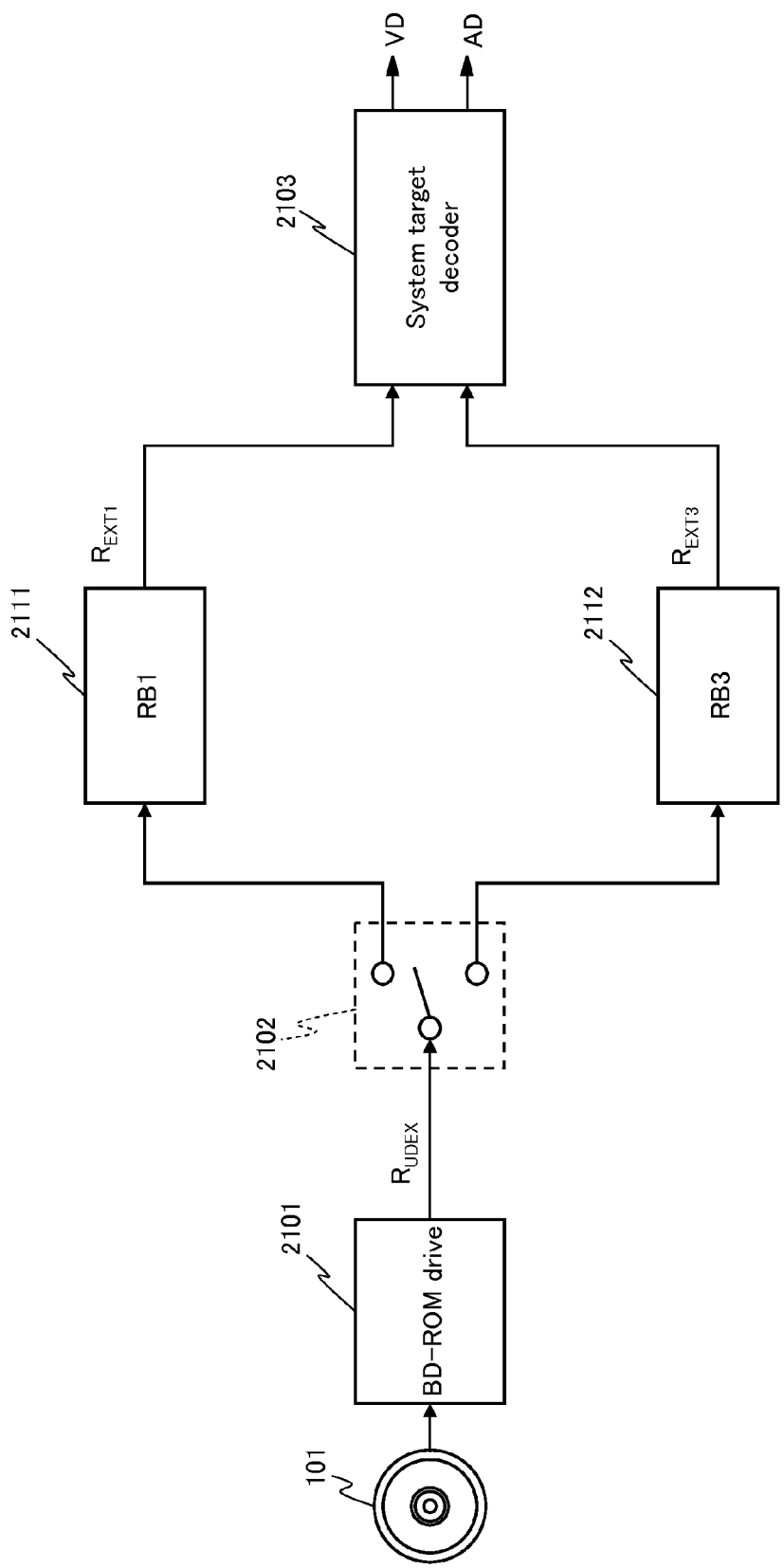
FIG. 21 is a block diagram showing a playback processing system built in the playback device 102 in extended playback mode.

FIG. 21 is a block diagram showing a playback processing system in the playback device 102 in extended playback mode. As shown in FIG. 21, this playback processing system includes a BD-ROM drive 2101, a switch 2102, a pair of read buffers 2111 and 2112, and a system target decoder 2103. The BD-ROM drive 2101 reads extended extents and base-view extents from the BD-ROM disc 101 and transfers the extents to the switch 2102 at a read rate $R_{UDEX}$. The switch 2102 separates extended extents from base-view extents. A first read buffer 2111 and a third read buffer 2113 (hereinafter abbreviated as RB1 and RB3) are buffer memories internal to the playback device 102 and store extents separated by the switch 2102. The RB1 2111 stores base-view extents, and the RB3 2112 stores extended extents. The system target decoder 2103 reads source packets from the base-view extents in the RB1 2111 at a first transfer rate $R_{EXT1}$ and reads source packets from the extended extents in the RB3 2112 at a third transfer rate $R_{EXT3}$. The system target decoder 2103 also decodes pairs of read base-view extents and extended extents into video data VD and audio data AD.

The first transfer rate $R_{EXT1}$ is equal to the first transfer rate in 3D playback mode. The third transfer rate $R_{EXT3}$ equals 192/188 times as high as the mean processing rate at which the system target decoder 2103 extracts TS packets from source packets stored in the RB3 2112. The maximum value $R_{MAX3}$ of the third transfer rate $R_{EXT3}$ equals 192/188 times the system rate $R_{TS3}$ of the extended stream file: $R_{MAX3}=R_{TS3}\times192/188$. The system rate $R_{TS3}$ is normally expressed in bits/second (bps) and equals eight times the recording rate of the extended stream expressed in bytes/second (Bps). The transfer rates $R_{EXT1}$ and $R_{EXT3}$ are typically represented in bits/second and specifically equal the size of each extent, which is expressed in bits, divided by the extent ATC time thereof.

The read rate $R_{UDEX}$ is typically expressed in bits/second and is set at a higher value, e.g., 72 Mbps, than either of the maximum values $R_{MAX1}$, $R_{MAX3}$ of the transfer rates $R_{EXT1}$, $R_{EXT3}$: $R_{UDEX}>R_{MAX1}$, $R_{UDEX}>R_{MAX2}$. This prevents decoding of the system target decoder 2103 from causing underflow of the RB1 2111 and the RB3 2112 while the BD-ROM drive 2101 is reading an extent of the file 2D or reading an extent of the extended stream file from the BD-ROM disc 101.

[Extent ATC Time of Extended Extents]

FIGS. 22A and 22B are graphs showing changes in data amounts DA1 and DA3 stored in the RB1 2111 and RB3 2112, respectively, when 4K2K 2D video images are played back seamlessly from two extent groups 2210 and 2211. FIG. 22C is a schematic diagram showing a correspondence between the extent groups 2210 and 2211 and a playback path 2220 in extended playback mode. Referring to FIG. 22c, the playback path 2220 specifies that an extended extent T is first read from each of the extent groups 2210 and 2211, and then a jump $J_{SJ}$ over the recording area of a dependent-view extent D and reading of a base-view extent B are repeated multiple times.

Reading and transfer operations by the BD-ROM drive 2101 are not actually performed in a continuous manner, as suggested by the graphs in FIGS. 22A and 22B, but rather in an intermittent manner. This prevents overflow in the RB1 2111 and RB3 2112 during the read periods of the extents T and B. Accordingly, the graphs in FIGS. 22A and 22B represent actual step-wise changes as approximated linear changes. Furthermore, the zero sector transition time $T_{JUMP0}$ is assumed to be 0 ms.

As shown by FIGS. 22A and 22B, during the read period $PR_T0$ for the first extended extent T0, the data amount DA3 stored in the RB3 2112 increases at a rate equal to $R_{UDEX}-R_{EXT3}$, the difference between the read rate $R_{UDEX}$ and the third transfer rate $R_{EXT3}$, whereas the data amount DA1 stored in the RB1 2111 decreases at the first transfer rate $R_{EXT1}$. As shown in FIG. 22C, a jump $J_{SJ}$ occurs at the end of the read period $PR_T0$ for the first extended extent T0, and the first dependent-view extent D is skipped. As shown in FIGS. 22A and 22B, during the jump period PSJ, the data amount DA1 stored in the RB1 2111 continues to decrease at the first transfer rate $R_{EXT1}$, whereas the data amount DA2 stored in the RB3 2112 decreases at the third transfer rate $R_{EXT3}$. Thereafter, during the read period $PR_B$ for the first base-view extent B, the data amount DA1 stored in the RB1 2111 increases at a rate equal to $R_{UDEX}-R_{EXT1}$, the difference between the read rate $R_{UDEX}$ and the first transfer rate $R_{EXT1}$. Subsequently, the data amount DA1 stored in the RB1 2311 decreases during the jump $J_{SJ}$ over the recording area of the dependent-view extent D and increases during the read period for the base-view extent B. Overall, however, the data amount DA1 stored in the RB1 2111 increases until the end of the extent group 2210 is read. On the other hand, the data amount DA3 stored in the RB3 2112 continues to decrease at the third transfer rate $R_{EXT3}$.

Once the entirety of the extent group 2210 has been read, the second extended extent T1 begins being read. During the read period $PR_T1$, the data amount DA3 stored in the RB3 2112 increases at a rate equal to $R_{UDEX}-R_{EXT3}$, the difference between the read rate $R_{UDEX}$ and the third transfer rate $R_{EXT3}$, whereas the data amount DA1 stored in the RB1 2111 decreases at the first transfer rate $R_{EXT1}$. Furthermore, a jump $J_{SJ}$ occurs at the end of the read period $PR_T1$ for the second extended extent T1, and reading of the dependent-view extent D is skipped. During the jump period PSJ, the data amount DA1 stored in the RB1 2112 continues to decrease at the first transfer rate $R_{EXT1}$, whereas the data amount DA2 stored in the RB3 2112 decreases at the third transfer rate $R_{EXT3}$.

For seamless playback of 4K2K 2D video images from the extent groups 2210 and 2211 shown in FIG. 22C, the size of the extended extent T satisfies condition 6 described below.

The first extended extent T0 is transferred from the RB3 2112 to the system target decoder 2103 during the period from a first read start time tA until a second read start time tB; at the first read start time tA, the base-view extent B located immediately after the first extended extent T0 starts to be read, and at the second read start time tB, the base-view extent B located immediately after the next extended extent T1 starts to be read. As shown in FIG. 22B, the data amount DA3 stored in the RB3 2112 does not fall below the level at which it was kept immediately before the read period $PR_T0$ of the first extended extent T0. Here, the read period $PR_B$ of one base-view extent B has a length equal to the value $S_B/R_{UDEX}$, i.e., the size $S_B$ of the base-view extent B divided by the read rate $R_{UDEX}$. On the other hand, the read period $PR_T1$ of the second extended extent T1 has a length equal to the value $S_T/R_{UDEX}$, i.e., the size $S_T$ of the extended extent T1 divided by the read rate $R_{UDEX}$. Accordingly, condition 6 indicates that the extent ATC time ATC(T0) of the first extended extent T0 satisfies the following expression (6):

$$ATC(T0) \geq \sum T_{JUMP} + \sum \frac{S_B}{R_{UDEX}} + \frac{S_T}{R_{UDEX}}. \quad (6)$$

Here, the first summation symbol represents the sum of the jump times $T_{jump}$ included in the period from the first read start point tA until the second read start point tB, and the second summation symbol represents the sum of the lengths $S_B/R_{UDEX}$ of the read periods of the base-view extents included in the same period.

Let us suppose that, for instance, the read rate $R_{UDEX}$ is 72 Mbps; the extent block arranged immediately after the first extended extent T0 includes two base-view extents; the upper limit of the jump time $T_{jump}$ or the maximum jump time is 200 ms; and the size $S_B$ of base-view extents equals the maximum extent size=3168×6144 bytes=approximately 18.6 MB. Then, expression (6) shows that the extent ATC time ATC(T0) of the extended extent T0 is approximately 4.72 seconds or longer. In this case, the size $S_T$ of the second extended extent T1 is ignored since it is sufficiently smaller than the sum of the sizes $S_B$ of the base-view extents.

The extent ATC time ATC(T0) of the extended extent T0 equals the sum of the extent ATC times ATC(B) of the base-view extents B included in the extent block located immediately after the extended extent T0: ATC(T0)=ΣATC(B). When the size $S_B$ of a base-view extent B equals the maximum extent size=approximately 18.6 MB, the extent ATC time ATC(B) of the base-view extent B reaches its upper limit of approximately 3.18 seconds. Accordingly, when the extent block arranged immediately after the first extended extent T0 includes two base-view extents, the upper limit of the extent ATC time of the extended extent T0 equals approximately 6.36 seconds. Practically, it is necessary to adjust the size of the extended extent T0 to an integer multiple of that of an ECC block. As such, the acceptable upper limit of the extent ATC time of the extended extent T0 is determined as approximately 6.5 seconds. The size $S_T$ of the extended extent T0 equals the product of the extent ATC time ATC(T0) and 192/188 times the bitrate of the extended stream. When the bitrate of the extended stream is 10 Mbps or 20 Mbps, the upper limit of the size $S_T$ of the extended extent T0 is 7.9 MB or 15.8 MB, respectively.

[Number of Extent Pairs Arranged Between Two Extended Extents]

As shown in FIGS. 21A and 21B, the playback device 102 in 3D playback mode, by reading the extent block EXTSS[n] arranged immediately after the first extended extent T, stores a data amount into the RB1 and RB2; the data amount is to be transmitted to the system target decoder during the jump over the recording area of the next extended extent T1. In this case, the extent block EXTSS[n] needs to have an extent ATC time of at least approximately 2.17 seconds according to condition 4. Meanwhile, the maximum extent size of a dependent-view extent is 7.7 MB. Accordingly, the extent block EXTSS[n] with only one dependent-view extent may fail to have the extent ATC time of 2.17 seconds even if the size of the dependent-view extent is extended to the maximum extent size. As such, as shown in FIG. 13, at least two extent pairs D[k], B[k] are arranged between two extended extents T[m] and T[m+1]. This enables the entirety of the extent block EXTSS[n] to be designed to have the total extent ATC time of the dependent-view extents of 2.17 seconds or longer.

Figure 23A:
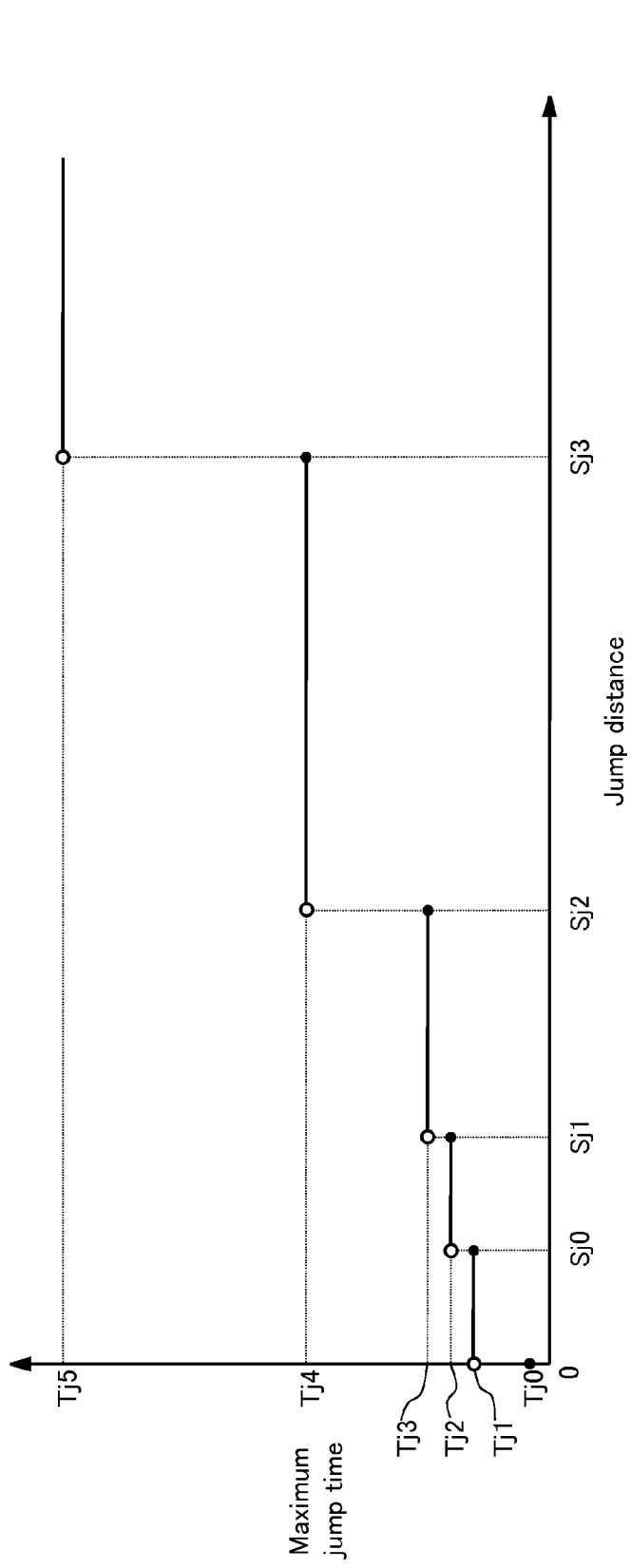
FIG. 23A is a graph showing a correspondence between the jump distances and maximum jump times shown in the table of FIG. 17.
Figure 23B:
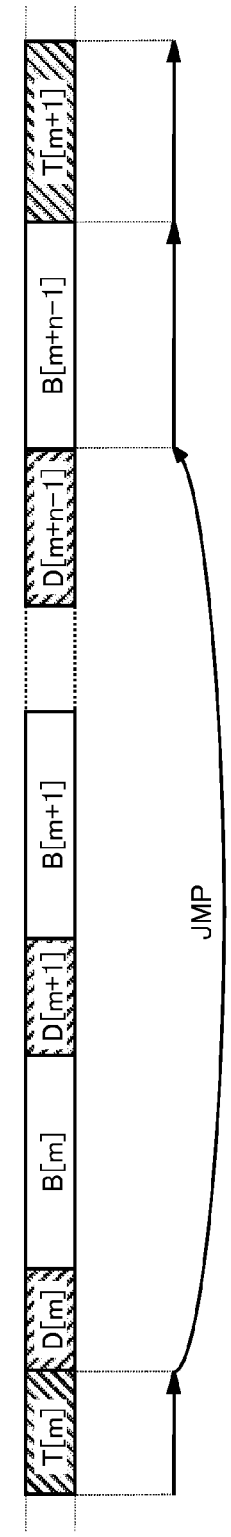
FIG. 23B is a schematic diagram showing a playback path in extended playback mode when the start position of interrupt playback is included in the last base-view extent B[m+n−1] of a single extent block.

On the other hand, the upper limit n of the number of the extent pairs D[k], B[k] arranged between the two extended extents T[m] and T[m+1] is determined as follows. FIG. 23A is a graph showing a correspondence between the jump distances and maximum jump times shown in the table of FIG. 17. FIG. 23B is a schematic diagram showing a playback path in extended playback mode when the start position of an interrupt playback is included in the last base-view extent B[m+n−1] of a single extent block. As shown in FIG. 23B, the playback device 102, when starting the interrupt playback, first reads the extended extent T[m] assigned to the base-view extent B[m+n−1]. The playback device 102 then performs a jump JMP and reads the base-view extent B[m+n−1]. The larger the number n, the longer the jump distance of the jump JMP. As can be seen from the graph shown in FIG. 23A, the maximum jump time of the jump JMP increases in a stepwise manner each time the jump distance reaches one of predetermined threshold values Sj0, Sj1, . . . . A longer jump time of the jump JMP results in a longer wait time from when the interrupt playback is requested until when it actually starts. Accordingly, a quicker start of the interrupt playback needs an upper limit to be set for the jump distance of the jump JMP.

As further shown in FIG. 23A, an increment of the maximum jump time, Tj(n+1)−Tjn (n=0, 1, 2, . . . ), increases exponentially with increase in the jump distance. Specifically, when the jump distance equals the second threshold value Sj1=20000, the increment of the maximum jump time, Tj3−Tj2, equals 50 ms. Compared to that, when the jump distance equals the fourth threshold value Sj3=1/10 of a stroke=640000 sectors, the increment of the maximum jump time, Tj5−Tj4, equals 700 ms. The upper limit of the jump distance of the jump JMP is set at one of the threshold values. Accordingly, the upper limit n of the number of the extent pairs D[k], B[k] arranged between the two extended extents T[m] and T[m+1] equals that of the extent pairs that can be arranged in the same number of sectors as the one of the threshold values.

For example, when each of the extents D[k] and B[k] has an extent ATC time of 3 seconds, and the bitrate of the file SS equals its upper limit of 64 Mbps, the total size of the extent pair D[k], B[k] is approximately 11720 sectors. When an extent block includes 55 or more extent pairs each having the total size, the size of the extent block exceeds the fourth threshold value Sj3=640000 sectors. As a result, the jump time required to skip the extent block reaches up to the fifth maximum jump time Tj5=1400 ms. In contrast, when an extent block includes 54 or less extent pairs each having the total size, the size of the extent block is the fourth threshold value Sj3=640000 sectors or less. In this case, the above-described jump time only needs to be up to the fourth maximum jump time Tj4=700 ms. As such, the limited number, 54 or less, of extent pairs per extent block reduces the jump time by up to a half of the jump time for an arrangement of 55 or more extent pairs per extent block. This can reduce the wait time at interrupt playback.

[Minimum Extent Size of Extended Extent]

The BD-ROM standards specify that, when one AV stream file is divided into a plurality of extents, each of the extents is required to have a size of 500 KB or greater, regardless of the above-described conditions 1-4. This allows, even when other data is arranged between two extents, a read buffer reading the first one of the extents to store a data amount enough to transmit to a decoder during the jump over the recording area of the other data. That is, underflow does not occur in the read buffer during the jump period. Accordingly, the two extents can be decoded seamlessly regardless of the other data existing therebetween.

As long as complying with the rule "the data size per extent is restricted to 500 KB or greater," the size of any extended extent needs to not only satisfy condition 6, but also be 500 KB or greater. However, a generally low bitrate of an extended stream may prevent the size of extended extents from satisfying the rule. For example, when the bitrate of an extended stream is 1 Mbps and an extent ATC time per extended extent is 3.18 seconds, the size per extended extent is 379 KB, which is smaller than 500 KB. In this case, adding padding bits to each extended extent is not desirable because of wasting the volume area 202B of the BD-ROM disc 101.

As shown in FIG. 12, the playback path 1203 in extended playback mode shows that each extended extent, except for one located at a reading start position, is read continuously with a base-view extent immediately before the extended extent. Actually, a zero sector transition $J_0$ is performed between the read periods of the base-view extent and the extended extent; its time length is 50 ms, and thus, sufficiently short. As long as each extended extent satisfies condition 6, underflow does not occur in the RB 3 during any jump included in the playback path 1203. Accordingly, only a total size of adjacent base-view and extended extents needs to satisfy the above-mentioned rule.

Figure 24:
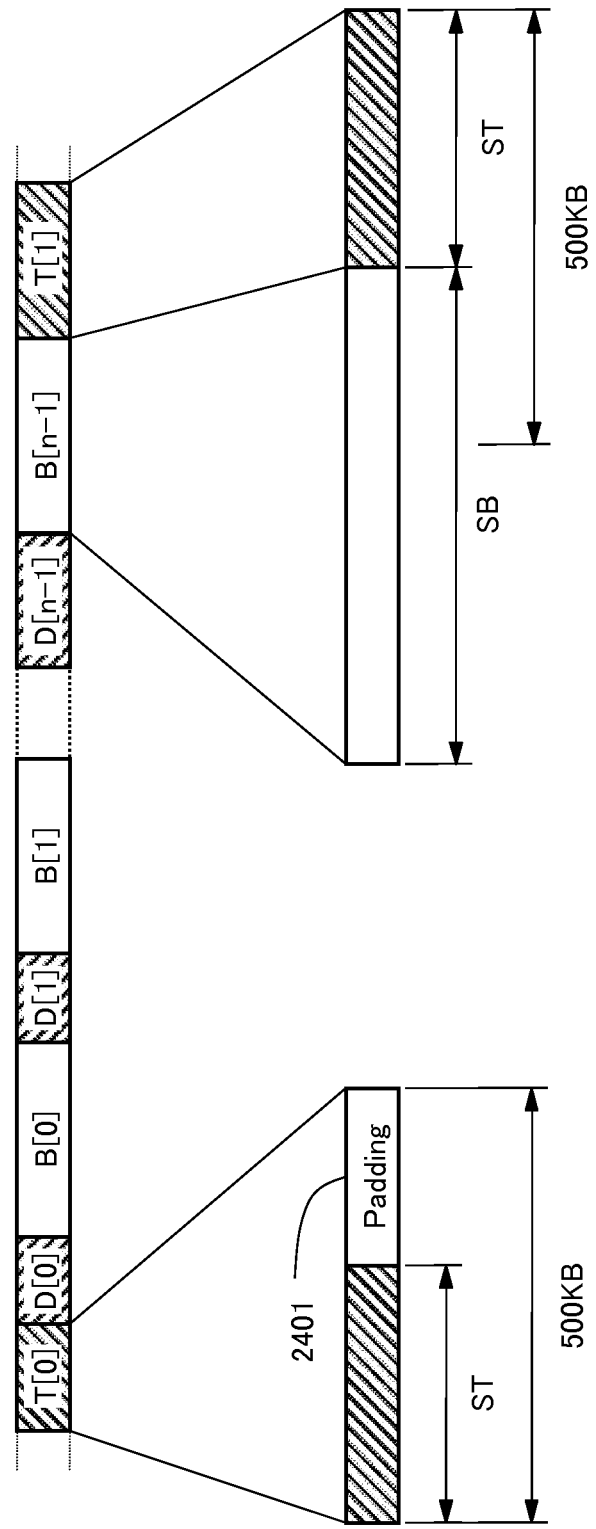
FIG. 24 is a schematic diagram showing a method for allowing an extended extent to have a size limited to 500 KB or greater.

FIG. 24 is a schematic diagram showing a method of allowing an extended extent to satisfy the rule that a size per extent is 500 KB or greater. The playback device 102 in extended playback mode reads an extended extent T[0] from a reading start position without any other extents. Accordingly, when the size $S_T$ of the extended extent T[0] is smaller than 500 KB as shown in FIG. 24, padding bits 2401 are appended to the extended extent T[0]. On the other hand, the next extended extent T[1] is read continuously with the immediately preceding base-view extent B[n−1]. As such, only the total of the size $S_T$ of the extended extent T[1] and the size $S_B$ of the base-view extent B[n−1] needs to be 500 KB or greater: $S_T + S_B \geq 500$ KB, as shown in FIG. 24. Furthermore, the size $S_B$ of the base-view extent B[n−1] is 500 KB or greater: $S_B \geq 500$ KB. Accordingly, the size $S_T$ of the extended extent T[1] may always be smaller than 500 KB. Due to this, padding bits need not be appended to extended extents other than the extended extent T[0] located at the reading start position. This enables a larger area of the BD-ROM disc 101 to be available for recording base-view and dependent-view extents, and thus the volume area 202B of the BD-ROM disc 101 can be used more efficiently.

[Lower Limit of Read Buffer Capacity]

Figure 25:
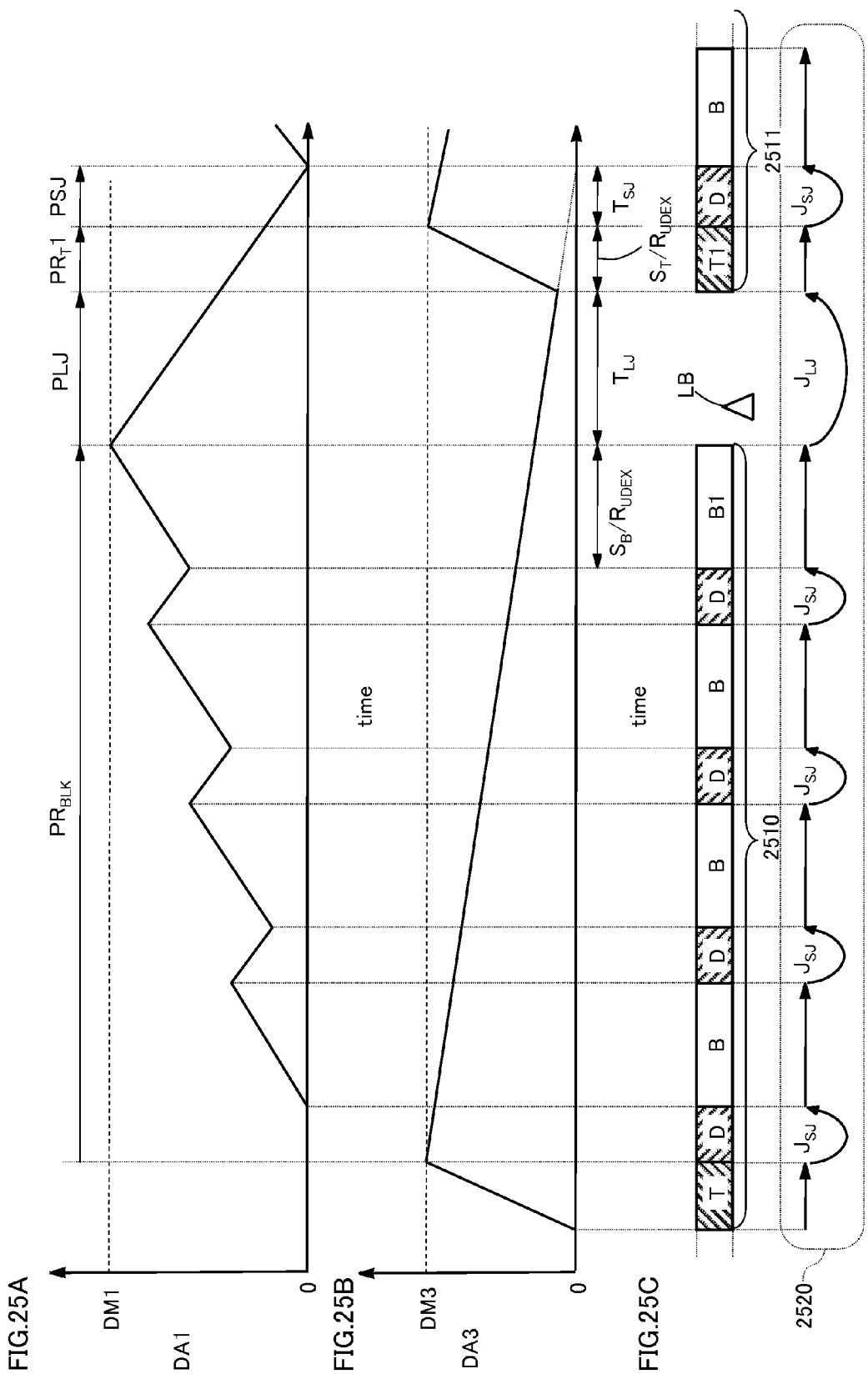
FIGS. 25A and 25B are graphs showing changes in data amounts DA1 and DA3 stored in the RB1 2111 and RB3 2112, respectively, when 4K2K 2D video images are played back seamlessly from two extent groups 2510 and 2511 separated at a layer boundary LB.
FIG. 25C is a schematic diagram showing a correspondence between the two extent groups 2510 and 2511 and a playback path 2520 in extended playback mode.

FIGS. 25A and 25B are graphs showing changes in data amounts DA1 and DA3 stored in the RB1 2111 and RB3 2112, respectively, when 4K2K 2D video images are played back seamlessly from two extents groups 2510 and 2511 separated by the layer boundary LB. FIG. 25C is a schematic diagram showing a correspondence between the extent groups 2510 and 2511 and a playback path 2520 in extended playback mode. As shown in FIG. 25C, the playback path 2520 shows that, from each of the extent groups 2510 and 2511, an extended extent T is first read, and then a jump over the recording area of a dependent-view extent D and reading of a base-view extent B are repeated multiple times.

As shown in FIGS. 25A and 25C, the data amount DA1 stored in the RB1 2111 decreases at the first transfer rate $R_{EXT1}$ from a value DM1 during a long jump period PLJ for a long jump over the layer boundary LB, and an immediately subsequent preload period $PR_T1$ and jump period PSJ; the data amount DA1 is kept at the value DM1 immediately after the base-view extent B1 located immediately before the layer boundary LB is read into the RB1 2111. In order to prevent the data amount DA1 stored in the RB1 2111 from reaching zero before the elapse of the three periods PLJ, $PR_T1$, PSJ, the value DM1 is equal to or greater than a data amount, which is transferred from the RB1 2111 to the system target decoder 2103 during the three periods PLJ, $PR_T1$, PSJ, and which equals the sum of the lengths $T_{LJ}$, $S_T/R_{UDEX}$, $T_{SJ}$ of the three periods multiplied by the first transfer rate $R_{EXT1}$: $DM1 \geq (T_{LJ} + S_T/R_{UDEX} + T_{SJ}) \times R_{EXT1}$. Since the first transfer rate $R_{EXT1}$ may reach its maximum value $R_{MAX1} = R_{TS1} \times 192/188$, the lower limit of the capacity RB1 of the RB1 2111 is expressed in the right-hand side of expression (7).

$$RB1 \geq \left(T_{LJ} + \frac{S_T}{R_{UDEX}} + T_{SJ}\right) \times R_{MAX1} = \left(T_{LJ} + \frac{S_T}{R_{UDEX}} + T_{SJ}\right) \times R_{TS1} \times \frac{192}{188} \quad (7)$$

As shown in FIGS. 25B and 25C, during a read period $PR_{BLK}$ for the extent block located immediately before the layer boundary LB and the long jump period PLJ, the data amount DA3 stored in the RB3 2112 decreases at the third transfer rate $R_{EXT3}$ from a value DM3, at which the data amount DA3 is kept immediately after the extended extent T0 located immediately before the extent block is read into the RB3 2112. Furthermore, during the preload period $PR_T1$ for the extended extent T1 immediately after the long jump $J_{LJ}$ and the immediately subsequent jump period PSJ, the extended extent T1 is not transferred to the system target decoder 2103. In order to continue the data supply from the RB3 2112 to the system target decoder 2103 until the elapse of the four periods $PR_{BLK}$, PLJ, $PR_T1$, PSJ, the value DM3 is equal to or greater than a data amount transferred from the RB3 2112 to the system target decoder 2103 during the four periods $PR_{BLK}$, PLJ, $PR_T1$, PSJ. When the extent block located immediately before the layer boundary LB includes n extent pairs D, B, the above-mentioned value DM 3, along with the length $S_B/R_{UDEX}$ of the read period for each base-view extent B, the jump time $T_{SJ}$ of a jump over the recording area of each dependent-view extent D, the jump time $T_{LJ}$ of a long jump, the length $S_T/R_{UDEX}$ of the read period for an extended extent, and the third transfer rate $R_{EXT3}$, satisfies: $DM3 \geq [(T_{SJ}+S_B/R_{UDEX}) \times n + T_{LJ} + S_T/R_{UDEX} + T_{SJ}] \times R_{EXT3}$. Here, the third transfer rate $R_{EXT3}$ may reach its maximum value $R_{MAX3}=R_{TS3} \times 192/188$. In addition, since preloading is performed when playback is started, the capacity RB3 of the RB3 2112 is equal to or greater than the maximum extent size max $S_T$ of the extended extent T. As such, the lower limit of the capacity of the RB3 2112 is expressed in the right-hand side of expression (8).

$$RB3 \geq \max \left\{ \left( \left( T_{SJ} + \frac{S_B}{R_{UDEX}} \right) \times n + T_{LJ} + \frac{S_T}{R_{UDEX}} + T_{SJ} \right) \times R_{TS3} \times \frac{192}{188}, \max S_T \right\} \quad (8)$$

Figure 26:
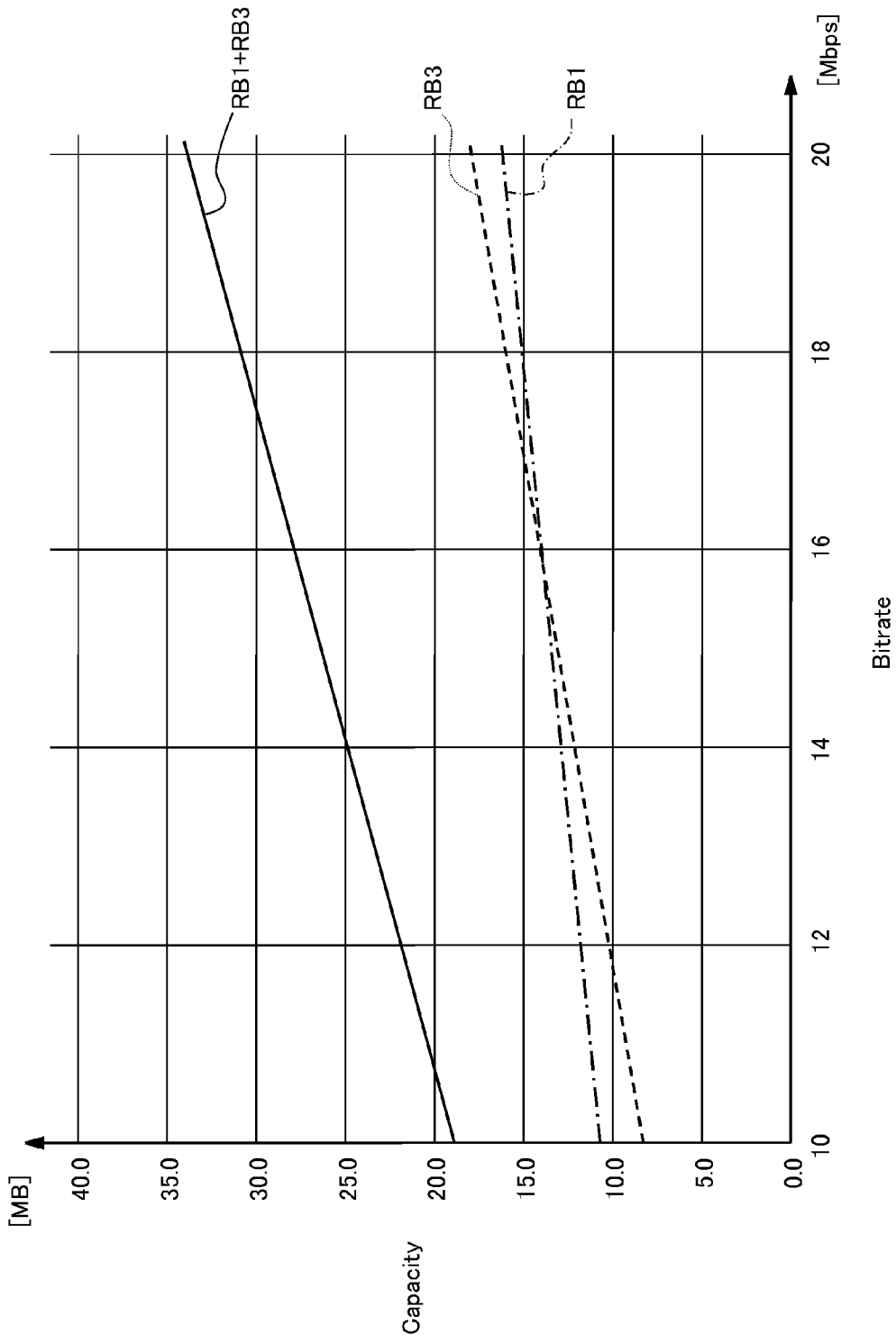
FIG. 26 shows graphs indicating a correspondence between lower limits of capacities of the RB1 and RB3 and bitrates of an extended stream.

FIG. 26 shows graphs indicating a correspondence between the lower limits of capacities of the RB1 and RB3 and the bitrate of an extended stream. We obtained these graphs by substituting the following values into expressions (7) and (8): $T_{LJ}=700$ ms; $T_{SJ}=200$ ms; $R_{UDEX}=72$ Mbps; $R_{TS3}=48$ Mbps; $S_B=3168 \times 6144$ bytes; n=2; $S_T=6.5$ seconds$\times R_{TS3} \times 192/188$. Referring to FIG. 26, the graphs drawn by the dashed-dotted, dashed, and solid lines indicate the lower limit of the capacity of the RB1, that of the RB3, and the sum of them, respectively. As shown by the graphs in FIG. 26, the lower the bitrate of the extended stream, the smaller the lower limits of the capacities. In particular, when the bitrate of the extended stream is lower than approximately 16 Mbps, the lower limit of the capacity of the RB3 is smaller than that of the RB 1. Specifically, when the bitrate of the extended stream is 10 Mbps, the RB1 has a capacity of 10.7 MB or greater, and the RB3 has a capacity of 8.0 MB or greater. Accordingly, the sum of the capacities of the RB1 and RB3 is 18.7 MB or greater: RB1≥10.7 MB; RB3≥8.0 MB; RB1+RB3≥18.7 MB. When the bitrate of the extended stream is 15 Mbps or 20 Mbps, the sum is 26.1 MB or greater, or 34.2 MB or greater, respectively.

<<Clip Information File>>

FIG. 27 is a schematic diagram showing the data structure of a 2D clip information file 231. As shown in FIG. 27, the 2D clip information file 231 includes clip information 2710, stream attribute information 2720, an entry map 2727, and 3D meta data 2740. The 3D meta data 2740 includes extent start points 2742. The DEP clip information file and the extended clip information file 233 also have the same data structure.

As shown in FIG. 27, the clip information 2710 includes a system rate 2711, a playback start time 2712, and a playback end time 2713. The system rate 2711 specifies a system rate $R_{TS}$ for the file 2D 221. In this context, as shown in FIG. 15, the playback device 102 in 2D playback mode transfers "TS packets" belonging to the file 2D 221 from the read buffer 1502 to the system target decoder 1503. Accordingly, the interval between the ATSs of the source packets in the file 2D 221 is set so that the transfer rate of the TS packets is limited to the system rate $R_{TS}$ or lower. The playback start time 2712 indicates the PTS allocated to the VAU located at the top of the file 2D 221, e.g. the PTS of the top video frame. The playback end time 2713 indicates the value of the STC delayed a predetermined time from the PTS allocated to the VAU located at the end of the file 2D 221, e.g. the sum of the PTS of the last video frame and the playback time of one frame.

As shown in FIG. 27, the stream attribute information 2720 is a correspondence table between PIDs 2721 of elementary streams included in the file 2D 221 and attribute information 2722. Attribute information 2722 is different among a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, a number of channels included in the audio stream, language, and sampling frequency. The playback device 102 uses this attribute information 2722 to initialize the decoder.

[Entry Map]

FIG. 28A is a schematic diagram showing the data structure of an entry map 2730. As shown in FIG. 28A, the entry map 2730 includes tables 2800. There is the same number of tables 2800 as there are video streams multiplexed in the main TS, and tables are assigned one-by-one to each video stream. In FIG. 28A, each table 2800 is distinguished by the PID of the video stream to which it is assigned. Each table 2800 includes an entry map header 2801 and an entry point 2802. The entry map header 2801 includes the PID corresponding to the table 2800 and the total number of entry points 2802 included in the table 2800. An entry point 2802 associates each pair of a PTS 2803 and source packet number (SPN) 2804 with one of individually differing entry point IDs (EP_ID) 2805. The PTS 2803 is equivalent to the PTS for one of the I pictures included in the video stream for the PID indicated by the entry map header 2801. The SPN 2804 is equivalent to the first SPN of the source packets containing the corresponding I picture. An "SPN" refers to the serial number assigned to source packets belonging to a single AV stream file, beginning from their top. The SPN is used as the address for each source packet in the AV stream file. In the entry map 2730 in the 2D clip information file 231, the SPN refers to the number assigned to the source packets belonging to the file 2D 221, i.e. the source packets containing the main TS. Accordingly, the entry point 2802 expresses a correspondence between the PTSs and addresses, i.e. SPNs, of I pictures included in the file 2D 221.

An entry point 2802 does not need to be set for all of the I pictures in the file 2D 221. However, when an I picture is located at the top of a GOP, and the TS packet that includes the top of that I picture is located at the top of an extent, an entry point 2802 has to be set for that I picture.

FIG. 28B is a schematic diagram showing source packets that are included in a source packet group 2810 belonging to a file 2D 221, and are associated with EP_IDs 2805 by the entry map 2730. FIG. 28C is a schematic diagram showing extents D[n], B[n] (n=0, 1, 2, 3, . . . ) on a BD-ROM disc 101 corresponding to the source packet group 2810. When the playback device 102 plays back 2D video images from the file 2D 221, it refers to the entry map 2730 to specify the SPN for the source packet that includes a frame representing an arbitrary scene from the PTS for that frame. Specifically, when for example a PTS=360000 is indicated as the PTS for a specific entry point for the playback start position, the playback device 102 first retrieves the SPN=3200 allocated to this PTS in the entry map 2730. Next, the playback device 102 seeks the quotient SPN×192/2048, i.e. the value of the SPN multiplied by 192 bytes, the data amount per source packet, and then divided by 2048 bytes, the data amount per sector. As can be understood from FIGS. 6B and 6C, this quotient is the same as the total number of sectors recorded in the main TS prior to the source packet to which the SPN is assigned. In the example shown in FIG. 28B, this quotient is 3200×192/2048=300, and is equal to the total number of sectors on which are recorded source packets 2811 to which SPNs 0 through 3199 are allocated. Next, the playback device 102 refers to the file entry in the file 2D 221 and specifies the LBN of the (total number+1)$^{th}$ sector, counting from the top of the sectors in which extents of the file 2D 221 are recorded. In the example shown in FIG. 28C, the LBN of a sector is specified; the sector is located at the 301$^{st}$ counting from the top of the sectors in which the base-view extents B[0], B[1], B[2], . . . accessible as extents EXT2D[0], EXT2D[1], EXT2D[2], . . . are recorded. The playback device 102 indicates the LBN to the BD-ROM drive. In this way, base-view extents are read in aligned units, beginning from the sector at the LBN. Furthermore, from the aligned unit that is first read, the playback device 102 selects the source packet indicated by the entry point for the playback start position, and then extracts and decodes an I picture from the source packet. From then on, subsequent pictures are decoded in order referring to already decoded pictures. In this way, the playback device 102 can play back 2D video images from the file 2D 221 from a specified PTS onwards.

Furthermore, the entry map 2730 is useful for efficiently performing trickplay such as fast forward, reverse, etc. For example, the playback device 102 in 2D playback mode first refers to the entry map 2730 to read SPNs starting at the playback start position, e.g. to read SPN=3200, 4800, . . . in order from the entry points EP_ID=2, 3, . . . that include PTSs starting at PTS=360000. Next, the playback device 102 refers to the file entry in the file 2D 221 to specify the LBN of the sectors corresponding to each SPN. The playback device 102 then indicates each LBN to the BD-ROM drive. Aligned units are thus read from the sector for each LBN. Furthermore, from each aligned unit, the playback device 102 selects the source packet indicated by each entry point and then extracts and decodes an I picture. The playback device 102 can thus selectively play back I pictures from the file 2D 221 without analyzing the extents EXT2D[n] themselves.

[Extent Start Points]

FIG. 29A is a schematic diagram showing the data structure of extent start points 2742. As shown in FIG. 29A, the "extent start points" 2742 include base-view extent IDs (EXT1_ID) 2911 and SPNs 2912. The EXT1_IDs 2911 are serial numbers assigned consecutively from the top to the base-view extents belonging to the file SS 223. One SPN 2912 is assigned to each EXT1 ID 2911 and is the same as the SPN of the source packet located at the top of the base-view extent identified by the EXT1_ID 2911. This SPN is a serial number assigned to source packets in order from the top; the source packets are included in the base-view extents belonging to the file SS 223.

As shown in FIG. 11, the base-view extents B[0], B[1], B[2], . . . included in the extent blocks are shared between the file 2D 221 and the file SS 223. However, extents arranged at a location where a long jump is required, such as the boundary between recording layers, generally include a base-view extent belonging to only one of the file 2D 221, the file SS 223, and the extended stream file 224 (for details, refer to explanation about Embodiment 2). Accordingly, the SPN 2912 indicated by the extent start points 2742 generally differs from the SPN of the source packet located at the top of an extent belonging to the file 2D 221.

FIG. 29B is a schematic diagram showing the data structure of the extent start points 2920 included in the DEP clip information file 232. As shown in FIG. 29B, the extent start points 2920 include dependent-view extent IDs (EXT2_ID) 2921 and SPNs 2922. The EXT2_IDs 2921 are serial numbers assigned consecutively from the top to the dependent-view extents belonging to the file SS 223. One SPN 2922 is assigned to each EXT2_ID 2921 and is the same as the SPN for the source packet located at the top of the dependent-view extent identified by the EXT2_ID 2921. This SPN is a serial number assigned to source packets in order from the top; the source packets are included in the dependent-view extents belonging to the file SS 223.

FIG. 29D is a schematic diagram representing a correspondence between dependent-view extents EXT2[0], EXT2[1], . . . , belonging to the file DEP 222 and the SPNs 2922 shown by the extent start points 2920. As shown in FIG. 11, the file DEP 222 and the file SS 243 share dependent-view extents in common. Accordingly, as shown in FIG. 29D, each SPN 2922 shown by the extent start points 2920 is the same as the SPN of the source packet located at the top of each dependent-view extent EXT2[0], EXT2[1], . . . .

As described below, the extent start points 2742 in the 2D clip information file 231 and the extent start points 2920 in the clip information file 232 are used for detecting the boundaries between base-view extents and dependent-view extents included in each extent of the file SS 223 when 3D video images are played back from the file SS 223.

FIG. 29E is a schematic diagram showing a correspondence between an extent EXTSS[0] belonging to the file SS 223 and an extent block on the BD-ROM disc 101. As shown in FIG. 29E, the extent block includes extents D[n] and B[n] (n=0, 1, 2, . . . ) in an interleaved arrangement. The extent block can be accessed as the extent EXTSS[0] of the file SS 223. Furthermore, the (n+1)$^{th}$ base-view extent B[n] of the extent EXTSS[0] has as many source packets as the difference A(n+1)–An between SPNs respectively corresponding to EXT1 ID=n+1 and n in the extent start points 2742. In this case, A0=0. On the other hand, the dependent-view extent D[n+1] has as many source packets as the difference B(n+1)–Bn between SPNs respectively corresponding to EXT2_ID=n+1 and n in the extent start points 2920. In this case, B0=0.

When the playback device 102 in 3D playback mode plays back 3D video images from the file SS 223, the playback device 102 refers to the entry maps and the extent start points 2742 and 2920 respectively found in the clip information files 231 and 232. By doing this, the playback device 102 specifies, from the PTS for a frame representing the right view of an arbitrary scene, the LBN for the sector on which a dependent-view extent that is required for composing the frame is recorded. Specifically, the playback device 102 for example first retrieves the SPN associated with the PTS from the entry map in the DEP clip information file 232. It is assumed that the source packet indicated by the SPN is included in the third dependent-view extent EXT2[2]=D[2] in the file DEP 222.

Next, the playback device 102 retrieves "B2," the largest SPN smaller than the target SPN, from among the SPNs 2922 shown by the extent start points 2920 in the DEP clip information file 232. The playback device 102 also retrieves the corresponding EXT2_ID "2." Then the playback device 102 retrieves the value "A2" for the SPN 2912 corresponding to the EXT1_ID, which is the same as the EXT2_ID "2," from the extent start points 2742 in the 2D clip information file 231. The playback device 102 further seeks the sum B2+A2 of the retrieved SPNs. As can be seen from FIG. 29E, this sum B2+A2 is the same as the total number of source packets located before the third dependent-view extent D[2] within the extent EXTSS[0] in the file SS 223. Accordingly, this sum B2+A2 multiplied by 192 bytes, the data amount per source packet, and divided by 2048 bytes, the data amount per sector, i.e. (B2+A2)×192/2048, is the same as the number of sectors from the top of the extent EXTSS[0] in the file SS 223 until immediately before the third dependent-view extent D[2]. Using this quotient, the LBN for the sector on which the top of the dependent-view extent D[2] is recorded can be specified by referencing the file entry for the file SS 223.

After specifying the LBN via the above-described procedure, the playback device 102 indicates the LBN to the BD-ROM drive 121. In this way, the portion of the extent EXTSS[0] of the file SS 223 is read in aligned units; the portion is recorded in the sectors located at and after the LBN, i.e., the third dependent-view extent D[2] and the following extents B[2], D[3], B[3], . . . .

The playback device 102 further refers to the extent start points 2742 and 2920 to extract dependent-view extents and base-view extents alternately from the extents read from the file SS 223. For example, assume that extents D[n], B[n] (n=0, 1, 2, . . . ) are read in order from an extent EXTSS[0] of the file SS 223 shown in FIG. 29E. The playback device 102 first extracts B1 source packets from the top of the extent EXTSS[0] as the dependent-view extent D[0]. Next, the playback device 102 extracts the B1$^{th}$ source packet and the subsequent (A1−1) source packets, a total of A1 source packets, as the first base-view extent B[0]. The playback device 102 then extracts the (B1+A1)$^{th}$ source packet and the subsequent (B2−B1−1) source packets, a total of (B2−B1) source packets, as the second dependent-view extent D[1]. The playback device 102 further extracts the (A1+B2)$^{th}$ source packet and the subsequent (A2−A1−1) source packets, a total of (A2−A1) source packets, as the second base-view extent B[1]. Thereafter, the playback device 102 thus continues to detect the boundary between dependent-view and base-view extents in the extents of the file SS 223 based on the number of read source packets, thereby alternately extracting dependent-view and base-view data extents. The extracted base-view and dependent-view extents are transmitted to the system target decoder to be decoded in parallel. In this way, the playback device 102 in 3D playback mode can play back 3D video images from the file SS 223 starting at a specific PTS.

<<File Base>>

FIG. 29C is a schematic diagram representing the base-view extents B[0], B[1], B[2], . . . extracted from the file SS 223 by the playback device 102 in 3D playback mode. As shown in FIG. 29C, when SPNs are allocated to source packets included in base-view extents B[n] (n=0, 1, 2, . . . ), beginning from their top, the source packet located at the top of each base-view extent B[n] has a SPN equal to one of the SPNs 2912 indicated by the extent start points 2742. Base-view extents extracted from a single file SS by referring to extent start points, like the base-view extents B[n], are referred to as a "file base." As shown in FIG. 29E, each of the base-view extents EXT1[0], EXT1[1] . . . is referred to by an extent start point 2742 or 2920 in a clip information file.

An extent EXT1[n] in the file base shares the same base-view extent B[n] with an extent EXT2D[n] in the file 2D. Accordingly, the file base includes the same main TS as the file 2D. Unlike the file 2D, however, the file base does not include a file entry. Furthermore, an extent start point is necessary to refer to a base-view extent. In this sense, the file base is a "virtual file." In particular, the file base is not recognized by the file system and does not appear in the directory-file structure shown in FIG. 2.

<<2D Playlist File>>

Figure 30:
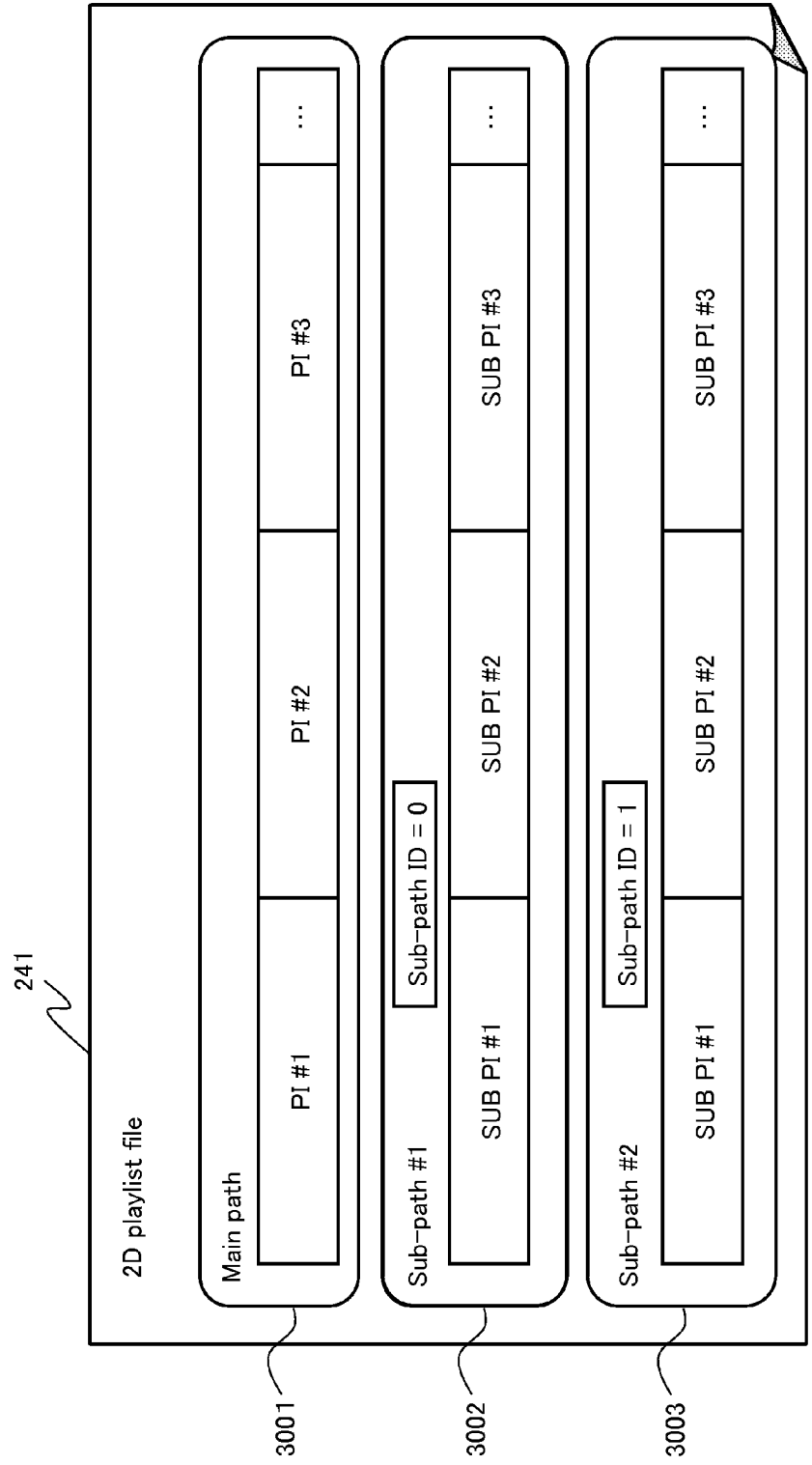
FIG. 30 is a schematic diagram showing the data structure of a 2D playlist file 241.

FIG. 30 is a schematic diagram showing the data structure of a 2D playlist file. As shown in FIG. 30, the 2D playlist file 241 includes a main path 3001 and two sub-paths 3002 and 3003.

The main path 3001 is a sequence of playitem information pieces (hereinafter abbreviated as PI) that defines the main playback path for the file 2D 221, i.e. the section for playback and the section's playback order. Each PI is identified with a unique playitem ID=#N (N=1, 2, 3, . . . ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 3001 represents the order of corresponding playback sections in the playback path.

Each of the sub-paths 3002 and 3003 is a sequence of sub-playitem information pieces (hereinafter abbreviated as SUB_PI) that defines a playback path that can be associated in parallel with the main playback path for the file 2D 221. Such a playback path is a different section of the file 2D 221 than is represented by the main path 3001, or is a section of stream data multiplexed in another file 2D, along with the corresponding playback order. The stream data indicated by the playback path represents other 2D video images to be played back simultaneously with 2D video images played back from the file 2D 221 in accordance with the main path 3001. These other 2D video images include, for example, sub-video in a picture-in-picture format, a browser window, a pop-up menu, or subtitles. Serial numbers "0" and "1" are assigned to the sub-paths 3002 and 3003 in the order of registration in the 2D playlist file 241. These serial numbers are used as sub-path IDs to identify the sub-paths 3002 and 3003. In the sub-paths 3002 and 3003, each SUB_PI is identified by a unique sub-playitem ID=#M (M=1, 2, 3, . . . ). Each SUB_PI #M defines a different playback section along the playback path with a pair of PTSs. One of the PTSs in the pair represents the playback start time of the playback section, and the other represents the playback end time. Furthermore, the order of the SUB_PIs in the sub-paths 3002 and 3003 represents the order of corresponding playback sections in the playback path.

Figure 31:
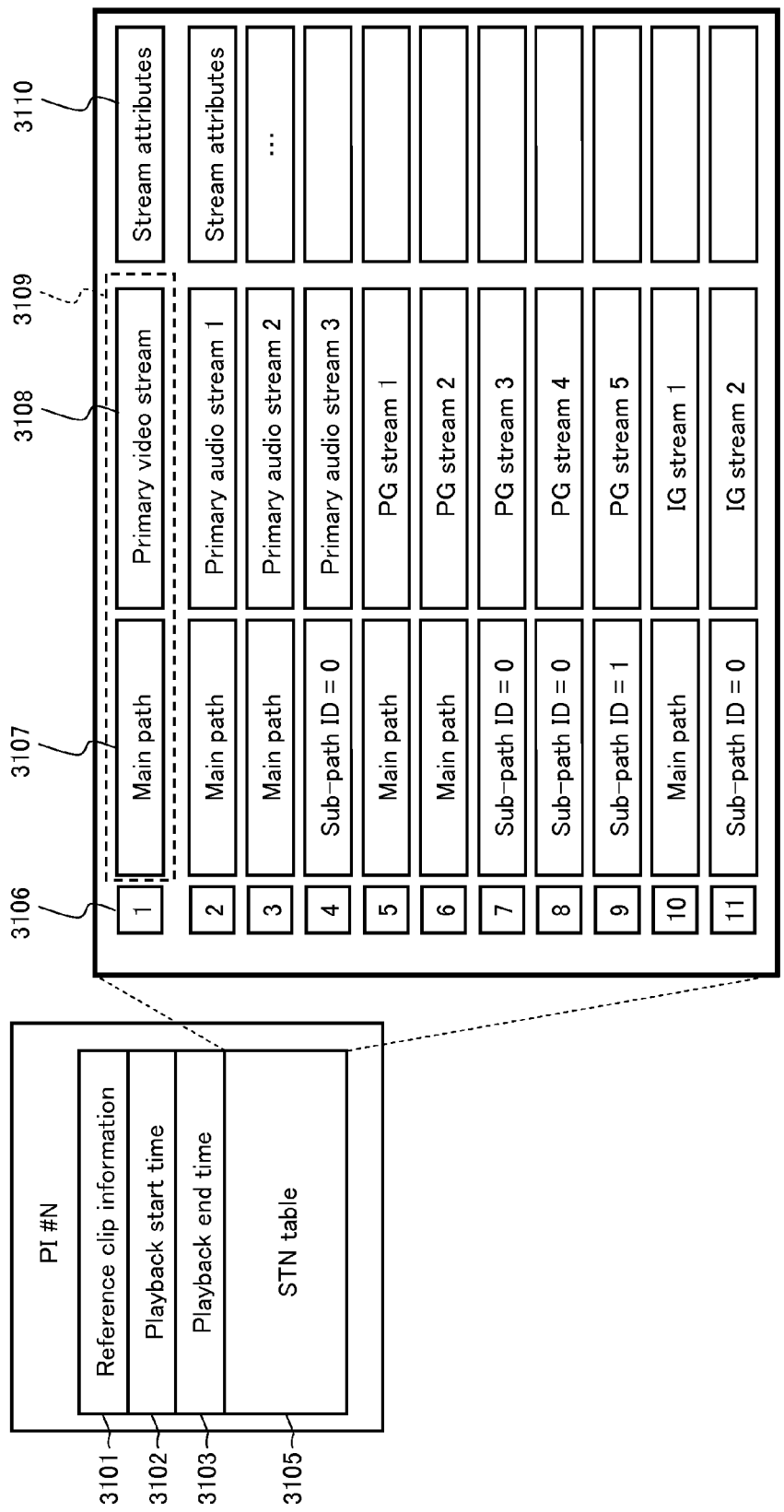
FIG. 31 is a schematic diagram showing the data structure of the $N^{th}$ piece of playitem information.

FIG. 31 is a schematic diagram showing the data structure of PI #N. As shown in FIG. 31, a PI #N includes a piece of reference clip information 3101, playback start time (In-Time) 3102, playback end time (Out-Time) 3103, and a stream selection table (hereinafter referred to as "STN table" (stream number table)) 3105. The reference clip information 3101 is information for identifying the 2D clip information file 231. The playback start time 3102 and playback end time 3103 respectively indicate PTSs for the beginning and the end of the section for playback of the file 2D 221. The STN table 3105 is a list of elementary streams that can be selected from the file 2D 221 by the decoder in the playback device 102 from the playback start time 3102 until the playback end time 3103.

The data structure of a SUB_PI is the same as the data structure of the PI shown in FIG. 31 insofar as it includes reference clip information, a playback start time, and a playback end time. In particular, the playback start time and playback end time of a SUB_PI are expressed as values along the same time axis as a PI.

[STN Table]

Referring again to FIG. 31, the STN table 3105 is an array of stream registration information. "Stream registration information" is information individually listing the elementary streams that can be selected for playback from the main TS between the playback start time 3102 and playback end time 3103. The stream number (STN) 3106 is a serial number allocated individually to stream registration information and is used by the playback device 102 to identify each elementary stream. The STN 3106 further indicates priority for selection among elementary streams of the same type. The stream registration information includes a stream entry 3109 and stream attribute information 3110. The stream entry 3109 includes stream path information 3107 and stream identification information 3108. The stream path information 3107 is information indicating the file 2D to which the selected elementary stream belongs. For example, if the stream path information 3107 indicates "main path," the file 2D corresponds to the 2D clip information file indicated by reference clip information 3101. On the other hand, if the stream path information 3107 indicates "sub-path ID=1," the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 3102 until the playback end time 3103 specified by the PI included in the STN table 3105. The stream identification information 3108 indicates the PID for the elementary stream multiplexed in the file 2D specified by the stream path information 3107. The elementary stream indicated by this PID can be selected from the playback start time 3102 until the playback end time 3103. The stream attribute information 3110 indicates attribute information for each elementary stream. For example, the attribute information for each of an audio stream, PG stream, and IG stream indicates a language type of the stream.

[Playback of 2D Video Images in Accordance with 2D Playlist File]

Figure 32:
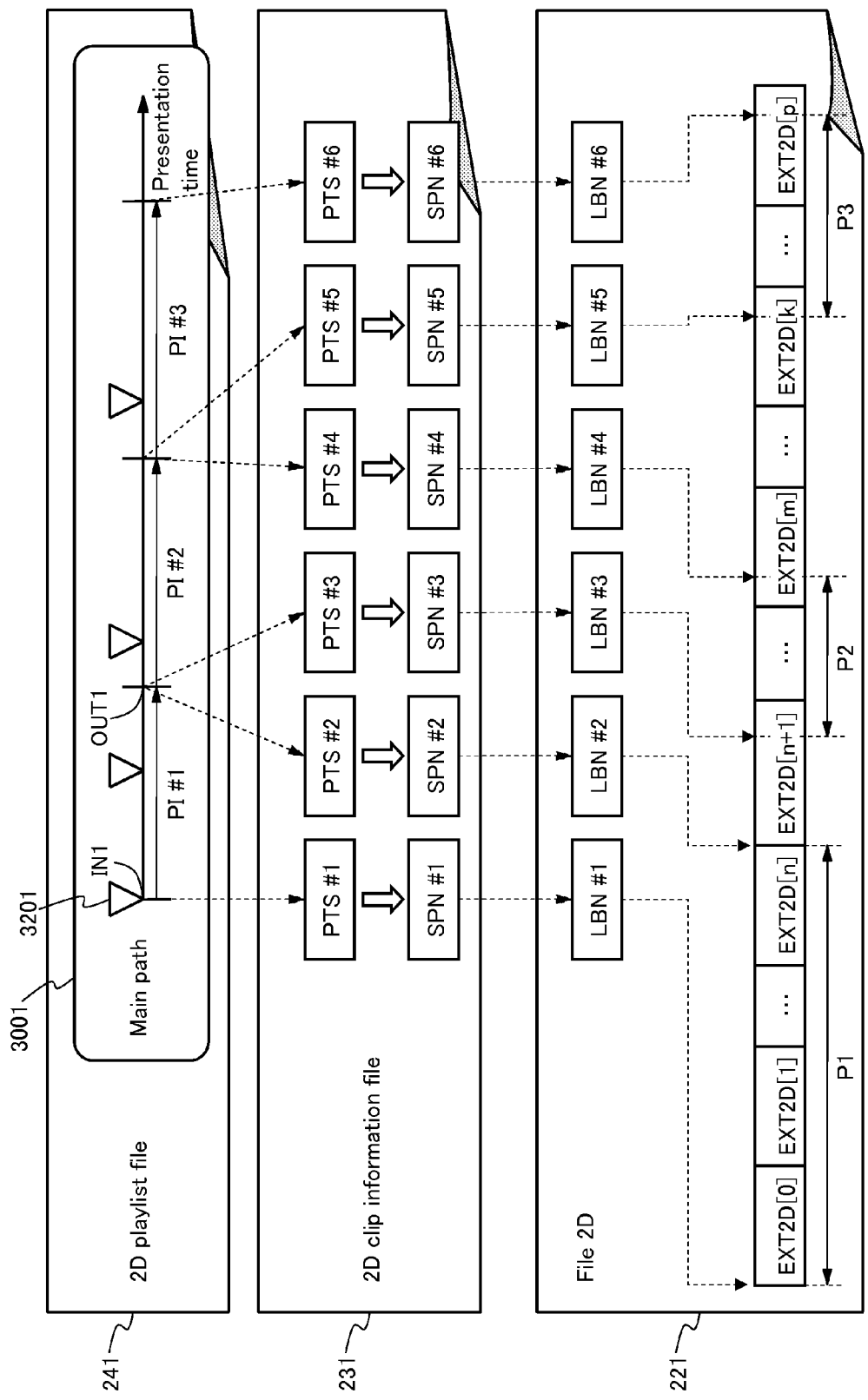
FIG. 32 is a schematic diagram showing a correspondence between PTSs indicated by the 2D playlist file 241 and sections played back from a file 2D 221.

FIG. 32 is a schematic diagram showing a correspondence between PTSs indicated by the 2D playlist file 241 and sections played back from the file 2D 221. As shown in FIG. 32, the main path 3001 of the 2D playlist file 241 includes the PI #1 specifying a PTS #1, which indicates a playback start time IN1, and a PTS #2, which indicates a playback end time OUT1. The reference clip information for PI #1 indicates the 2D clip information file 231. When playing back 2D video images in accordance with the 2D playlist file 241, the playback device 102 first reads the PTS #1 and PTS #2 from the PI #1. Next, the playback device 102 refers to the entry map in the 2D clip information file 231 to retrieve from the file 2D 221 the SPN #1 and SPN #2 that correspond to the PTS #1 and PTS #2. The playback device 102 then calculates the corresponding numbers of sectors from the SPN #1 and SPN #2. Furthermore, the playback device 102 refers to these numbers of sectors and the file entry of the file 2D 221 to specify LBN #1 and LBN #2 assigned to the top and end, respectively, of the sector group P1 on which extents EXT2D[0], ..., EXT2D[n] to be played back are recorded. Calculation of the numbers of sectors and specification of the LBNs are as per the description about FIGS. 28A, 28B, and 28C. Finally, the playback device 102 indicates the range from LBN #1 to LBN #2 to the BD-ROM drive 121. In response, the BD-ROM drive 121 uses the file entry of the file 2D 221 to read source packets belonging to the extents EXT2D[0], ..., EXT2D[n] from the sector group P1 located in the range. Similarly, the pair PTS #3 and PTS #4 indicated by the PI #2 are first converted into a pair of SPN #3 and SPN #4 by referring to the entry map in the 2D clip information file 231. Then, referring to the file entry for the file 2D 221, the pair of SPN #3 and SPN #4 are converted into a pair of LBN #3 and LBN #4. Furthermore, source packets belonging to extents of the file 2D 221 are read from the sector group P2 located in a range from LBN #3 to LBN #4. Conversion of a pair of PTS #5 and PTS #6 indicated by PI #3 to a pair of SPN #5 and SPN #6, conversion of the pair of SPN #5 and SPN #6 to a pair of LBN #5 and LBN #6, and reading of source packets from the sector group P3 located in a range from LBN #5 to LBN #6 are similarly performed. The playback device 102 thus plays back 2D video images from the file 2D 221 in accordance with the main path 3001 in the 2D playlist file 241.

The 2D playlist file 241 may include an entry mark 3201. The entry mark 3201 indicates a time point in the main path 3001 at which playback is actually to start. For example, as shown in FIG. 32, a plurality of entry marks 3201 can be set for the PI #1. The entry mark 3201 is particularly used for searching for a playback start position during interrupt playback. For example, when the 2D playlist file 241 specifies a playback path for a movie title, the entry marks 3201 are assigned to the top of each chapter. Consequently, the playback device 102 can play back the movie title by chapters.

<<3D Playlist File>>

Figure 33:
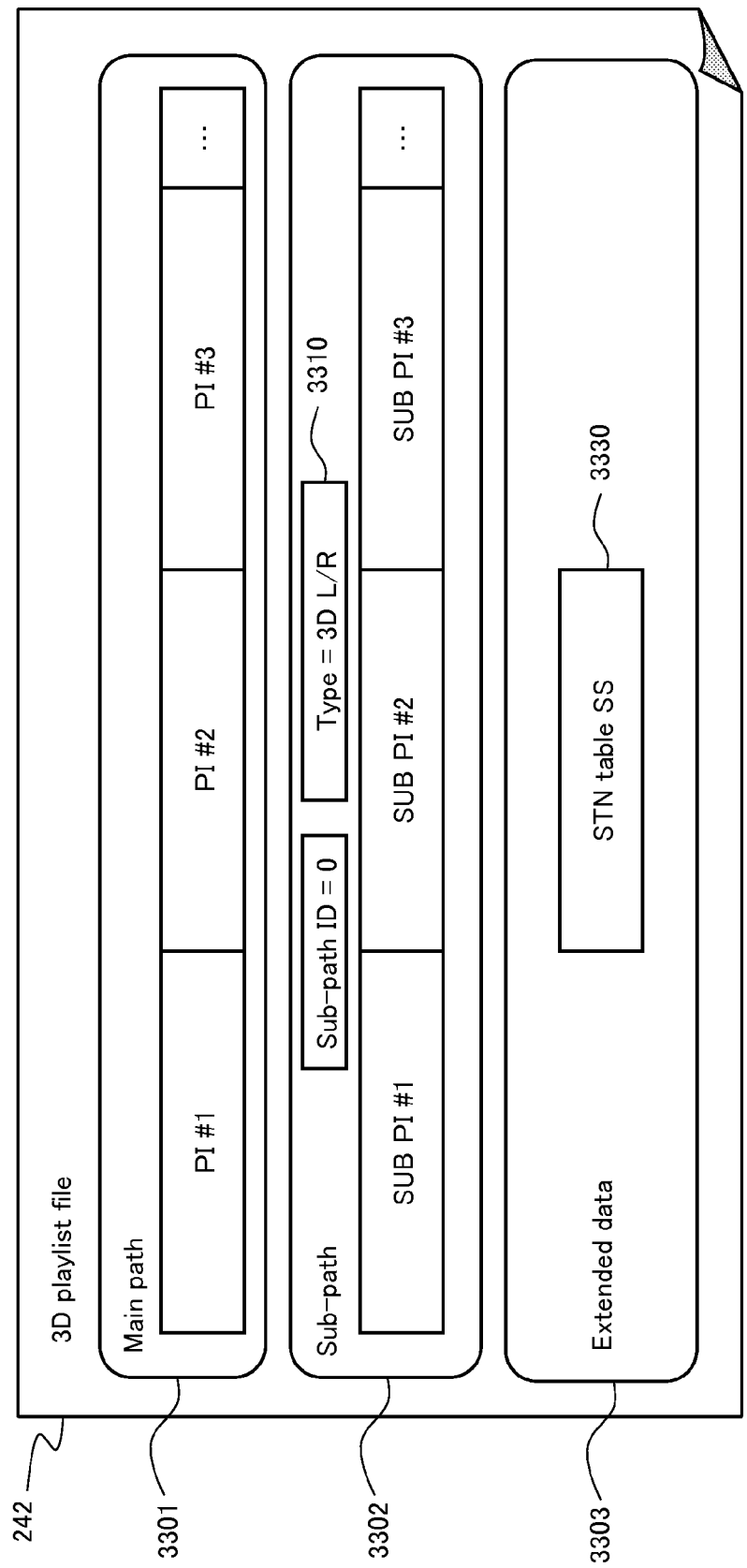
FIG. 33 is a schematic diagram showing the data structure of a 3D playlist file 242.

FIG. 33 is a schematic diagram showing the data structure of a 3D playlist file 242. As shown in FIG. 33, the 3D playlist file 242 includes a main path 3301, sub-path 3302, and extended data 3303.

The main path 3301 specifies the playback path for the main TS. Accordingly, the main path 3301 is substantially the same as the main path 3001 for the 2D playlist file 241. In other words, the playback device 102 in 2D playback mode can play back 2D video images from the file 2D 221 in accordance with the main path 3301 in the 3D playlist file 242.

The sub-path 3302 specifies the playback path for the sub-TS, i.e. the playback path for the file DEP 222. The data structure of the sub-path 3302 is the same as the data structure of the sub-paths 3002 and 3003 in the 2D playlist file 241. Accordingly, details on this similar data structure can be found in the description about FIG. 30, in particular details on the data structure of the SUB_PI.

The SUB_PI #N (N=1, 2, 3, ...) in the sub-path 3302 are in one-to-one correspondence with the PI #N in the main path 3301. Furthermore, the playback start time and playback end time specified by each SUB_PI #N is the same as the playback start time and playback end time specified by the corresponding PI #N. The sub-path 3302 additionally includes a sub-path type 3310. The "sub-path type" generally indicates whether playback according to the main path should be synchronized with playback according to the sub-path or not. In the 3D playlist file 242, the sub-path type 3310 in particular indicates the type of 3D playback mode, i.e. the type of the dependent-view video stream to be played back in accordance with the sub-path 3302. In FIG. 33, the value of the sub-path type 3310 is "3D L/R," thus indicating that the type of 3D playback mode is L/R mode, i.e. that the right-view video stream is to be played back. On the other hand, a value of "3D depth" for the sub-path type 3310 indicates that the type of 3D playback mode is depth mode, i.e. that the depth map stream is to be played back. When the playback device 102 in 3D playback mode detects that the value of the sub-path type 3310 is "3D L/R" or "3D depth," the playback device 102 synchronizes playback according to the main path 3301 with playback according to the sub-path 3302.

Extended data 3303 is interpreted only by the playback device 102 in 3D playback mode, and is ignored by the playback device 102 in 2D playback mode. In particular, the extended data 3303 includes an extended stream selection table 3330. The extended stream selection table (hereinafter abbreviated as STN table SS) is an array of stream registration information to be added to the STN tables indicated by the PIs in the main path 3301 in 3D playback mode. This stream registration information indicates elementary streams that can be selected for playback from the sub TS.

[STN Table SS]

Figure 34:
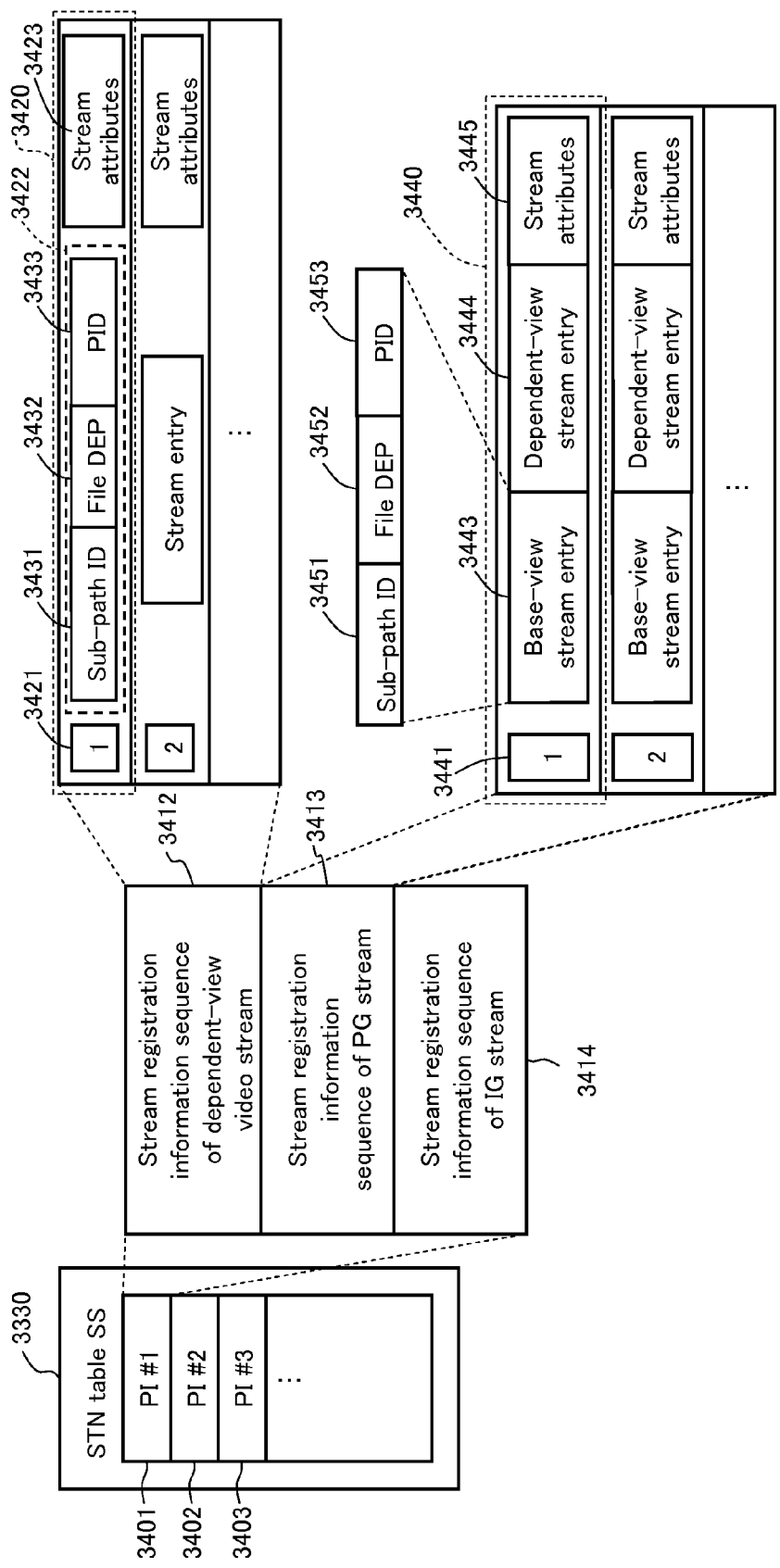
FIG. 34 is a schematic diagram showing the data structure of an STN table SS 3330.

FIG. 34 is a schematic diagram showing the data structure of the STN table SS 3330. As shown in FIG. 34, an STN table SS 3330 includes stream registration information sequences 3401, 3402, 3403, . . . . The stream registration information sequences 3401, 3402, 3403, . . . individually correspond to the PI #1, PI #2, PI #3, . . . in the main path 3301. The playback device 102 in 3D playback mode uses these stream registration information sequences 3401, 3402, and 3403 in combination with the stream registration information sequences included in the STN tables in the corresponding PIs. The stream registration information sequences 3401-3403 for the PIs include a stream registration information sequence 3412 for the dependent-view video streams, a stream registration information sequence 3413 for the PG streams, and a stream registration information sequence 3414 for the IG streams.

The stream registration information sequence 3412 for the dependent-view video streams, stream registration information sequence 3413 for the PG streams, and stream registration information sequence 3414 for the IG streams respectively include stream registration information indicating the dependent-view video streams, PG streams, and IG streams that can be selected for playback from the sub-TS. These stream registration information sequences 3412, 3413, and 3414 are used in combination with the stream registration information sequences, included in the STN table of the corresponding PI, that indicate base-view video streams, PG streams, and IG streams. When reading a stream registration information sequence from an STN table, the playback device 102 in 3D playback mode automatically also reads the stream registration information sequence, located in the STN table SS, that has been combined with that stream registration information sequence. When simply switching from 2D playback mode to 3D playback mode, the playback device 102 can thus maintain already recognized STNs and stream attributes such as language.

The stream registration information sequence 3412 for the dependent-view video streams generally includes a plurality of pieces of stream registration information (SS_dependent_view_block) 3420. These are the same in number as the pieces of stream registration information in the corresponding PI that indicate the base-view video stream. Each piece of stream registration information 3420 includes an STN 3421, stream entry 3422, and stream attribute information 3423. The STN 3421 is a serial number assigned individually to pieces of stream registration information 3420 and is the same as the STN of the piece of stream registration information, located in the corresponding PI, with which the piece of stream registration information 4120 is combined. The stream entry 3422 includes sub-path ID reference information (ref_to_Subpath_id) 3431, stream file reference information (ref_to_subClip_entry_id) 3432, and a PID (ref_to_stream_PID_subclip) 3433. The sub-path ID reference information 3431 indicates the sub-path ID of the sub-path that specifies the playback path of the dependent-view video stream. The stream file reference information 3432 is information to identify the file DEP storing this dependent-view video stream. The PIDs 3433 are the PIDs for the dependent-view video streams. The stream attribute information 3423 includes attributes the dependent-view video stream, such as frame rate, resolution, and video format. In particular, these attributes are the same as those for the base-view video stream shown by the piece of stream registration information, located in the corresponding PI, with which each piece of stream registration information is combined.

The stream registration information sequence 3413 of the PG stream generally includes a plurality of pieces of stream registration information 3440. These are the same in number as the pieces of stream registration information in the corresponding PI that indicate the PG stream. Each piece of stream registration information 3440 includes an STN 3434, base-view stream entry (stream_entry_for_base_view) 3443, dependent-view stream entry (stream_entry_for_dependent_view) 3444, and stream attribute information 3445. The STN 3434 is a serial number assigned individually to pieces of stream registration information 3440 and is the same as the STN of the piece of stream registration information, located in the corresponding PI, with which the piece of stream registration information 4120 is combined. Both the base-view stream entry 3443 and the dependent-view stream entry 3444 include sub-path ID reference information 3451, stream file reference information 3452, and PIDs 3453. The sub-path ID reference information 3451 indicates the sub-path IDs of the sub-paths that specify the playback paths of the base-view and dependent-view PG streams. The stream file reference information 3452 is information to identify the file DEP storing the PG streams. The PIDs 3453 are the PIDs for the PG streams. The stream attribute information 3445 includes attributes for the PG streams, such as language type. The stream registration information sequence 3414 of the IG stream has the same data structure.

[Playback of 3D Video Images in Accordance with 3D Playlist File]

Figure 35:
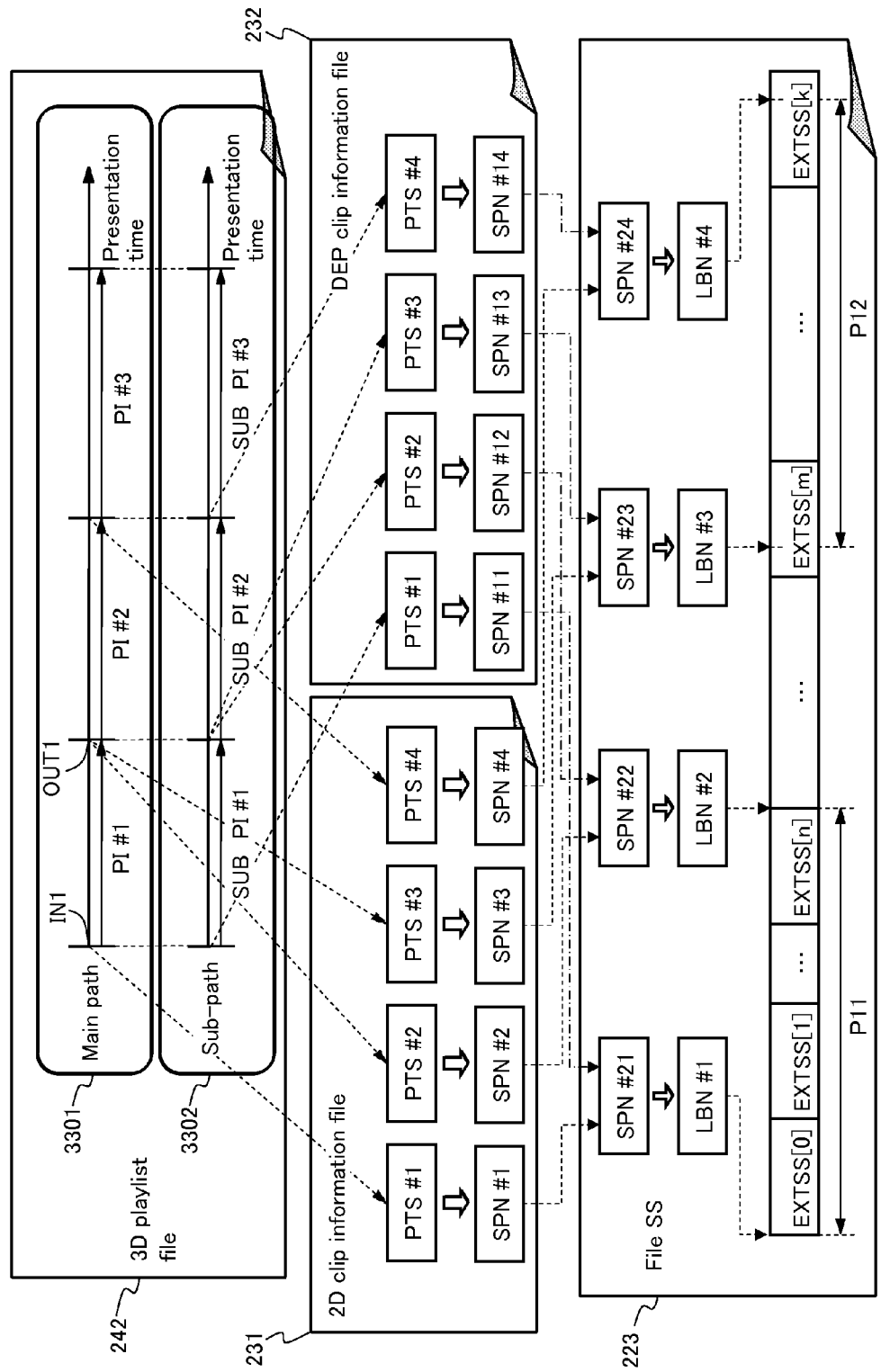
FIG. 35 is a schematic diagram showing a correspondence between PTSs indicated by the 3D playlist file 242 and sections played back from the file SS 223.

FIG. 35 is a schematic diagram showing a correspondence between PTSs indicated by the 3D playlist file 242 and sections played back from the file SS 223. As shown in FIG. 35, in the main path 3301 in the 3D playlist file 242, the PI #1 specifies a PTS #1, which indicates a playback start time IN1, and a PTS #2, which indicates a playback end time OUT1. The reference clip information for PI #1 indicates the 2D clip information file 231. In the sub-path 3302, the SUB_PI #1 specifies the same PTS #1 and PTS #2 as the PI #1. The reference clip information for SUB_PI #1 indicates the DEP clip information file 232.

When playing back 3D video images in accordance with the 3D playlist file 242, the playback device 102 first reads PTS #1 and PTS #2 from the PI #1 and SUB_PI #1. Next, the playback device 102 refers to the entry map in the 2D clip information file 231 to retrieve from the file 2D 221 the SPN #1 and SPN #2 that correspond to the PTS #1 and PTS #2. In parallel, the playback device 102 refers to the entry map in the DEP clip information file 232 to retrieve from the file DEP 222 the SPN #11 and SPN #12 that correspond to the PTS #1 and PTS #2. As described with reference to FIG. 29E, the playback device 102 then uses the extent start points 2742 and 2920 in the clip information files 231 and 232 to calculate, from SPN #1 and SPN #11, the number of source packets SPN #21 from the top of the file SS 223 to the playback start position. Similarly, the playback device 102 calculates, from SPN #2 and SPN #12, the number of source packets SPN #22 from the top of the file SS 223 to the playback end position. The playback device 102 further calculates the numbers of sectors corresponding to the SPN #21 and SPN #22. Next, the playback device 102 refers to these numbers of sectors and the file entry of the file SS 243 to specify LBN #1 and LBN #2 at the start and end, respectively, of the sector group P11 on which extents EXTSS[0], . . . , EXTSS[n] to be played back are recorded. Calculation of the numbers of sectors and specification of the LBNs are as per the description about FIG. 29E. Finally, the playback device 102 indicates the range from LBN #1 to LBN #2 to the BD-ROM drive 121. In response, the BD-ROM drive 121 uses the file entry of the file SS 223 to read the source packets belonging to the extents EXTSS[0], . . . , EXTSS[n] from the sector group P11 located in this range. Similarly, the pair PTS #3 and PTS #4 indicated by PI #2 and SUB_PI #2 are first converted into a pair of SPN #3 and SPN #4 and a pair of SPN #13 and SPN #14 by referring to the entry maps in the clip information files 231 and 232. Then, the number of source packets SPN #23 counted from the top of the file SS 223 to the playback start position is calculated from SPN #3 and SPN #13, and the number of source packets SPN #24 counted from the top of the file SS 223 to the playback end position is calculated from SPN #4 and SPN #14. Next, the file entry of the file SS 223 is referred to convert the pair of SPN #23 and SPN #24 into a pair of LBN #3 and LBN #4. Furthermore, source packets belonging to extents of the file SS 223 are read from the sector group P12 located in the range from LBN #3 to LBN #4.

In parallel with the above-described read process, as described with reference to FIG. 32E, the playback device 102 refers to the extent start points 2742 and 2920 in the clip information files 231 and 232 to extract base-view extents and dependent-view extents from each extent in the file SS 223 and decode the extents in parallel. The playback device 102 thus plays back 3D video images from the file SS 223 in accordance with the 3D playlist file 242.

<<Extended Playlist File>>

Figure 36:
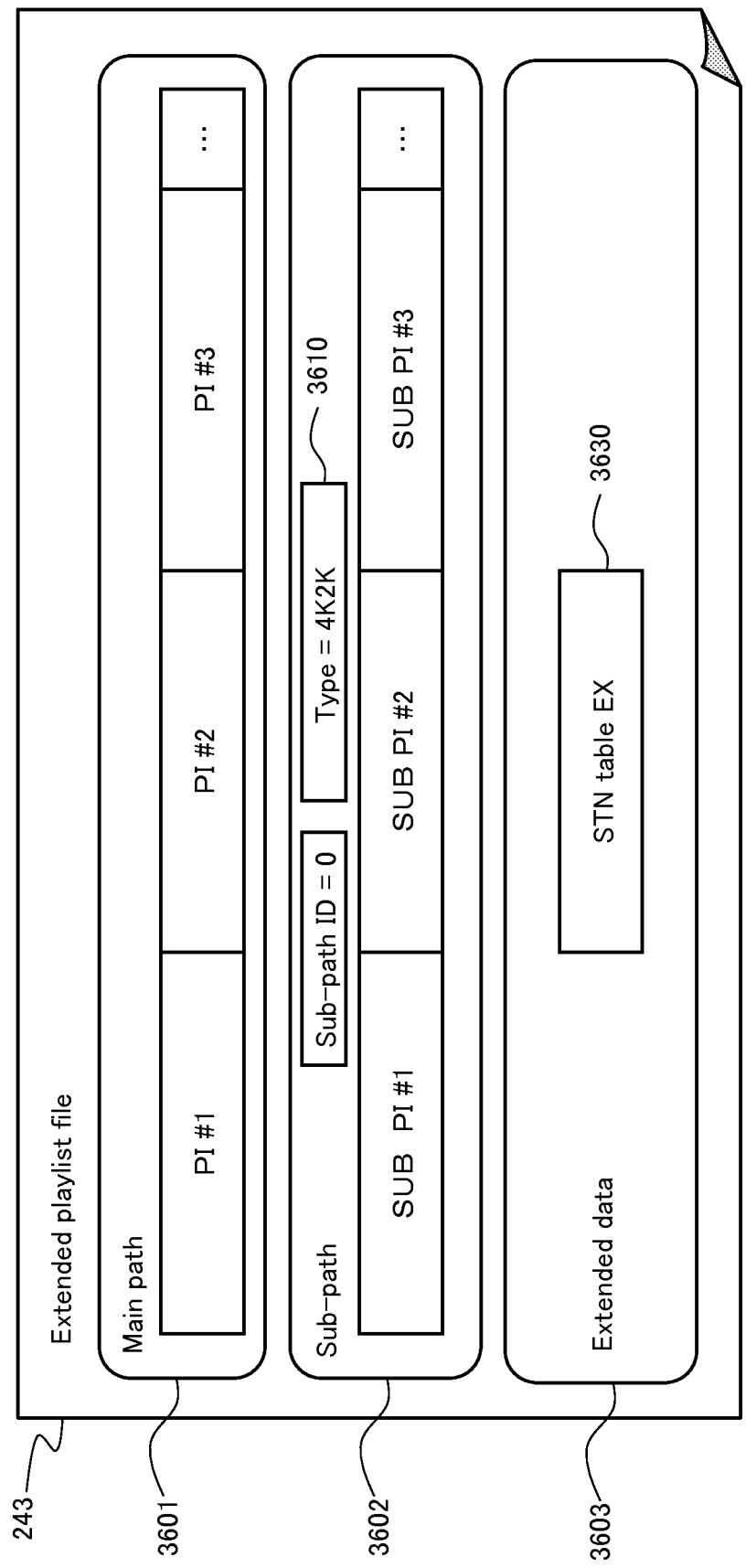
FIG. 36 is a schematic diagram showing the data structure of an extended playlist file 243.

FIG. 36 is a schematic diagram showing the data structure of the extended playlist file 243. As shown in FIG. 36, the extended playlist file 243 includes a main path 3601, sub-path 3602, and extended data 3603.

The main path 3601 specifies the playback path for the main TS. Accordingly, the main path 3601 is substantially the same as the main path 3001 of the 2D playlist file 241. In other words, the playback device 102 in 2D playback mode can play back full-HD 2D video images from the file 2D 221 in accordance with the main path 3601 of the extended playlist file 243.

The sub-path 3602 specifies the playback path for the extended stream file 224. The data structure of the sub-path 3602 is the same as the data structure of the sub-paths 3002 and 3003 of the 2D playlist file 241. Accordingly, details on this similar data structure, in particular, details on the data structure of SUB_PI, can be found in the description about FIG. 30.

The SUB_PI #N (N=1, 2, 3, . . . ) of the sub-path 3602 are in one-to-one correspondence with the PI #N of the main path 3601. Furthermore, the playback start time and playback end time specified by each SUB_PI #N are the same as the playback start time and playback end time specified by the corresponding PI #N, respectively. The sub-path 3602 additionally includes a sub-path type 3610. In particular, the extended playlist file 243 has the sub-path type 3610 of "4K2K" that indicates the playback device 102 being in extended playback mode. When the playback device 102 in extended playback mode detects that the sub-path type 3610 indicates extended playback mode, the playback device 102 synchronizes playback according to the main path 3601 with playback according to the sub-path 3602.

Extended data 3603 is interpreted only by the playback device 102 in extended playback mode, and is ignored by the playback device 102 in 2D playback mode and in 3D playback mode. In particular, the extended data 3603 includes an extended stream selection table 3630. The extended stream selection table (hereinafter abbreviated as STN table EX) is an array of stream registration information to be added to the STN tables indicated by the PIs in the main path 3601 for extended playback mode. This stream registration information indicates elementary streams that can be selected for playback from the extended stream.

[STN Table EX]

Figure 37:
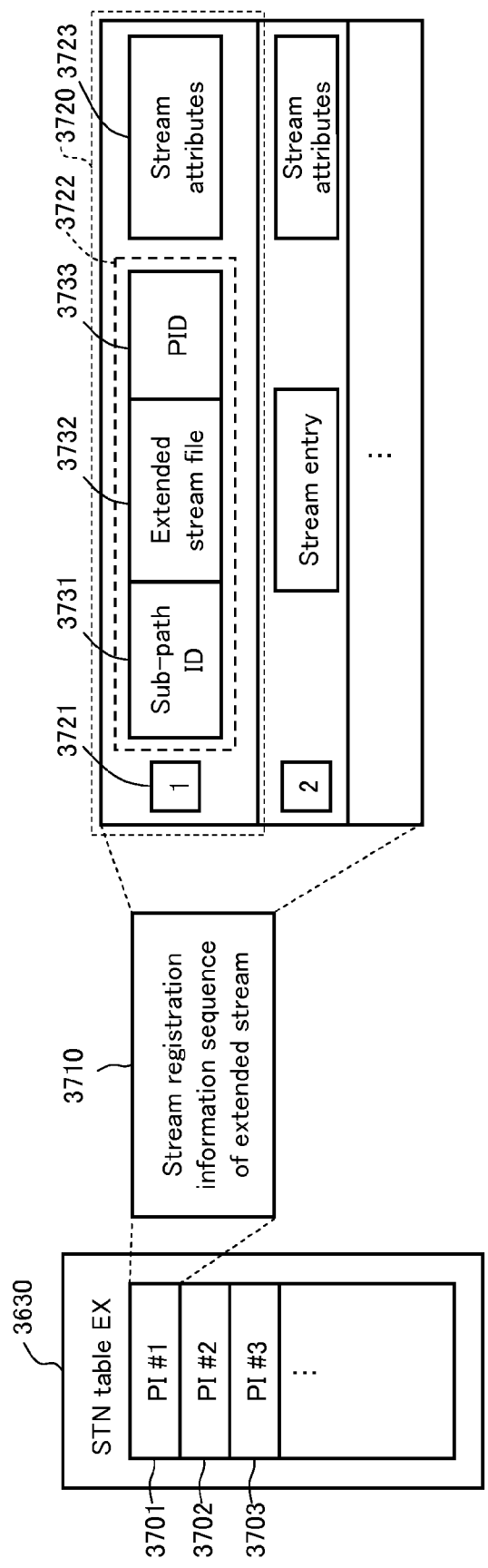
FIG. 37 is a schematic diagram showing the data structure of an STN table EX 3630.

FIG. 37 is a schematic diagram showing the data structure of the STN table EX 3630. As shown in FIG. 37, the STN table EX 3630 includes stream registration information sequences 3701, 3702, 3703, . . . . The stream registration information sequences 3701, 3702, 3703, . . . individually correspond to the PI #1, PI #2, PI #3, . . . in the main path 3301. The playback device 102 in extended playback mode uses these stream registration information sequences 3701, 3702, and 3703 in combination with the stream registration information sequences included in the STN tables of the corresponding PIs. The stream registration information sequence 3701 for each PI includes a stream registration information sequence 3710 of the extended stream.

This stream registration information sequence 3710 of the extended stream is used in combination with another stream registration information sequence that is included in the STN table of the corresponding PI and indicates the base-view video stream. When reading a first stream registration information sequence from an STN table, the playback device 102 in extended playback mode automatically reads a second stream registration information sequence that is located in the STN table EX and to be combined with the first stream registration information sequence read from the STN table. When simply switching from 2D playback mode to extended playback mode, the playback device 102 can thus maintain already recognized STNs and stream attributes such as language without any changes.

The stream registration information sequence 3710 of the extended stream generally includes a plurality of pieces of stream registration information 3720. These pieces are the same in number as the pieces of stream registration information of the corresponding PI that indicate the base-view video stream. Each piece of stream registration information 3720 includes an STN 3721, stream entry 3722, and stream attribute information 3723. The STN 3721 is a serial number assigned individually to the piece of stream registration information 3720 and is the same as the STN of another piece of stream registration information that is located in the corresponding PI and to be combined with the piece of stream registration information 3720. The stream entry 3722 includes sub-path ID reference information 3731, stream file reference information 3732, and a PID 3733. The sub-path ID reference information 3731 indicates the sub-path ID of the sub-path that specifies the playback path of the extended stream. The stream file reference information 3732 is information to identify the extended stream file containing the extended stream. The PID 3733 is the PID of the elementary stream to be selected from among the extended stream, in particular, the PID of the resolution extension information. The stream attribute information 3723 includes attributes of the extended stream.

[Playback of 4K2K Video Images in Accordance with Extended Playlist File]

Figure 38:
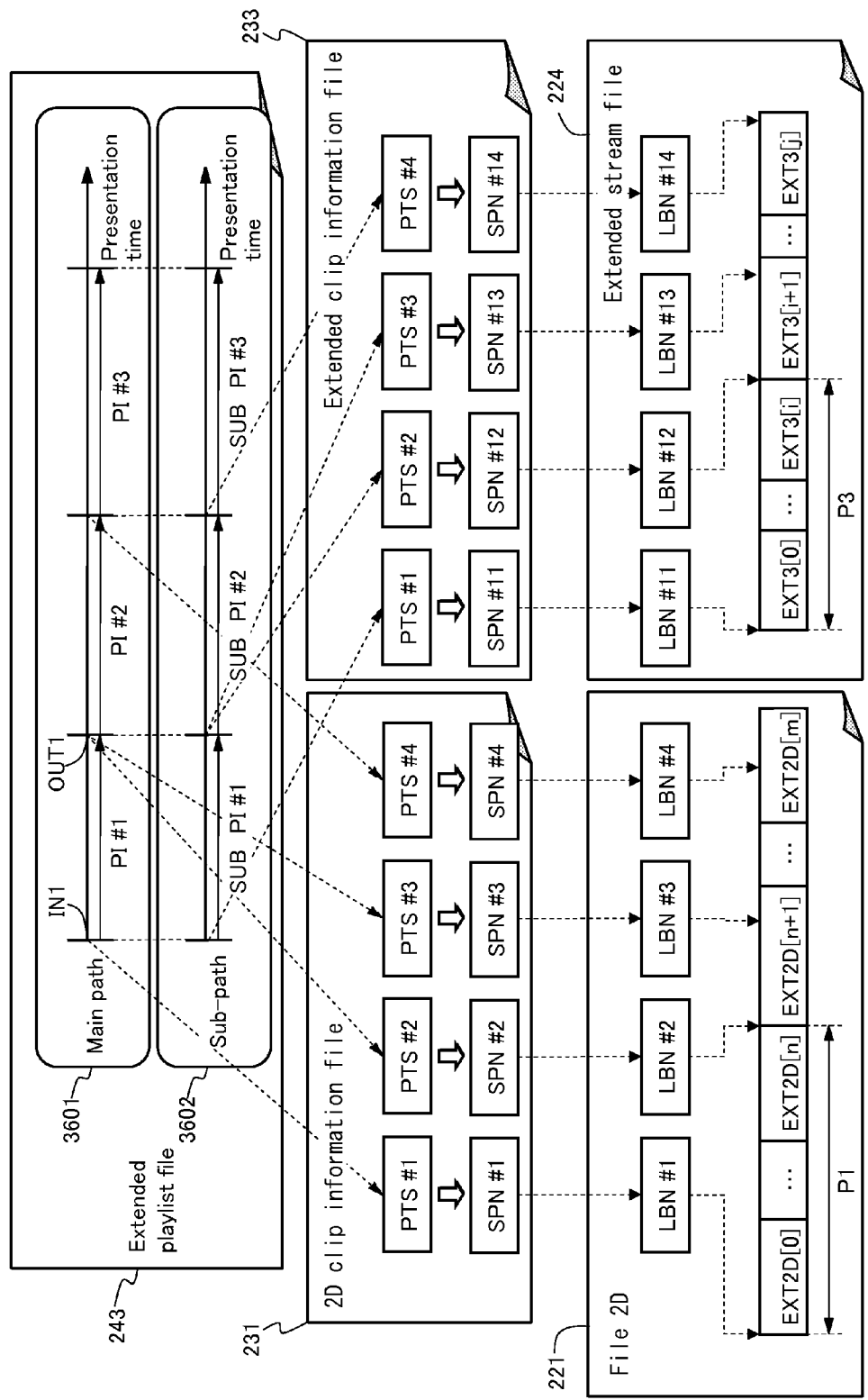
FIG. 38 is a schematic diagram showing a correspondence between PTSs indicated by the extended playlist file 243 and sections played back from the file 2D 221 and an extended stream file 224.

FIG. 38 is a schematic diagram showing a correspondence between PTSs indicated by the extended playlist file 243 and sections played back from the file 2D 221 and the extended stream file 224. As shown in FIG. 38, PI #1 in the main path 3601 of the extended playlist file 243 specifies PTS #1 that indicates the playback start time IN1 and PTS #2 that indicates the playback end time OUT1. The reference clip information of PI #1 indicates the 2D clip information file 231. In the sub-path 3602, SUB_PI #1 specifies the same PTS #1 and PTS #2 as PI #1. The reference clip information of SUB_PI #1 indicates the extended clip information file 233.

When playing back 4K2K 2D video images in accordance with the extended playlist file 243, the playback device 102 first reads PTS #1 and PTS #2 from PI #1 and SUB_PI #1. Next, the playback device 102 refers to the entry map in the 2D clip information file 231 to retrieve from the file 2D 221 SPN #1 and SPN #2 that correspond to PTS #1 and PTS #2, respectively. In parallel, the playback device 102 refers to the entry map in the extended clip information file 233 to retrieve from the extended stream file 224 SPN #11 and SPN #12 that correspond to PTS #1 and PTS #2, respectively. The playback device 102 then calculates the corresponding numbers of sectors from SPN #1 and SPN #2. Furthermore, the playback device 102 refers to these numbers of sectors and the file entry of the file 2D 221 to specify LBN #1 and LBN #2 at the start and end, respectively, of the sector group P1 on which extents EXT2D[0], . . . , EXT2D[n] to be played back are recorded. Calculation of the numbers of sectors and specification of LBNs are as per the description about FIGS. 28A, 28B, and 28C. Finally, the playback device 102 indicates the range from LBN #1 to LBN #2 to the BD-ROM drive 121. Similarly, the playback device 102 calculates the corresponding numbers of sectors from SPN #11 and SPN #12, and then uses these numbers of sectors and the file entry of the extended stream file 224 to specify LBN #11 and LBN #12 at the start and end, respectively, of the sector group P3 on which extended extents EXT3[0], . . . , EXT3 [i] to be played back are recorded. Furthermore, the playback device 102 indicates the range from LBN #11 to LBN #12 to the BD-ROM drive 121. In response to the indication from the playback device 102, the BD-ROM drive 121 uses the file entry of the file 2D 221 to read extents EXT2D[0], . . . , EXT2D[n] of the file 2D 221 from the sector group P1 in the range from LBN #1 to LBN #2. In parallel, the BD-ROM drive 121 uses the file entry of the extended stream file 224 to read extended extents EXT3[0], . . . , EXT3[i] from the sector group P3 in the range from LBN #11 to LBN #12. As can be understood from FIG. 11, the range from LBN #1 to LBN #2 and the range from LBN #11 to LBN #12 overlap with each other. Therefore, the extents EXT2D[0], . . . , EXT2D[n] of the file 2D 221 and the extended extents EXT3[0], . . . , EXT3[i] are read, beginning from one whose top is located at the smallest LBN. In this way, the playback device 102 can play back 4K2K 2D video images from the file 2D 221 and the extended stream file 224 in accordance with the main path 3601 and the sub-path 3602 of the extended playlist file 243.

<<Index File>>

Figure 39:
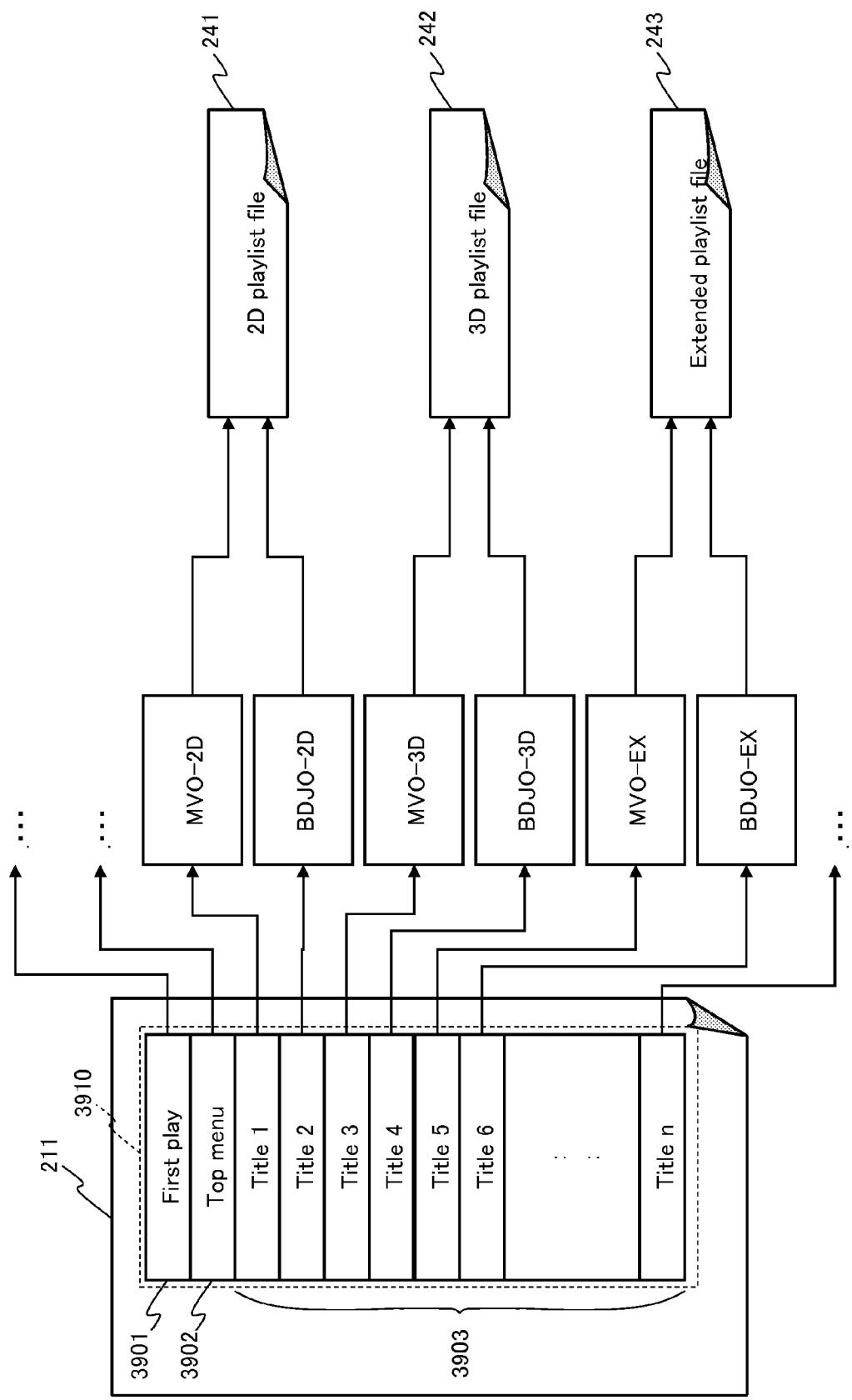
FIG. 39 is a schematic diagram showing the data structure of an index file 211.

FIG. 39 is a schematic diagram showing the data structure of the index file 211 shown in FIG. 2. As shown in FIG. 39, the index file 211 includes an index table 3910. The index table 3910 stores the items "first play" 3901, "top menu" 3902, and "title k" 3903 (k=1, 2, . . . , n, where the letter n denotes an integer equal to or greater than one). Each item is associated either with a MV object MVO-2D, MVO-3D, or MVO-EX, or with a BD-J object BDJO-2D, BDJO-3D, or BDJO-EX. Each time a title or a menu is called in response to a user operation or an application program, a control unit in the playback device 102 refers to a corresponding item in the index table 3910. Furthermore, the control unit calls an object associated with the item from the BD-ROM disc 101 and accordingly executes a variety of processes. Specifically, the item "first play" 3901 specifies an object to be called when the BD-ROM disc 101 is loaded into the BD-ROM drive 121. The item "top menu" 3902 specifies an object for displaying a menu on the display device 103 when, for example, a command "go back to menu" is input by user operation. In the items "title k" 3903, the titles that constitute the content on the BD-ROM disc 101 are individually allocated. For example, when a title for playback is specified by user operation, in the item "title k" in which the title is allocated, the object for playing back video images from the AV stream file corresponding to the title is specified.

In the example shown in FIG. 39, the items "title 1" and "title 2" are allocated to titles of full HD 2D video images. The MV object associated with the item "title 1," MVO-2D, includes commands related to playback processes for full HD 2D video images by using the 2D playlist file 241. When the playback device 102 refers to the item "title 1," then in accordance with the MV object MVO-2D, the 2D playlist file 241 is read from the BD-ROM disc 101, and playback processes for full HD 2D video images are executed in accordance with the playback path specified therein. The BD-J object associated with the item "title 2," BDJO-2D, includes an application management table related to playback processes for full HD 2D video images using the 2D playlist file 241. When the playback device 102 refers to the item "title 2," then in accordance with the application management table in the BD-J object BDJO-2D, a Java application program is called from the JAR file 253 and executed. In this way, the 2D playlist file 241 is read from the BD-ROM disc 101, and playback processes for full HD 2D video images are executed in accordance with the playback path specified therein.

Furthermore, the item "title 3" and the item "title 4" are allocated to titles of 3D video images. The MV object associated with the item "title 3," MVO-3D, includes commands related to playback processes for full HD 2D video images by using the 2D playlist file 241, as well as commands related to playback processes for 3D video images by using the 3D playlist file 242. When the playback device 102 refers to the item "title 3," then, in accordance with the MV object MVO-3D, the 3D playlist file 242 is read from the BD-ROM disc 101, and playback processes for 3D video images are executed in accordance with the playback path specified therein. In the BD-J object associated with the item "title 4," BDJO-3D, the application management table specifies, in addition to a Java application program related to playback processes for 2D video images using the 2D playlist file 221, a Java application program related to playback processes for 3D video images using the 3D playlist file 242. When the playback device 102 refers to the item "title 4," then in accordance with the application management table in the BD-J object BDJO-3D, a Java application program is called from the JAR file 253 and executed. In this way, the 3D playlist file 242 is read from the BD-ROM disc 101, and playback processes for 3D video images are executed in accordance with the playback path specified therein.

Additionally, the item "title 5" and the item "title 6" are allocated to titles of 4K2K 2D video images. The MV object associated with the item "title 5," MVO-EX, includes commands related to playback processes for full HD 2D video images by using the 2D playlist file 241, as well as commands related to playback processes for 4K2K 2D video images by using the extended playlist file 243. When the playback device 102 refers to the item "title 5," then in accordance with the MV object MVO-EX, the extended playlist file 243 is read from the BD-ROM disc 101, and playback processes for 4K2K 2D video images are executed in accordance with the playback path specified therein. The BD-J object associated with the item "title 6," BDJO-EX, includes an application management table related to playback processes for full HD 2D video images using the 2D playlist file 241, as well as a Java application program related to playback processes for 4K2K 2D video images using the extended playlist file 243. When the playback device 102 refers to the item "title 6," then in accordance with the application management table in the BD-J object BDJO-EX, a Java application program is called from the JAR file 253 and executed. In this way, the extended playlist file 243 is read from the BD-ROM disc 101, and playback processes for 4K2K 2D video images are executed in accordance with the playback path specified therein.

<Structure of Playback Device>

Figure 40:
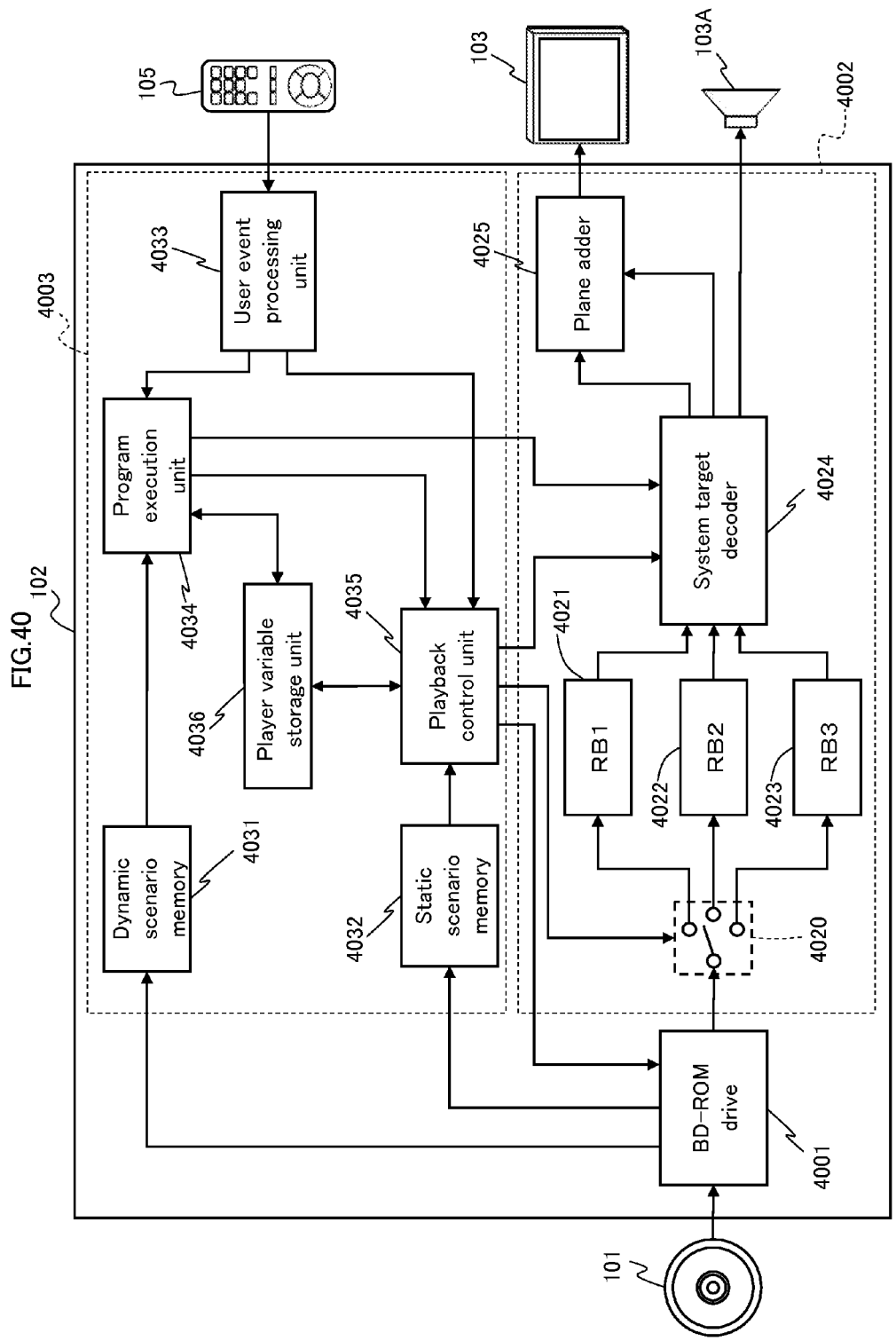
FIG. 40 is a functional block diagram of the playback device 102 shown in FIG. 1.

FIG. 40 is a functional block diagram of the playback device 102 shown in FIG. 1. As shown in FIG. 40, the playback device 102 includes a BD-ROM drive 4001, playback unit 4002, and control unit 4003. The playback unit 4002 includes a switch 4020, first read buffer (RB 1) 4021, second read buffer (RB2) 4022, third read buffer (RB3) 4023, system target decoder 4024, and plane adder 4025. The control unit 4003 includes a dynamic scenario memory 4031, static scenario memory 4032, user event processing unit 4033, program execution unit 4034, playback control unit 4035, and player variable storage unit 4036. The playback unit 4002 and the control unit 4003 are each implemented on a different integrated circuit. In particular, the program execution unit 4034 and the playback control unit 4035 are implemented by functions of the CPU in the playback device 102. Alternatively, the playback unit 4002 and the control unit 4003 may be integrated on a single integrated circuit.

When the BD-ROM disc 101 is loaded into the BD-ROM drive 4001, the BD-ROM drive 3701 radiates laser light to the disc 101 and detects change in the reflected light. Furthermore, using the change in the amount of reflected light, the BD-ROM drive 3701 reads data recorded on the disc 101. Specifically, the BD-ROM drive 4001 has an optical pickup, i.e. an optical head. The optical head has a semiconductor laser, collimate lens, beam splitter, objective lens, collecting lens, and optical detector. A beam of light radiated from the semiconductor laser sequentially passes through the collimate lens, beam splitter, and objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

Upon receiving an indication from the playback control unit 4035 of a range of LBNs as a file read request, the BD-ROM drive 4001 uses the file entry of the file to read extents in the file included in the range on the BD-ROM disc 101. When a plurality of files are to be read, and the ranges of LBNs indicated for the files overlap, the BD-ROM drive 4001 reads extents in order from the smallest top LBN in the overlapping sections, regardless of the file to which the extents belong. Among the files that are read in this way, the AV stream file is transferred to the switch 4020, dynamic scenario information is transferred to the dynamic scenario memory 4031, and static scenario information is transferred to the static scenario memory 4032. The "dynamic scenario information" includes an index file and a BD program file. The "static scenario information" includes a playlist file and a clip information file.

The switch 4020 transfers the AV stream file in units of extents from the BD-ROM drive 4001 to one of the read buffers 4021-4023. In the playback device 102 in 2D playback mode, the switch 4020 transfers extents from the file 2D to the RB1 4021. In the playback device 102 in 3D playback mode, the switch 4020 receives boundary information related to the extents in the file SS in advance from the playback control unit 4035. The boundary information indicates the boundary between the base-view extents and the dependent-view extents included in each extent in the file SS. Specifically, the boundary information indicates the number of source packets from the top of each extent included in the file SS to each boundary between a base-view extent and a dependent-view extent included in the extent. The switch 4020 then refers to the boundary information to extract base-view extents and dependent-view extents from each extent SS, transmit the base-view extents to the RB1 4021, and transmit the dependent-view extents to the RB2 4022. In the playback device 102 in extended playback mode, the switch 4020 transmits the extents in the file 2D to the RB1 4021 and transmits the extents in the extended stream file to the RB3 4023. Information on whether each extent transmitted from the BD-ROM drive 4001 to switch 4020 belongs to the file 2D or the extended stream file is transmitted from the BD-ROM drive 4001 to the switch 4020.

The RB1 4021, the RB2 4022, and the RB3 4023 are buffer memories that use a memory element in the playback unit 4002. In particular, different areas in a single memory element are used as the RB1 4021, the RB2 4022, and the RB3 4023. Alternatively, different memory elements may be used as the read buffers 4021-4023. The RB1 4021 receives base-view extents from the switch 4020 and stores these extents. The RB2 4022 receives dependent-view extents from the switch 4020 and stores these extents. The RB3 4023 receives extended extents from the switch 4020 and stores these extents.

The system target decoder 4024 reads extents from the read buffers 4021-4023 in units of source packets and demultiplexes the extents. The system target decoder 4024 then decodes each of the elementary streams obtained by the demultiplexing. At this point, the PIDs of the elementary streams to be decoded, as well as information necessary for decoding each elementary stream, such as the type of codec and attributes of the stream, are transferred in advance from the playback control unit 4035 to the system target decoder 4024. Furthermore, the system target decoder 4024 transmits the video frames decoded from the primary video stream (hereinafter referred to as the primary video plane), the video frames decoded from the secondary video stream (hereinafter referred to as the secondary video plane), the PG plane decoded from the PG stream, and the IG plane decoded from the IG stream to the plane adder 4025. These pieces of plane data represent the following: full HD 2D video images in 2D playback mode, a pair of left-view and right-view 2D video images in 3D playback mode, and 4K2K 2D video images in extended playback mode. On the other hand, the system target decoder 4024 mixes the decoded primary audio stream and secondary audio stream and transmits the resultant data to an audio output device, such as an internal speaker 103A of the display device 103. In addition, the system target decoder 4024 receives graphics data from the program execution unit 4034. The graphics data is used for rendering graphics on the screen for a GUI menu or the like and is in a raster data format such as JPEG or PNG. The system target decoder 4024 processes the graphics data for conversion to an image plane and outputs the image plane to the plane adder 4025. Details on the system target decoder 4024 are provided below.

The plane adder 4025 reads the primary video plane, the secondary video plane, the PG plane, the IG plane, and the image plane from the system target decoder 4024 and superimposes these planes one on another to yield one video frame. In particular, in L/R mode, each of the planes is composed of a data pair representing a left view and a right view. The plane adder 4025 superimposes data of the planes representing left views on the primary video plane representing a left view and superimposes data of the planes representing right views on the primary video plane representing a right view. On the other hand, in depth mode, each of the planes is composed of a data pair representing 2D video images and a depth map. Accordingly, the plane adder 4025 first generates a pair of left-view and right-view plane data from each of the planes. Subsequent combination process in depth mode is the same as in L/R mode. The combined video data is converted into a video signal in HDMI format and transmitted to the display device 103. The plane adder 4025 in 2D playback mode transmits video frames for full HD 2D video images. The plane adder 4025 in 3D playback mode alternately transmits a left-view video frame and a right-view video frame. The plane adder 4025 in extended playback mode transmits video frames for 4K2K 2D video images.

The dynamic scenario memory 4031 and static scenario memory 4032 are each a buffer memory. Different memory elements in the control unit 4003 are used as the dynamic scenario memory 4031 and the static scenario memory 4032. Alternatively, different areas in a single memory element may be used as the dynamic scenario memory 4031 and the static scenario memory 4032. The dynamic scenario memory 4031 stores dynamic scenario information, and the static scenario memory 4032 stores static scenario information.

The user event processing unit 4033 detects a user operation via the remote control 105 or the front panel of the playback device 102. Depending on the type of operation, the user event processing unit 4533 requests the program execution unit 4034 or the playback control unit 4035 to perform data processing. For example, when a user instructs to display a pop-up menu by pushing a button on the remote control 105, the user event processing unit 4033 detects the push and identifies the button. The user event processing unit 4033 further requests the program execution unit 4034 to execute a command corresponding to the button, i.e. a command to display the pop-up menu. On the other hand, when a user pushes a fast-forward or a rewind button on the remote control 105, the user event processing unit 4033 detects the push and identifies the button. The user event processing unit 4033 then requests the playback control unit 4035 to fast-forward or rewind the playlist currently being played back.

The program execution unit 4034 reads programs from MV object files and BD-J object files stored in the dynamic scenario memory 4031 and executes these programs. Furthermore, the program execution unit 4034 performs the following operations in accordance with the programs: (1) The program execution unit 4034 orders the playback control unit 4035 to perform playlist playback. (2) The program execution unit 4034 generates graphics data for a menu or game as PNG or JPEG raster data, transfers the generated data to the system target decoder 4024, and causes the generated data to be combined with other plane data. Via program design, specific details on these processes can be designed relatively flexibly. In other words, during the authoring process of the BD-ROM disc 101, the nature of these processes is determined while programming the MV object files and BD-J object files.

The playback control unit 4035 controls transfer of different types of files from the BD-ROM disc 101 to the read buffers 4021-4023, the dynamic scenario memory 4031, and the static scenario memory 4032. The file system of the BD-ROM disc 101 is used for this control. Specifically, when a certain file is to be transferred, the playback control unit 4035 first refers to the name of the file to retrieve the file entry of the file within the directory-file structure on the BD-ROM disc 101. Next, the playback control unit 4035 refers to the file entry to specify sectors of the BD-ROM disc 101 in which extents of the file to be transferred are recorded. Subsequently, the playback control unit 4035 instructs the BD-ROM drive 4001 to read data from the sectors. In response to this instruction, the BD-ROM drive 4001 transfers, in units of extents, the file to be transferred from the BD-ROM disc 101 to the buffer memories 4021-4023, 4031, and 4032.

The playback control unit 4035 decodes video data and audio data from the AV stream file by controlling the BD-ROM drive 4001 and the system target decoder 4024. Specifically, the playback control unit 4035 first reads a playlist file from the static scenario memory 4032, in response to an instruction from the program execution unit 4034 or a request from the user event processing unit 4033, and interprets the content of the file. In accordance with the interpreted content, particularly with the playback path, the playback control unit 4035 then specifies an AV stream file to be played back and instructs the BD-ROM drive 4001 and the system target decoder 4024 to read and decode the specified file. Such playback according to a playlist file is called "playlist playback."

In the playback device 102 in 2D playback mode, when the playback control unit 4035 is instructed by the program execution unit 4034 or another unit to perform playlist playback, the playback control unit 4035 reads PIs in order from the 2D playlist file stored in the static scenario memory 4032, setting the read PI as the current PI. Each time the playback control unit 4035 sets the current PI, it first sets operation conditions on the system target decoder 4024 in accordance with the STN table. In particular, the playback control unit 4035 selects the PID of the elementary stream for decoding and transmits the PID, together with the attribute information necessary for decoding the elementary stream, to the system target decoder 4024. Next, in accordance with the current PI, the playback control unit 4035 indicates a range of LBNs to the BD-ROM drive 4001 via the procedures indicated in the description about FIG. 32; in the sectors located within the range of the LBNs, extents of the file 2D to be read are recorded.

In the playback device 102 in 3D playback mode, when the playback control unit 4035 is instructed by the program execution unit 4034 or another unit to perform playlist playback, the playback control unit 4035 reads PIs in order from the 3D playlist file stored in the static scenario memory 4032, setting the read PI as the current PI. Each time the playback control unit 4035 sets the current PI, it sets operation conditions on the system target decoder 4024 and the plane adder 4025 in accordance with the STN table of the PI and the STN table SS in the 3D playlist file. In particular, the playback control unit 4035 selects the PID of the elementary stream for decoding and transmits the PID, together with the attribute information necessary for decoding the elementary stream, to the system target decoder 4024. Next, in accordance with the current PI, the playback control unit 4035 indicates a range of LBNs to the BD-ROM drive 4001 via the procedures indicated in the description about FIG. 35; in sectors located within the range of LBNs, extents of the file SS to be read are recorded. Meanwhile, the playback control unit 4035 refers to the extent start points in the clip information file stored in the static scenario memory 4032 to generate information on the boundaries of extents of the file SS, and then transmitting the boundary information to the switch 4020.

In the playback device 102 in extended playback mode, when the playback control unit 4035 is instructed by the program execution unit 4034 or another unit to perform playlist playback, the playback control unit 4035 reads PIs in order from the extended playlist file stored in the static scenario memory 4032, setting the read PI as the current PI. Each time the playback control unit 4035 sets the current PI, it first sets operation conditions on the system target decoder 4024 in accordance with the STN table of the PI and the STN table EX in the extended playlist file. In particular, the playback control unit 4035 selects the PID of the elementary stream for decoding and transmits the PID, together with the attribute information necessary for decoding the elementary stream, to the system target decoder 4024. Next, in accordance with the current PI, the playback control unit 4035 indicates a range of LBNs to the BD-ROM drive 4001 via the procedures indicated in the description about FIG. 38; in sectors located within the range of LBNs, extents of the file 2D and extended stream file to be read are recorded.

In addition, the playback control unit 4035 sets various types of player variables in the player variable storage unit 4036 using the static scenario information. With reference to the player variables, the playback control unit 4035 further specifies to the system target decoder 4024 the PIDs of the elementary streams to be decoded and provides the information necessary for decoding the elementary streams.

The player variable storage unit 4036 is composed of a group of registers for storing player variables. Types of player variables include system parameters (SPRM) and general parameters (GPRM). An SPRM indicates the status of the playback device 102. There may, for example, be 64 SPRMs that have the meanings listed below.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for karaoke
SPRM(12): Country code for parental management
SPRM(13): Parental level
SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24)-SPRM(63): Reserved The SPRM(10) indicates the PTS of the picture currently being decoded and is updated every time a picture is decoded. Accordingly, the current playback point can be known by referring to the SPRM(10).

The language code for audio stream in SPRM(16) and the language code for subtitle stream in SPRM(18) show default language codes of the playback device 102. These codes may be changed by a user with use of the OSD or the like of the playback device 102, or the codes may be changed by an application program via the program execution unit 4034. For example, if the SPRM(16) shows "English," then during playlist playback, the playback control unit 4035 first searches the STN table in the PI showing the current playback section, i.e. the current PI, for a stream entry having the language code for "English." The playback control unit 4035 then extracts the PID from the stream identification information of the stream entry and transmits the extracted PID to the system target decoder 4024. As a result, an audio stream having the PID is selected and decoded by the system target decoder 4024. These processes can be executed by the playback control unit 4035 with use of the MV object file or the BD-J object file.

During playback, the playback control unit 4035 updates the player variables in accordance with the status of playback. The playback control unit 3735 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the SPRM(1) has been changed by the program execution unit 4034. In this case, the playback control unit 4035 first refers to the STN shown by the new SPRM(1) and retrieves the stream entry that includes this STN from the STN table in the current PI. The playback control unit 4035 then extracts the PID from the stream identification information in the stream entry and transmits the extracted PID to the system target decoder 4024. As a result, an audio stream having the PID is selected and decoded by the system target decoder 4024. This is how the audio stream to be played back is switched. The subtitle stream and the secondary video stream to be played back can be similarly switched.

<<2D Playlist Playback>>

Figure 41:
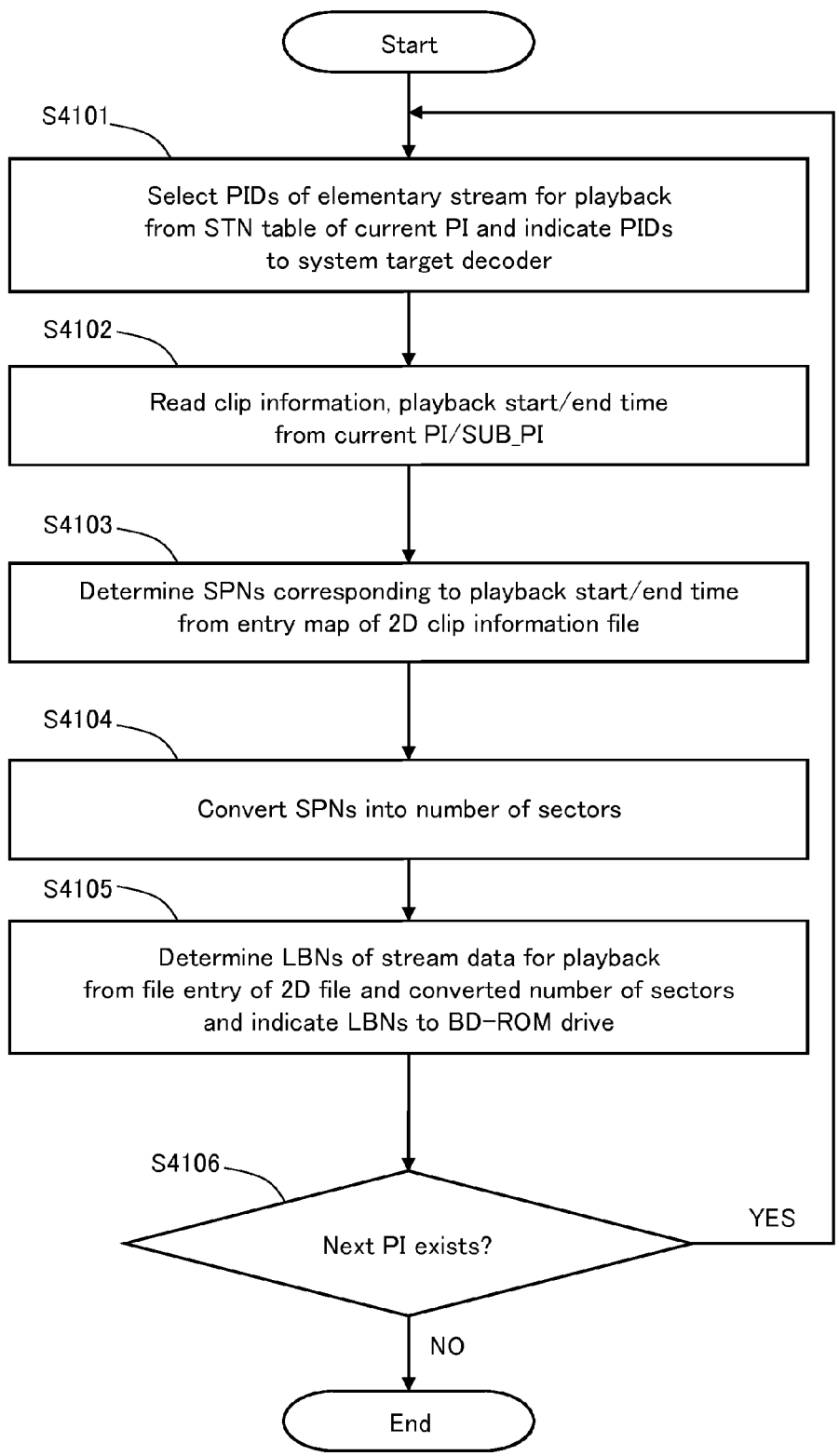
FIG. 41 is a flowchart of 2D playlist playback by a playback control unit 4035.

FIG. 41 is a flowchart of 2D playlist playback by a playback control unit 4035. 2D playlist playback is performed according to a 2D playlist file and is started when the playback control unit 4035 reads a 2D playlist file from the static scenario memory 4032.

In step S4101, the playback control unit 4035 first reads a single PI from the main path in the 2D playlist file and then sets the PI as the current PI. Next, from the STN table of the current PI, the playback control unit 4035 selects PIDs of elementary streams to be played back and specifies attribute information necessary for decoding the elementary streams. The selected PIDs and attribute information are indicated to the system target decoder 4024. The playback control unit 4035 further specifies a SUB_PI associated with the current PI from the sub-paths in the 2D playlist file. Thereafter, the process proceeds to step S4102

In step S4102, the playback control unit 4035 reads reference clip information, a PTS #1 indicating a playback start time IN1, and a PTS #2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, the process proceeds to step S4103.

In step S4103, the playback control unit 4035 refers to the entry map in the 2D clip information file to retrieve from the file 2D the SPN #1 and SPN #2 that correspond to the PTS #1 and PTS #2. The pair of PTSs indicated by the SUB_PI is also converted to a pair of SPNs. Thereafter, the process proceeds to step S4104.

In step S4104, from the SPN #1 and the SPN #2, the playback control unit 4035 calculates the number of sectors corresponding to the SPN #1 and the SPN #2. Specifically, the playback control unit 4035 first obtains the product of each of the SPN #1 and the SPN #2 multiplied by the data amount per source packet, i.e. 192 bytes. Next, the playback control unit 4035 obtains a quotient by dividing each product by the data amount per sector, i.e. 2048 bytes: N1=SPN #1×192/2048, N2=SPN #2×192/2048. The quotients N1 and N2 are the same as the total number of sectors, in the main TS, recorded in portions previous to the source packets to which SPN #1 and SPN #2 are allocated, respectively. The pair of SPNs converted from the pair of PTSs indicated by the SUB_PI is similarly converted to a pair of numbers of sectors. Thereafter, the process proceeds to step S4105.

In step S4105, the playback control unit 4035 specifies LBNs from the numbers of sectors N1 and N2 obtained in step S4104; at the LBNs, the top and end of extents to be played back are located. Specifically, with reference to the file entry of the file 2D to be played back, the playback control unit 4035 counts from the top of sectors in which the extents are recorded, in order to specify the LBN of the $(N1+1)^{th}$ sector=LBN #1 and the LBN of the $(N2+1)^{th}$ sector=LBN #2. The playback control unit 4035 further specifies a range from LBN #1 to LBN #2 to the BD-ROM drive 4001. The pair of numbers of sectors converted from the pair of PTSs indicated by the SUB_PI is similarly converted to a pair of LBNs and specified to the BD-ROM drive 4001. As a result, from the sectors located within the specified range, source packets belonging to extents are read in aligned units. Thereafter, the process proceeds to step S4106.

In step S4106, the playback control unit 4035 checks whether an unprocessed PI remains in the main path. When an unprocessed PI remains, the process is repeated from step S4101. When no unprocessed PI remains, the process is ended.

<<3D Playlist Playback>>

Figure 42:
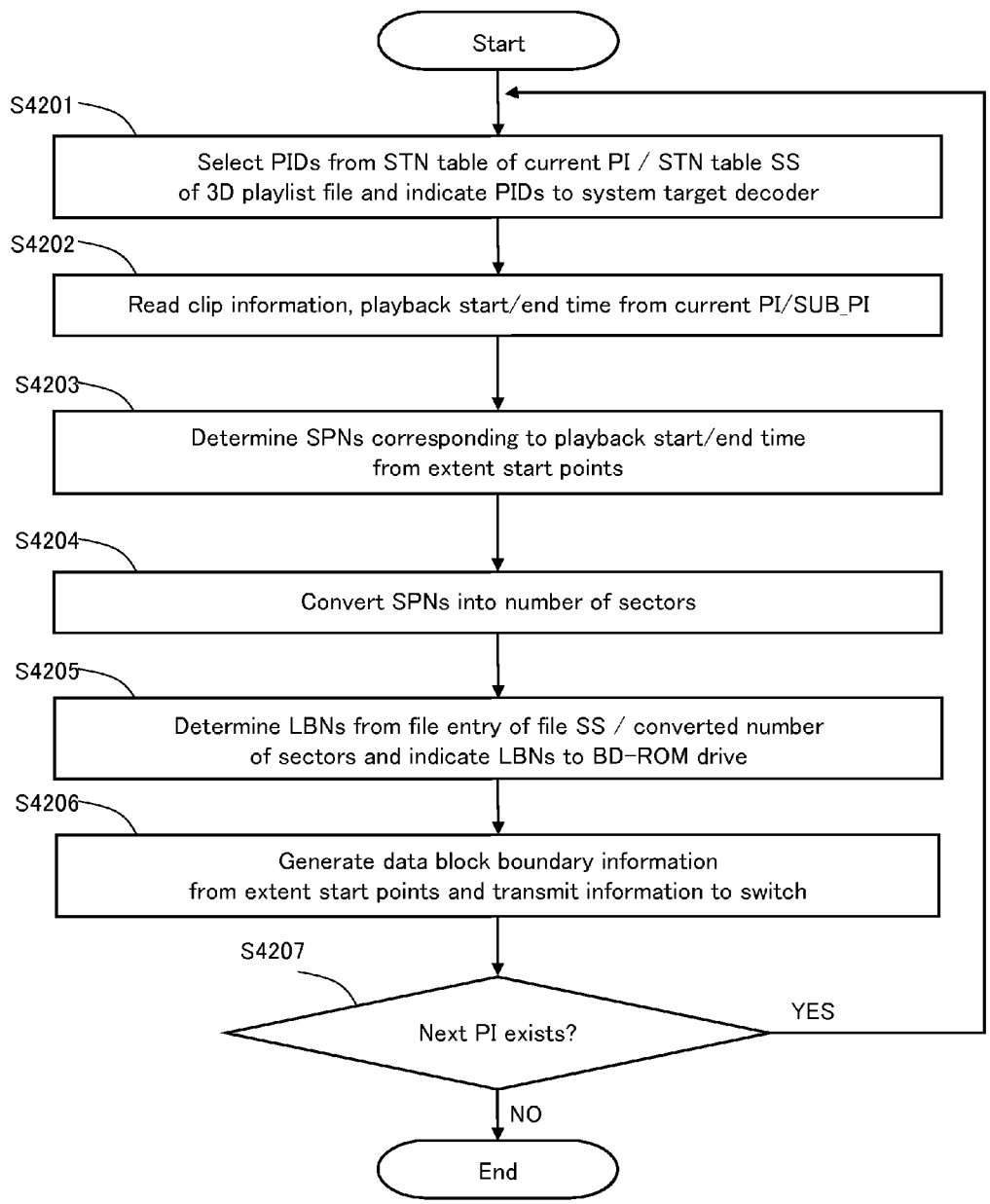
FIG. 42 is a flowchart of 3D playlist playback by the playback control unit 4035.

FIG. 42 is a flowchart of 3D playlist playback by a playback control unit 4035. 3D playlist playback is performed according to a 3D playlist file and is started when the playback control unit 4035 reads a 3D playlist file from the static scenario memory 4032.

In step S4201, the playback control unit 4035 first reads a single PI from the main path in the 3D playlist file and then sets the PI as the current PI. Next, from the STN table of the current PI, the playback control unit 4035 selects PIDs of elementary streams to be played back and specifies attribute information necessary for decoding the elementary streams. The playback control unit 4035 further selects, from among the elementary streams corresponding to the current PI in the STN table SS 3330 in the 3D playlist file, PIDs of additional elementary streams for playback, and the playback control unit 4035 specifies attribute information necessary for decoding these elementary streams. The selected PIDs and attribute information are indicated to the system target decoder 4024. The playback control unit 4035 additionally specifies, from among sub-paths in the 3D playlist file, a SUB_PI to be referenced at the same time as the current PI, specifying this SUB_PI as the current SUB_PI. Thereafter, the process proceeds to step S4202.

In step S4202, the playback control unit 4035 reads reference clip information, a PTS #1 indicating a playback start time IN1, and a PTS #2 indicating a playback end time OUT1 from the current PI and the SUB_PI. From this reference clip information, clip information files corresponding to the file 2D and the file DEP to be played back are specified. Thereafter, the process proceeds to step S4203.

In step S4203, with reference to the entry map in each of the clip information files specified in step S4202, the playback control unit 4035 retrieves the SPN #1 and SPN #2 in the file 2D, and the SPN #11 and SPN #12 in the file DEP, corresponding to the PTS #1 and the PTS #2. Referring to extent start points of each clip information file, the playback control unit 4035 further calculates, from the SPN #1 and the SPN #11, the number of source packets SPN #21 from the top of the file SS to the playback start position. The playback control unit 5035 also calculates, from the SPN #2 and the SPN #12, the number of source packets SPN #22 from the top of the file SS to the playback end position. Specifically, the playback control unit 4035 first retrieves, from among SPNs shown by extent start points of the 2D clip information file, a value "Am" that is the largest value less than or equal to SPN #1, and retrieves, from among the SPNs shown by extent start points of the DEP clip information file, a value "Bm" that is the largest value less than or equal to the SPN #11. The playback control unit 4035 then obtains the sum of the retrieved SPNs Am+Bm and sets the sum as SPN #21. Next, the playback control unit 4035 retrieves, from among SPNs shown by extent start points of the 2D clip information file, a value "An" that is the smallest value that is larger than the SPN #2, and retrieves, from among the SPNs shown by extent start points of the DEP clip information files, a value "Bn" that is the smallest value that is larger than the SPN #12. The playback control unit 4035 then obtains the sum of the retrieved SPNs An+Bn and sets the sum as SPN #22. Thereafter, the process proceeds to step S4204.

In step S4204, the playback control unit 4035 converts the SPN #21 and the SPN #22, determined in step S4203, into a pair of numbers of sectors N1 and N2. Specifically, the playback control unit 4035 first obtains the product of SPN #21 and the data amount per source packet, i.e. 192 bytes. Next, the playback control unit 4035 divides this product by the data amount per sector, i.e. 2048 bytes: SPN #21×192/2048. The resulting quotient is the same as the number of sectors N1 from the top of the file SS to immediately before the playback start position. Similarly, from the SPN #22, the playback control unit 4035 calculates SPN #22×192/2048. The resulting quotient is the same as the number of sectors N2 from the top of the file SS to immediately before the playback end position. Thereafter, the process proceeds to step S4205.

In step S4205, the playback control unit 4035 specifies LBNs from the numbers of sectors N1 and N2 obtained in step S4204; at the LBNs, the start and end of the extents to be played back are located. Specifically, with reference to the file entry of the file SS to be played back, the playback control unit 4035 counts from the top of the sectors in which the extents are recorded, in order to specify the LBN of the $(N1+1)^{th}$ sector=LBN #1 and the LBN of the $(N2+1)^{th}$ sector=LBN #2. The playback control unit 4035 further specifies the range from LBN #1 to LBN #2 to the BD-ROM drive 4001. As a result, from the sectors located within the specified range, source packets belonging to extents are read in aligned units. Thereafter, the process proceeds to step S4206

In step S4206, the playback control unit 4035 again refers to the extent start points of the clip information file used in step S4203 to generate boundary information for extents of the file SS, then transmitting the boundary information to the switch 4020. As a specific example, assume that SPN #21 indicating the playback start position is the same as the sum of SPNs indicating the extent start points, An+Bn, and that SPN #22 indicating the playback end position is the same as the sum of SPNs indicating the extent start points, Am+Bm. In this case, the playback control unit 4035 obtains a sequence of differences between SPNs from the respective extent start points, A(n+1)–An, B(n+1)–Bn, A(n+2)–A(n+1), B(n+2)–B(n+1), . . . , Am–A(m–1), and Bm–B(m–1), and transmits the sequence to the switch 4020 as the boundary information. As shown in FIG. 29E, this sequence indicates the number of source packets in each of the base-view extents and dependent-view extents included in the extents in the file SS. The switch 4020 counts, from zero, the number of source packets of the extents in the file SS received from the BD-ROM drive 4001. Each time the count is the same as the difference between SPNs indicated by the boundary information, the switch 4020 switches the destination of output of the source packets between the RB1 4021 and RB2 4022 and resets the count to zero. As a result, {B(n+1)–Bn} source packets from the top of each extent SS in the file SS, i.e. the first dependent-view extent, are output to the RB2 4022, and the following {A(n+1)–An} source packets, i.e. the first base-view extent, are transmitted to the RB1 4021. Thereafter, dependent-view extents and base-view extents are extracted from the extents in the file SS alternately in the same way, alternating each time the number of source packets received by the switch 4020 is the same as the difference between SPNs indicated by the boundary information. Thereafter, the process proceeds to step S4207.

In step S4207, the playback control unit 4035 checks whether an unprocessed PI remains in the main path. When an unprocessed PI remains, the process is repeated from step S4201. When no unprocessed PI remains, the process is ended.

<<Extended Playlist Playback>>

Figure 43:
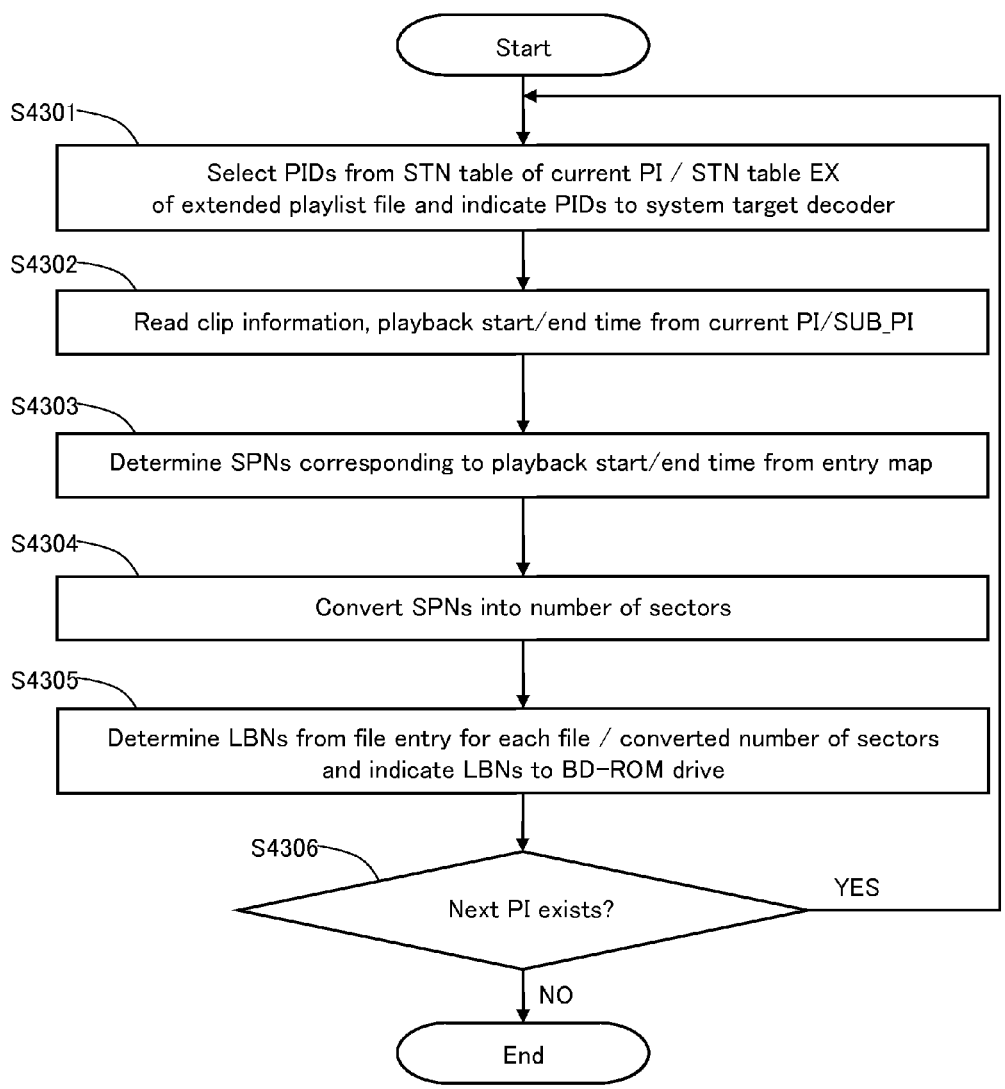
FIG. 43 is a flowchart of extended playlist playback by the playback control unit 4035.

FIG. 43 is a flowchart of extended playlist playback by the playback control unit 4035. Extended playlist playback is performed according to an extended playlist file and is started when the playback control unit 4035 reads the extended playlist file from the static scenario memory 4032.

In step S4301, the playback control unit 4035 first reads one PI from the main path in the extended playlist file and then sets the PI as the current PI. Next, from the STN table of the current PI, the playback control unit 4035 selects PIDs of elementary streams to be played back and specifies attribute information necessary for decoding the elementary streams. In addition, from the entry that is included in the STN table EX 3630 of the extended playlist file and corresponds to the current PI, the playback control unit 4035 selects the PID of resolution extension information and specifies the attribute information necessary for decoding the resolution extension information. The selected PID and attribute information are indicated to the system target decoder 4024. The playback control unit 4035 further specifies a SUB_PI to be referenced at the same time as the current PI from the sub-path of the extended playlist file, and sets this SUB_PI as the current SUB_PI. Thereafter, the process proceeds to step S4302.

In step S4302, the playback control unit 4035 reads reference clip information, PTS #1 indicating a playback start time IN1, and PTS #2 indicating a playback end time OUT1 from each of the current PI and SUB_PI. From the reference clip information, clip information files individually corresponding to the file 2D and the extended stream file to be played back are specified. Thereafter, the process proceeds to step S4303.

In step S4303, the playback control unit 4035 refers to the entry map in each of the clip information files specified in step S4302, and then retrieves the pair of SPN #1 and SPN #2 in the file 2D and the pair of SPN #11 and SPN #12 in the extended stream file, the pairs correspond to the pair of PTS #1 and PTS #2. Thereafter, the process proceeds to step S4304.

In step S4304, the playback control unit 4035 calculates the corresponding numbers of sectors from SPN #1, #2, #11, and #12. Specifically, the playback control unit 4035 first multiplies each of SPN #1, #2, #11, and #12 by the data amount per source packet, i.e., 192 bytes. Next, the playback control unit 4035 divides 192 bytes times each of the SPNs by the data amount per sector, i.e., 2048 bytes: N1=SPN #1×192/2048, N2=SPN #2×192/2048, N11=SPN #11×192/2048, and N12=SPN #12×192/2048. The quotients N1 and N2 are equal to the total numbers of sectors in which first and second portions of the main TS are recorded, respectively; the first and second portions are located before the source packets to which SPN #1 and SPN #2 are allocated, respectively. The quotients N11 and N12 are equal to the total numbers of sectors in which first and second portions of the extended stream are recorded, respectively; the first and second portions are located before the source packets to which SPN #11 and SPN #12 are allocated, respectively. Thereafter, the process proceeds to step S4305.

In step S4305, the playback control unit 4035 determines LBNs that should be assigned to the start and end of extents of the file 2D to be played back from the numbers of sectors N1 and N2 obtained in step S4304; and determines LBNs that should be assigned to the start and end of extents of the extended stream file to be played back from the numbers of sectors N11 and N12 obtained in step S4304. Specifically, the playback control unit 4035 refers to the file entry of the file 2D to be played back to specify the LBN of the $(N1+1)^{th}$ sector=LBN #1 and the LBN of the $(N2+1)^{th}$ sector=LBN #2 counting from the top of the sectors in which the extents of the file 2D are recorded. Furthermore, the playback control unit 4035 refers to the file entry of the extended stream file to be played back to specify the LBN of the $(N11+1)^{th}$ sector=LBN #11 and the LBN of the $(N12+1)^{th}$ sector=LBN #12 counting from the top of the sectors in which the extents of the extended stream file are recorded. The playback control unit 4035 then indicates the range from LBN #1 to LBN #2 and the range from LBN #11 to LBN #12 to the BD-ROM drive 4001. As a result, the extents of the file 2D and extended stream file are read from the sectors located within the indicated ranges, beginning from the extent with its top located at the smallest LBN. Thereafter, the process proceeds to step S4306.

In step S4306, the playback control unit 4035 checks whether an unprocessed PI remains in the main path. When an unprocessed PI remains, the process is repeated from step S4301. When no unprocessed PI remains, the process is ended.

<<System Target Decoder>>

[Structure in 2D Playback Mode]

Figure 44:
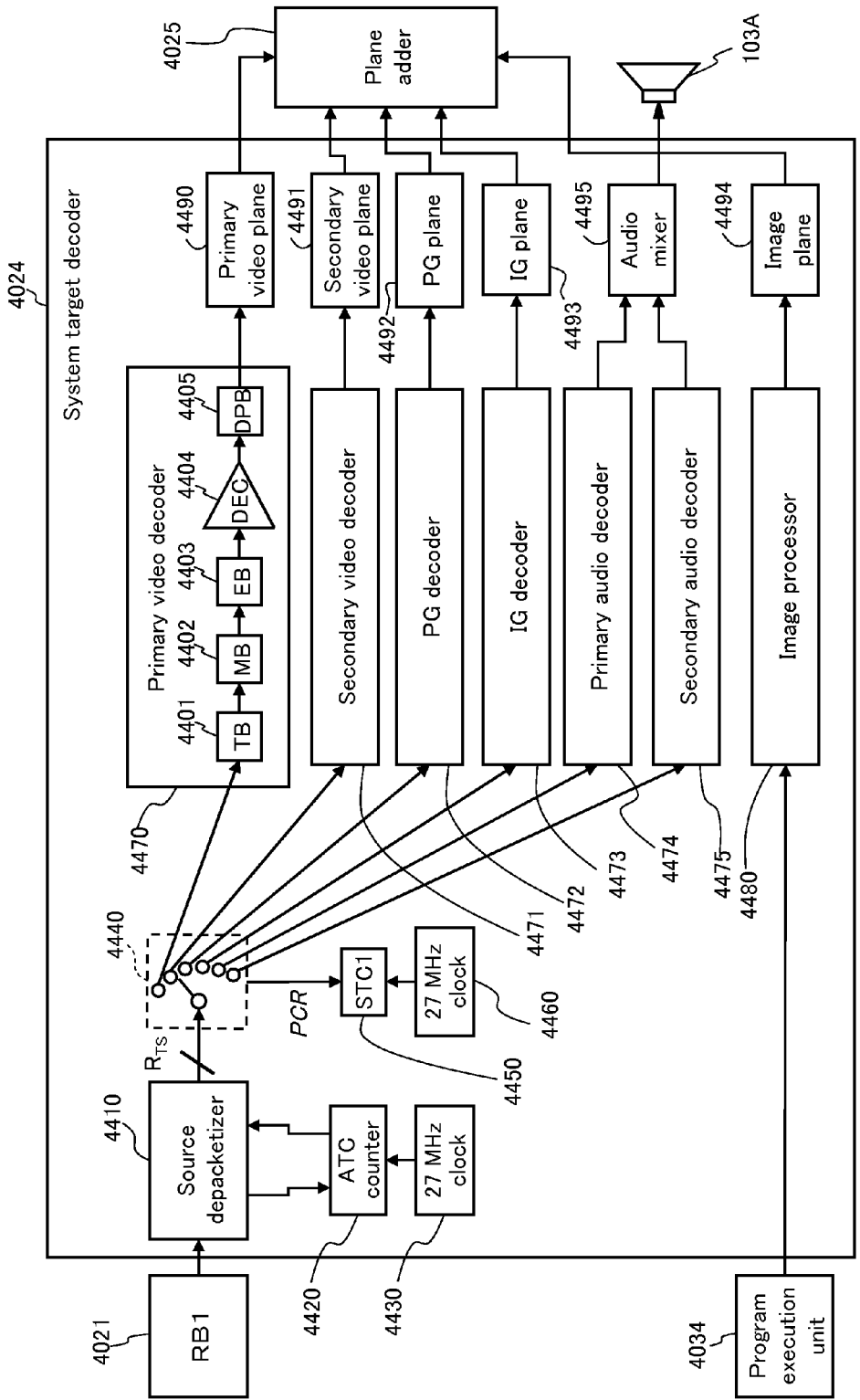
FIG. 44 is a functional block diagram of a system target decoder 4024 in 2D playback mode.

FIG. 44 is a functional block diagram of the system target decoder 4024 in 2D playback mode. As shown in FIG. 44, the system target decoder 4024 includes a source depacketizer 4410, ATC counter 4420, first 27 MHz clock 4430, PID filter 4440, STC counter (STC1) 4450, second 27 MHz clock 4460, primary video decoder 4470, secondary video decoder 4471, PG decoder 4472, IG decoder 4473, primary audio decoder 4474, secondary audio decoder 4475, image processor 4480, primary video plane memory 4490, secondary video plane memory 4491, PG plane memory 4492, IG plane memory 4493, image plane memory 4494, and audio mixer 4495.

The source depacketizer 4410 reads source packets from the RB1 4021, extracts the TS packets from the read source packets, and transfers the TS packets to the PID filter 4440. Furthermore, the source depacketizer 4410 synchronizes the time of the transfer with the time shown by the ATS of each source packet. Specifically, the source depacketizer 4410 first monitors the value of the ATC generated by the ATC counter

4420. In this case, the value of the ATC is incremented by the ATC counter 4420 in accordance with a pulse of a clock signal from the first 27 MHz clock 4430. Subsequently, at the instant the value of the ATC matches with the ATS of a source packet, the source depacketizer 4410 transfers the TS packets extracted from the source packet to the PID filter 4440. By adjusting the time of transfer in this way, the mean transfer rate of TS packets from the source depacketizer 4410 to the PID filter 4440 does not surpass the value $R_{TS}$ specified by the system rate 2711 in the 2D clip information file 231 shown in FIG. 27.

The PID filter 4440 first monitors a PID that includes each TS packet outputted by the source depacketizer 4410. When the PID matches with a PID pre-specified by the playback control unit 4035, the PID filter 4440 selects the TS packet and transfers it to the decoder 4470-4475 appropriate for decoding of the elementary stream indicated by the PID. For example, if a PID is 0x1011, the TS packets are transferred to the primary video decoder 4470. TS packets with PIDs ranging from 0x1B00-0x1B1F, 0x1100-0x111F, 0x1A00-0x1A1F, 0x1200-0x121F, and 0x1400-0x141F are transferred to the secondary video decoder 4471, primary audio decoder 4474, secondary audio decoder 4475, PG decoder 4472, and IG decoder 4473, respectively.

The PID filter 4440 further detects a PCR from TS packets using the PIDs of the TS packets. At each detection, the PID filter 4440 sets the value of the STC counter 4450 to a predetermined value. Then, the value of the STC counter 4450 is incremented in accordance with a pulse of the clock signal of the second 27 MHz clock 4460. In addition, the value to which the STC counter 4450 is set is indicated to the PID filter 4440 from the playback control unit 4035 in advance. The decoders 4470-4475 each use the value of the STC counter 4450 as the STC. Specifically, the decoders 4470-4475 first reconstruct the TS packets received from the PID filter 4440 into PES packets. Next, the decoders 4470-4475 adjust the timing of the decoding of data included in the PES payloads in accordance with the times indicated by the PTSs or the DTSs included in the PES headers.

The primary video decoder 4470, as shown in FIG. 44, includes a transport stream buffer (TB) 4401, multiplexing buffer (MB) 4402, elementary stream buffer (EB) 4403, compressed video decoder (DEC) 4804, and decoded picture buffer (DPB) 4405.

The TB 4401, MB 4402, and EB 4403 are each a buffer memory and use an area of a memory element internally provided in the primary video decoder 4470. Alternatively, some or all of the buffer memories may be separated between different memory elements. The TB 4401 stores the TS packets received from the PID filter 4440 as they are. The MB 4402 stores PES packets reconstructed from the TS packets stored in the TB 4401. Note that when the TS packets are transferred from the TB 4401 to the MB 4402, the TS header is removed from each TS packet. The EB 4403 extracts encoded VAUs from the PES packets and stores the VAUs therein. A VAU includes a compressed picture, i.e., an I picture, B picture, or P picture. Note that when data is transferred from the MB 4402 to the EB 4403, the PES header is removed from each PES packet.

The DEC 4404 is a hardware decoder designed specifically for decoding of compressed pictures and is composed of an LSI that includes, in particular, a function to accelerate the decoding. The DEC 4404 decodes a picture from each VAU in the EB 4403 at the time shown by the DTS included in the original PES packet. During decoding, the DEC 4404 first analyzes the VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 4404 transmits the decoded, uncompressed picture to the DPB 4405.

Like the TB 4401, MB 4402, and EB 4403, the DPB 4405 is a buffer memory that uses an area of a built-in memory element in the primary video decoder 4470. Alternatively, the DPB 4405 may be located in a memory element separate from the other buffer memories 4401, 4402, and 4403. The DPB 4405 temporarily stores the decoded pictures. When a P picture or B picture is to be decoded by the DEC 4404, the DPB 4405 retrieves reference pictures, in response to an instruction from the DEC 4404, from among stored, decoded pictures. The DPB 4005 then provides the reference pictures to the DEC 4404. Furthermore, the DPB 4405 writes the stored pictures into the primary video plane memory 4490 at the time shown by the PTSs included in the original PES packets.

The secondary video decoder 4471 includes the same structure as the primary video decoder 4470. The secondary video decoder 4471 first decodes the TS packets of the secondary video stream received from the PID filter 4440 into uncompressed pictures. Subsequently, the secondary video decoder 4471 writes uncompressed pictures into the secondary video plane memory 4491 at the times shown by the PTSs included in the PES packets of the secondary video stream.

The PG decoder 4472 decodes the TS packets received from the PID filter 4440 into an uncompressed graphics object. The PG decoder 4472 then writes the uncompressed graphics object to the PG plane memory 4492 at the time shown by the PTSs included in the PES packets decoded from the TS packets.

The IG decoder 4473 decodes the TS packets received from the PID filter 4440 into an uncompressed graphics object. The IG decoder 4473 then writes the uncompressed graphics object to the IG plane memory 4493 at the time shown by the PTSs included in the PES packets decoded from the TS packets.

The primary audio decoder 4474 first stores the TS packets received from the PID filter 4440 in a buffer provided therein. Subsequently, the primary audio decoder 4474 removes the TS header and the PES header from each TS packet in the buffer, and decodes the remaining data into uncompressed LPCM audio data. Furthermore, the primary audio decoder 4474 transmits the resultant audio data to the audio mixer 4495 at the time shown by the PTS included in the original PES packet. The primary audio decoder 4474 selects the decoding method for compressed audio data in accordance with the compression encoding method and stream attributes for the primary audio stream included in the TS packets. Compression encoding methods include, for example, AC-3 and DTS.

The secondary audio decoder 4475 has the same structure as the primary audio decoder 4474. The secondary audio decoder 4475 first reconstructs PES packets from the TS packets of the secondary audio stream received from the PID filter 4440 and then decodes the data included in the PES payloads into uncompressed LPCM audio data. Subsequently, the secondary audio decoder 4475 transmits the uncompressed LPCM audio data to the audio mixer 4495 at the times shown by the PTSs included in the PES headers. The secondary audio decoder 4475 selects the decoding method for compressed audio data in accordance with the compression encoding method and stream attributes for the secondary audio stream included in the TS packets. Compression encoding methods include, for example, Dolby Digital Plus and DTS-HD LBR.

The audio mixer 4495 receives uncompressed audio data from both the primary audio decoder 4474 and the secondary audio decoder 4475 and then mixes the received data. The audio mixer 4495 also transmits the synthesized sound yielded by mixing audio data to, for example, an internal speaker 103A of the display device 103.

The image processor 4480 receives graphics data, i.e., PNG or JPEG raster data, from the program execution unit 4034. Upon receiving the graphics data, the image processor 4480 renders the graphics data and writes the graphics data to the image plane memory 4494.

The primary video plane memory 4490, secondary video plane memory 4491, PG plane memory 4492, IG plane memory 4493, and image plane memory 4494 are reserved as different areas in a memory element internal to the system target decoder 4024. Alternatively, the plane memories 4490-4494 may be separated between different memory elements. The plane memories 4490-4494 can store the corresponding plane data and are equal in size to at least one video frame.

[Structure in 3D Playback Mode]

Figure 45:
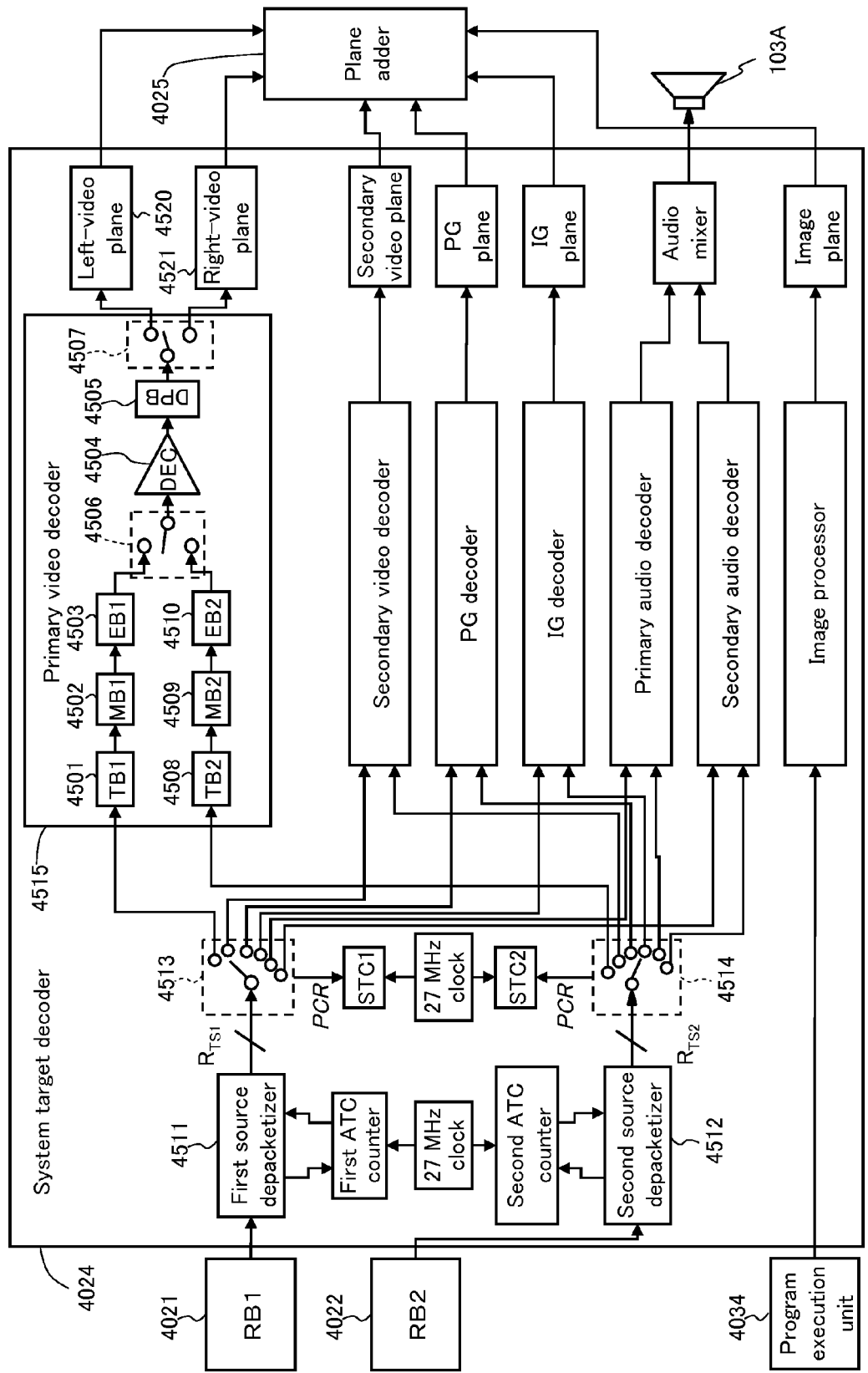
FIG. 45 is a functional block diagram of the system target decoder 4024 in 3D playback mode.

FIG. 45 is a functional block diagram of the system target decoder 4024 in 3D playback mode. The components shown in FIG. 45 differ from those shown in FIG. 44 in the following three points. (1) The input system from the read buffer to each of the decoders is doubled. (2) The primary video decoder, the secondary video decoder, the PG decoder, and the IG decoder can all decode the main TS and the sub-TS alternately. (3) Each plane memory can store plane data representing the left view and the right view. On the other hand, the primary audio decoder, secondary audio decoder, audio mixer, and image processor are the same as those shown in FIG. 44. Accordingly, among the components shown in FIG. 45, those differing from the components shown in FIG. 44 are described below. Details on similar elements can be found in the description about FIG. 44. Furthermore, since the decoders each have a similar structure, only the structure of the primary video decoder 4515 is described below. This description is also valid for the structure of the other decoders.

The first source depacketizer 4511 reads source packets from the RB1 4021, furthermore extracting TS packets included therein and transmitting the TS packets to the first PID filter 4513. The second source depacketizer 4512 reads source packets from the RB2 4022, furthermore extracting TS packets included therein and transmitting the TS packets to the second PID filter 4514. Each of the source depacketizers 4511 and 4512 further synchronizes the time of transfer the TS packets with the time shown by the ATS of each source packet. This synchronization method is the same method as the source depacketizer 4410 shown in FIG. 44. Accordingly, details thereof can be found in the description provided for FIG. 44. With this sort of adjustment of transfer time, the mean transfer rate $R_{TS1}$ of TS packets from the first source depacketizer 4511 to the first PID filter 4513 does not exceed the system rate indicated by the 2D clip information file. Similarly, the mean transfer rate $R_{TS2}$ of TS packets from the second source depacketizer 4512 to the second PID filter 4514 does not exceed the system rate indicated by the DEP clip information file.

The first PID filter 4513 compares the PID of each TS packet received from the first source depacketizer 4511 with the selected PID. The playback control unit 4035 designates the selected PID beforehand in accordance with the STN table in the 3D playlist file. When the two PIDs match with each other, the first PID filter 4513 transfers the TS packets to the decoder assigned to the PID. For example, if a PID is 0x1011, the TS packets are transferred to TB1 4501 in the primary video decoder 4515. On the other hand, TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, and IG decoder respectively.

The second PID filter 4514 compares the PID of each TS packet received from the second source depacketizer 4512 with the selected PID. The playback control unit 4035 designates the selected PID beforehand in accordance with the STN table SS in the 3D playlist file. When the two PIDs match with each other, the second PID filter 4514 transfers the TS packets to the decoder assigned to the PID. For example, if a PID is 0x1012 or 0x1013, the TS packets are transferred to TB2 4508 in the primary video decoder 4515. On the other hand, TS packets with PIDs ranging from 0x1B20-0x1B3F, 0x1220-0x127F, and 0x1420-0x147F are transferred to the secondary video decoder, PG decoder, or IG decoder respectively.

The primary video decoder 4515 includes a TB1 4501, MB1 4502, EB1 4503, TB2 4508, MB2 4509, EB2 4510, buffer switch 4506, DEC 4504, DPB 4505, and picture switch 4507. The TB1 4501, MB1 4502, EB1 4503, TB2 4508, MB2 4509, EB2 4510 and DPB 4505 are all buffer memories. Each of these buffer memories uses an area of a memory element included in the primary video decoder 4515. Alternatively, some or all of these buffer memories may be separated between different memory elements.

The TB1 4501 receives TS packets that include a base-view video stream from the first PID filter 4513 and stores the TS packets as they are. The MB1 4502 decodes PES packets from the TS packets stored in the TB1 4501 and stores the PES packets. The TS headers of the TS packets are removed at this point. The EB1 4503 extracts encoded VAUs from the PES packets stored in the MB1 4502 and stores the VAUs. The PES headers of the PES packets are removed at this point.

The TB2 4508 receives TS packets that include a dependent-view video stream from the second PID filter 4514 and stores the TS packets as they are. The MB2 4509 decodes PES packets from the TS packets stored in the TB2 4508 and stores the PES packets. The TS headers of the TS packets are removed at this point. The EB2 4510 extracts encoded VAUs from the PES packets stored in the MB2 4509 and stores the VAUs. The PES headers of the PES packets are removed at this point.

The buffer switch 4506 transfers the headers of the VAUs stored in the EB1 4503 and the EB2 4510 in response to a request from the DEC 4504. Furthermore, the buffer switch 4506 transfers the compressed picture data for the VAUs to the DEC 4504 at the times indicated by the DTSs included in the original PES packets. In this case, the DTSs are equal for a pair of pictures belonging to the same 3D VAU between the base-view video stream and dependent-view video stream. Accordingly, for a pair of VAUs that have the same DTS, the buffer switch 4506 first transmits the VAU stored in the EB1 4503 to the DEC 4504.

Like the DEC 4404 shown in FIG. 44, the DEC 4504 is a hardware decoder designed specifically for decoding of compressed pictures and is composed of an LSI that includes, in particular, a function to accelerate the decoding. The DEC 4504 decodes the compressed picture data transferred from the buffer switch 4506 in order. During decoding, the DEC 4504 first analyzes each VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 4504 transmits the decoded, uncompressed picture to the DPB 4505.

The DPB 4505 temporarily stores the decoded, uncompressed pictures. When the DEC 4504 decodes a P picture or a B picture, the DPB 4505 retrieves reference pictures from among the stored, uncompressed pictures in response to a request from the DEC 4504 and supplies the retrieved reference pictures to the DEC 4504.

The picture switch 4507 writes the uncompressed pictures from the DPB 4505 to either the left-video plane memory 4520 or the right-video plane memory 4521 at the time indicated by the PTS included in the original PES packet. In this case, the PTSs are equal between a base-view picture and a dependent-view picture belonging to the same 3D VAU. Accordingly, for a pair of pictures that have the same PTS and that are stored by the DPB 4505, the picture switch 4507 first writes the base-view picture in the left-video plane memory 4520 and then writes the dependent-view picture in the right-video plane memory 4521.

[Structure in Extended Playback Mode]

Figure 46:
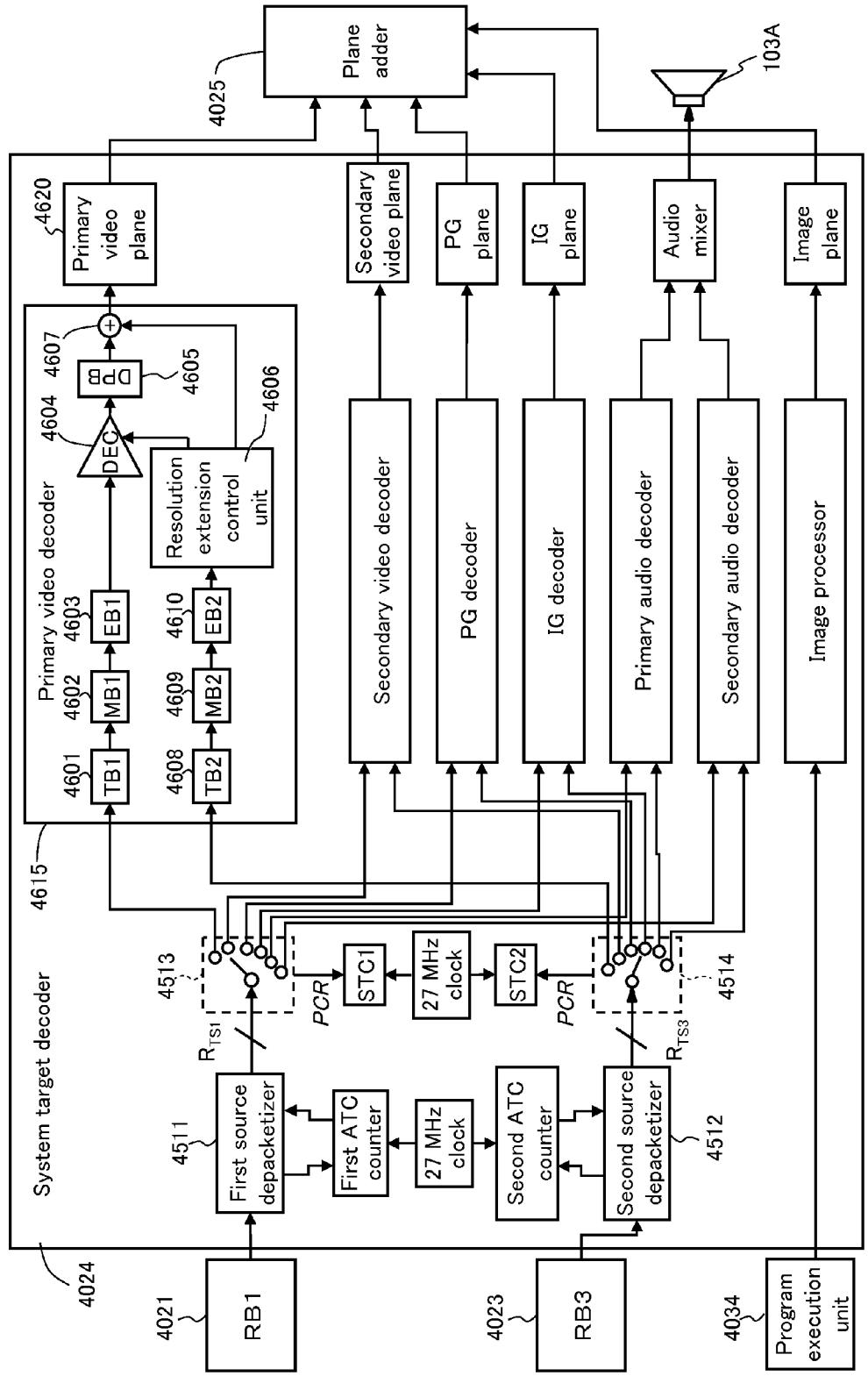
FIG. 46 is a functional block diagram of the system target decoder 4024 in extended playback mode.

FIG. 46 is a functional block diagram of the system target decoder 4024 in extended playback mode. The components shown in FIG. 46 differ from those shown in FIG. 45 in the following two points. (1) The primary video decoder, the secondary video decoder, the PG decoder, and the IG decoder can all decode the main TS and the extended stream alternately. (2) Each plane memory can store 4K2K plane data. On the other hand, the primary audio decoder, secondary audio decoder, audio mixer, and image processor are the same as those shown in FIG. 45. Accordingly, among the components shown in FIG. 46, those differing from the components shown in FIG. 45 are described below. Details on similar elements can be found in the description about FIG. 45. Furthermore, since the decoders each have a similar structure, only the structure of the primary video decoder 4615 is described below. This description is also valid for the structure of the other decoders.

The second source depacketizer 4512 reads source packets from the RB3 4023, furthermore extracting and transmitting TS packets from the source packets to the second PID filter 4514. The mean transfer rate $R_{TS3}$ for the TS packets to be transferred from the second source depacketizer 4512 to the second PID filter 4514 does not exceed the system rate indicated by the extended clip information file.

Every time the second PID filter 4514 receives a TS packet from the second source depacketizer 4512, the second PID filter compares the PID of the TS packet with PIDs to be selected. The PIDs to be selected have been preliminarily specified by the playback control unit 4035 in accordance with the STN table EX of the extended playlist file. When the PID of the TS packet matches with one of the PIDs to be selected, the second PID filter 4514 transfers the TS packet to the decoder assigned to its PID. For example, if the PID is 0x1014, the TS packet is transferred to TB2 4608 in the primary video decoder 4615.

The primary video decoder 4615 includes TB1 4601, MB1 4602, EB1 4603, TB2 4608, MB2 4609, EB2 4610, resolution extension control unit 4606, DEC 4604, DPB 4605, and adder 4607. TB1 4601, MB1 4602, EB1 4603, TB2 4608, MB2 4609, EB2 4610, and DPB 4605 are all buffer memories. Each of these buffer memories uses an area of a memory element included in the primary video decoder 4615. Alternatively, some or all of these buffer memories may be separated into different memory elements.

TB1 4601 receives TS packets that include a base-view video stream from the first PID filter 4513 and stores the TS packets as they are. MB1 4602 decodes PES packets from the TS packets stored in TB1 4601 and stores the PES packets. TS headers are removed from the TS packets at this point. EB1 4603 extracts encoded VAUs from the PES packets stored in MB1 4602 and stores the VAUs. PES headers are removed from the PES packets at this point.

TB2 4608 receives TS packets that include resolution extension information from the second PID filter 4514 and stores the TS packets as they are. MB2 4609 decodes PES packets from the TS packets stored in TB2 4608 and stores the PES packets. TS headers are removed from the TS packets at this point. EB2 4610 extracts encoded VAUs from the PES packets stored in MB2 4609 and stores the VAUs. PES headers are removed from the PES packets at this point.

The resolution extension control unit 4606 reads an extended resolution and an interpolation method from the resolution extension information stored in EB2 4610, and indicates the read information to the DEC 4604. Furthermore, the resolution extension control unit 4606 reads pixel difference information from the resolution extension information, and transmits the pixel difference information to the adder 4607 at the time indicated by the DTS included in the original PES packet. Here, a picture of the base-view video stream and resolution extension information of the extended stream, which are necessary for constituting a 4K2K video frame, have the same DTS Like the DEC 4404 shown in FIG. 44, the DEC 4604 is a hardware decoder designed specifically for decoding of compressed pictures and is composed of an LSI that includes, in particular, a function to accelerate the decoding. The DEC 4604 decodes the compressed picture data transferred from EB1 4603 in order. During decoding, the DEC 4604 first analyzes each VAU header to specify the compression encoding method and stream attributes of the compressed picture stored in the VAU, then selecting a decoding method in accordance with this information. Options of the compression encoding method include, for example, MPEG-2, MPEG-4 AVC, and VC1.

Furthermore, the DEC 4604 uses the interpolation method indicated by the resolution extension control unit 4606 to increase the resolution of the decoded, uncompressed pictures from full HD to the resolution indicated by the resolution extension control unit 4606, i.e., to 4K2K. Here, any of the well-known methods available to increase resolution of video images, such as the bilinear and bicubic methods, is used as the interpolation method. The DEC 4604 transmits the 4K2K pictures to the DPB 4605.

The DPB 4605 temporarily holds the decoded, uncompressed pictures. When the DEC 4604 decodes a P picture or a B picture, the DPB 4605 responds to a request from the DEC 4604 to retrieve one or more reference pictures from among the uncompressed pictures that the DPB 4605 holds, and then supply the reference pictures to the DEC 4604.

The adder 4607 reads a 4K2K picture from the DPB 4605, and in parallel, receives pixel difference information from the resolution extension control unit 4606. Then, the adder 4607 adds the difference in corresponding pixel data contained in the pixel difference information to pixel data contained in the picture. In this way, the video images represented by the 4K2K picture are converted to the original fine-resolution images. The 4K2K picture after converted is written to the primary video plane 4620 at the time indicated by the PTS included in the original PES packet.

[Conversion of Resolution from Full HD to 4K2K]

Figure 47:
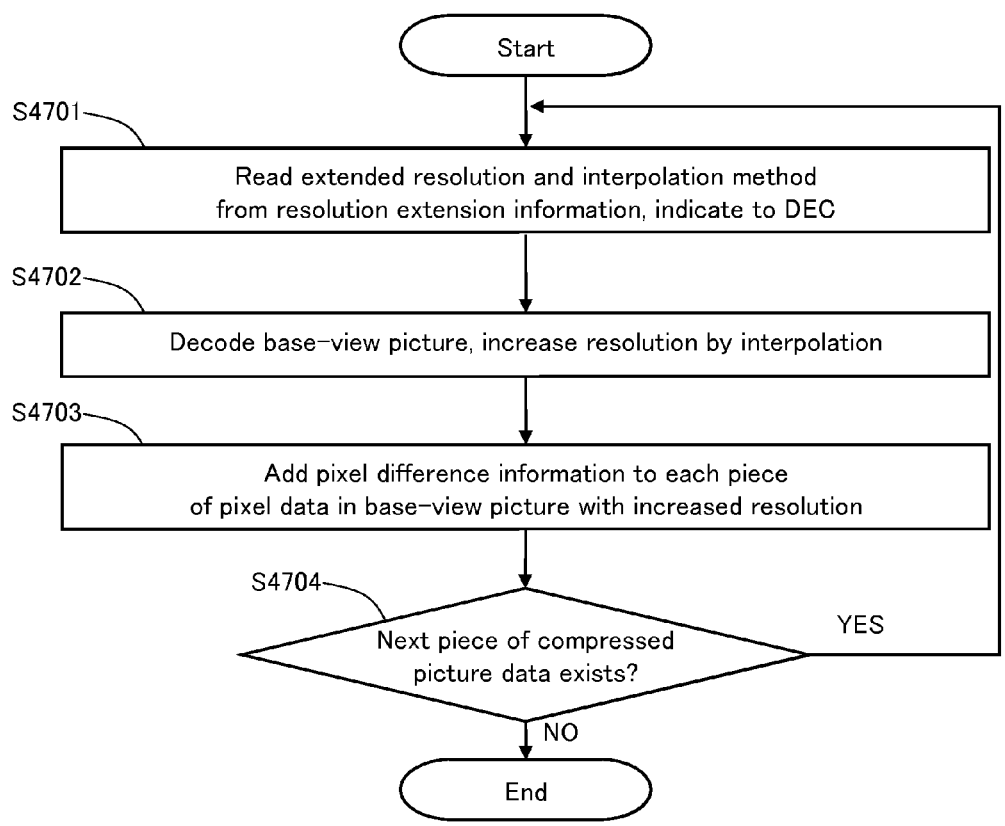
FIG. 47 is a flowchart of resolution conversion from full HD to 4K2K.

FIG. 47 is a flowchart of resolution conversion from full HD to 4K2K. This process is started when resolution extension information begins to be transferred from EB2 4610 to the resolution extension control unit 4606.

In step S4701, the resolution extension control unit 4606 reads an extended resolution and an interpolation method from the resolution extension information. The resolution extension control unit 4606 then indicates the extended resolution and the interpolation method to the DEC 4604. Thereafter, the process proceeds to step S4702.

In step S4702, DEC 4604 reads the compressed picture data from EB1 4603 and decodes a base-view picture from the compressed picture data. Furthermore, DEC 4604 uses the interpolation method indicated by the resolution extension control unit 4606 to increase the resolution of the base-view picture from full HD to the resolution indicated by the resolution extension control unit 4606, i.e., to 4K2K. DEC 4603 then writes the 4K2K picture to DPB 4605. Thereafter, the process proceeds to step S4703.

In step S4703, the adder 4607 reads the 4K2K base-view picture from DPB 4605 and receives pixel difference information from the resolution extension control unit 4606. At this point, the adder 4607 adds the difference in pixel data contained in the pixel difference information to the corresponding pixel data contained in the base-view picture. The 4K2K picture is written into the primary video plane memory 4620. Thereafter, the process proceeds to step S4704.

In step S4704, DEC 4604 confirms whether data of the next compressed picture exists in EB1 4603. If exists, the process is repeated from step S4701. If not, the process is ended.

Effects of Embodiment 1

The BD-ROM disc 101 according to Embodiment 1 of the present invention includes the file 2D, file DEP, and extended stream file divided into a plurality of extents that are recorded in an interleaved arrangement as shown in FIG. 13. In particular, at least two each of base-view and dependent-view extents are arranged between two extended extents. Accordingly, even when the size of each extent is restricted to its maximum extent size or smaller, a total size of the extents arranged between two extended extents is sufficiently great. This prevents underflow from occurring in the RB1 and RB2 while the playback device 102 in 3D playback mode jumps over the recording areas of extended extents. Consequently, the playback device 102 can seamlessly playback 3D video images from the BD-ROM disc 101 regardless of the extended stream file existing thereon. As such, the above-described arrangement of extents of AV stream files recorded on the BD-ROM disc 101 enables the playback device 102 to maintain excellent playback performance <Modifications>

(1-A) According to Embodiment 1 of the present invention, the extended stream includes information necessary for extending full HD 2D video images represented by the base-view video stream into 4K2K 2D video images. As such, the extended stream can contain information to be used in combination with the main TS, which is hereinafter referred to as "extended data." Examples of the extended data include, other than the resolution extension information described above, information described below.

<<Depth Map Stream>>

The extended data may be a depth map stream. In this case, extended playback mode of the playback device 102 is equivalent to depth mode. In other words, the playback device 102 plays back 3D video images from extents read in accordance with the third playback path 1203 shown in FIG. 12.

Depth maps are used for playback of 3D video images as follows. 2D video images represented by the base-view video stream are the 3D video images projected onto a virtual 2D screen. The depth maps represent, pixel by pixel, the depths of portions of the 3D video images with respect to the 2D screen. In particular, the depth of an image to be displayed by a pixel is expressed by the luminance of the pixel. In the playback device 102 in depth mode, the plane adder 4025 constructs left- and right-view video frames from the combination of the base-view video stream and the depth maps.

FIG. 48 is a schematic diagram showing an example of constructing a left view LVW and a right view RVW from the combination of 2D video images MVW and a depth map DPH. As shown in FIG. 48, the 2D video images MVW include a circular plate DSC shown in its background BGV. The depth map DPH expresses the depths for portions of the 2D video images MVW by the luminances of pixels. According to the depth map DPH, the area DA1 where the circular plate DSC is displayed in the 2D video images MVW is to be seen by viewers closer than the screen, while the area DA2 where the background BGV is displayed is to be farer than the screen. In the plane adder 4025 of the playback device 102, a parallax image generation unit PDG first calculates binocular parallax of each portion of the 2D video images MVW by using the depths of the portion indicated by the depth map DPH. Next, the parallax image generation unit PDG shifts the position of the portion to the left and right in the 2D video images MVW in accordance with the calculated binocular parallax to construct the left view LVW and the right view RVW. In the example shown in FIG. 48, the parallax image generation unit PDG shifts the circular plate DSC from its original position in the 2D video images MVW as follows: the circular plate DSL displayed in the left view LVW is located on the right side of the original position and at a distance S1 of half of the circular plate's binocular parallax from the original position, while the circular plate DSR displayed in the right view RVW is located on the left side of the original position and at the distance S1 therefrom. In this way, the circular plate DSC is seen by the viewers as being closer than the screen. Conversely, the parallax image generation unit PDG shifts the background BGV from its original position in the 2D video images MVW as follows: the background BGL displayed in the left view LVW is located on the left side of the original position and at a distance S2 of half of the background's binocular parallax from the original position, while the background BGR displayed in the right view RVW is located on the right side of the original position and at the distance S2 therefrom. In this way, the background BGV is seen by the viewers as being farer than the screen.

Pixel data included in the depth map only expresses the luminances of a single color, and therefore the bitrate of the depth map is generally lower than both the bitrates of the base-view and right-view video streams. Accordingly, the interleaved arrangement of extents shown in FIG. 13 is effective.

<<Audio Stream Conforming to DTS Extended Standard>>

The extended data is not limited to a video stream, but may also be an audio stream. In particular, extended data may be an audio stream conforming to the DTS extended standard. The DTS extended standard includes DTS-ES (Extended Surround), DTS-HD master audio, and DTS-HD high-resolution sound. In all of these standards, the extended stream contains a data portion as extended data; the data portion is to be combined with the primary audio stream included in the main TS. Combining this data portion with the primary audio stream improves audio quality and increases the number of channels for surround sound. In the playback device 102 in extended playback mode, the primary audio decoder 4474 decodes the primary audio stream from the main TS, and in parallel decodes the extended data from the extended stream, and then constructs a target audio stream from the decoded data.

In an audio stream conforming to the DTS extended standard, portion extended from the primary audio stream included in the main TS has a data amount much smaller than both the data amounts of the base-view and dependent-view video streams. Accordingly, the interleaved arrangement of extents shown in FIG. 13 is effective.

<<Video Stream for Super Picture-in-Picture>>

The extended data may be secondary video streams to be combined with the primary video stream of the main TS. The playback device 102 in extended playback mode can simultaneously display three or more types of video images on one screen by using the combination of the extended data and the primary video stream in addition to the secondary video streams of the main TS.

In picture-in-picture, the secondary video stream typically has a resolution lower than that of the primary video stream. Accordingly, the video stream included in the extended stream generally has a bitrate lower than both the bitrates of the base-view and dependent-view video streams. Accordingly, the interleaved arrangement of extents shown in FIG. 13 is effective.

<<Additional Color Information for N-Bit Extension>>

The extended data may be information necessary for increasing the number of bits of color information included in pixel data of the base-view pictures. For example, when the pixel data of the base-view pictures expresses each of RGB or YCrCb color coordinates with eight bits, information necessary for converting the color coordinates to 12-bit representation is contained in the extended stream as extended data. The playback device 102 in extended playback mode includes the primary video decoder 4470 that decodes the extended data from the extended stream in addition to base-view pictures from the main TS, and combines the decoded data to increase the number of bits of color information of pixel data. This enables finer color representation.

Generally, the data amount necessary for increasing the number of bits of color information included in data per pixel of a base-view picture is smaller than the amount of the data per pixel itself. Accordingly, the extended stream has generally a bitrate lower than both the bitrates of the base-view video stream and the dependent-view video stream. Therefore, the interleaved arrangement of extents shown in FIG. 13 is effective.

<<Additional Pictures in Temporal Scalable Coding>>

Extended data may be information necessary for increasing the frame rate of the base-view video stream. For example, when the base-view video stream has a frame rate of 60 fps, additional pictures necessary for raising this value to 120 fps is contained in the extended stream as extended data. In particular, the additional pictures are compressed with reference to base-view pictures. In the playback device 102 in extended playback mode, the primary video decoder 4470 decodes the base-view pictures from the main TS and in parallel decodes the additional pictures from the extended stream by using the base-view pictures. Furthermore, the primary video decoder 4470 inserts the additional pictures between the base-view pictures to increase the frame rate of the base-view video stream. This enables video images to change even finer over time.

Since the additional pictures are for changing video images even finer between base-view pictures, the similarity between the additional pictures and the base-view pictures are generally high. Accordingly, by compressing the additional pictures with reference to the base-view pictures, the extended stream can have a bitrate much lower than both the bitrates of the base-view and dependent-view video streams. Therefore, the interleaved arrangement of extents shown in FIG. 13 is effective.

<<Difference in Video Images Before and after Camera's Angle of View is Enlarged>>

Extended data may be differences in video images before and after a camera's angle of view is enlarged. In this case, the base-view video stream represents video images captured by a camera with the original angle of view. In the playback device 102 in extended playback mode, the primary video decoder 4470 decodes one video frame from the base-view video stream and in parallel decodes pixel data from the extended stream; the pixel data represents video images to be displayed in a region outside video images represented by a video frame. The primary video decoder 4470 then reconstructs one video frame from the data. As a result, video images to be displayed within a wider angular range than the original video images can be played back.

The pixel data representing video images to be displayed in a region outside video images represented by the original video frame contained in the base-view video stream generally has a total data amount much smaller than those of the original video frame. Accordingly, the extended stream has a bitrate much lower than both the bitrates of the base-view and dependent-view video streams. Therefore, the interleaved arrangement of extents shown in FIG. 13 is effective.

<<Dependent-View Video Stream>>

Extended data may be a dependent-view video stream to be combined with the base-view video stream of the main TS to represent 3D video images, or alternatively may be information representing parallax between left and right views that are generated from combination between the base-view and dependent-view video streams. In this case, the playback device 102 in extended playback mode plays back 3D video images, like the playback device 102 in 3D playback mode. The dependent-view video stream of the extended stream differs from that of the sub-TS in the degree of parallax between left and right views generated from combination with the common base-view video stream.

The parallax between left and right views has a maximum value normally equal to or shorter than an average viewer's interpupillary distance (in the case of children, 5 cm or less). As long as this condition is satisfied, the parallax will not exceed the viewer's interpupillary distance. This can reduce the viewer's risk of visually induced motion sickness and eye strain. Left and right views with larger parallax are displayed on a larger screen of the display device 103. For example, when the dependent-view video stream of the sub-TS can be combined with the base-view video stream to generate left and right views having parallax suitable for a screen size of 50 inches or less, the dependent-view video stream of the extended stream is designed to be combined with the base-view video stream to generate left and right views having parallax suitable for a screen size of 100 inches or less.

When playing back 3D video images from the BD-ROM disc 101, the playback control unit 4035 in the playback device 102 selects 3D playback mode or extended playback mode, whichever is suitable for the screen size of the display device 103. Specifically, the playback control unit 4035 first acquires the screen size from the display device 103 via the HDMI cable 122. Next, the playback control unit 4035 selects 3D playback mode if the screen size of the display device 103 is equal to or less than 50 inches, and selects extended playback mode if the screen size is larger than 50 inches but does not exceed 100 inches. Therefore, the parallax between left and right views is set to a value appropriate for the screen size.

The playback device 102 in extended playback mode reads all of base-view, dependent-view, and extended extents in order, in contrast to reading extents according to the third playback path 1203 shown in FIG. 12. The playback device 102 then uses the file entries of the file SS and the extended stream file as well as the extent start points contained in the 3D clip information file to distribute the read extents among the RB1 4021, the RB2 4022, and the RB3 4023. The system target decoder 4024 provides the primary video decoder with source packets containing the base-view video stream, the dependent-view video stream, and the extended data from the RB1 4021, the RB2 4022, and the RB3 4023, respectively. When the extended data includes dependent-view pictures, the dependent-view pictures are highly similar to dependent-view pictures of the sub-TS, and therefore are compressed with reference to dependent-view pictures of the sub-TS. In this case, the primary video decoder uses dependent-view pictures of the sub-TS to decode dependent-view pictures from the extended data. On the other hand, when the extended data includes parallax information, the primary video decoder uses the parallax information to shift pixel data to the left or right in a dependent-view picture of the sub-TS. By combining a resulting dependent-view picture with a base-view picture, the primary video decoder constructs a pair of video frames representing left and right views.

The extended data is either pictures compressed with reference to the dependent-view pictures of the sub-TS or parallax information. Accordingly, the extended stream has a bitrate much lower than both the bitrates of the base-view video stream and the dependent-view video stream of the sub-TS. Therefore, the interleaved arrangement of extents shown in FIG. 13 is effective.

<<Resolution Extension Information for 3D Video Images>>

Extended data may include not only resolution extension information for the base-view video stream but also resolution extension information for the dependent-view video stream. In this case, the playback device 102 in extended playback mode plays back 4K2K 3D video images as follows.

The playback device 102 in extended playback mode reads all of base-view, dependent-view, and extended extents in order, in contrast to reading extents according to the third playback path 1203 shown in FIG. 12. The playback device 102 then uses the file entries of the file SS and the extended stream file as well as the extent start points contained in the 3D clip information file to distribute the read extents among the RB1 4021, the RB2 4022, and the RB3 4023. The system target decoder 4024 provides the primary video decoder with source packets containing the base-view video stream, the dependent-view video stream, and the extended data from the RB1 4021, the RB2 4022, and the RB3 4023, respectively. The primary video decoder first decodes full HD base-view and dependent-view pictures. The primary video decoder then increases the resolution of each picture to 4K2K through the interpolation method indicated by the resolution extension information. Next, the primary video decoder adds pixel difference information to each picture with increased resolution, thus generating a pair of video frames representing 4K2K left and right views.

The resolution extension information has a data amount sufficiently smaller than both base-view and dependent-view pictures. Accordingly, the extended stream has a bitrate sufficiently lower than both the bitrates of the base-view video stream and the dependent-view video stream of the sub-TS. Therefore, the interleaved arrangement of extents shown in FIG. 13 is effective.

(1-B) The display device 103 according to Embodiment 1 of the present invention is a liquid crystal display. Alternatively, the display device according to the present invention may be another type of flat panel display, such as a plasma display, an organic EL display, etc., or a projector. Furthermore, the display device 103 shown in FIG. 1 is separate from the playback device 102. Alternatively, the display device may be formed integrally with the playback device.

(1-C) The recording medium 101 according to Embodiment 1 of the present invention is a BD-ROM disc. Alternatively, the recording medium according to the present invention may be a different portable recording medium, for example, an optical disc with a different format such as DVD or the like, a removable hard disk drive (HDD), or a semiconductor memory device such as an SD memory card.

(1-D) The 3D glasses 102 according to Embodiment 1 of the present invention are shutter glasses. Alternatively, the 3D glasses according to the present invention may be those including left and right lenses covered by polarization films with different polarization directions, or those including left and right lenses with different transmission spectra. When the former glasses are used, the display device uses different polarized lights to display left-view and right-view video images. When the latter glasses are used, the display device uses lights with different spectra to display left-view and right-view video images. Left lenses of both the glasses only allow left-view video images to pass through, and right lenses thereof only allow right-view video images to pass through.

(1-E) A picture contained in a PES packet 511 shown in FIG. 5 is the entirety of one encoded video frame. Alternatively, the picture may be one encoded field.

(1-F) The playback device 102 in L/R mode according to Embodiment 1 of the present invention plays back video frames representing left and right views from the base-view and dependent-view video streams, respectively. Conversely, the base-view and dependent-view video streams may represent right and left views, respectively.

(1-G) The arrangement of extents shown in FIG. 11 includes dependent-view extents placed before base-view extents. Contrary to the assumption under which the arrangement has been determined, when the system rate $R_{TS2}$ for the file DEP is set as high as the system rate $R_{TS1}$ for the file 2D, the second transfer rate $R_{EXT2}$ may exceed the first transfer rate $R_{EXT1}$ for the extent pair located at the top of an extent block. In this case, the base-view extent may be placed before the dependent-view extent. In other words, a smaller one of the extent pair is placed before the other larger one. This enables the read buffer to maintain a smaller capacity.

(1-H) In order to reduce the jump time of interrupt playback in extended playback mode, the top of a GOP at the playback start position may be stored in a base-view extent arranged immediately after an extended extent. In this case, the jump distance of the interrupt playback does not exceed the maximum extent size of a dependent-view extent, in contrast to the case illustrated in FIG. 23. Accordingly, any upper limit need not be set to the number of extent pairs arranged between two extended extents.

Embodiment 2

A BD-ROM disc according to Embodiment 2 includes extents arranged to divide playback paths among 2D, 3D, and extended playback modes immediately before or immediately after a location where a long jump is required, such as a layer boundary. Other than the extents arranged in this manner, the BD-ROM and playback device according to Embodiment 2 have structures and functions equivalent for those according to Embodiment 1. The following explanation on the BD-ROM disc and playback device according to Embodiment 2 focuses on modifications and extensions of those according to Embodiment 1. Details on elements similar to those of the BD-ROM disc and playback device according to Embodiment 1 can be found in the explanation on Embodiment 1 described above.

FIG. 12 shows that any of the first playback path 1201, the second playback path 1202, and the third playback path 1203 runs through the fourth base-view extent B[3] immediately before the long jump $J_{LY}$ over the layer boundary LB. The data amount of the base-view video stream that the system target decoder should process during the long jump $J_{LY}$ is surely provided by the size of the fourth base-view extent B[3] according to condition 1 in 2D playback mode, by the total size of the third and fourth base-view extents B[2] and B[3] according to condition 4 in 3D playback mode, and by the total size of the third and fourth base-view extents B[2] and B[3] according to condition 6 in extended playback mode. Therefore, the minimum extent size of the fourth base-view extent B[3] required by condition 1 is generally larger than that required by conditions 2 and 6. Furthermore, the dependent-view extent D[3] located immediately before the base-view extent B[3] has the same extent ATC time as the base-view extent B[3], and hence, the size of the dependent-view extent D[3] is generally larger than the minimum extent size required by condition 2. Therefore, the capacity of the RB2 is generally larger than a minimum necessary for seamless playback in 3D playback mode. In addition, the extended extent T[1] has the same extent ATC time as the combination of the base-view extents B[2] and B[3] located immediately after the extended extent T[1], and hence, the size of the extended extent T[1] is generally larger than the minimum extent size required by condition 6. Therefore, the capacity of the RB3 is generally larger than a minimum necessary for seamless playback in extended playback mode. As such, the arrangement shown in FIG. 12 allows the extents to be seamlessly connected, but hardly limits the capacities of the RB2 and RB3 to their minimums.

Changing arrangements of extents before and after the layer boundary LB from the interleaved arrangement to divide playback paths among 2D, 3D, and extended playback modes suffices further reducing the capacities of the RB2 and RB3 while enabling seamless playback of video images during the long jump $J_{LY}$. Patterns resulting from the changing include, for example, the following arrangements 1, 2, and 3. In any of the arrangements 1-3, playback paths in 2D, 3D, and extended playback modes run through different base-view extents immediately before or immediately after the long jump $J_{LY}$. Accordingly, 3D and extended playback modes do not need the base-view extents read immediately before or immediately after the long jump $J_{LY}$ to satisfy condition 1. This enables the playback device 102 to easily realize seamless playback of video images during the long jump $J_{LY}$ while maintaining the capacities of the RB1, RB2, RB3 at their minimums.

For ease of explanation described below, let us assume that arrangements 1-3 are applied to extents recorded before and after the layer boundary LB of the BD-ROM disc 101. Note that the following explanation similarly holds true when the extents are separated by, instead of the layer boundary, a recording area of other data that exceeds a predetermined number of sectors, e.g., 40,000 sectors.

<Arrangement 1>

FIG. 49 is a schematic diagram showing arrangement 1 of extents recorded before and after the layer boundary LB of the BD-ROM disc 101 and playback paths in the respective modes. As shown in FIG. 49, a first extent block 4901 is arranged immediately before the layer boundary LB and a second extent block 4902 is arranged immediately after the layer boundary LB. The extent blocks 4901 and 4902 respectively include extended extents T[0] and T[2] arranged at their tops, and two extent pairs (D[0], B[0], D[1], B[1]), (D[4], B[4], D[5], B[5]) forming an interleaved arrangement immediately after the extended extents. Furthermore, arrangement 1 includes one data block $B_{2D}$, two extent pairs D[2], $B_{3D}$, D[3], $B_{3D}$, and a pair of an extended extent T[1] and a base-view extent $B_{EX}$ arranged in this order between the end B[1] of the first extent block 4901 and the layer boundary LB. The data block $B_{2D}$ at the top of this order corresponds bit-for-bit with the entirety of the two subsequent base-view extents $B_{3D}$, and with the base-view extent $B_{EX}$ immediately before the layer boundary LB. In other words, the same data is recorded in triplicate. In the following, the data block $B_{2D}$ is referred to as a "2D playback-only block," the two subsequent base-view extents $B_{3D}$ are as "3D playback-only blocks," and the base-view extent $B_{EX}$ immediately before the layer boundary LB is as an "extended playback-only block." The base-view extent B[1] located at the end of the first extent block 4901 and the 2D playback-only block $B_{2D}$ are integrally accessible as a single extent EXT2D[1] of the file 2D. The 3D playback-only blocks $B_{3D}$, along with the immediately preceding dependent-view extents D[2] and D[3], is accessible as a single extent EXTSS[1] of the file SS. The extended playback-only block $B_{EX}$ is accessible as a single extent EXT3[3] of the extended stream file.

The playback device 102 in 2D playback mode plays back the file 2D. The playback path 4911 in 2D playback mode shows that the base-view extent B[0] located at the top of the first extent block 4901 is first read as the first extent EXT2D [0] of the file 2D, and then the immediately subsequent dependent-view extent D[1] is skipped. Next, a pair of the last base-view extent B[1] included in the first extent block 4901 and the immediately subsequent 2D playback-only block $B_{2D}$ is read as the second extent EXT2D[1] of the file 2D Immediately following this, a long jump $J_{LY}$ occurs to skip the extent pairs D[2], $B_{3D}$, D[3], $B_{3D}$ including the 3D playback-only blocks, the extended extent T[1], the extended playback-only block $B_{EX}$, and the extended extent T[2] and dependent-view extent D[4] located at the top of the second extent block 4902. Subsequently, the base-view extents B[4] and B[5] included in the second extent block 4902 are read as extents EXT2D[2] and EXT2D[3] of the file 2D, respectively, and the dependent-view extent D[5] is skipped.

The playback device 102 in 3D playback mode plays back the file SS. The playback path 4912 in 3D playback mode shows that, first, the entirety of the first extent block 4901, excluding the extended extent T[0] located at its top, is continuously read as the first extent EXTSS[0] of the file SS Immediately following this, a jump occurs to skip the 2D playback-only block $B_{2D}$. Subsequently, the entirety of the two extent pairs D[2], $B_{3D}$, D[3], $B_{3D}$ including the 3D playback-only blocks is continuously read as the second extent EXTSS[1] of the file SS. Then, a long jump $J_{LY}$ occurs to skip the extended extents T[1] and T[2] and the extended playback-only block $B_{EX}$. After that, the entirety of the second extent block 4902, excluding the extended extent T[2] at its top, is continuously read as the third extent EXTSS[2] of the file SS.

The playback device 102 in extended playback mode plays back the extended stream file and the file 2D. The playback path 4913 in extended playback mode shows that, first, the extended extent T[0] included in the first extent block 4901 is read as the first extent EXT3[0] of the extended stream file.

Next, the subsequent dependent-view extents D[0] and D[1] are skipped, and then, the top base-view extent B[0] is read as the first extent EXT2D[0] of the file 2D, and the second base-view extent B[1] is as the second extent EXT3[1] of the extended stream file Immediately following this, a jump occurs to skip the 2D playback-only block $B_{2D}$ and the entirety of the two extent pairs D[2], $B_{3D}$, D[3], $B_{3D}$ including the 3D playback-only blocks. Subsequently, the extended extent T[1] and the extended playback-only block $B_{EX}$ are continuously read as extents EXT3[2] and EXT3[3] of the extended stream file, respectively. Immediately following this, a long jump $J_{LY}$ occurs. After that, the extended extent T[2] included in the second extent block 4902 is read as the fifth extent EXT3[4] of the extended stream file, and the subsequent dependent-view extents D[4] and D[5] are skipped, and further the base-view extents B[4] and B[5] are respectively read as extents EXT2D[2] and EXT2D[3] of the file 2D.

As shown in FIG. 49, the playback device in 2D playback mode reads the 2D playback-only block $B_{2D}$, but skips the 3D playback-only blocks $B_{3D}$ and extended playback-only block $B_{EX}$. The playback device in 3D playback mode reads the 3D playback-only blocks $B_{3D}$, but skips the 2D playback-only block $B_{2D}$ and extended playback-only block $B_{EX}$. The playback device in extended playback mode reads the extended playback-only block $B_{EX}$, but skips the 2D playback-only block $B_{2D}$ and the 3D playback-only blocks $B_{3D}$. As such, arrangement 1 divides a common playback path, immediately before the long jump $J_{pz}$, into the playback path 4911 in 2D playback mode, the playback path 4912 in 3D playback mode, and the playback path 4913 in extended playback mode. Since the 2D playback-only block $B_{2D}$, the 3D playback-only blocks $B_{3D}$, and the extended playback-only block $B_{EX}$ are in bit-for-bit correspondence with each other, the same base view video frames are played back in any of the three playback modes.

Seamless playback in 2D playback mode only needs the 2D playback-only block $B_{2D}$ to be transferred from the RB1 to the system target decoder within the period from the start point of reading from the BD-ROM disc 101 to the end point of the long jump $J_{LY}$. Accordingly, the size $S_{DUP\_FOR\_SSIF}$ and extent ATC time $T_{DUP\_FOR\_SSIF}$ of the 2D playback-only block $B_{2D}$ are designed to satisfy the following expression (9):

$$T_{DUP\_FOR\_SSIF} \geq \frac{S_{DUP\_FOR\_SSIF}}{R_{UD2D}} + T_{JUMP},\qquad(9)$$

$$S_{DUP\_FOR\_SSIF} = T_{DUP\_FOR\_SSIF} \times R_{MAX1} \therefore$$

$$T_{DUP\_FOR\_SSIF} \geq \frac{R_{UD2D}}{R_{UD2D} - R_{MAX1}} \times T_{JUMP}.$$

For example, when the jump time $T_{AMP}$ of the long jump $J_{LY}$ is 700 ms, the bitrate $R_{TS1}$ for the file 2D equals its maximum value of 48 Mbps, and the read rate $R_{UD2D}$ of the BD-ROM drive is 54 Mbps, the extent ATC time $T_{DUP\_FOR\_SSIF}$ of the 2D playback-only block $B_{2D}$ only needs to be approximately 7.6 sec or longer.

Seamless playback in extended playback mode only needs the extended extent T[1] arranged immediately before the layer boundary LB to be transferred from the RB3 to the system target decoder within a period from the start point of reading from the BD-ROM disc 101 to the end point of the long jump $J_{LY}$. Accordingly, the size $S_T$ of the extended extent T[1], the size $S_{DUP\_FOR\_EX}$ of the extended playback-only block $B_{EX}$, and the extent ATC time $T_{DUP\_FOR\_Ex}$ of them are designed to satisfy the following expression (10):

$$T_{DUP\_FOR\_EX} \geq \frac{S_T}{R_{UDEX}} + \frac{S_{DUP\_FOR\_EX}}{R_{UDEX}} + T_{JUMP},\qquad(10)$$

$$S_{DUP\_FOR\_EX} = T_{DUP\_FOR\_EX} \times R_{MAX1},$$

$$S_T = T_{DUP\_FOR\_EX} \times R_{MAX3} \therefore$$

$$T_{DUP\_FOR\_EX} \geq \frac{R_{UDEX}}{R_{UDEX} - (R_{MAX1} + R_{MAX3})} \times T_{JUMP}.$$

Consequently, the common size $S_{DUP}$ of the 2D playback-only block $B_{2D}$, the entirety of the 3D playback-only blocks $B_{3D}$, and the extended playback-only block $B_{EX}$ is determined as the product of an extent ATC time and 192/188 times the bitrate $R_{TS1}$ of the file 2D; the extent ATC time equals a value $T_{DUP\_FOR\_SSIF}$ or $T_{DUP\_FOR\_EX}$ calculated from expression (9) or (10), whichever is longer: $S_{DUP}$=max ($T_{DUP\_FOR\_SSIF}$, $T_{DUP\_FOR\_EX}$)×$R_{TS1}$×192/188.

Arrangement 1 shown in FIG. 49, unlike the arrangement shown in FIG. 12, does not need the base-view extent B[1] to satisfy condition 1; the extent EXT2D[1] of the file 2D located immediately before the layer boundary LB shares the base-view extent B[1] with the extent EXTSS[0] of the file SS. This means that, as long as the extent ATC time of the 2D playback-only block $B_{2D}$ satisfies expressions (9) and (10), the extent ATC time of the base-view extent B[1] may be shortened. This enables both the dependent-view extent D[1] arranged immediately before the base-view extent B[1], and the extended extent T[0] to have greatly reduced sizes.

Both the entirety of the 3D playback-only blocks $B_{3D}$ and the extended playback-only block $B_{EX}$ are in bit-for-bit correspondence with the 2D playback-only block $B_{2D}$. Accordingly, an enlarged size of the 2D playback-only block $B_{2D}$ results in enlarged sizes of the dependent-view extents D[2] and D[3] arranged immediately before the 3D playback-only blocks $B_{3D}$, and of the extended extent T[1] located immediately before the extended playback-only block $B_{EX}$. However, these enlarged sizes can be sufficiently smaller than the sizes of the dependent-view extent D[3] arranged immediately before the layer boundary LB, and of the extended extent T[1] shown in FIG. 12. As such, the capacities of the RB1 and RB3 can be reduced further close to their minimum necessary for seamless playback.

<Arrangement 2>

FIG. 50A is a schematic diagram showing arrangement 2 of extents recorded before and after the layer boundary LB of the BD-ROM disc 101 and playback paths in the respective modes. As is clear from comparing FIG. 50A with FIG. 49, arrangement 2 differs from arrangement 1 in that a 2D playback-only block $B_{2D}$, 3D playback-only block $B_{3D}$, and extended playback-only block $B_{EX}$ are also arranged immediately after the layer boundary LB, in addition to immediately before the layer boundary LB.

As shown in FIG. 50A, the arrangement of extents before the layer boundary LB is similar to that shown in FIG. 49. Meanwhile, between the layer boundary LB and the second extent block 4902, a pair of an extended extent T and extended playback-only block $B_{EX}$, a 2D playback-only block $B_{2D}$, and an extent pair D, $B_{3D}$ including a 3D playback-only block are arranged in this order. The 2D playback-only block $B_{2D}$ is accessible as a single extent EXT2D[2] of the file 2D. The 3D playback-only block $B_{3D}$, along with the immediately preceding dependent-view extent D, is accessible as a single extent EXTSS[2] of the file SS. The extended extent T and extended playback-only block $B_{EX}$ arranged immediately after the layer boundary LB are respectively accessible as single extents EXT3[4] and EXT3[5] of the extended stream file. The entirety of the extended playback-only blocks $B_{EX}$ arranged before and after the layer boundary LB corresponds bit-for-bit with the entirety of the 2D playback-only blocks $B_{2D}$, and with the entirety of the 3D playback-only blocks $B_{3D}$.

The playback device 102 in 2D playback mode plays back the file 2D. The playback path 5011 in 2D playback mode shows that immediately after the layer boundary LB, first, the pair of the extended extent T and extended playback-only block $B_{EX}$ is skipped, and the 2D playback-only block $B_{2D}$ is read as a single extent EXT2D[2] of the file 2D, and then the immediately subsequent dependent-view extent D and 3D playback-only block $B_{3D}$ are skipped. Next, within the second extent block 4902, the base-view extents B are read as single extents EXT2D[3] and EXT2D[4] of the file 2D, and the other extents D and T are skipped.

The playback device 102 in 3D playback mode plays back the file SS. The playback path 5012 in 3D playback mode shows that immediately after the layer boundary LB, first, the pair of the extended extent T and extended playback-only block $B_{EX}$, and the 2D playback-only block $B_{2D}$ are skipped, and the entirety of the dependent-view extent D and 3D playback-only block $B_{3D}$ is read as the third extent EXTSS[2] of the file SS. Immediately after that, a jump occurs to skip the extended extent T at the top of the second extent block 4902. Subsequently, the entirety of the extent pairs D, B included in the second extent block 4902 is continuously read as the fourth extent EXTSS[3] of the file SS.

The playback device 102 in extended playback mode plays back the extended stream file and file 2D. The playback path 5013 in extended playback mode shows that immediately after the layer boundary LB, first, the extended extent T and the extended playback-only block $B_{EX}$ are respectively read as single extents EXT3[4] and EXT3[5] of the extended stream file. Next, the subsequent 2D playback-only block $B_{2D}$, dependent-view extent D, and 3D playback-only block $B_{3D}$ are skipped, and the extended extent T located at the top of the second extent block 4902 is read as the seventh extent EXT3[6] of the extended stream file. Following that, within the second extent block 4902, the dependent-view extents D are skipped, and the base-view extents B are read as single extents EXT2D[3] and EXT2D[4] of the file 2D.

Arrangement 2 shown in FIG. 50A, unlike arrangement 1, divides a common playback path into the playback path 5011 in 2D playback mode, the playback path 5012 in 3D playback mode, and the playback path 5013 in extended playback mode, not only immediately before but also immediately after the long jump $J_{LY}$. However, since the entirety of the 2D playback-only blocks $B_{2D}$ corresponds bit for bit with the entirety of the extended playback-only blocks $B_{EX}$, and with the entirety of the 3D playback-only blocks $B_{3D}$, the same base-view video frames are played back in any of the three playback modes.

Arrangement 2 allows the sizes of the 2D playback-only block $B_{2D}$, 3D playback-only block $B_{3D}$, and extended playback-only block $B_{EX}$ to be designed with a higher level of flexibility than arrangement 1. This enables dependent-view and extended extents to have sufficiently small sizes. As such, the capacities of the RB2 and RB3 can be reduced further close to their minimum necessary for seamless playback.

<Arrangement 3>

FIG. 50B is a schematic diagram showing arrangement 3 of extents recorded before and after the layer boundary LB of the BD-ROM disc 101 and playback paths in 2D and extended playback modes. As is clear from comparing FIG. 50B with FIG. 50A, arrangement 3 differs from arrangement 2 in that a 2D playback-only block arranged immediately after the layer boundary LB is also used as an extended playback-only block.

As shown in FIG. 50B, the arrangement of extents before the layer boundary LB is similar to that shown in FIG. 49. Meanwhile, between the layer boundary LB and the second extent block 4902, a pair of an extended extent T and extended playback-only block $B_{2-E}$, and an extent pair D, $B_{3D}$ including a 3D playback-only block are arranged in this order. The entirety of the base-view extent $B_{2-E}$ arranged immediately after the layer boundary LB and the extended playback-only block $B_{EX}$ corresponds bit-for-bit with the entirety of the base-view extent $B_{2-E}$ and 2D playback-only block $B_{2D}$, and with the entirety of the 3D playback-only blocks $B_{3D}$. The base-view extent $B_{2-E}$ is accessible as a single extent EXT2D [2] of the file 2D.

The playback device 102 in 2D playback mode plays back the file 2D. The playback path 5021 in 2D playback mode shows that immediately after the layer boundary LB, first, the extended extent T is skipped, and then the base-view extent $B_{2-E}$ is read as the single extent EXT2D[2] of the file 2D, and further the immediately subsequent dependent-view extent D and 3D playback-only block $B_{3D}$ are skipped. Next, within the second extent block 4902, the base-view extents B are read as extents EXT2D[3] and EXT2D[4] of the file 2D, and the other extents D and T are skipped.

The playback device 102 in extended playback mode plays back the extended stream file and file 2D. The playback path 5023 in extended playback mode shows that immediately after the layer boundary LB, first, the extended extent T is read as the fifth extent EXT3[4] of the extended stream file, and then the base-view extent $B_{2-E}$ is read as the third extent EXT2D[2] of the file 2D. Next, the subsequent dependent-view extent D and 3D playback-only block $B_{3D}$ are skipped, and the extended extent T located at the top of the second extent block 4902 is read as the sixth extent EXT3[5] of the extended stream file. Following that, within the second extent block 4902, the dependent-view extents D are skipped, and the base-view extents B are read as single extents EXT2D[3] and EXT2D[4] of the file 2D.

Arrangement 3 shown in FIG. 50B, unlike arrangement 2, requires both the playback path 5021 in 2D playback mode and the playback path 5023 in extended playback mode to run through the same base-view extent $B_{2-E}$ immediately after the long jump $J_{LY}$. Accordingly, the base-view extent $B_{2-E}$ needs to satisfy condition 1, and thereby affects the size of the extended extent T immediately before the base-view extent $B_{2-E}$. However, the playback path 5021 in 2D playback mode shows that the jump $J_{2D}$ occurring immediately after the base-view extent $B_{2-E}$ has a shorter jump distance, and therefore, the extent ATC time of the base-view extent $B_{2-E}$ is also relatively short. This limits the sizes of the extended extents T to values that do not increase the necessary capacity of the RB3. For example, when the extended stream has the bitrate $R_{TS3}$ of 10 Mbps and the BD-ROM drive in extended playback mode has the read rate $R_{UDEX}$ of 72 Mbps, the capacity of the RB1 has the lower limit RB1 of 10.7 MB or greater, and the capacity of the RB3 has the lower limits RB3 of 8.0 MB or greater: RB1≥10.7 MB, RB3≥8.0 MB, RB1+RB3≥18.7 MB. On the other hand, when the extended stream has the bitrate of 12 Mbps and the base-view extent $B_{2-E}$ arranged immediately after the layer boundary LB has the extent ATC time of 3.18 seconds, then the extended extent T arranged immediately before the base-view extent $B_{2-E}$ has the size of 4.5 MB. This size is sufficiently smaller than the lower limit RB3 of the capacity of the RB3=8.0 MB. As such, the playback path 5021 in 2D playback mode and the playback path 5023 in extended playback mode, even when running through the same base-view extent $B_{2-E}$, do not increase the necessary capacity of the RB3.

Arrangement 3 allows the playback path 5021 in 2D playback mode and the playback path 5023 in extended playback mode to run through the same base-view extent $B_{2-E}$ immediately after the long jump $J_{LY}$. This can reduce the duplicate data amount of the 2D playback-only block $B_{2D}$ on the BD-ROM disc 101. As a result, the volume area 202B on the BD-ROM disc 101 can be utilized more effectively.

Embodiment 3

A BD-ROM disc according to Embodiment 3 of the present invention, in contrast to that according to Embodiment 1, includes extended portions of a DTS-HD extended audio stream as the extended stream. On the other hand, the main TS includes a DTS-HD core audio stream as the primary audio stream. A combination of frames with the same PTS between the extended portions and the DTS-HD core audio stream constitutes a frame of the DTS-HD extended audio stream. The playback device 102 in extended playback mode includes the primary audio decoder 4474 that decodes the DTS-HD core audio stream from the main TS, and in parallel, the extended portions from the extended stream, then constructing the DTS-HD extended audio stream from the decoded data. Other components and functions of Embodiment 3 are similar to those of Embodiment 1, and thus, details on them can be found in the explanation on Embodiment 1.

When the extended stream is video data, differences in images between the presence and absence of the extended data are easy for viewers to immediately recognize. At interrupt playback, the playback device 102 in extended playback mode starts reading from the extended extent arranged immediately before the base-view extent including a playback start portion, thus preventing an unnatural change in image quality of the playback start portion. When the extended stream is audio data, differences in sounds between the presence and absence of the extended data are more difficult for viewers to immediately recognize than the differences in images. At interrupt playback, the playback device 102 in extended playback mode starts reading from the base-view extent including a playback start portion, thus reducing the wait time from when the interrupt playback is requested until when it is actually started. In this case, the extended data assigned to the playback start portion is not read, and thus there is a risk of an unnatural change in sounds during playback. At interrupt playback, the playback device 102 according to Embodiment 3, when failing to read the extended data assigned to the playback start portion, combines frames of the DTS-HD core audio stream with default extended data instead, and thereby forms frames of the DTS-HD extended audio stream. In this way, the playback device 102 can prevent the unnatural change in sounds.

Figure 51:
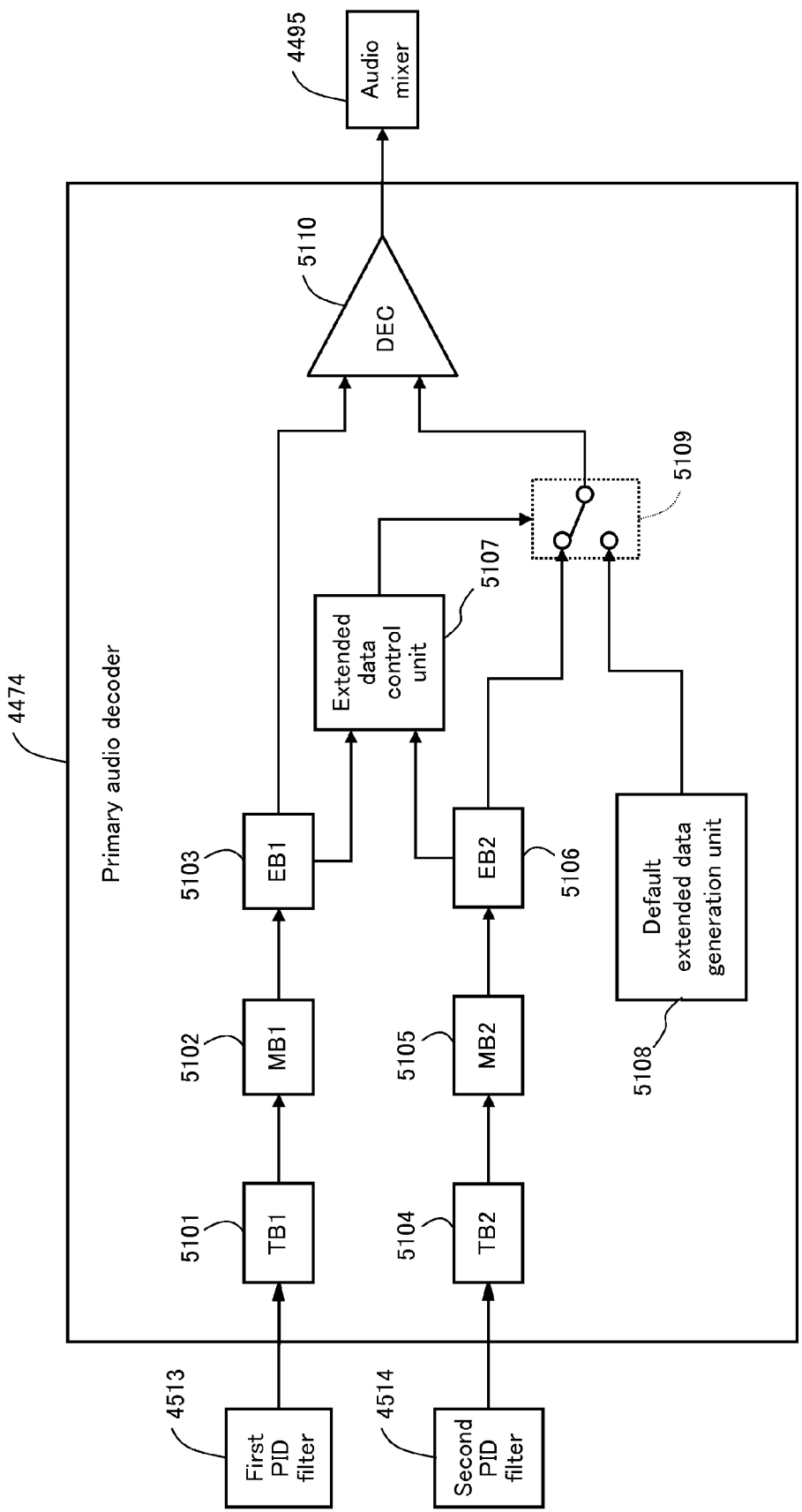
FIG. 51 is a functional block diagram of a primary audio decoder 4474 included in the playback device 102 in extended playback mode according to Embodiment 3 of the present invention.

FIG. 51 is a functional block diagram of the primary audio decoder 4474 included in the playback device 102 in extended playback mode. As shown in FIG. 51, the primary audio decoder 4474 includes a TB1 5101, MB1 5102, EB1 5103, TB2 5104, MB2 5105, EB2 5106, extended data control unit 5107, default extended data generation unit 5108, switch 5109, and compressed audio decoder (DEC) 5110. Any of the TB1 5101, MB1 5102, EB1 5103, TB2 5104, MB2 5105, and EB2 5106 is a buffer memory. Each of these buffer memories uses an area of a memory element included in the primary audio decoder 4474. Alternatively, some or all of these buffer memories may be separated into different memory elements.

The TB1 5101 receives TS packets that include a primary audio stream of the main TS from the first PID filter 4513 and stores the TS packets as they are. The MB1 5102 decodes and stores PES packets from the TS packets stored in the TB1 5101. At this point, TS headers are removed from the TS packets. The EB1 5103 extracts and stores encoded frames of the DTS-HD core audio stream from the PES packets stored in the MB1 5102. At this point, PES headers are removed from the PES packets.

The TB2 5104 receives TS packets that include the extended portions of the DTS-HD extended audio stream from the second PID filter 4514 and stores the TS packets as they are. The MB2 5105 decodes and stores PES packets from the TS packets stored in the TB2 5104. At this point, TS headers are removed from the TS packets. The EB2 5106 extracts and stores the encoded extended portions of the DTS-HD extended audio stream from the PES packets stored in the MB2 5105. At this point, PES headers are removed from the PES packets.

The extended data control unit 5107 first reads a PTS from the PES header of a PES packet containing each frame of the DTS-HD core audio stream stored in the EB1 5103. The extended data control unit 5107 next reads a PTS from the PES header of a PES packet containing each of the extended portions stored in the EB2 5106. The extended data control unit 5107 further searches for one of the extended portions that is allocated the same PTS as each frame of the DTS-HD core audio stream is. When finding the one of the extended portions, the extended data control unit 5107 controls the switch 5109 to connect the EB2 5106 to the DEC 5110. When failing to find the one of the extended portions, the extended data control unit 5107 controls the switch 5109 to connect the default extended data generation unit 5108 to the DEC 5110.

The default extended data generation unit 5108 generates default data as the extended portions of the DTS-HD extended audio stream. The default data includes a channel mixing coefficient for frames of the DTS-HD core audio stream, and thus allows a frame of the DTS-HD extended audio stream to be constructed in combination with any frame of the DTS-HD core audio stream.

The switch 5109 connects either the EB2 5106 or the default extended data generation unit 5108 to the DEC 5110 in response to an instruction from the extended data control unit 5107.

The DEC 5110 is a hardware decoder designed specifically for decoding frames of the DTS-HD extended audio stream, and is composed of an LSI that has in particular a function to accelerate the decoding. The DEC 5110 sequentially decodes frames of the DTS-HD core audio stream in the order of receipt from the EB1 5103. In parallel with the decoding, the DEC 5110 sequentially decodes the extended portions transferred from the switch 5109. Furthermore, the DEC 5110 combines the decoded data to construct frames of the DTS-HD extended audio stream, and then transmits the frames to the audio mixer 4495.

Figure 52:
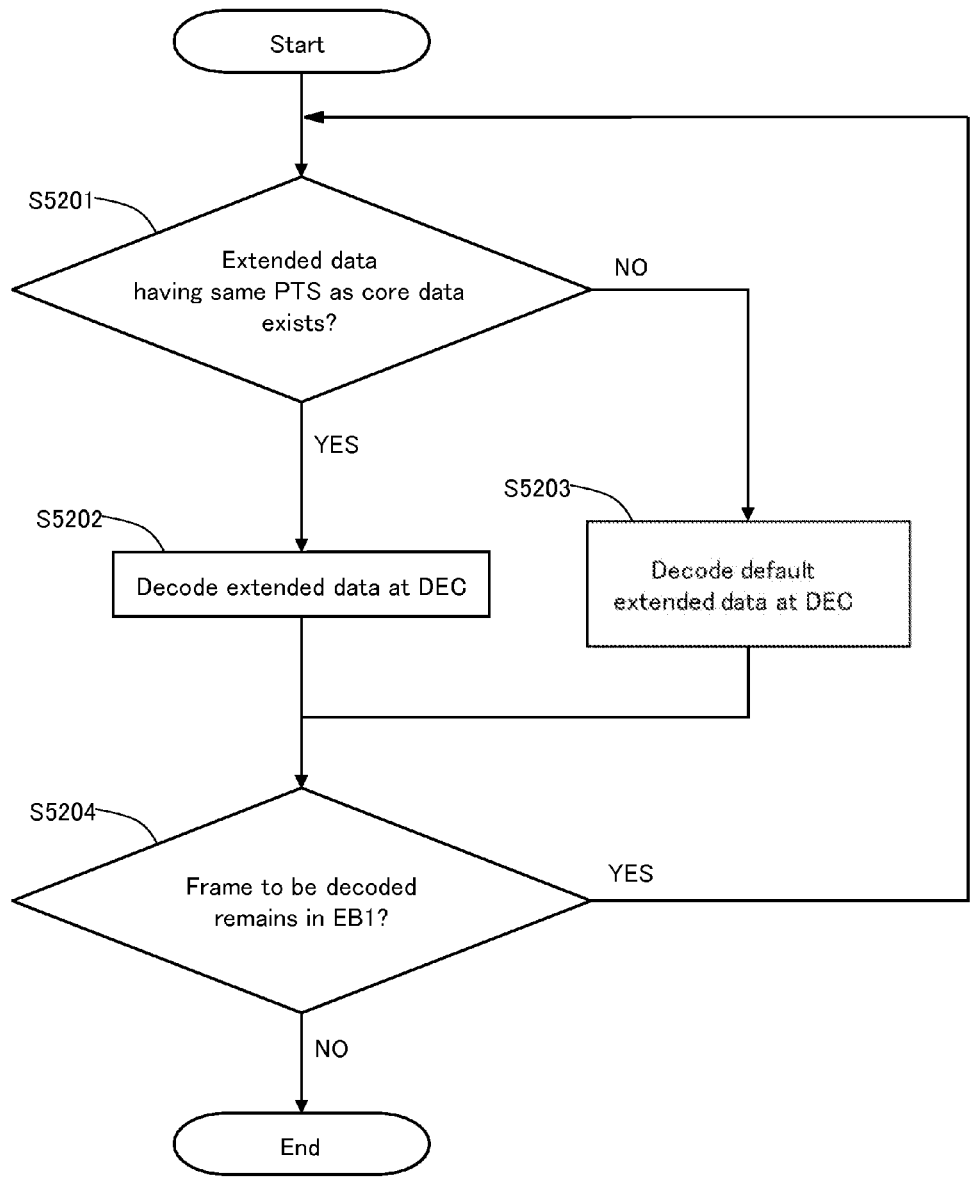
FIG. 52 is a flowchart showing decoding of an audio stream performed by the primary audio decoder shown in FIG. 51.

FIG. 52 is a flowchart showing decoding of an audio stream by the primary audio decoder. This process starts when TS packets are transferred from the PID filters 4513 and 4514 to the primary audio decoder 4474.

In step S5201, frames of the encoded DTS-HD core audio stream are reconstructed from TS packets stored in the TB1 5101, and then stored to the EB1 5103. At the same time, encoded extended portions of the DTS-HD extended audio stream are reconstructed from TS packets stored in the TB2 5104, and then stored to the EB2 5106. The extended data control unit 5107 reads from the EB1 5103 a PTS for each of the frames of the DTS-HD core audio stream, and reads from the EB2 5106 a PTS for each of the extended portions. Furthermore, the extended data control unit 5107 searches for one of the extended portions allocated the same PTS as each of the frames of the DTS-HD core audio stream is. If the one of the extended portions is present in the EB2 5106, the process proceeds to step S5202. When the one of the extended portions is absent therein, the process proceeds to step S5203.

In step S5202, one extended portion is present in the EB2 5106, which is allocated the same PTS as one frame of the DTS-HD core audio stream is. Accordingly, the extended data control unit 5107 controls the switch 5109 to connect the EB2 5106 to the DEC 5110. Then, the DEC 5110 decodes the one frame of the DTS-HD core audio stream and the one extended portion that are transferred from the EB1 5103 and the switch 5109, respectively, and further combines the decoded data to construct a frame of the DTS-HD extended audio stream. In addition, the DEC 5110 transmits the constructed frame to the audio mixer 4495. Following this, the process proceeds to step S5204.

In step S5203, no extended portion allocated the same PTS as a frame of the DTS-HD core audio stream is present in the EB2 5106. Accordingly, the extended data control unit 5107 controls the switch 5109 to connect the default extended data generation unit 5108 to the DEC 5110. Then, the DEC 5110 decodes the frame of the DTS-HD core audio stream transferred from the EB1 5103, and further combines the decoded frame with the default extended portion transferred from the default extended data generation unit 5108 to construct a frame of the DTS-HD extended audio stream. In addition, the DEC 5110 transmits the constructed frame to the audio mixer 4495. Following this, the process proceeds to step S5204.

In step S5204, the extended data control unit 5107 checks whether or not any frame to be decoded remains in the EB1 5103. When a frame remains in the EB1 5103, the process is repeated from S5201. When no frame remains therein, the process is ended.

In the playback device 102 in extended playback mode, as described above, the primary audio decoder compares the PTSs of frames of the DTS-HD core audio stream with those of extended portions of the DTS-HD extended audio stream, thus checking, at interrupt playback, whether or not the extended portions assigned to the frames of the DTS-HD core audio stream have been read. When the extended portions have not been read, the primary audio decoder combines the default extended portions with the frames of the DTS-HD core audio stream, instead of the extended portions, thereby constructing frames of the DTS-HD extended audio stream. This can prevent unnatural lack of sounds.

Embodiment 4

As Embodiment 4 of the present invention, a device and method for recording in real time an AV stream file onto a writable recording medium are described below. The device and method use for the recording the arrangements of extents according to Embodiments 1 and 2 of the present invention. The writable recording medium is, for example, a BD-RE (Rewritable) disc, BD-R (Recordable) disc, hard disk, or semiconductor memory card, which is hereinafter referred to as a BD disc or the like.

A recording device according to Embodiment 4 is mounted in a household optical disc recorder or video camera. The recording device converts a moving video content filmed by the video camera, or a content playback from another recording medium such as a BD-ROM disc, into an AV stream file using a predetermined compression encoding method and records the AV stream file on the recording medium. The content is expressed as both 2D video images at 4K2K and as full HD 3D video images. Next, the recording device generates a scenario. A "scenario" is information defining how each title included in the content is to be played back. Specifically, a scenario includes dynamic scenario information and static scenario information. The recording device then records the scenario on the recording medium.

Figure 53:
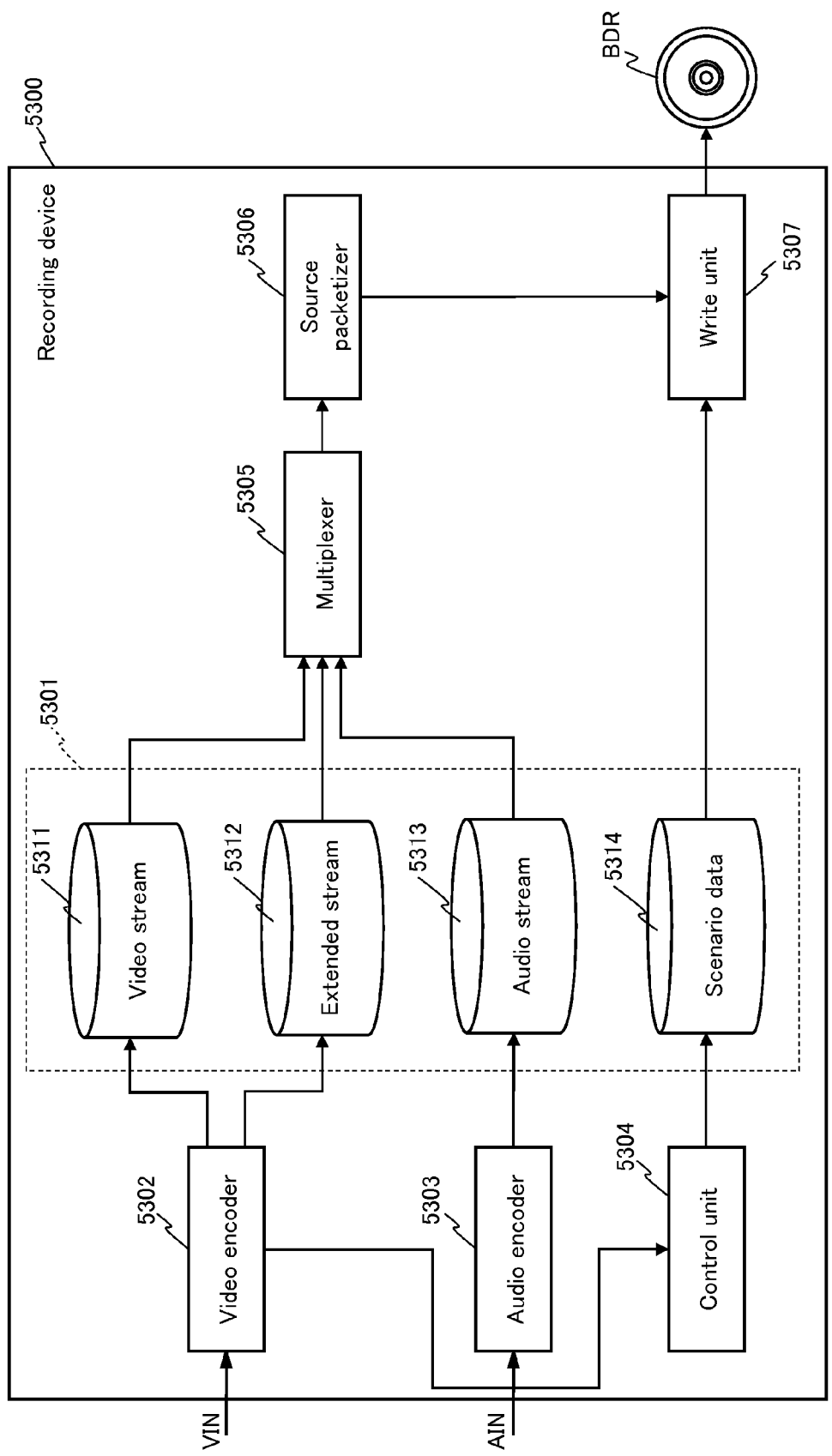
FIG. 53 is a functional block diagram of a recording device according to Embodiment 4 of the present invention.

FIG. 53 is a functional block diagram of the recording device according to Embodiment 4. As shown in FIG. 53, a recording device 5300 includes a recording unit 5301, a video encoder 5302, an audio encoder 5303, a control unit 5304, a multiplexer 5305, a source packetizer 5306, and a write unit 5307.

The recording unit 5301 is a storage device embedded in the recording device 5300 and is in particular an HDD. Alternatively, the recording unit 5301 may be an external HDD connected to the recording device 5300, or a semiconductor memory device internal or external to the recording device 5300.

The video encoder 5302 is dedicated hardware for encoding of video data. Alternatively, the video encoder 5302 may be an element that functions by the CPU internal to the recording device 5300 executing specific software. The video encoder 5302 compresses an analog or digital input video signal VIN using a compression encoding method such as MPEG-4 AVC, MVC, or MPEG-2. The video data is thus converted into a combination of a base-view video stream, a dependent-view video stream, and an extended stream. The converted video streams 5311 and the extended stream 5312 are stored in the recording unit 5301.

The video encoder 5302 uses a multiview coding method such as MVC to encode the 3D video image data. The 3D video image data is thus converted into a pair of a base-view video stream and a dependent-view video stream as shown in FIG. 7. In other words, the video frame sequence representing the left view is converted into a base-view video stream via inter-picture predictive encoding on the pictures in these video frames. On the other hand, the video frame sequence representing the right view is converted into a dependent-view video stream via predictive encoding on not only the pictures in these video frames, but also the base-view pictures. Note that the video frames representing the right view may be converted into a base-view video stream, and the video frames representing the left view may be converted into a dependent-view video stream.

When encoding the 3D video image data, the video encoder 5302 compares the left-view picture and the right-view picture before compression by macroblock during the inter-picture predictive encoding process, each macroblock being 8×8 or 16×16 pixels, in order to detect movement vectors in the video images between the pictures. The video encoder 5302 uses the detected movement vectors to compress each picture. The video encoder 5302 may instead use the movement vectors to calculate the binocular parallax of the video images, detecting depth information for each video image from the binocular parallax thereof. The video encoder 5302 may then use this depth information to generate a depth map for the left view or right view. In this case, the video encoder 5302 uses inter-picture predictive encoding on the pictures in the left-view or right-view stream data and the depth map stream to convert these into a base-view video stream and a depth map stream.

When encoding 2D video image data at 4K2K, the video encoder 5302 first extracts a full HD video frame from the base-view video stream obtained by encoding the 3D video image data and converts the video frame to a 4K2K video frame using a bicubic or a bilinear interpolation method.

Next, the video encoder 5302 compares the converted 4K2K video frame with the original 4K2K video frame to generate pixel difference information. The video encoder 5302 then generates resolution extension information from the generated pixel difference information and converts the resolution extension information into the extended stream.

The audio encoder 5303 is dedicated hardware for encoding of audio data. Alternatively, the audio encoder 5303 may be an element that functions by the CPU internal to the recording device 5300 executing specific software. The audio encoder 5303 generates an audio stream 5313 from an audio input signal AIN, storing the audio signal 5313 in the recording unit 5301. The audio input signal AIN is, for example, LPCM audio data and is encoded using a compression encoding method such as AC-3.

The control unit 5304 is an element that functions by the CPU internal to the recording device 5300 executing specific software. The control unit 5304 generates scenario data 5314 and stores the scenario data 5314 in the recording unit 5301. The scenario data 5314 includes an index file, an MV object file, a clip information file, and a playlist file and specifies the playback method of the elementary streams 5311-5313 stored in the recording unit 5301.

In particular, the control unit 5304 generates the entry map of the clip information file in real-time as follows. Each time the video encoder 5302 encodes one GOP, the video encoder 5302 transmits a PTS and two SPNs to the control unit 5304; the PTS is included in the I or P picture located at the top of the GOP; the first SPN is assigned to the top of source packets in which the I or P picture is to be stored; and the second SPN is assigned to the top of source packets in which resolution extension information on the I or P picture is to be stored. The control unit 5304 adds the PTS and the first SPN transmitted by the video encoder 5302 to the entry map as one entry point.

The control unit 5304 also generates the extent start points 2742 and 2920 shown in FIGS. 29A and 29B by referring to the respective entry maps of the 2D clip information file and the DEP clip information file. At this point, extent ATC times are aligned between extent pairs. Furthermore, the control unit 5304 designs the arrangement of extents so that the size of each base-view extent, dependent-view extent, and extended extent satisfies conditions 1-6. In particular, as shown in FIG. 13, at least two extent pairs are arranged immediately after one extended extent, and designed to have the same extent ATC time as that of the one extended extent.

The control unit 5304 also extracts the stream attribute information 2720 shown in FIG. 27 from the elementary stream in which the main TS, the sub-TS, and the extended stream are to be multiplexed and associates a combination of an entry map 2730, 3D meta data 2740, and stream attribute information 2720 with a piece of clip information 2710, as shown in FIG. 27. The 2D clip information file, the DEP clip information file, and the extended clip information file are thus generated. Subsequently, the control unit 5304 generates the 2D playlist file, the 3D playlist file, and the extended playlist file by referring to each clip information file.

The multiplexer 5305 multiplexes the elementary streams 5311-5313 stored in the recording unit 5301 into stream data in MPEG2-TS format. Specifically, as shown in FIG. 5, each of the elementary streams 5311-5312 is first converted into a series of TS packets. The series of TS packets are then multiplexed into one sequence of multiplexed stream data. The main TS, the sub-TS, and the extended stream are thus generated. These pieces of multiplexed stream data are output to the source packetizer 5306.

The source packetizer 5306 converts each TS packet in the main TS, the sub-TS, and the extended stream into one source packet. The main TS, the sub-TS, and the extended stream are thus each converted into a series of source packet sequences and output to the write unit 5307.

The write unit 5307 first writes the source packet sequences generated by the source packetizer 5306 on a BDR, such as a BD disc, in accordance with the arrangement of extents designed by the control unit 5304. In parallel, the write unit 5307 generates the file entries for the file 2D, the file DEP, the file SS, and the extended stream file within internal memory. Upon completion of writing all the source packet sequences to the BDR, such as a BD disc, the write unit 5307 writes the file entry for each AV stream file to the BDR, such as a BD disc. Each source packet sequence is thus recorded on the BDR, such as a BD disc, as an AV stream file. Subsequently, the write unit 5307 records the scenario data 5314 stored in the recording unit 5301 on the BDR, such as a BD disc.

When generating the file entry of the AV stream file, the write unit 5307 refers to the entry map and the 3D metadata included in the clip information file. Each SPN for entry points and extent start points is thereby used in creating allocation descriptors. In particular, the value of the LBN and the extent size to be represented by each allocation descriptor are determined in accordance with the arrangement of extents designed by the control unit 5304 so as to express an interleaved arrangement like the one shown in FIG. 11.

Figure 54:
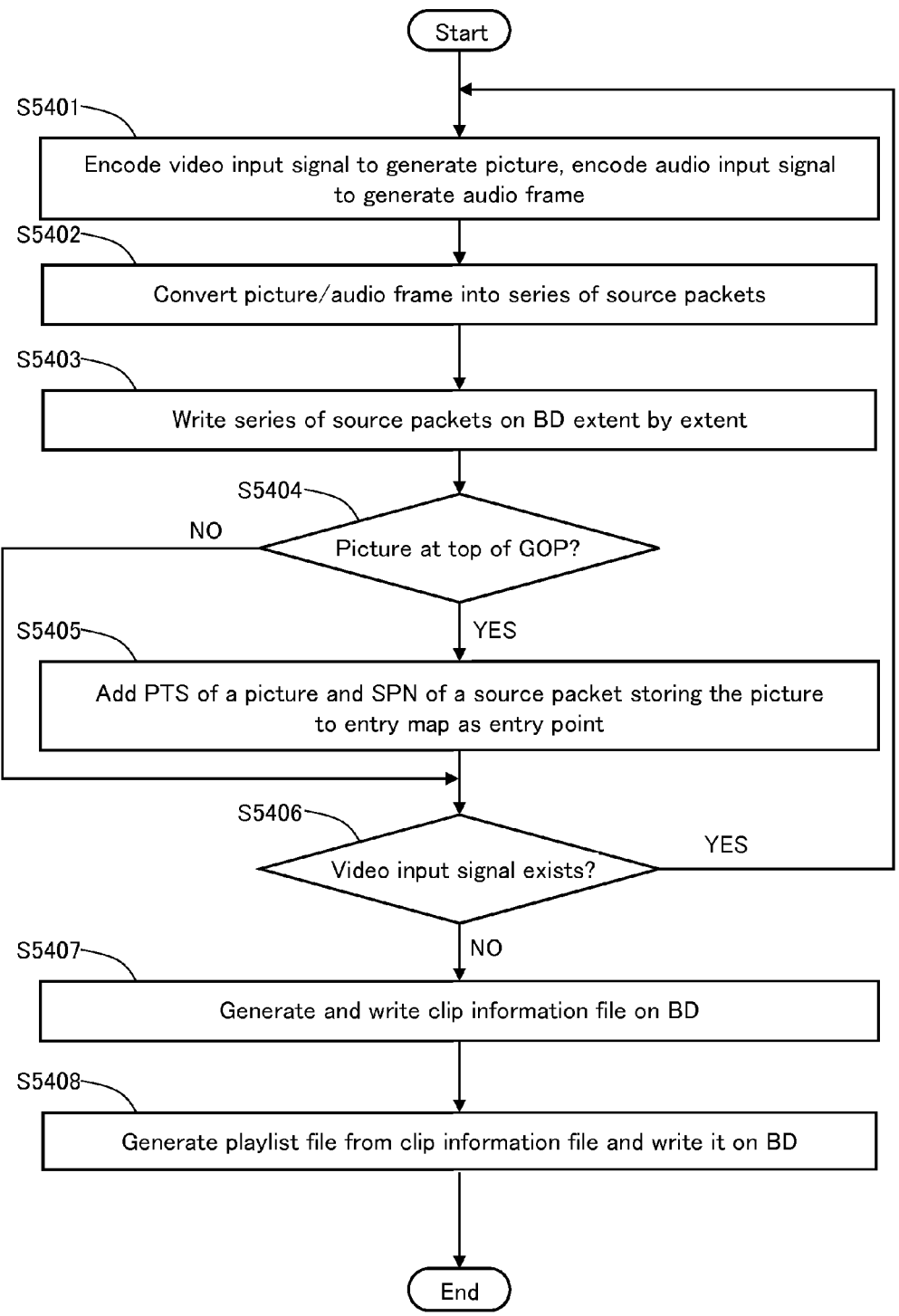
FIG. 54 is a flowchart of a method for real-time recording of content onto a BD disc BDR or the like using the recording device 5300 shown in FIG. 53.

FIG. 54 is a flowchart of a method for real-time recording of content onto a BDR, such as a BD disc, using the recording device 5300 shown in FIG. 53. This method begins, for example, when power to the recording device 5300 is turned on.

In step S5401, the video encoder 5302 encodes a video input signal VIN to generate a picture and encodes an audio input signal AIN to generate an audio frame. In particular, the video frame representing the left view of a 3D video image is encoded as a base-view picture, and the video frame representing the right view is encoded as a dependent-view picture. Furthermore, a 4K2K video frame is converted into resolution extension information with reference to the base-view picture. The generated pictures, audio frame, and resolution extension information are stored in the recording unit 5301. Thereafter, the process proceeds to step S5402.

In step S5402, the multiplexer 5305 multiplexes the pictures, audio frame, and resolution extension information stored in the recording unit 5301 into one TS. Furthermore, the source packetizer 5306 converts the TS into a source packet sequence and transfers the source packet sequence to the write unit 5307. Thereafter, the process proceeds to step S5403.

In step S5403, the write unit 5307 accumulates the source packet sequence generated by the source packetizer 5306. Based on the accumulated source packet sequence, the control unit 5304 designs the arrangement of extents to be recorded on the BDR, such as a BD disc. The write unit 5307 writes the source packet sequences on the BDR, such as a BD disc, in accordance with the arrangement of extents designed by the control unit 5304. In parallel, the write unit 5307 generates the file entries for the AV stream files within internal memory. Thereafter, the process proceeds to step S5404.

In step S5404, the video encoder 5302 checks whether the picture generated in step S5401 is at the top of a GOP. If the picture is at the top of a GOP, the process proceeds to step S5405. If the picture is not at the top of a GOP, the process proceeds to step S5406.

In step S5405, the picture generated in step S5401 is at the top of a GOP. Accordingly, the video encoder 5302 transmits the PTS of the picture and two SPNs to the control unit 5304; the first SPN is assigned to the top of source packets in which the picture is to be stored; and the second SPN is assigned to the top of source packets in which resolution extension information for the picture is to be stored. The control unit 5304 adds the PTS and the first SPN transmitted by the video encoder 5302 to the entry map as one entry point. Thereafter, the process proceeds to step S5406.

In step S5406, the video encoder 5302 checks the presence of a video input signal VIN to be decoded. If the video input signal YIN is present, the process is repeated from step S5401. If not, the process proceeds to step S5407.

In step S5407, all of the video input signals VIN to be decoded are converted into multiplexed stream data and recorded on the BDR, such as a BD disc. Accordingly, the write unit 5307 transmits the file entry for each AV stream from internal memory to the BDR, such as a BD disc. On the other hand, the control unit 5304 extracts the stream attribute information from the elementary streams to be multiplexed into the main TS, the sub-TS, and the extended stream and associates the stream attribute information with clip information along with the entry map and the 3D metadata. The 2D clip information file, the DEP clip information file, and the extended clip information file are thus generated. The write unit 5307 thus records these clip information files on the BDR, such as a BD disc. Thereafter, the process proceeds to step S5408.

In step S5408, the control unit 5304 uses the 2D clip information file, the DEP clip information file, and the extended clip information file to generate the 2D playlist file, the 3D playlist file, and the extended playlist file. The write unit 5307 records these playlist files on the BDR, such as a BD disc. Processing then terminates.

Embodiment 5

As Embodiment 5 of the present invention, a device and method for recording content onto a BD-ROM disc are described below. The device and method use for the recording the arrangements of extents according to Embodiments 1 and 2 of the present invention. The recording device described in Embodiment 5 of the present invention is called an authoring device. The authoring device is generally located at a creation studio and used by authoring staff to create content to be distributed. First, in response to operations by the authoring staff, the recording device converts content into AV stream files using a predetermined compression encoding method. The content is expressed as both 2D video images at 4K2K and as full HD 3D video images. Next, the recording device generates a scenario. Then, the recording device generates a volume image for a BD-ROM disc from the AV stream files and scenario. Finally, the recording device records the value image on a BD-ROM disc.

Figure 55:
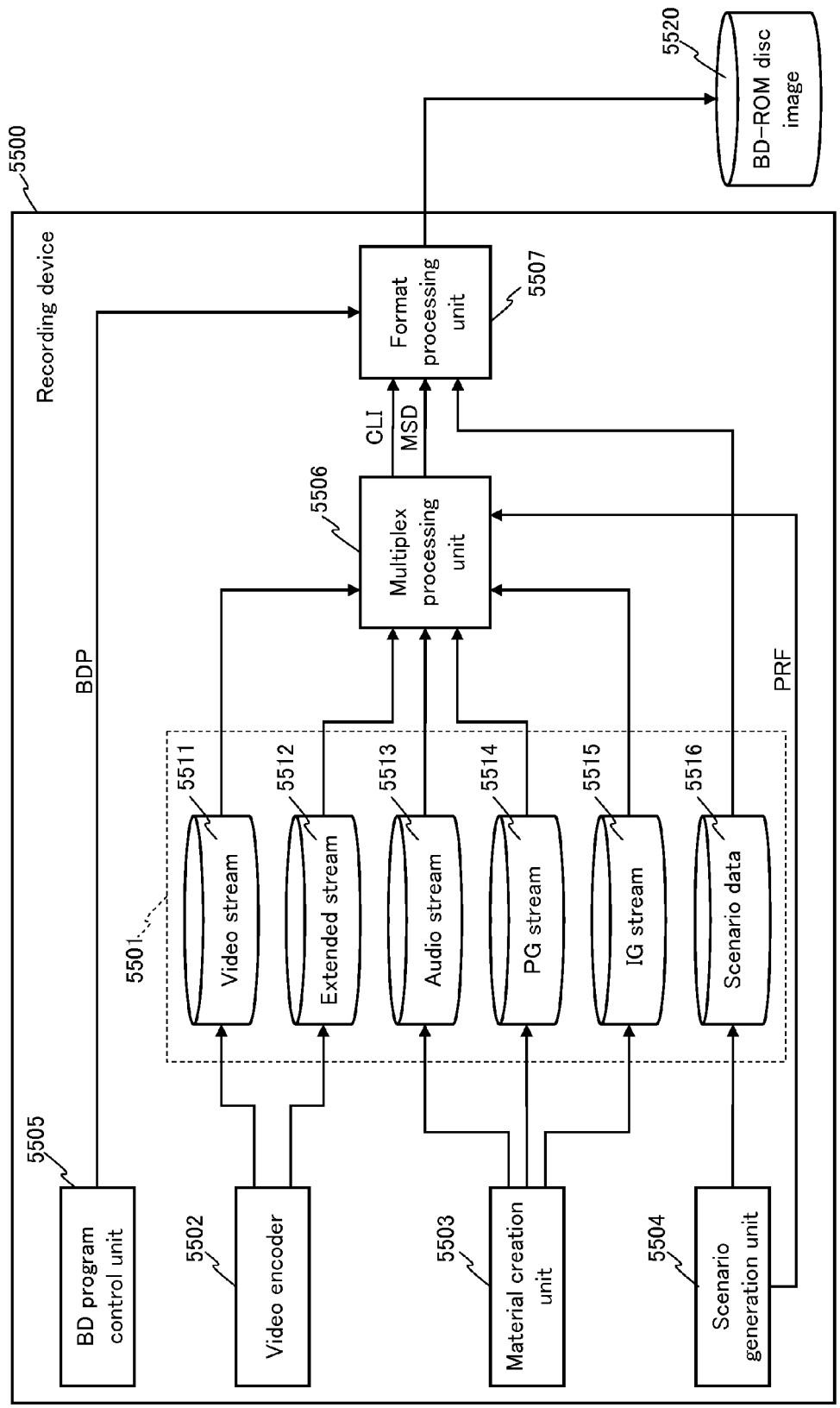
FIG. 55 is a functional block diagram of a recording device according to Embodiment 5 of the present invention.

FIG. 55 is a functional block diagram of a recording device according to Embodiment 5 of the present invention. As shown in FIG. 55, the recording device 5500 includes a database unit 5501, video encoder 5502, material creation unit 5503, scenario generation unit 5504, BD program creation unit 5505, multiplex processing unit 5506, and format processing unit 5507.

The database unit 5501 is a nonvolatile storage device embedded in the recording device 5500 and is in particular an HDD. Alternatively, the database unit 5501 may be an external HDD connected to the recording device 5500, or a nonvolatile semiconductor memory device internal or external to the recording device 5500.

The video encoder 5502 is dedicated hardware for encoding of video data. Alternatively, the video encoder 5502 may be an element that functions by the CPU internal to the recording device 5500 executing specific software. The video encoder 5502 receives video data, such as uncompressed bit map data, from the authoring staff and compresses the received video data in accordance with a compression encoding method such as MPEG-4 AVC, MVC, or MPEG-2. The video data is thus converted into a combination of a base-view video stream, a dependent-view video stream, and an extended stream. The converted video streams 5511 and the extended stream 5512 are stored in the database unit 5501.

Like the video encoder 5302 shown in FIG. 53, the video encoder 5502 converts the 3D video image data into a pair of a base-view video stream and a dependent-view video stream. In particular, the video encoder 5502 calculates depth information of each 3D video image based on motion vectors between the left view and the right view and generates the depth map stream with reference to the depth information. The video encoder 5502 also refers to the base-view video stream obtained by encoding the 3D video image data to generate the extended stream that includes resolution extension information from the 2D video image data at 4K2K.

The material creation unit 5503 creates elementary streams other than the video stream 5511 and the extended stream 5512, such as an audio stream 5513, PG stream 5514, and IG stream 5515 and stores the created streams in the database unit 5501. For example, the material creation unit 5503 receives uncompressed LPCM audio data from the authoring staff, encodes the uncompressed LPCM audio data in accordance with a compression encoding method such as AC-3, and converts the encoded LPCM audio data into the audio stream 5513. When a DTS-HD extended audio stream is generated as the audio stream, each audio frame is separated into a DTS-HD core audio frame and an extended portion. The former is stored in the audio stream, and the latter is stored in the extended stream. The material creation unit 5503 additionally receives a subtitle information file from the authoring staff and generates the PG stream 5514 in accordance with the subtitle information file. The subtitle information file defines image data or text data for showing subtitles, display timings of the subtitles, and visual effects to be added to the subtitles, such as fade-in/out. Furthermore, the material creation unit 5503 receives bit map data and a menu file from the authoring staff and generates the IG stream 5515 in accordance with the bit map data and the menu file. The bit map data shows images that are to be displayed on a menu. The menu file defines how each button on the menu is to be transitioned from one status to another and defines visual effects to be added to each button.

The scenario generation unit 5504 generates scenario data 5516 in response to an instruction received from the authoring staff via a GUI and then stores the created scenario data 5516 in the database unit 5501. The scenario data 5516 includes an index file, an MV object file, and a playlist file and specifies the playback method of the elementary streams 5511-5515 stored in the database unit 5501. The scenario generation unit 5504 further generates a parameter file PRF and transfers the generated parameter file PRF to the multiplex processing unit 5506. The parameter file PRF defines, from among the elementary streams 5511-5515 stored in the database unit 5501, the elementary streams to be respectively multiplexed into the main TS, the sub-TS, and the extended stream.

The BD program creation unit 5505 provides the authoring staff with a programming environment for programming BD-J objects and Java application programs. The BD program creation unit 5505 receives a request from a user via a GUI and generates each program's source code according to the request. The BD program creation unit 5505 further generates BD-J object files from the BD-J objects and compresses the Java application programs in JAR files. The program files BDP are transferred to the format processing unit 5507.

The multiplex processing unit 5506 multiplexes the elementary streams 5511-5515 stored in the database unit 5501 as stream data in MPEG2-TS format in accordance with a parameter file PRF. Specifically, as shown in FIG. 5, each of the elementary streams 5511-5515 is first converted into a series of source packets. Next, the series of source packet are multiplex into a single series of multiplexed stream data. The main TS, the sub-TS, and the extended stream are thus generated. These pieces of multiplexed stream data MSD are output to the format processing unit 5507.

The multiplex processing unit 5506 then generates a 2D clip information file, a DEP clip information file, and an extended clip information file by the following four steps (I)-(IV). (I) An entry map is generated for each of the file 2D, the file DEP, and the extended clip information file. (II) Extent start points are generated by referring to the entry map of each clip information file. At this point, extent ATC times are aligned between extent pairs. Furthermore, the multiplex processing unit 5506 designs the arrangement of extents so that the size of each base-view extent, dependent-view extent, and extended extent satisfies conditions 1-6. In particular, as shown in FIG. 13, at least two extent pairs are arranged immediately after one extended extent, and designed to have the same extent ATC time as that of the one extended extent. (III) The multiplex processing unit 5506 extracts the stream attribute information from elementary streams to be multiplexed into the main TS, the sub-TS, and the extended stream. (IV) A combination of the entry map, 3D metadata, and stream attribute information is associated with the clip information. Each clip information file CLI is thus generated and transmitted to the format processing unit 5507.

The format processing unit 5507 creates a BD-ROM disc image 5520 from (i) the scenario data 5516 stored in the database unit 55801, (ii) program files BDP such as BD-J object files created by the BD program creation unit 5505, and (iii) multiplexed stream data MSD and clip information files CLI generated by the multiplex processing unit 5506.

The format processing unit 5507 stores the multiplexed stream data MSD in the file 2D, the file DEP, the file SS, and the extended stream file. When generating the file entries of these AV stream files, the format processing unit 5507 refers to the entry map and the 3D metadata included in the clip information file. Each SPN for entry points and extent start points is thereby used in creating allocation descriptors. In particular, the value of the LBN and the extent size to be represented by each allocation descriptor are determined in accordance with the arrangement of extents designed by the multiplex processing unit 5506 so as to express an interleaved arrangement like the one shown in FIG. 11.

Figure 56:
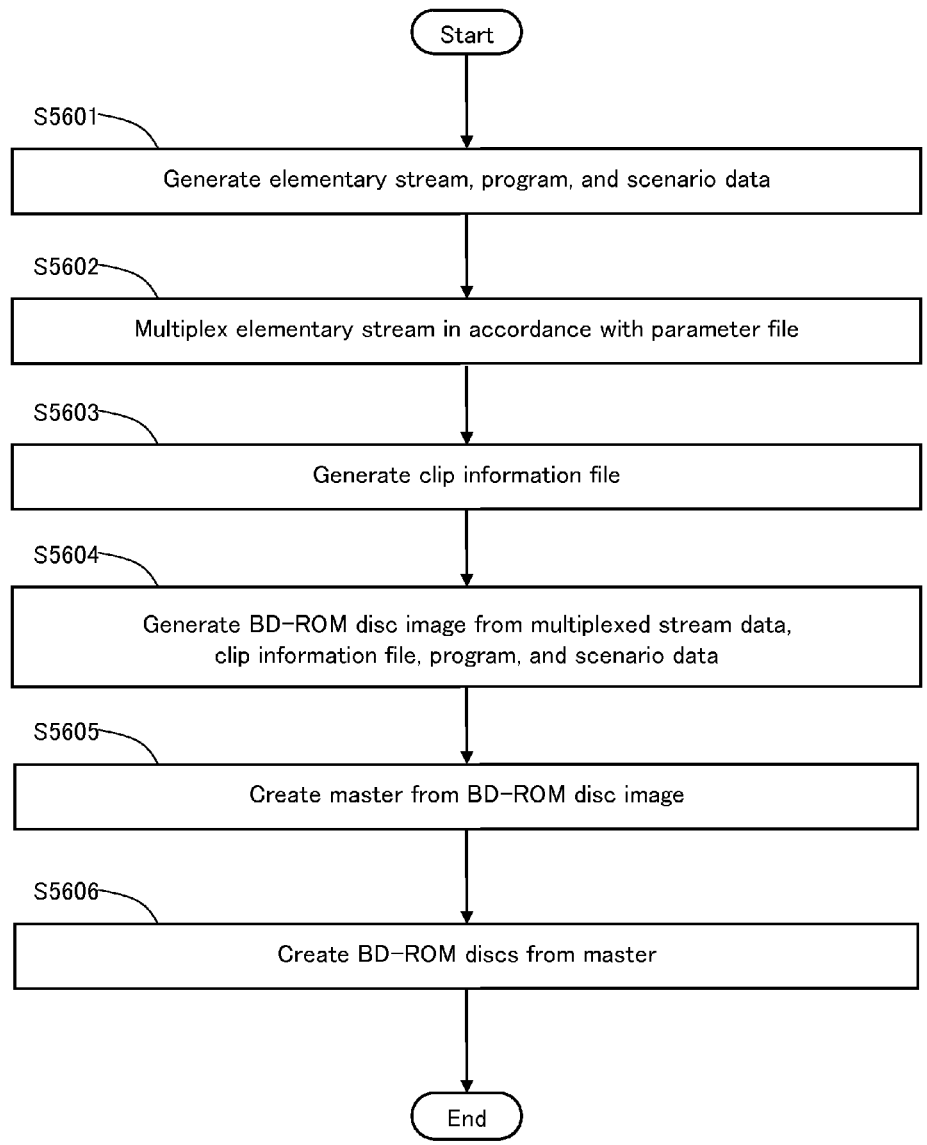
FIG. 56 is a flowchart of a method for recording content on a BD-ROM disc using the recording device 5500 shown in FIG. 55.
Figure 57:
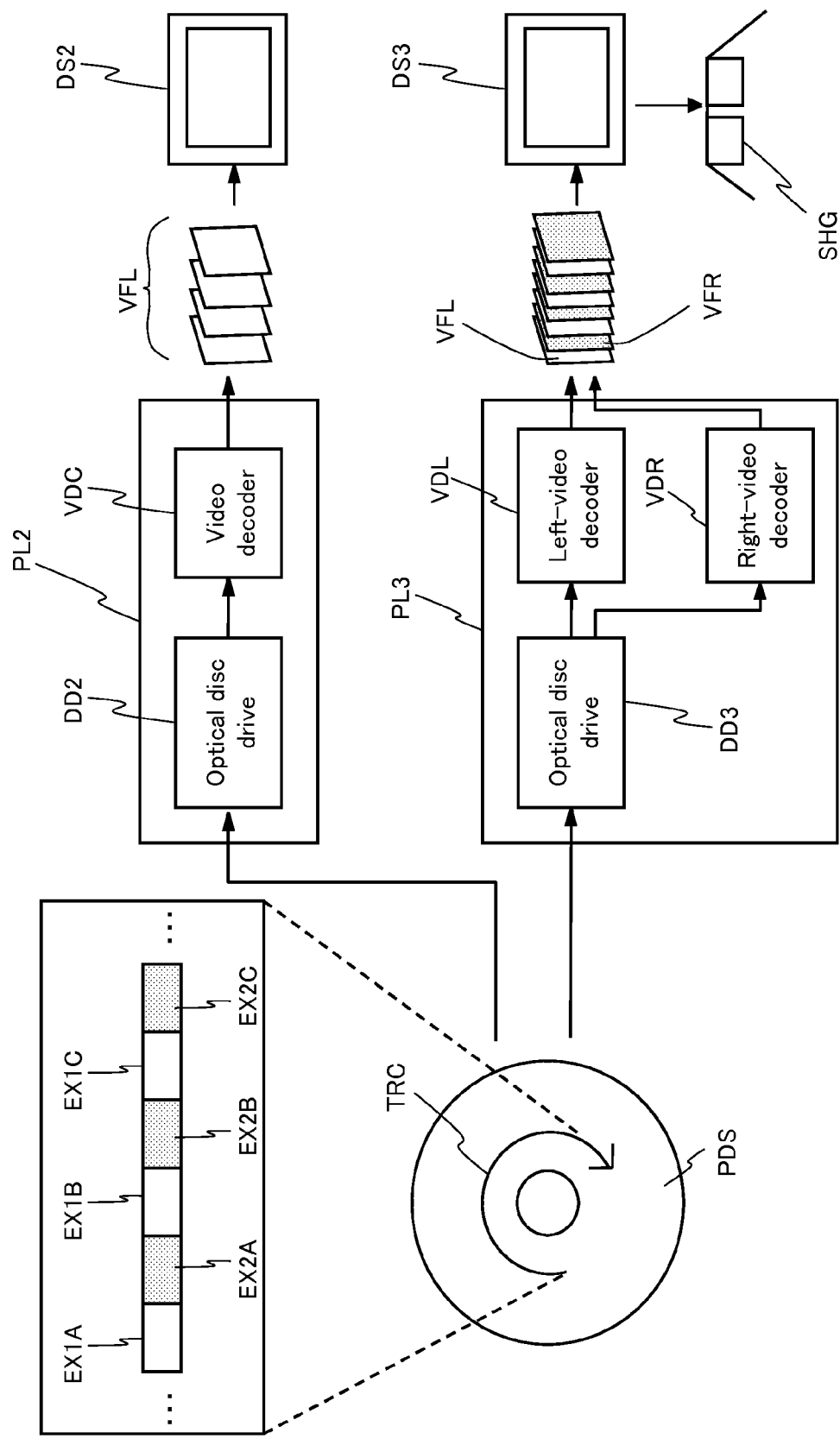
FIG. 57 is a schematic diagram showing technology for ensuring compatibility with 2D playback devices for an optical disc on which 3D video content is recorded.

FIG. 56 is a flowchart of a method for recording content on a BD-ROM disc using the recording device 5500 shown in FIG. 55. This method begins, for example, when power to the recording device 5500 is turned on.

In step S5601, the elementary streams, programs, and scenario data to be recorded on a BD-ROM disc are generated. In other words, the video encoder 5502 generates a video stream 5511 and an extended stream 5512. The material creation unit 5503 generates an audio stream 5513, PG stream 5514, and IG stream 5515. The scenario generation unit 5504 generates scenario data 5516. These created pieces of data 5511-5516 are stored in the database unit 5501. The scenario generation unit 5504 also generates a parameter file PRF and transfers the generated parameter file PRF to the multiplex processing unit 5506. The BD program creation unit 5505 generates program files BDP, which include BD-J object files and JAR files, and transfers the program files BDP to the format processing unit 5507. Thereafter, the process proceeds to step S5602.

In step S5602, the multiplex processing unit 5506 reads the elementary streams 5511-5515 from the database unit 5501 in accordance with a parameter file PRF and multiplexes the elementary streams into stream data in MPEG2-TS format. Thereafter, the process proceeds to step S5603.

In step S5603, the multiplex processing unit 5506 then generates a 2D clip information file, a DEP clip information file, and an extended clip information file. Furthermore, the multiplex processing unit 5506 sets the size of each base-view extent, dependent-view extent, and extended extent so as to satisfy conditions 1-6. Thereafter, the process proceeds to step S5604.

In step S5604, the format processing unit 5507 creates a BD-ROM disc image 5520 from the scenario data 5516, program files BDP, multiplexed stream data MDS, and clip information file CLI. In particular, when the multiplexed stream data MDS is stored in an AV stream file, the value of the LBN and the extent size to be represented by each allocation descriptor in the file entry are determined in accordance with the arrangement of extents designed by the multiplex processing unit 5506 so as to express an interleaved arrangement like the one shown in FIG. 11. Thereafter, the process proceeds to step S5605.

In step S5604, a digital watermark may be embedded into the BD-ROM disc image 5520. The digital watermark is an identifier non-detectable by normal playback devices. Checking the presence or absence of the digital watermark on the BD-ROM disc with a special playback device can determine whether or not the BD-ROM disc is a pirated one.

In step S5605, the BD-ROM disc image 5520 is converted into data for BD-ROM pressing. This data is recorded on a master BD-ROM disc by a mastering device. Thereafter, the process proceeds to step S5606.

In step S5605, an electronic signature of the Advanced Access Content System Licensing Administrator (AACS LA) may be recorded onto the master BD-ROM disc, along with data for BD-ROM pressing. The AACS LA is an organization that manages licenses related to technologies of protecting copyrighted works with the next generation of digital home electric appliances. An owner of the mastering device, when licensed from the AACS LA, sends a portion of the data for BD-ROM pressing to the AACS LA, then allowed to have the electronic signature of the AACS LA. A playback device, when reproducing data from a BD-ROM disc, checks the presence of the electronic signature thereon, thereby being able to authenticate the BD-ROM disc that the AACS LA authorizes.

In step S5605, a portion of the BD-ROM disc image 5520, especially the video and audio streams, may be encrypted to protect copyright or improve confidentiality of data. In this case, encrypted data of a title key and a Media Key Block (MKB) are recorded on the master BD-ROM disc. The title key is a key required to decrypt the encrypted portion of the BD-ROM disc image 5520. The MKB is data provided from the AACS LA to be used to encrypt the title key and decrypt the encrypted title key. A playback device, when reproducing the encrypted video stream and the likes, first decrypts the encrypted title key with a device key, the MKB, and a volume ID. The device key is a code uniquely assigned to the playback device. The volume ID is a code uniquely assigned to the BD-ROM disc and written in the BCA 201 of the BD-ROM disc 101 shown in FIG. 2. The playback device next uses the decrypted title key to decrypt the encrypted video stream and the likes. Since the title key can be decrypted only with the correct combination of a device key, MKB, and volume ID, only the combination of a playback device and BD-ROM disc authorized by the AACS LA can correctly play back the encrypted video stream and the likes.

In step S5606, BD-ROM discs 101 are mass produced by pressing the master obtained in step S5605. Processing thus concludes.

<<Supplement>>

<File System on Recording Medium>

When UDF is used as the file system for the recording medium, a data recording area such as the volume area 202B of the BD-ROM disc 101 shown in FIG. 2 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and subordinate files.

The "file entry" includes a descriptor tag, Information Control Block (ICB) tag, and allocation descriptor. The "descriptor tag" indicates that the type of the data that includes the descriptor tag is a file entry. For example, when the value of the descriptor tag is "261," the type of that data is a file entry. The "ICB tag" indicates attribute information for the file entry itself. The "allocation descriptor" indicates the LBN of the sector on which the directory file belonging to the same directory is recorded.

The "directory file" typically includes a plurality of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file," as described below, includes address information for the data constituting the actual subordinate file.

By tracing the file set descriptors and the file identifier descriptors of subordinate directories/files in order, the file entry of an arbitrary directory-file recorded on the recording medium can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information for the file entry itself. The "allocation descriptors" are provided in a one-to-one correspondence with each extent and indicate the arrangement of each extent in the data recording area, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. Specifically, when the two most significant bits are "0," an extent has been assigned to the sector and has been actually recorded thereat. When the two most significant bits are "1," an extent has been assigned to the sector but has not been yet recorded thereat.

Like the above-described file system employing a UDF, when each file recorded on the recording medium is divided into a plurality of extents, the file system for the recording medium also generally stores the information showing the locations of the extents, as with the above-mentioned allocation descriptors, in the recording medium. By referring to the information, the location of each extent, particularly the logical address thereof, can be found.

<Other Aspects of the Present Invention>

The claims recite a recording medium, playback device, and recording device according to the first aspect of the present invention. Alternatively, based on the above-described Embodiments 1-3, the present invention may be characterized as follows.

A recording medium according to a second aspect of the present invention comprises a main-view stream, a sub-view stream, and an extended stream recorded thereon. The main-view stream contains a main-view video stream constituting main views of stereoscopic video images, and is divided into a plurality of main-view extents arranged on the recording medium. The sub-view stream contains a sub-view video stream constituting sub-views of the stereoscopic video images, and is divided into a plurality of sub-view extents arranged on the recording medium. The extended stream contains extended data to be used in combination with the main-view stream, and is divided into a plurality of extended extents arranged on the recording medium. When one of the plurality of extended extents is placed adjacent to one of the plurality of main-view extents, a minimum of a data amount of the one of the plurality of extended extents is smaller than a minimum of a data amount that a playback device continuously reads from the recording medium without performing a jump.

A playback device according to the second aspect of the present invention is for playing back a main-view stream, a sub-view stream, and an extended stream from a recording medium. The main-view stream contains a main-view video stream constituting main views of stereoscopic video images, and is divided into a plurality of main-view extents arranged on the recording medium. The sub-view stream contains a sub-view video stream constituting sub-views of the stereoscopic video images, and is divided into a plurality of sub-view extents arranged on the recording medium. The extended stream contains extended data to be used in combination with the main-view stream, and is divided into a plurality of extended extents arranged on the recording medium. The playback device comprises: a read unit configured to read data from the recording medium; a switching unit configured to extract the main-view stream, the sub-view stream, and the extended stream from the data read by the read unit; a first read buffer configured to store the main-view stream extracted by the switching unit; a second read buffer configured to store the sub-view stream extracted by the switching unit; a third read buffer configured to store the extended stream extracted by the switching unit; and a decoding unit configured to read and decode the main-view stream from the first read buffer, the sub-view stream from the second read buffer, and the extended stream from the third read buffer. A data amount that the read unit continuously reads from the recording medium without performing a jump equals or exceeds a predetermined threshold value. The read unit, when reading one of the plurality of extended extents placed adjacent to one of the plurality of main-view extents, continuously reads the one of the plurality of extended extents along with the one of the plurality of main-view extents.

A recording device according to the second aspect of the present invention is for recording a main-view stream, a sub-view stream, and an extended stream on a recording medium. The recording device comprises: an encoding unit configured to encode main views of stereoscopic video images into a main-view video stream, sub-views of the stereoscopic video images into a sub-view video stream, and extended data to be used in combination with the main-view video stream; a multiplexing unit configured to multiplex the main-view video stream into the main-view stream, the sub-view video stream into the sub-view stream, and the extended data into the extended stream, and then determine an arrangement of the main-view, sub-view, and extended streams on the recording medium; and a write unit configured to write the main-view, sub-view, and extended streams onto the recording medium. The multiplexing unit divides the main-view stream into a plurality of main-view extents, the sub-view stream into a plurality of sub-view extents, and the extended stream into a plurality of extended extents, and then arranges the extents. The multiplexing unit, when placing one of the plurality of extended extents adjacent to one of the plurality of main-view extents, sets a minimum of a data amount of the one of the plurality of extended extents to be smaller than a minimum of a data amount that a playback device continuously reads from the recording medium without performing a jump.

The recording medium according to the second aspect of the present invention includes one of the extended extents, which is adjacent to one of the main-view extents, having a lower limit of data amount smaller than that a playback device continuously reads from the recording medium without any jump. The playback device reads the one of the extended extents continuously with the adjacent one of the main-view extents. This allows the one of the extended extents to avoid padding bits to be appended thereto. As a result, the recording medium has so large a recordable area for the main-view and sub-view extents that its data area can be used more efficiently.

A playback device according to a third aspect of the present invention is for playing back a main-view stream, a sub-view stream, and an extended stream from a recording medium. The main-view stream contains a main-view video stream constituting main views of stereoscopic video images and an audio stream, and is divided into a plurality of main-view extents arranged on the recording medium. The sub-view stream contains a sub-view video stream constituting sub-views of the stereoscopic video images, and is divided into a plurality of sub-view extents arranged on the recording medium. The extended stream contains extended audio data to be used in combination with the audio stream, and is divided into a plurality of extended extents arranged on the recording medium. The playback device comprises: a read unit configured to read data from the recording medium; a switching unit configured to extract the main-view stream, the sub-view stream, and the extended stream from the data read by the read unit; a first read buffer configured to store the main-view stream extracted by the switching unit; a second read buffer configured to store the sub-view stream extracted by the switching unit; a third read buffer configured to store the extended stream extracted by the switching unit; and a decoding unit configured to read and decode the main-view stream from the first read buffer, the sub-view stream from the second read buffer, and the extended stream from the third read buffer. When the switching unit fails to extract a portion of the extended audio data read by the read unit that is to be combined with a portion of the audio stream read by the read unit, the decoding unit outputs default extended audio data instead of the portion of the extended audio data.

The playback device according to the third aspect of the present invention, at interrupt playback for example, starts reading from a main-view extent including the playback start portion, thus reducing the wait time from when the interrupt playback is requested until when it is actually started. In this case, the playback device does not read the extended audio data assigned to the playback start portion, but instead of it, combines and uses the default extended audio data with the audio stream contained in the main-view stream. Thus, the playback device can prevent any unnatural change in sounds.

INDUSTRIAL APPLICABILITY

The present invention relates to the technology for recording and playing back stereoscopic video images, and as described above, designs the sizes of extents to be recorded on a recording medium with the above-described conditions 1 through 6 satisfied. The present invention thus clearly has industrial applicability.

REFERENCE SIGNS LIST

B[m] base-view extent
D[m] dependent-view extent
T[m] extended extent
$T_k$ resolution extension information for base-view extent B[m+k]
$S_{EXT1}[m]$ size of base-view extent
$S_{EXT2}[m]$ size of dependent-view extent
$S_{EXT3}[m]$ size of extended extent

The invention claimed is:

1. A recording medium comprising a main-view stream, a sub-view stream, and an extended stream recorded thereon,
the main-view stream containing a main-view video stream constituting main views of stereoscopic video images, and being divided into a plurality of main-view extents arranged on the recording medium,
the sub-view stream containing a sub-view video stream constituting sub-views of the stereoscopic video images, and being divided into a plurality of sub-view extents arranged on the recording medium,
the extended stream containing extended data to be used in combination with the main-view stream, and being divided into a plurality of extended extents arranged on the recording medium, wherein at least two each of the plurality of main-view extents and the plurality of sub-view extents are placed in a continuous, interleaved arrangement between an adjacent pair of the plurality of extended extents, and the number of pairs of the plurality of main-view extents and the plurality of sub-view extents that are continuously arranged between the adjacent pair of the plurality of extended extents is determined such that a jump distance between the adjacent pair of the plurality of extended extents does not exceed a predetermined threshold value.

2. The recording medium according to claim 1, wherein
a maximum jump time is specified to increase in a staircase pattern with increase of a jump distance, and
the threshold value is equal to a value that a jump distance reaches immediately before a maximum jump time increases to a predetermined level.

3. The recording medium according to claim 1, wherein
the extended data contains information necessary for converting the main-views to video images with a higher resolution.

4. The recording medium according to claim 3, wherein
the information includes a value of the higher resolution, a scheme of interpolation to be used to raise the resolution of the main-views, and difference data between the main-views after the interpolation and the video images with the higher resolution.

5. The recording medium according to claim 1, wherein
the extended data contains a depth map for the stereoscopic video images.

6. The recording medium according to claim 1, wherein
the main-view stream contains an audio stream, and the extended data contains extended audio data to be used in combination with the audio stream.

7. The recording medium according to claim 1, wherein
the extended data contains stream data constituting monoscopic video images to be displayed in a picture-in-picture manner with the main-views.

8. The recording medium according to claim 1, wherein
the extended data contains information necessary for increasing the number of bits of pixel data constituting the main-views.

9. The recording medium according to claim 1, wherein
the extended data contains information necessary for raising the frame rate of the main-view video stream.

10. The recording medium according to claim 1, wherein
the extended data contains information necessary for increasing an angle of view for video images represented by the main-view video stream.

11. The recording medium according to claim 1, wherein
the extended data contains a sub-view video stream constituting sub-views that have different attributes from the sub-views constituted by the sub-view video stream contained in the sub-view stream.

12. A playback device for playing back a main-view stream, a sub-view stream, and an extended stream from a recording medium, wherein:
the main-view stream contains a main-view video stream constituting main views of stereoscopic video images, and is divided into a plurality of main-view extents arranged on the recording medium;
the sub-view stream contains a sub-view video stream constituting sub-views of the stereoscopic video images, and is divided into a plurality of sub-view extents arranged on the recording medium;

the extended stream contains extended data to be used in combination with the main-view stream, and is divided into a plurality of extended extents arranged on the recording medium; and at least two each of the plurality of main-view extents and the plurality of sub-view extents are placed in a continuous, interleaved arrangement between an adjacent pair of the plurality of extended extents, the playback device comprising:
a processor; and
a non-transitory computer-readable medium having stored thereon executable instructions that, when executed by the processor, cause said playback device to function as:
a read unit configured to read data from the recording medium;
a switching unit configured to extract the main-view stream, the sub-view stream, and the extended stream from the data read by the read unit;
a first read buffer configured to store the main-view stream extracted by the switching unit;
a second read buffer configured to store the sub-view stream extracted by the switching unit;
a third read buffer configured to store the extended stream extracted by the switching unit; and
a decoding unit configured to read and decode the main-view stream from the first read buffer, the sub-view stream from the second read buffer, and the extended stream from the third read buffer, wherein
when the stereoscopic video images are played back, the read unit reads the plurality of main-view extents and the plurality of sub-view extents from the recording medium, and jumps over recording areas of the plurality of extended extents,
a capacity allocated to the first read buffer is larger than a data amount of portion of the main-view stream read by the decoding unit from the first read buffer during a period when the read unit jumps over the recording area of one of the plurality of extended extents, and
a capacity allocated to the second read buffer is larger than a data amount of portion of the sub-view stream read by the decoding unit from the second read buffer during the period.

13. The playback device according to claim 12, wherein
the number of pairs of the plurality of main-view extents and the plurality of sub-view extents that are continuously arranged between the adjacent pair of the plurality of extended extents is determined such that a jump distance between the adjacent pair of the plurality of extended extents does not exceed a predetermined threshold value.

14. A recording device for recording a main-view stream, a sub-view stream, and an extended stream on a recording medium, comprising:
a processor; and
a non-transitory computer-readable medium having stored thereon executable instructions that, when executed by the processor, cause said recording device to function as:
an encoding unit configured to encode main views of stereoscopic video images into a main-view video stream, sub-views of the stereoscopic video images into a sub-view video stream, and extended data to be used in combination with the main-view video stream;
a multiplexing unit configured to multiplex the main-view video stream into the main-view stream, the sub-view video stream into the sub-view stream, and the extended data into the extended stream, and then determine an arrangement of the main-view, sub-view, and extended streams on the recording medium; and a write unit configured to write the main-view, sub-view, and extended streams onto the recording medium, wherein the multiplexing unit divides the main-view stream into a plurality of main-view extents, the sub-view stream into a plurality of sub-view extents, and the extended stream into a plurality of extended extents, and then arranges the extents, the multiplexing unit places at least two each of the plurality of main-view extents and the plurality of sub-view extents in a continuous, interleaved arrangement between an adjacent pair of the plurality of extended extents, and the number of pairs of the plurality of main-view extents and the plurality of sub-view extents that are continuously arranged between the adjacent pair of the plurality of extended extents is determined such that a jump distance between the adjacent pair of the plurality of extended extents does not exceed a predetermined threshold value.

* * * * *